US007958457B1

(12) United States Patent
Brandenberg et al.

(10) Patent No.: US 7,958,457 B1
(45) Date of Patent: Jun. 7, 2011

(54) METHOD AND APPARATUS FOR SCHEDULING PRESENTATION OF DIGITAL CONTENT ON A PERSONAL COMMUNICATION DEVICE

(75) Inventors: Carl Brock Brandenberg, Cresson, TX (US); Robert L. Kay, Forth Worth, TX (US); Kenneth J. Maxwell, Forth Worth, TX (US); R. Brandon Cotter, Dallas, TX (US)

(73) Assignee: Wireless Agents, LLC, Fort Worth, TX (US)

( * ) Notice: Subject to any disclaimer, the term of this patent is extended or adjusted under 35 U.S.C. 154(b) by 0 days.

(21) Appl. No.: 09/944,482

(22) Filed: Aug. 31, 2001

Related U.S. Application Data

(63) Continuation-in-part of application No. 09/826,448, filed on Apr. 4, 2001, and a continuation-in-part of application No. 09/745,617, filed on Dec. 20, 2000.

(60) Provisional application No. 60/229,235, filed on Aug. 31, 2000, provisional application No. 60/232,063, filed on Sep. 12, 2000, provisional application No. 60/172,675, filed on Dec. 20, 1999, provisional application No. 60/194,644, filed on Apr. 4, 2000.

(51) Int. Cl.
*G06F 3/00* (2006.01)

(52) U.S. Cl. .................. 715/789; 715/811; 715/817

(58) Field of Classification Search .................. 345/708, 345/745, 789, 811; 715/708, 745, 789, 811, 715/864, 859, 860, 857, 858, 855, 820, 819, 715/818, 817, 736, 737, 740
See application file for complete search history.

(56) References Cited

U.S. PATENT DOCUMENTS

| 5,757,904 | A  | * | 5/1998 | Anderson | 379/265.06 |
| 5,930,803 | A  | * | 7/1999 | Becker et al. | 707/104.1 |
| 5,949,416 | A  | * | 9/1999 | Bush | 345/708 |
| 6,199,099 | B1 | * | 3/2001 | Gershman et al. | 709/203 |
| 6,232,970 | B1 | * | 5/2001 | Bodnar et al. | 345/708 |
| 6,504,990 | B1 | * | 1/2003 | Abecassis | 386/46 |

* cited by examiner

*Primary Examiner* — Ba Huynh
*Assistant Examiner* — Mylinh Tran
(74) *Attorney, Agent, or Firm* — James E. Walton; Richard G. Eldredge

(57) ABSTRACT

A method of presenting digital content to a user on a display of a computing device displaying a continuous stream of digital content in a stream portion of the display, obtaining a current context of the user and the computing device, providing contextual sensitivities for the digital content items, determining a value for the digital content item's relevance of being displayed, calculating a probability of displaying the digital content item based upon the value of the digital content item's relevance of being displayed, performing a random selection of the digital content item based upon the probability of displaying the digital content item, and presenting the digital content item in the stream of digital content being displayed.

2 Claims, 91 Drawing Sheets

| | Biographic Data | Data | Confidence | Correlation |
|---|---|---|---|---|
| 163 | Name | Sue | High | Yes |
| 165 | Gender | Female | High | Yes |
| 167 | Age | 13 | Medium | Yes |
| 169 | Ethnic Background | Chinese-American | Medium | No |
| | Demographic Data | | | |
| 171 | Culture | American | Low | No |
| 173 | Region | East Coast | High | Yes |
| 175 | Likely Family Income | High | Low | No |
| | Preferences Data | | | |
| 177 | Action Movies | High Interest | High | No |
| 179 | Hip-Hop Music | Low Interest | Low | No |
| 181 | Clothing from The GAP | High Interest | High | Yes |

Figure 1E

| Tower No. | Region | Adjoining Regions | Favorite Places | Network Affiliates |
|---|---|---|---|---|
| 203 | 213 | 221 | 225<br>Riding Stables | 253<br>Game Arcade |
| | | 215 | 227<br>Water Park | 255<br>Video Store |
| | | | | 257<br>Taco Stand |
| | | | | 259<br>Book Store |
| | | | | 261<br>Riding Supply Store |
| | | | | |
| | | | | |
| | | | | |

Figure 1G (1 of 5)

| Tower No. | Region | Adjoining Regions | Favorite Places | Network Affiliates |
|---|---|---|---|---|
| 205 | 215 | 213 | 229 Aunt Jane's House | 263 24-Hour Gym |
| | | 217 | 231 Linear Park | 265 Ice Skating Rink |
| | | 221 | 233 Pottery Supply Store | 267 Sporting Goods Superstore |
| | | | | 269 Promdress Shop |
| | | | | 271 Belgian Chocolate Store |
| | | | | 273 Pet Store |
| | | | | 278 Model Train Store |
| | | | | |
| | | | | |

Figure 1G (2 of 5)

| Tower No. | Region | Adjoining Regions | Favorite Places | Network Affiliates |
|---|---|---|---|---|
| 207 | 217 | 219 | 235 Candy's House | 275 Corn Maze |
| | | 221 | 237 Resale Boutique | 277 Aquarium |
| | | 215 | | 279 Museum |
| | | | | 281 I-MAX Theatre |
| | | | | 283 Movie Theatre |
| | | | | 285 Laser Tag Facility |
| | | | | 287 Pizza Place |
| | | | | 289 Zoo |
| | | | | 291 Public Library |

Figure 1G (3 of 5)

| Tower No. | Region | Adjoining Regions | Favorite Places | Network Affiliates |
|---|---|---|---|---|
| 209 | 219 | 217 | 239 Home | 293 Mall #1 |
| | | 221 | 241 School | 295 Mall #2 |
| | | | 243 Work | 297 Chinese Food |
| | | | 245 Suzy's House | 299 K-Mart |
| | | | | 301 Target |
| | | | | 303 Record Store |
| | | | | 305 Batting Cages |
| | | | | 307 Golf Driving Range |
| | | | | 309 Computer Superstore |
| | | | | 311 Boy's Club |
| | | | | 313 Church #1 |
| | | | | 315 Restaurant #14 |
| | | | | 317 Bicycle Shop |

Figure 1G (4 of 5)

| Tower No. | Region | Adjoining Regions | Favorite Places | Network Affiliates |
|---|---|---|---|---|
| 211 | 221 | 219 | 247<br>Uncle Clay's House | 319<br>Metro Stop |
| | | 217 | 249<br>The Gap | 321<br>Starbucks |
| | | 215 | 251<br>Grand Mother's House | 323<br>Bowling Alley |
| | | 213 | | 325<br>Antique Mall |
| | | | | 327<br>Tennis Facility |
| | | | | 329<br>Car Stereo Superstore |
| | | | | |
| | | | | |

Figure 1G (5 of 5)

| | | | | | | | | | | |
|---|---|---|---|---|---|---|---|---|---|---|
| | Digital Content ID | Playable Digital Content | Source | Type | Subject | Energy Required to Play (Units) | Energy Earned for Playing (Units) | Preferred Location | Preferred Time | Period |
| 385 | Digital Content A | Movie | Merchant #12 | Advertisement | X, Y | 0 | 5 | LATLONG1 | After School | Incrementally Larger with Location |
| 387 | Digital Content B | Text and Alarm | Government Entity | Warning | Weather | 0 | 0 | Various Changing | Immediate | One Time Only |
| 389 | Digital Content C | Graphical Icon | Friend #1 | Email Message | | 2 | 0 | N/A | ASAP | 7 Days |
| 391 | Digital Content D | Text Message | Acquaintance #3 | Request for Chat | | 5 | 0 | N/A | ASAP | 3 Hours |
| 393 | Digital Content E | Executable Spreadsheet | Merchant #2 | Survey | L, M | 0 | 20 | LATLONG2 | Between 12/1 and 12/25 | 25 Days |
| 395 | Digital Content F | Text Message | School | Announcement | Sporting Event | 1 | 0 | N/A | Between 3:00 pm and 10:00 pm | Incrementally Larger for 7 Days |
| 397 | Digital Content G | Calendar File | Soccer Team | Schedule | | 3 | 0 | N/A | | User Initiated for 2 Days |

Figure 1I

Contextual User Profile

| | Static Components 423 | | | Dynamic Data Components 425 | | | | | | | |
|---|---|---|---|---|---|---|---|---|---|---|---|
| | | | | Hard | | | | | Soft | | |
| User/Appliance | Biographic 423a | Demographic 423b | Cultural 423c | Latitude Longitude 425a | Time 425b | Date 425c | Available Energy 425d | Food Pref. 425e | Entertainment Preferences 425f | Relationship Preferences 425g | Privacy Block 425h |
| 351 | B1 | DM3 | C1 | LATLONG1 | 4:00 pm | 12/5 | 130 | F1 | E1 | R3 | P1 |
| 353 | B3 | DM2 | C2 | LATLONG2 | 4:30 pm | 12/5 | 43 | F2 | E3 | R2 | P2 |
| 355 | B2 | DM1 | C3 | LATLONG3 | 5:00 pm | 12/5 | 62 | F3 | E2 | R1 | P3 |
| 357 | B1 | DM2 | C1 | LATLONG4 | 4:00 pm | 12/5 | 227 | F3 | E1 | R1 | P4 |
| 359 | B3 | DM3 | C2 | LATLONG5 | 4:30 pm | 12/5 | 39 | F2 | E3 | R2 | P5 |
| 361 | B1 | DM3 | C3 | LATLONG6 | 5:00 pm | 12/5 | 200 | F1 | E2 | R3 | P6 |

Figure 1L

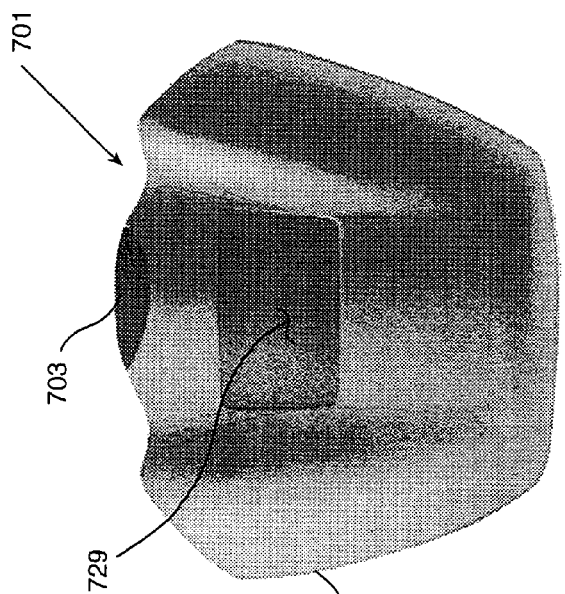
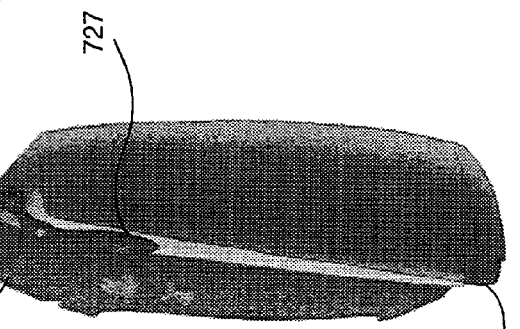
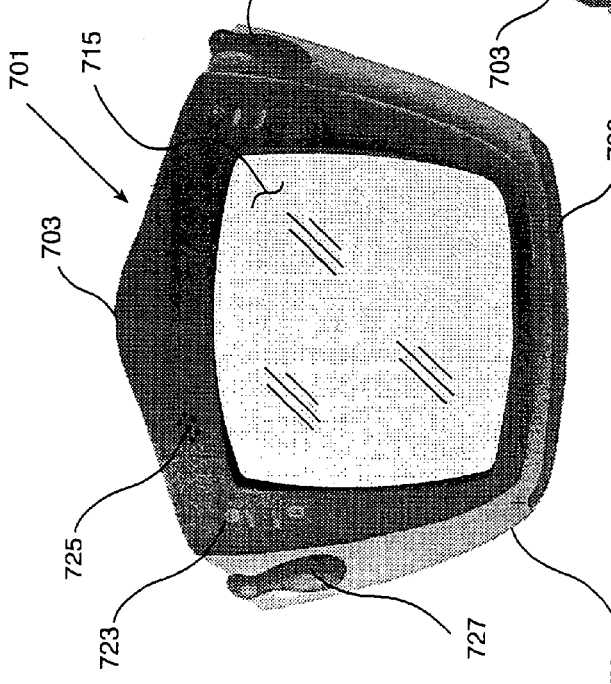
Figure 2R
Figure 2S
Figure 2Q

| Type of Input Element | Non-Biasing | Starting Position | Needs On-Screen Indicator | Continuous |
|---|---|---|---|---|
| One-Dimensional Touch Pad | Yes | No | No | Yes |
| Elongated Button | Yes | No | No | Yes |
| Touch Screen with Graphical Slider | Yes | No | Yes | Yes |
| Jog Wheel | No | Yes | Yes | Yes |
| Scroll Wheel | No | No | Yes | Yes |
| Thumb Wheel | No | Yes | Yes | Yes |
| Linear Sliding Knob | Yes | No | No | Yes |
| Touch Screen with Graphical Radio Buttons | Yes | No | Yes | No |
| Dedicated Buttons on Keyboard | Yes | No | No | No |
| Two-Dimensional Touch Pad | Yes | No | No | Yes |

Figure 5A

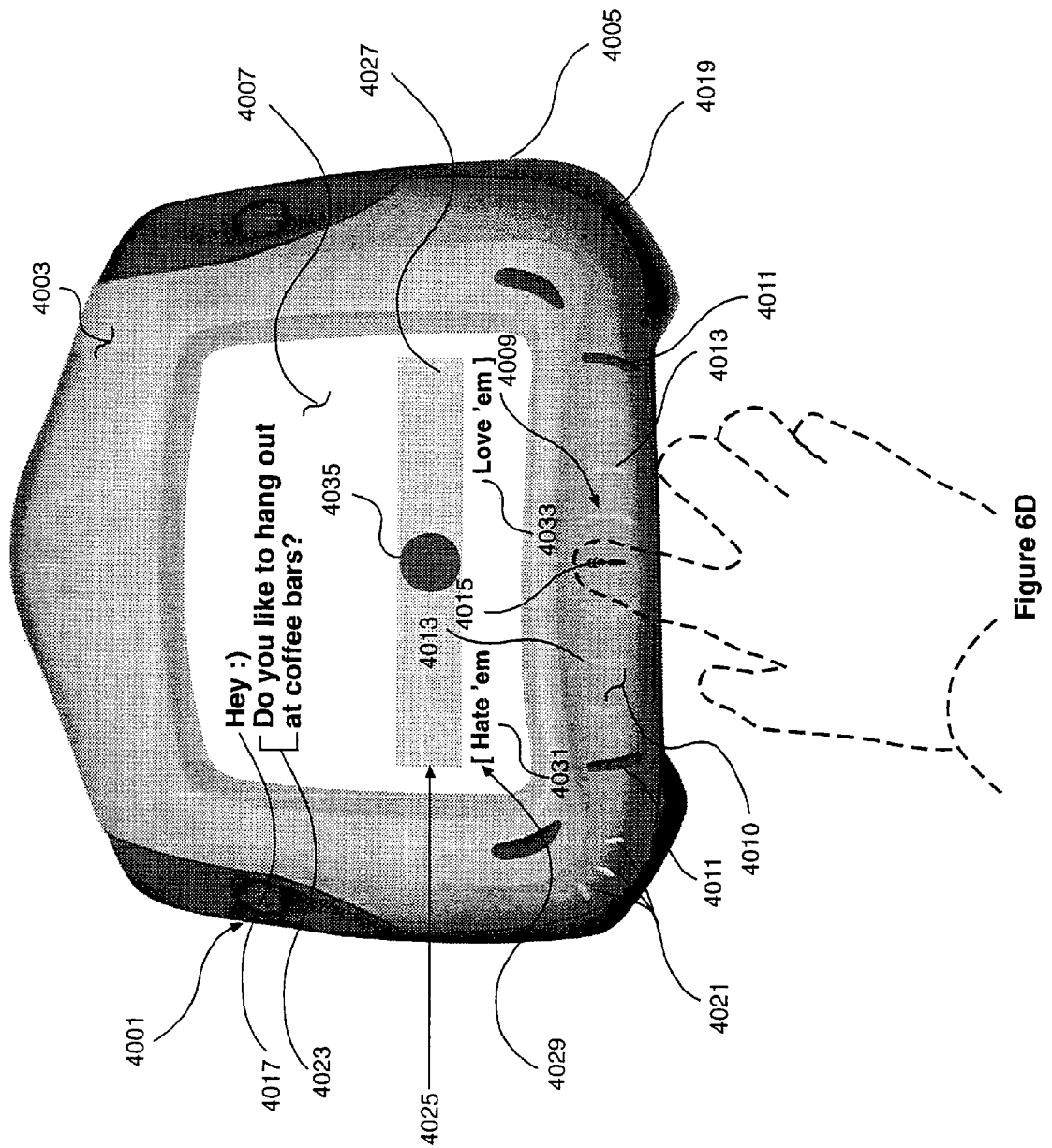

Age * Sex Crosstabulation

| Age | Male | Female | Total |
|---|---|---|---|
| 12 | 154 | 133 | 287 |
| 13 | 154 | 161 | 315 |
| 14 | 155 | 116 | 271 |
| 15 | 131 | 133 | 264 |
| 16 | 100 | 98 | 198 |
| 17 | 104 | 117 | 221 |
| 18 | 80 | 60 | 140 |
| 19 | 10 | 9 | 19 |
| Total | 888 | 827 | 1715 |

Fig 10A

Race * Sex Crosstabulation

| Race | | Male | Female | Total |
|---|---|---|---|---|
| White | N | 783 | 714 | 1497 |
| | %w/in race | 52.30 | 47.70 | 100.00 |
| Black | N | 91 | 94 | 185 |
| | %w/in race | 49.19 | 50.81 | 100.00 |
| Oriental | N | 4 | 4 | 8 |
| | %w/in race | 50.00 | 50.00 | 100.00 |
| American Indian | N | 4 | | 4 |
| | %w/in race | 100.00 | | 100.00 |
| Other | N | 6 | 13 | 19 |
| | %w/in race | 31.58 | 68.42 | 100.00 |
| Total | N | 888 | 825 | 1713 |
| | %w/in race | 51.84 | 48.16 | 100.00 |

Fig 10B

Thumb Length

|  | N | Mean | Std Dev | 1st | 5th | 50th | 95th | 99th |
|---|---|---|---|---|---|---|---|---|
| Total Males | 292 | 6.3 | 0.7 | 5.0 | 5.3 | 6.3 | 7.3 | 8.1 |
| Total Females | 285 | 6.0 | 0.5 | 4.8 | 5.1 | 5.9 | 6.8 | 7.1 |
| Males 12-15 | 196 | 6.1 | 0.6 | 5.0 | 5.2 | 6.1 | 7.1 | 7.8 |
| Males 16-19 | 96 | 6.7 | 0.6 | 5.5 | 5.9 | 6.7 | 7.5 | . |
| Females 12-15 | 198 | 5.9 | 0.5 | 4.7 | 5.0 | 5.9 | 6.8 | 7.0 |
| Females 16-19 | 87 | 6.1 | 0.5 | 5.1 | 5.3 | 6.2 | 6.9 | . |

Fig. 10C

Thumb Length: Males

| | | | | Percentiles | | | | |
| Age | N | Mean | Std Dev | 1st | 5th | 50th | 95th | 99th |
|---|---|---|---|---|---|---|---|---|
| 12 | 46 | 5.7 | 0.4 | 4.9 | 5.0 | 5.7 | 6.3 | . |
| 13 | 46 | 6.0 | 0.5 | 5.1 | 5.2 | 5.9 | 6.9 | . |
| 14 | 54 | 6.2 | 0.6 | 5.1 | 5.2 | 6.1 | 7.3 | . |
| 15 | 50 | 6.6 | 0.4 | 5.5 | 5.9 | 6.6 | 7.3 | . |
| 16 | 31 | 6.6 | 0.4 | 5.7 | 5.9 | 6.6 | 7.1 | . |
| 17 | 38 | 6.8 | 0.7 | 5.5 | 5.8 | 6.8 | 7.9 | . |
| 18 | 25 | 6.8 | 0.4 | 6.2 | 6.2 | 6.9 | 7.5 | . |
| 19 | 2 | 7.6 | 0.8 | 7.0 | 7.0 | 7.6 | . | . |

Fig. 10D

Thumb Length: Females

| | | | | Percentiles | | | | |
| Age | Valid N | Mean | Std Dev | 1st | 5th | 50th | 95th | 99th |
|---|---|---|---|---|---|---|---|---|
| 12 | 48 | 5.7 | 0.5 | 4.7 | 4.9 | 5.8 | 6.5 | . |
| 13 | 61 | 5.9 | 0.5 | 4.6 | 4.9 | 5.8 | 6.6 | . |
| 14 | 44 | 5.9 | 0.5 | 4.8 | 5.0 | 5.9 | 6.9 | . |
| 15 | 45 | 6.1 | 0.4 | 5.4 | 5.4 | 6.0 | 6.9 | . |
| 16 | 25 | 6.2 | 0.5 | 5.1 | 5.2 | 6.3 | 7.1 | . |
| 17 | 42 | 6.0 | 0.5 | 5.1 | 5.2 | 6.0 | 7.0 | . |
| 18 | 16 | 6.2 | 0.3 | 5.7 | 5.7 | 6.2 | . | . |
| 19 | 4 | 6.1 | 0.3 | 5.7 | 5.7 | 6.1 | . | . |

Correlations: Total

|  |  | THUMB LENGTH | HAND LENGTH |
|---|---|---|---|
| THUMB LENGTH | Pearson Correlation | 1 | 0.770 |
|  | Sig. (2-tailed)** | . | 0.000 |
|  | N | 577 | 576 |
| HAND LENGTH | Pearson Correlation | 0.770 | 1 |
|  | Sig. (2-tailed)** | 0.000 | . |
|  | N | 576 | 1707 |
| ** | Correlation is significant at the 0.01 level (2-tailed)**. | | |

Fig. 10G

Correlations: Male

|  |  | THUMB LENGTH | HAND LENGTH |
|---|---|---|---|
| THUMB LENGTH | Pearson Correlation | 1 | 0.790 |
|  | Sig. (2-tailed)** | . | 0.000 |
|  | N | 292 | 291 |
| HAND LENGTH | Pearson Correlation | 0.790 | 1 |
|  | Sig. (2-tailed)** | 0.000 | . |
|  | N | 291 | 882 |
| ** | Correlation is significant at the 0.01 level (2-tailed)**. | | |

Correlations: Female

|  |  | THUMB LENGTH | HAND LENGTH |
|---|---|---|---|
| THUMB LENGTH | Pearson Correlation | 1 | 0.657 |
|  | Sig. (2-tailed)** | . | 0.000 |
|  | N | 285 | 285 |
| HAND LENGTH | Pearson Correlation | 0.657 | 1 |
|  | Sig. (2-tailed)** | 0.000 | . |
|  | N | 285 | 825 |
| ** | Correlation is significant at the 0.01 level (2-tailed)**. | | |

Fig. 10H

1st Percentile Left Thumb Sweeps, Females Age 12-19
(Uniform object thickness 0.75", corner radius 1.5")
Note: each data point represents thumb tip at centerline of thumb

* Located vertically over point of thumb base contact with corner,
at midpoint of lower corner radius on device 1st Percentile Left Thumb Sweeps, Females Age 12-19
(Uniform object thickness 0.75", corner radius 0.75")

* Located vertically over point of thumb base contact with corner,
at midpoint of lower corner radius on device 95th Percentile Left Thumb Sweeps, Male Age 12-19
(Uniform object thickness 0.75", corner radius 1.5")
Note: each data point represents thumb tip at centerline of thumb

* Located vertically over point of thumb base contact with corner,
at midpoint of lower corner radius on device 95th Percentile Left Thumb Sweeps, Male Age 12-19
(Uniform object thickness 0.75", corner radius 0.75")

* Located vertically over point of thumb base contact with corner,
at midpoint of lower corner radius on device 50th Percentile Left Thumb Sweeps, M+F Age 12-19
(Uniform object thickness 0.75", corner radius 1.5")

Note: Each data point represents thumb tip at centerline of thumb

* Located vertically over point of thumb base contact with corner, at midpoint of lower corner radius on device 1st Percentile Combined Thumb Sweeps, Females Age 12-19
(Uniform object thickness 0.75", corner radius 1.5")
Note: each data point represents thumb tip at centerline of thumb

* Located vertically over point of thumb base contact with corner,
at midpoint of lower corner radius on device

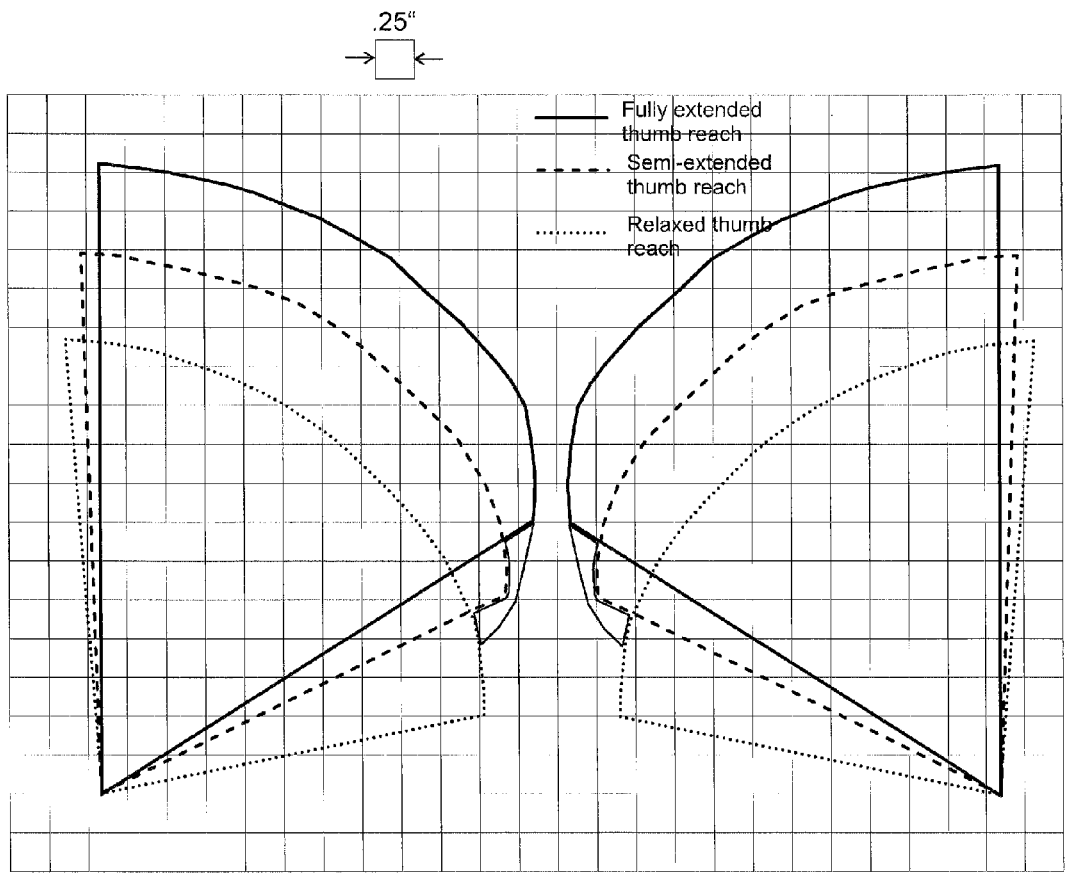

50th Percentile Combined Thumb Sweeps, Male+Females Age 12-19
(Uniform object thickness 0.75", corner radius 1.5")

Notes: Each data point represents thumb tip at centerline of thumb
Left and right thumb envelopes are arbitrarily placed relative to each other
to permit cutting or measurements without overlapped reach lines

* Located vertically over point of thumb base contact with corner,
at midpoint of lower corner radius on device

FIG. 10P

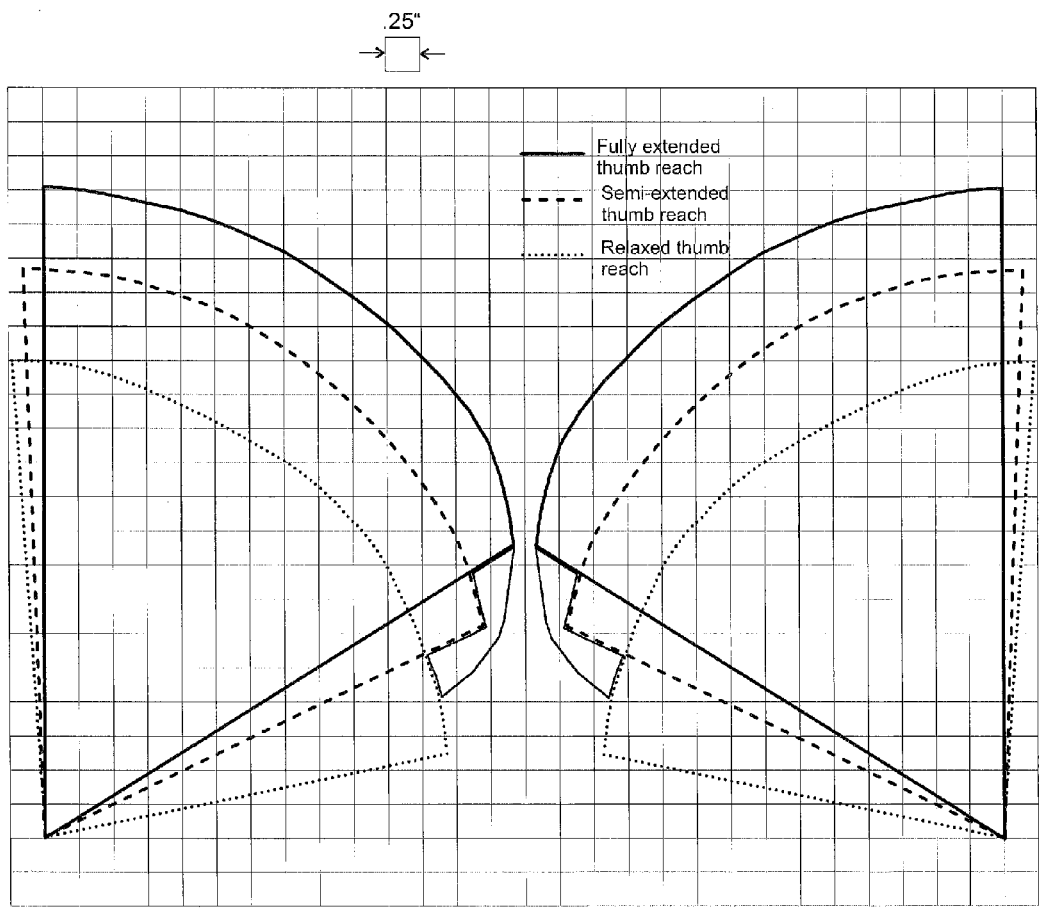

95th Percentile Combined Thumb Sweeps, Males Age 12-19
(Uniform object thickness 0.75", corner radius 1.5")

Notes: Each data point represents thumb tip at centerline of thumb
Left and right thumb envelopes are arbitrarily placed relative to each other
to permit cutting or measurements without overlapped reach lines

* Located vertically over point of thumb base contact with corner,
at midpoint of lower corner radius on device

FIG. 10Q

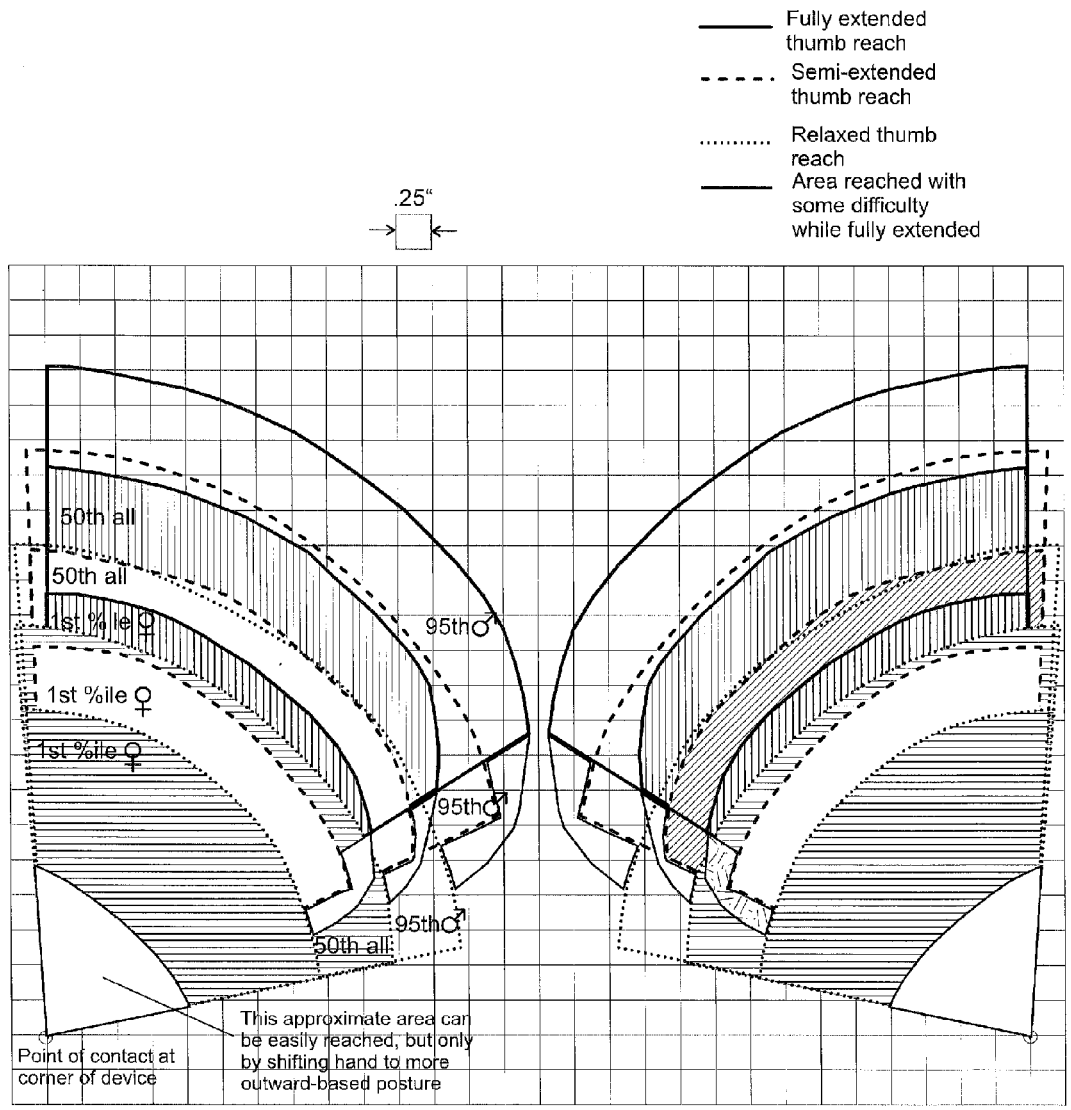

Combined Thumb Sweeps, 1st Percentile Females Through 95th Percentile Males Age 12-19

(Uniform object thickness 0.75", corner radius 1.5")
Notes: Each data point represents thumb tip at centerline of thumb
Left and right thumb envelopes are arbitrarily placed relative to each other
to permit cutting or measurements without overlapped reach lines \* Located vertically over point of thumb base contact with corner,
at midpoint of lower corner radius on device

FIG. 10R

95th Percentile Combined Thumb Sweeps, Males Age 12-19
(Uniform object thickness 0.75", corner radius 1.5")
Notes: Each data point represents thumb tip at centerline of thumb \* Located vertically over point of thumb base contact with corner,
at midpoint of lower corner radius on device 1st Percentile Combined Thumb Sweeps, Females Age 12-19
(Uniform object thickness 0.75", corner radius 1.5")

Notes: Each data point represents thumb tip at centerline of thumb
Left and right thumb envelopes are arbitrarily placed relative to each other
to permit cutting or measurements without overlapped reach lines

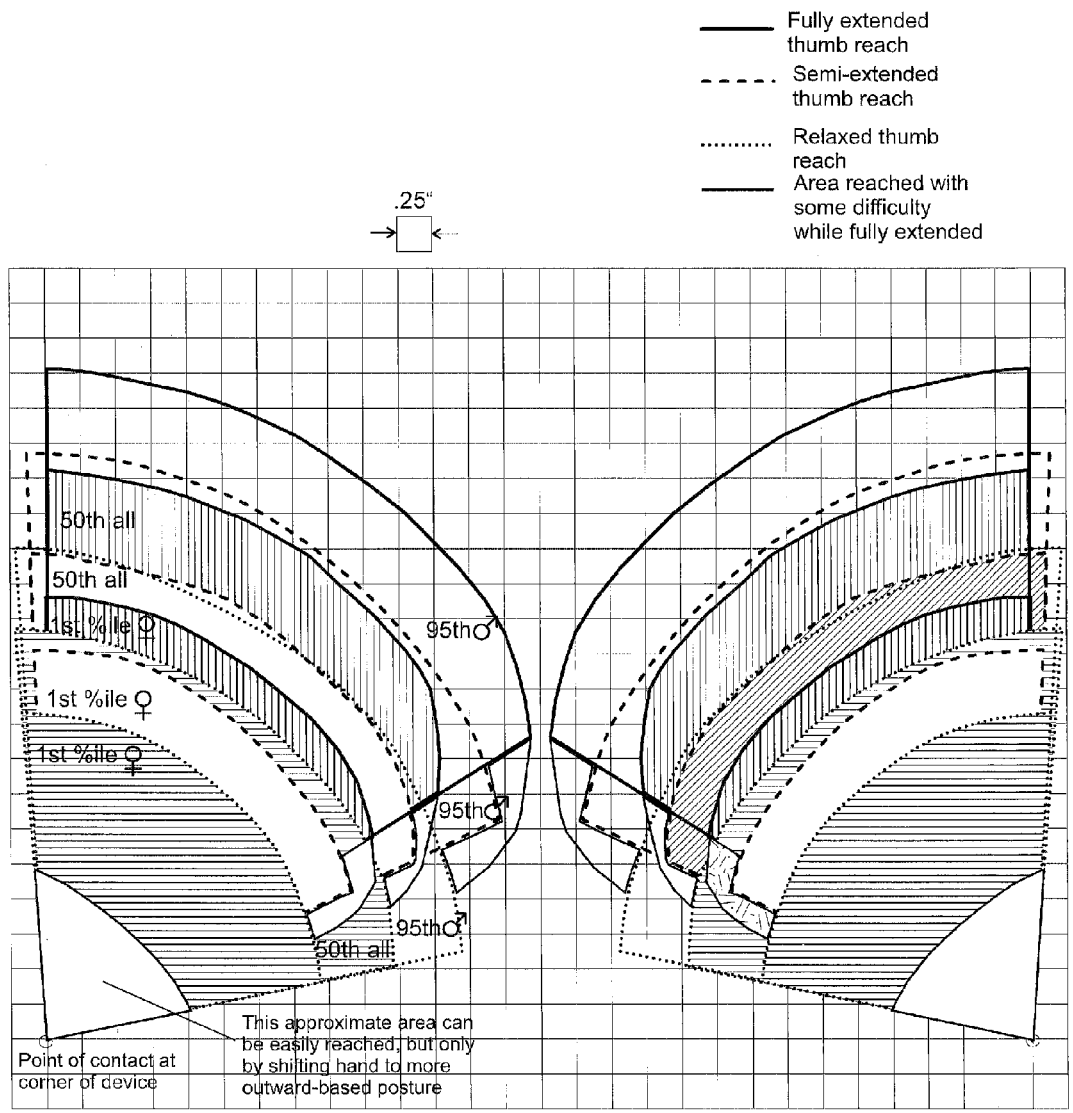

Combined Thumb Sweeps, 1st Percentile Females Through 95th Percentile Males Age 12-19

(Uniform object thickness 0.75", corner radius 1.5")
Notes: Each data point represents thumb tip at centerline of thumb
Left and right thumb envelopes are arbitrarily placed relative to each other
to permit cutting or measurements without overlapped reach lines \* Located vertically over point of thumb base contact with corner,
at midpoint of lower corner radius on device

FIG. 10U

Combined thumb sweeps on 1.5 in. corner template, 5.5 in.
(50th percentile relaxed reaches overlap 0.15 in.)

Key Placement Guidelines

(Uniform object thickness 0.75", corner radius 1.5")

Using 50th percentile semi-extended reach for primary keying area

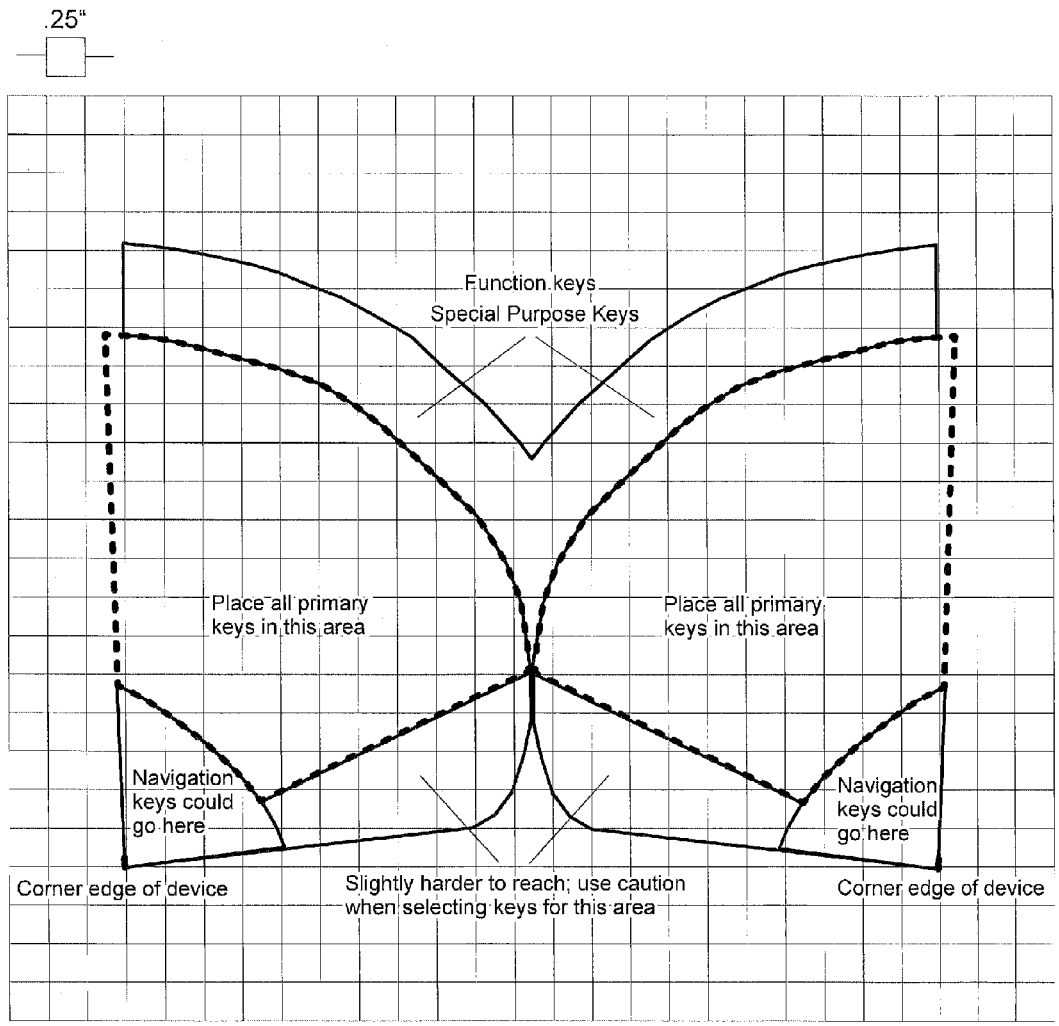

Key Placement Guidelines

Device thickness 0.75"(uniform), corner radius 1.5" (plan view), corner radius approx. 1.0" (side view)

Notes:
For device thickness of 0.75 in., keying area width is approx. 5.5 in.
Reach areas are valid for placement of thumbs at corner or along sides
Smaller corner radii decrease reach areas but permit easier reach into blue areas
Device thicknesses greater than 0.75 in. quickly decrease size of reach areas
Reach plots generally indicate a device width of approx. 6.0 in.

1. Used reach envelope of 50% combined male and female with relaxed grip (not pich or extended reach).
2. Drew geometry to represent the approx dims of 50% woman. Circle represents the palm at the base and crotch of the thumb.
3. Rotated the reach envelope approx 15 to more closely resemble the hand posture of holding a game controller.

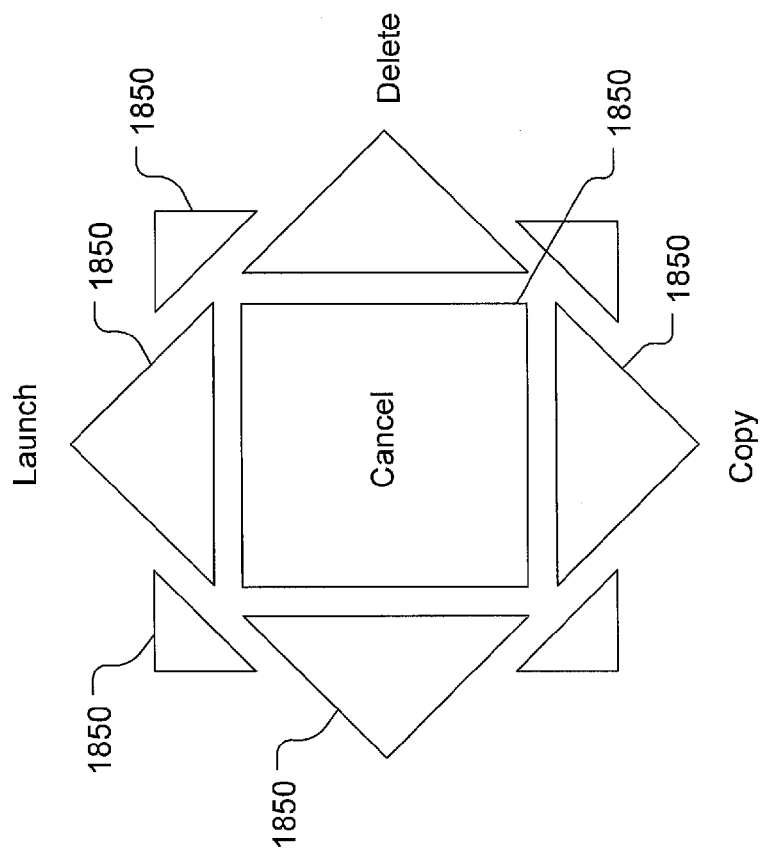

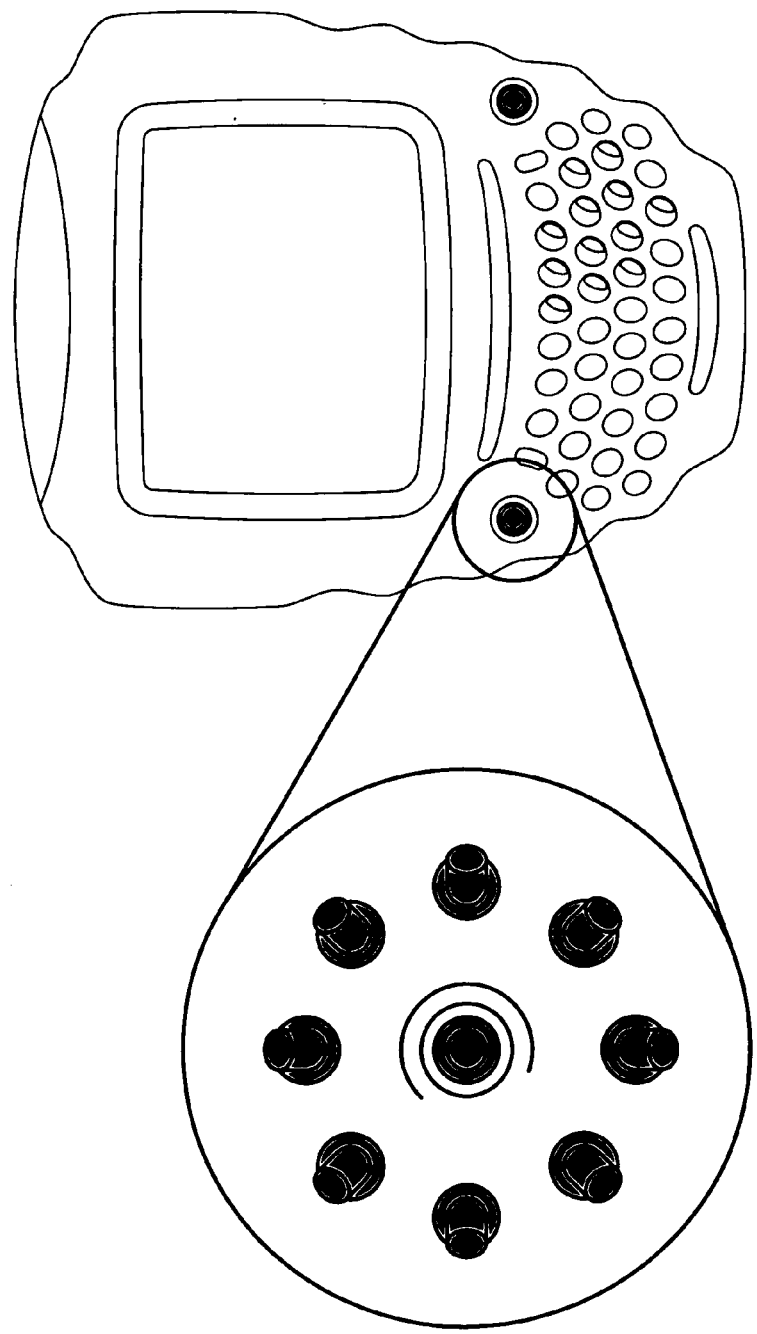

METHOD AND APPARATUS FOR SCHEDULING PRESENTATION OF DIGITAL CONTENT ON A PERSONAL COMMUNICATION DEVICE

CLAIM OF PRIOR FILING DATES

This application claims the benefit of U.S. Provisional Application No. 60/229,235, filed Aug. 31, 2000, titled "Location-Aware Wireless Communication Appliance and Network" and U.S. Provisional Application No. 60/232,063, filed Sep. 12, 2000, titled "Thumb Optimized Keyboard for Personal Computing Device."

CROSS REFERENCE TO RELATED APPLICATIONS

This application is a continuation-in-part of U.S. application Ser. No. 09/745,617, filed 20 Dec. 2000, titled "Physical Configuration of a Handheld Electronic Communication Device," which claimed the benefit of U.S. provisional Application No. 60/172,675, filed 20 Dec. 1999, titled "Physical Configuration of a Handheld Electronic Communication Device," and this application incorporates U.S. application Ser. No. 09/745,617 by reference as if set forth in full.

This application is also a continuation-in-part of U.S. application Ser. No. 09/826,448, filed 4 Apr. 2001, titled "Method and Apparatus for Scheduling Presentation of Digital Content on a Personal Communication Device," which claimed the benefit of U.S. Provisional Application No. 60/194,644, filed Apr. 4, 2000, titled "Location-Aware Wireless Communication Appliance and Network," and this application incorporates U.S. application Ser. No. 09/826,448 by reference as if set forth in full.

BACKGROUND OF THE INVENTION

1. Field of the Invention

The present invention relates to the presentation of digital content on personal communication devices. In particular, the present invention relates to systematic scheduling of the presentation of digital content on personal communication devices.

2. Background Information

Over the last decade, there has been a tremendous increase in demand for new and better means of communicating and transferring data among consumers over communication networks. The Internet has played an important role in satisfying this demand, in that its development has spawned many new modes of communicating and sharing data, such as e-mail, chat, instant messaging, and video messaging. During its early development, consumers could only access the Internet and these new forms of digital content from a computer that was hard-wired to the Internet, either over a local area network, or via a modem. Recently, there has been a shift in consumer demand toward wireless communication and data sharing. People want access to all of these forms of communication and data transfer not only while they are at their desks, but also when they are on the move.

Many companies have tried to meet this demand by providing cellular phones and other wireless communicating devices which can transmit and receive Internet-type communications in addition to voice communications. However, because such phones have small display screens and limited data input devices, they typically rely on scaled down data transmission protocols, such as the Wireless Application Protocol (WAP). Although WAP devices can transmit textual and graphical data, they are extremely limited in bandwidth. As such, these devices and the digital content available with them do not provide a very interesting user experience.

Aside from the problem of providing a wireless device with which consumers can communicate using these Internet-type modes of communication, there is also the problem of determining what information to provide. The Internet has quickly become one of the world's largest sources of knowledge and information. The enormous size and scope of the Internet and other information networks often makes it impossible to find relevant information in a reasonable amount of time. The difficulty of obtaining relevant information from the Internet and other information networks in a timely fashion has given rise to the development of a wide variety of products and services which locate and sift through large volumes of data in an effort to disseminate particular information which is relevant to particular consumers. For example, consumers can subscribe to certain services which locate and periodically broadcast specified information to their subscribers. This technology is often referred to as "push" technology, in that the information, or digital content, is pushed from the information provider to the subscriber.

It is not uncommon for push-technology service providers to have each subscriber fill out an initial questionnaire at the beginning of the subscription in order to obtain certain information about the subscriber. Such questionnaires typically include questions directed to the subscriber's biographic, demographic, and economic background. The digital content that is broadcast by these service providers to their subscribers is typically controlled solely by the service provider, with no input from the subscriber, other than the subscriber's initial questionnaire or when the subscriber updates his profile. These systems are not designed for ongoing interaction between the subscriber and the service provider. Although such systems can provide periodic broadcast of digital content or information, such as the transmission of a daily e-mail of news or information, they are not designed to provide the most appropriate digital content at the most appropriate time for the subscriber. Other than the subscriber "unsubscribing," the service provider has no way of knowing whether the subscriber is still interested in the digital content offered by the service.

Although the devices and systems discussed above represent great strides in the areas of communication and presentation of digital content over personal communication devices, many shortcomings remain.

SUMMARY OF THE INVENTION

There is a need for a method and apparatus with which digital content may be systematically scheduled and presented on personal communication devices.

Therefore, it is an object of the present invention to provide a method and apparatus for systematically scheduling and selectively presenting digital content on personal communication devices.

It is another object of the present invention to provide a method and apparatus for systematically scheduling and selectively offering digital content for presentation to users, wherein the digital content is generated, organized, stored, and rated by the users over a communication network.

It is another object of the present invention to provide a method and apparatus for systematically scheduling and selectively offering digital content for presentation to users, wherein the digital content is generated, organized, stored, transmitted over a communication network to a client device, and rated by the users.

It is another object of the present invention to provide a method and apparatus for systematically scheduling and selectively offering digital content for presentation on a client device, wherein the digital content is generated, organized, stored, profiled, compared to a contextual user profile, transmitted to the client devices over a communication network, and rated by the users.

These objects are achieved by providing a method and apparatus wherein a software scheduling agent resides on a communication network and/or client device, such as location-aware wireless communication appliances, television set top boxes, or other end user client devices. The software scheduling agent is part of a probabilistic modeling system in which the scheduler operates to perform constrained random variation with selection. Digital content is generated, organized, and stored on the communication network and/or the client devices. An electronic digital content wrapper, which holds information in the form of data and metadata related to the digital content is associated with each item of digital content. Contextual profiles for each user and each item of digital content are established by the users and the network and maintained by a service provider on the communication network. The software scheduling agent compares the contextual digital content profile for each item of digital content to the contextual user profile for each user to determine which digital content should be offered for presentation to each user. The comparison and determination of which items of digital content should be offered for presentation to which users is performed by a process of constrained random variation. After the software scheduling agent determines which items of digital content would most likely be relevant or interesting to the user, the digital content is transmitted, either in whole or in part, at predetermined times over the communication network to the appropriate client devices. The digital content is then stored, either in whole or in part, in cache memory on the client device until an appropriate time when the digital content is digitally packaged and presented to particular users over the users' client devices.

The present invention has many advantages over conventional methods and apparatuses for transmitting digital content to personal communication devices. First and foremost, the present invention is not merely a method of broadcasting digital content to an indiscriminant collection of subscribers. The present invention is a tool with which the user can play an active role in the dissemination and presentation of digital content. The present invention uses a scheduling agent that is based upon a probabilistic modeling system. The contextual digital content profiles and the contextual user profiles are continuously updated to ensure that there is a high probability that the user will be presented with digital content that he finds relevant and interesting. The user plays an ongoing active role in the systematic scheduling of digital content by rating the digital content as it is presented. Although the scheduling system is very sophisticated, the rating procedure is very intuitive and non-intrusive. The system is designed to obtain valuable opinion information from the user without intruding into the user's experience. Through the rating system of the present invention, the user has a certain level of control over which digital content is offered to himself and others on the system. This ensures that the user will not only continue to participate in the experience, but take an active role in the dissemination of digital content, thereby building community.

BRIEF DESCRIPTION OF THE DRAWINGS

FIG. 1E is a simplified tabular representation of some basic information types that can be aggregated or assembled for particular users by the appliance and network of FIG. 1A.

FIG. 1G (1 of 5) is a simplified tabular representation of a data array of location data for tower 203 of FIG. 1F.

FIG. 1G (2 of 5) is a simplified tabular representation of a data array of location data for tower 205 of FIG. 1F.

FIG. 1G (3 of 5) is a simplified tabular representation of a data array of location data for tower 207 of FIG. 1F.

FIG. 1G (4 of 5) is a simplified tabular representation of a data array of location data for tower 209 of FIG. 1F.

FIG. 1G (5 of 5) is a simplified tabular representation of a data array of location data for tower 211 of FIG. 1F.

FIG. 1I is a tabular representation of digital content that may be transmitted to the plurality of appliances of FIG. 1H.

FIG. 1L is a tabular representation of a novel contextual user profile used by the appliance and network of FIG. 1A in conjunction with the digital content of FIG. 1I.

FIG. 1O is a simplified schematic illustrating the relationship network for the appliance and network of FIG. 1A.

FIG. 2O is a front view of the appliance of FIG. 2K with the constantly visible display translated relative to the body portion to fully reveal the keyboard or other input devices.

FIG. 2Q is a front view of an alternate embodiment of the appliance of FIG. 1A having a constantly visible display that translates relative to a body portion to reveal a thumbboard or other data input devices that are integrated into the body portion, and having an analog electronic data input device using slider movement according to the present invention.

FIG. 2R is a rear view of the appliance of FIG. 2Q.

FIG. 2S is a right side view of the appliance of FIG. 2Q.

FIG. 5A is a tabular representation of the preferred embodiment of an electronic data input apparatus according to the present invention and alternate embodiments thereof.

FIGS. 6A-6E are schematics representing the function and operation of the electronic data input apparatus and system according to the present invention.

FIG. 15 is a screen shot of a contextual menu of the user interface according to the present invention.

FIGS. 17A-17C are screen shots of the contextual switcher of the user interface according to the present invention.

FIG. 19 is a schematic illustrating the deflection of a user input device according to the present invention.

DETAILED DESCRIPTION OF THE INVENTION

Figure 1A:
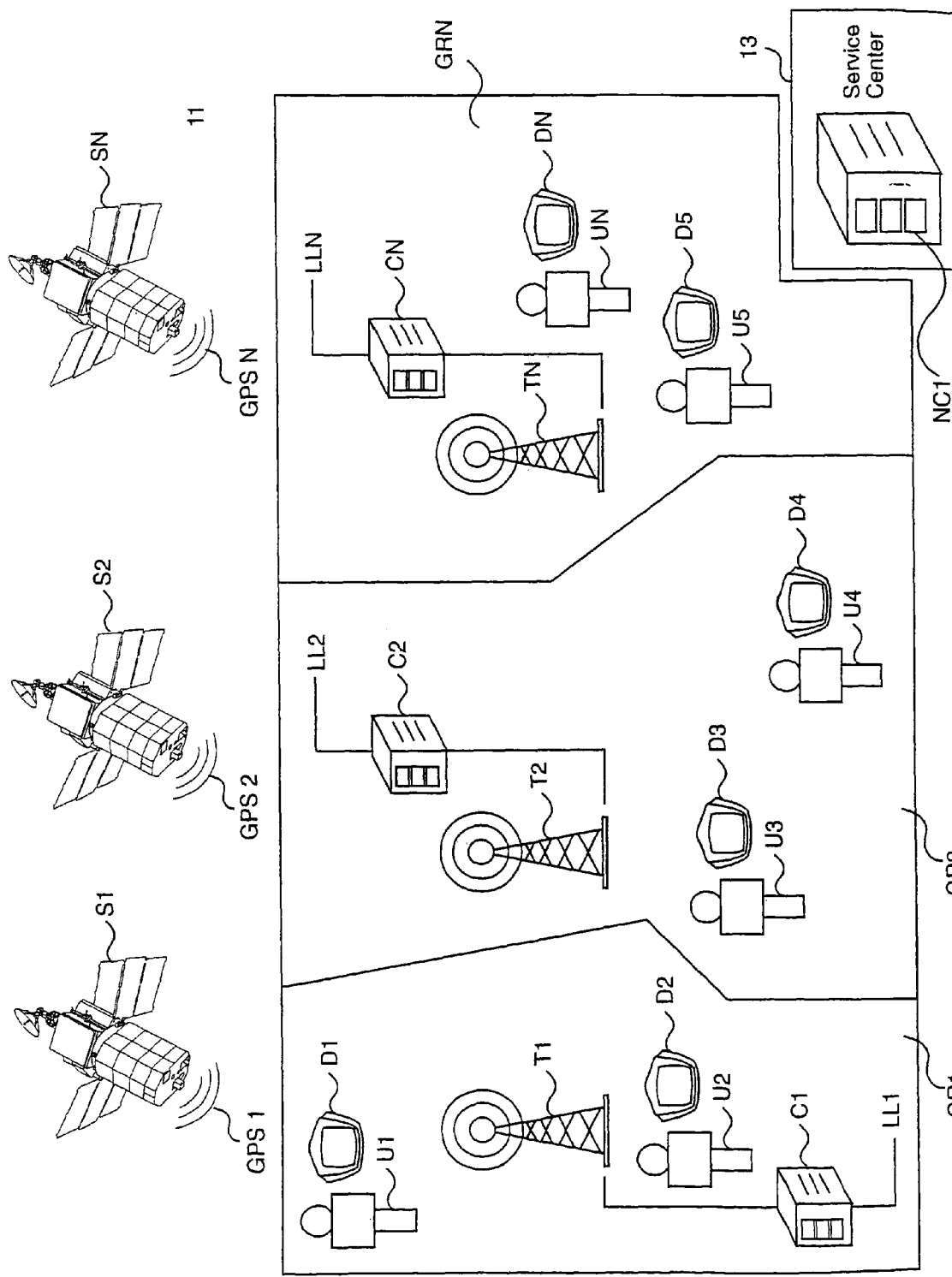
FIG. 1A is a simplified pictorial representation of the preferred embodiment of a location-aware wireless communication appliance and related network according to the present invention.

The following is a table of contents for this Specification. Topics will be grouped under these headings and discussed in detail below.

1. Introduction and Overview
   1.A. Contextually Aware Client
   1.B. Network
      1.B.1. Wireless
      1.B.2. Wired
   1.C. Delivery Of Content
      1.C.1. Delivery In Response to User Request
      1.C.2. Deliver Based On Context
      1.C.3. Subscription
2. Creating Value
   2.A. Creating Value For Users
      2.A.1. Feeling Connected
      2.A.2. Keeping Up With What Is Important
      2.A.3. Reminders In Time and Space
      2.A.4. Communicating
         a. Instant Messaging
         b. E-Mail
         c. Voice
      2.A.5. Finding What They Need
         a. Contextual Searches
      2.A.6. Rich Media Experience
   2.B. Creating Value for Developers
      2.B.1. Higher Level Development Environment
      2.B.2. "Mobile Flash" Extensions
      2.B.3. Best Environment to Create Low-Bandwidth, Rich Media, High Interaction
   2.C. Creating Value for Wireless Operators
      2.C.1. 3G Experience on a 2.5G Packet Network
      2.C.2. Lets Operators Be More Than a Data Pipe
      2.C.3. First Platform That Can Be Monetized
   2.D. Creating Value For Device Manufacturers
      2.D.1. Wireless, Rich Media Reference Design
      2.D.2. Hooks to Recurring Revenue
   2.E. Creating Value For Merchants
      2.E.1. Rich Media
      2.E.2. Contextual
      2.E.3. Aggregated User Data
      2.E.4. Transactional Capability
3. Basic Concepts
   3.A. Content
      3.A.1. Content Item Elements
         a. Meta-Data (Wrapper)
         b. Data (Content Item)
      3.A.2. Routing
         a. Specifically Routed
         b. Self Routed
      3.A.3. Auto-Updateable
   3.B. Context
      3.B.1. Device Context
      3.B.2. Objective Context
      3.B.3. Objective Context - Altered (Virtual Locations)
      3.B.4. Subjective Context
      3.B.5. Preference Context
   3.C. Rating Of Content
   3.D. Content Selection
      3.D.1. Gross
      3.D.2. Fine
   3.E. Awareness
   3.F. Arrangements
      3.F.1. Organizational Tool
      3.F.2. Content Item Membership Is Non-Exclusive
      3.F.3. Types Of Arrangements
         a. Arbitrary
         b. Rules-Based
      3.F.4. Representation in Other Arrangements
      3.F.5. Contextually Triggered
   3.G. Communications
      3.G.1. E-Mail
      3.G.2. Instant Messaging
      3.G.3. Chat
      3.G.4. Voice
      3.G.5. Video
      3.G.6. Escalation
      3.G.7. De-Escalation
   3.H. Searches
   3.I. Relationship Network
      3.I.1. Overview
      3.I.2. Nodes
         a. Node Types
         b. Node Attributes
         c. Node Operations
      3.I.3. Links
      3.I.4. Ratings
      3.I.5. Content Routing and Scheduling
   3.J. Economy of Content Delivery
   3.K. Abstraction of Location
      3.K.1. Named Places
      3.K.2. Named Times
      3.K.3. Named Events (Place/Times)
   3.L. Authorization
4. Create
   4.A. Macromedia Flash
      4.A.1. File Format
      4.A.2. Rendering Engine
      4.A.3. Authoring Tools
      4.A.4. Scripting Language
5. Wrapping Content
   5.A. Prototypical Wrappers
      5.A.1. Least Common Denominator Method
      5.A.2. Stereotype Method
   5.B. Wrapper Assistant Tool
      5.B.1. Weighted multi-wrapper Association value Averaging
      5.B.2. Content Item Validity Check
   5.C. Automatic Wrapping Tool
   5.D. Content Registration
   5.E. Wrapper Abstract
6. Routing Mechanisms
   6.A. Destination-Specific Routing
      6.A.1. Awareness Updates
      6.A.2. Messages
      6.A.3. Payload Fills
      6.A.4. Search Results
      6.A.5. Browsing
   6.B. Self-Routed
      6.B.1. Simultaneous Distribution of Unique Experiences
      6.B.2. Content Selection Engine
         a. Content Similarity Calculation
      6.B.3. Relationship Influence
7. Deliver
   7.A. Optimizing Across Delivery Factor
      7.A.1. Transfer Costs
         a. Fixed Location
         b. Wide Area Wireless Off-Peak
         c. Wide Area Wireless Peak
      7.A.2. Delivery Times
   7.B. Optimal Delivery Approaches
      7.B.1. Intelligent Pre-Caching
      7.B.2. Optimizing the Transfer of Subscription Update Data
      7.B.3. Separation of Data and Presentation Elements
8. Present
   8.A. Content's Context Sensitivities Interacting with Current Context
      8.A.1. Client Presentation Scheduler
         a. Probabilistic Selection
         b. Neediness
   8.B. User Interface
      8.B.1. Overview
         a. User-Centric Design
         b. Awareness as Primary Function
         c. Designating Awareness Content
         d. The Nature Of Content In the Network
         e. Network Mechanisms Form A Foundation For The UI
         f. High-Level Introduction to the Current UI
         g. UI Constructs
      8.B.2. Content Items (Awareness Items)
         a. Visual States
         b. Functional Types
      8.B.3. Arrangement Layer
      8.B.4. Work Layer
      8.B.5. Stream Layer

|  |  | 8.B.6. | Contextual Layer |
|---|---|---|---|
|  |  |  | a. Menus |
|  |  |  | b. Pickers |
|  |  |  | c. Alerts |
|  |  |  | d. Switcher |
|  | 8.C. | User Interface (Alternate) | |
|  | 8.D. | User Interface - Audio | |
|  | 8.E. | User Interface Themes | |
|  |  | 8.E.1. | Demographically Configured |
|  |  | 8.E.2. | Personality Configured |
|  | 8.F. | Rating Mechanisms | |
|  |  | 8.F.1. | Explicit Methods |
|  |  | 8.F.2. | Implicit Methods |
|  |  | 8.F.3. | Forgetfulness |
|  |  | 8.F.4. | Contextually Situated Ratings |
|  |  | 8.F.5. | Ratings of People |
|  |  | 8.F.6. | Ratings Accumulation |
|  |  | 8.F.7. | Rating Summary Points |
|  | 8.G. | Inquisitiveness | |
|  | 8.H. | Prioritized Interrupts | |
|  | 8.I. | Messaging Centric Network System with Low Latency | |
|  | 8.J. | Suspend/Resume of Awareness Subscriptions | |
| 9. | Refresh | | |
| 10. | Network | | |
|  | 10.A. | Packet Data | |
|  | 10.B. | Gateways | |
| 11. | Device | | |
|  | 11.A. | Hardware | |
|  |  | 11.A.1. | Physical Configuration |
|  |  |  | a. First Translating Design |
|  |  |  | b. Second Translating Design |
|  |  |  | c. Clam-Shell Design |
|  |  |  | d. Telescoping Design |
|  |  | 11.A.2. | Internal Device Hardware |
|  |  |  | a. The Ideal Device |
|  |  |  | b. The Intermediate Device |
|  |  |  | c. The Low-Cost Device |
|  |  | 11.A.3. | Analog Responder |
|  |  |  | a. One-Dimensional Touch Pad |
|  |  |  | b. Elongated Button |
|  |  |  | c. Touch Screen With Graphical Slider |
|  |  |  | d. Jog Wheel |
|  |  |  | e. Scroll Wheel |
|  |  |  | f. Thumb Wheel |
|  |  |  | g. Linear Sliding Knob |
|  |  |  | h. Touch Screen With Graphical Radio Buttons |
|  |  |  | i. Dedicated Buttons |
|  |  |  | j. Two-Dimensional Touch Pad |
|  |  | 11.A.4. | Utilizing Analog Responder In Other Personal Computing Devices |
|  |  |  | a. Analog Responder Integrated Into Device |
|  |  |  | b. Analog Responder as an Expansion Module |
|  |  | 11.A.5. | QWERTY Thumbboard |
|  | 11.B. | Software | |
|  |  | 11.B.1. | Separate Thread For Monitoring User Action |
|  |  | 11.B.2. | User Impact on Operating Processes |
| 12. | User | | |
|  | 12.A. | Operational Empathy | |
|  |  | 12.A.1. | Device Awareness |
|  |  | 12.A.2. | User Compensation/Incentives |
|  | 12.B. | Expectation Management | |
| 13. | Network Energy | | |
|  | 13.A. | Energy Management | |
|  | 13.B. | Earning Network Energy | |
|  |  | 13.B.1. | Purchasing Energy |
|  |  | 13.B.2. | Earning Energy Through Posting of Digital Content |
|  |  | 13.B.3. | Earning Energy Through Interaction With Merchants |
|  |  | 13.B.4. | Earning Energy Through Recruitment of New Network Members |
|  |  | 13.B.5. | Earning Energy Through Good Samaritan Action |
|  |  | 13.B.6. | Gifts of Network Energy to Encourage Participation |
|  | 13.C. | Burning Network Energy | |
|  |  | 13.C.1. | Burning Energy Through Hardware Acquisition |
|  |  | 13.C.2. | Burning Energy Through Content Consumption |
|  |  | 13.C.3. | Burning Energy Through Airtime Use |
|  |  | 13.C.4. | Burning Energy Through Instant Messaging |
|  |  | 13.C.5. | Burning Energy Through Chatting |
|  |  | 13.C.6. | Burning Energy Through E-Mail |
|  |  | 13.C.7. | Burning Energy Through Finding Buddies |
|  |  | 13.C.8. | Burning Energy Through Internet and World Wide Web Access |
|  |  | 13.C.9. | Burning Energy Through Gifts or Transfers |
|  |  | 13.C.10. | Burning Energy Through "Collect" Transactions |
|  | 13.D. | Merchants And Affiliates | |
|  | 13.E. | The Relationship Between Network Energy and Currency | |
|  | 13.F. | E-Coupons | |
| 14. | Community Systems | | |
|  | 14.A. | Trust Management | |
|  | 14.B. | Network Management of Relationships | |
|  | 14.C. | Referential Trust | |
|  | 14.D. | Message Bubble-Up Filtering | |
|  | 14.E. | Filtering Merchant Offers | |
|  | 14.F. | Virtual Introductions | |
|  | 14.G. | Seeking a Good Samaritan | |
|  | 14.H. | Requesting Information | |
|  | 14.I. | Direct Assessment Of Trust | |
|  | 14.J. | Interpolated Or Calculated Trust | |
|  | 14.K. | Trust in "ePinions" and "eValuations" | |
|  | 14.L. | Messages And Trust | |
|  | 14.M. | Digital Peripheral Vision | |
|  | 14.N. | Sticky-Notes Community Communication | |
|  | 14.O. | Digital Graffiti | |
|  | 14.P. | Shouting Communication Mode | |
|  |  | 14.P.1. | Generating a Digital Shout |
|  |  | 14.P.2. | Sending a Digital Shout |
|  |  | 14.P.3. | Combination Digital Shout |
|  | 14.Q. | Virtual Tourism | |
|  | 14.R. | Virtual Window Shopping In Remote Locale | |
|  | 14.S. | Sister City Through Virtual Location Grouping | |
|  | 14.T. | Location "Morphing" to Create Shared Virtual Space | |
|  | 14.U. | Position/Location Snap Shots | |
|  | 14.V. | Jump-To Function to Emulate Relocation and/or Travel | |

1. Introduction and Overview

1.A. Contextually aware client.

1.B. Network.

1.B.1. Wireless. Referring to FIG. 1A in the drawings, a simplified pictorial representation of the present invention in broad overview is illustrated. The present invention is directed to a novel location-aware wireless communication appliance and related network system, as well as, novel functions and novel commercial activity enabled by the system. The location-aware appliances of the present invention are also referred to herein as "user devices," "devices," "client appliances," "clients," or various combinations of these terms.

As is shown in FIG. 1A, a plurality of global position satellites S1, S2, SN are provided in orbit around planet earth. Each of the global position satellites transmits global position signals such as GPS1, GPS2, and GPSN. The details of the preferred global position system (GPS) will be discussed below.

Additionally, details of alternative position determination systems will also be discussed. As is shown in FIG. 1A, a plurality of users are distributed in diverse geographic locations, such as locations L1, L2, LN. More particularly, in the view of FIG. 1A, user U1 is located in geographic location L1. User U2 is also located in geographic region L1. User U3 is located in geographic region L2. Additionally, user U4 is located in geographic region L2. As is shown, user U5 is located in geographic region LN. Additionally, user UN is located in geographic region LN.

A plurality of wireless transmission towers T1, T2, and TN are provided and distributed about the diverse geographic regions in order to provide wireless, bi-directional communication capabilities. As is shown in the view of FIG. 1A, tower T1 is located in geographic region L1 and serves the users located in that geographic region. Tower T2 is located in geographic region L2 and is utilized to serve the users located in that geographic region. Tower TN is located in region LN and is utilized to serve users in that particular geographic region.

In accordance with the preferred embodiment of the present invention, each of users U1, U2, U3, U4, U5, and UN is equipped with his or her own personal location-aware wireless communication appliance D1, D2, D3, D4, D5, and DN. The users U1, U2, U3, U4, U5 and UN utilize the location-aware wireless communication appliances D1, D2, D3, D4, D5, DN in order to perform bi-directional communication operations through towers T1, T2, and TN. Preferably, each of the towers T1, T2, TN is communicatively coupled to a regional computing and traffic management system such as computing systems C1, C2, CN utilizing land line communication pathways LL1, LL2, LLN. Additionally, each of the regional computing and traffic management data processing systems C1, C2, CN are communicatively coupled utilizing land lines preferably to a network computer NC1 which is preferably located at a service center 13.

It should be appreciated that FIG. 1A is a highly symbolic and simplified view of the location-aware communication appliances and related network system. In practice, there may be hundreds of thousands of users broadly distributed over a wide range of geographic regions. For example, there may be several hundred thousand users located in North America. Most users will reside in areas which are serviced by preexisting communication towers which are capable of communication through packet data transfer. More particularly, in the preferred embodiment, the present invention utilizes Global System for Mobile Communications (GSM), General Packet Radio Service (GPRS), 3rd Generation (3G) protocol supported by the consortium led by AT&T and Ericson, other protocols supported by other wireless communication consortia, and/or other global standards in order to communicate digital content bi-directionally throughout network 11.

For example, systems running on network computer NC1 at the service center may be utilized to broadcast or narrowcast particular information in the form of digital content to one or more particular users. For example, an advertisement may be transmitted from the network computer NC1 of the service center to users U1 and U2 in geographic location L1. Alternatively, the location-aware wireless communication appliances D1, D2, D3, D4, D5 and DN may be utilized to allow particular users or groups of users to communicate with one another utilizing the GSM/GPRS as a communication protocol. For example, user U1 may utilize location-aware wireless communication appliance D1 to engage in a text-based "chat" with user UN who is located at a distant geographic location LN. In order to engage in the text-based chatting, user U1 will enter textual messages on his location-aware wireless communication appliance D1. The location-aware wireless communication appliance D1 will perform a wireless communication operation through tower T1. Tower T1 will utilize regional computer C1 and the local land lines LL1 in order to communicate with the network computer NC1 at the service center. Network computer NC1 at the service center will then communicate utilizing land lines LLN and regional computer CN in order to energize tower T1 in a predetermined manner in order to communicate the GSM/GPRS from tower TN to the location-aware wireless communication appliance DN which is under the control of user UN.

In accordance with the preferred embodiment of the present invention, the network computer NC1 "knows" that user UN is in geographic locale LN which is within the transmission range of tower TN because location-aware wireless communication appliance DN has previously announced its availability to network computer NC1 through wireless communication or interaction with tower TN. In accordance with the preferred embodiment of the present invention, and as will be discussed in greater detail below, each of the location-aware wireless communication appliances D1, D2, D3, D4, D5, and DN include a global positioning system integrated into the device. Each of the users U1, U2, U3, U4, U5, and UN may determine if and when the device will announce its location and availability to a particular one of towers T1, T2, and TN. It can be appreciated that, with a great number of users or with heavy communication traffic, a plurality of service centers may be provided, each equipped with a network computer, such as network computer NC1.

Figure 1B:
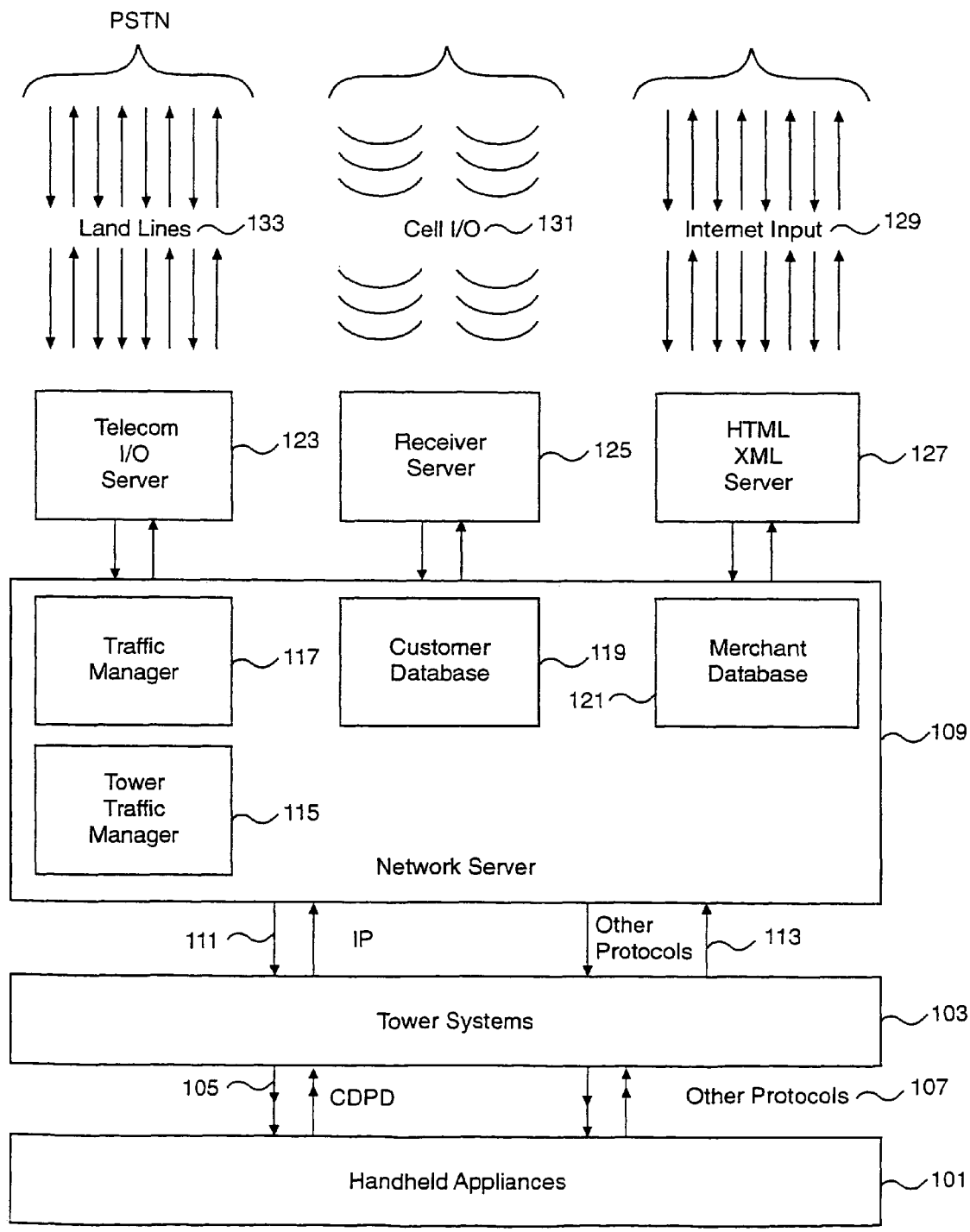
FIG. 1B is a high-level block diagram of the bi-directional communication of the appliance and network of FIG. 1A.

While the preferred embodiment of the present invention relies upon GSM/GPRS in order to enable bi-directional communication, alternative and/or additional modes of communication or communication protocols may be utilized in order to allow communication over the network, including communication between particular users or groups of users and communication between the network and particular users or groups of users. This is illustrated in a high level block diagram format in FIG. 1B. As is shown, the handheld devices 101 may communicate with tower systems 103 utilizing wireless, bi-directional cellular digital packet data (CDPD) communications 105; however, other wireless protocols 107 may be utilized to allow communication between tower systems 103 and handheld devices 101. The tower systems 103 communicate with the network server 109 over electrical or optical bi-directional channel 111 utilizing an IP protocol. Other protocols 113 may be utilized to communicate bi-directionally between network server 109 and tower systems 103. Preferably, network server 109 includes dedicated systems, such as tower traffic manager 115 which is utilized to manage the communication traffic between network server 109 and tower system 103. Additionally, network servers should include a customer database 119 and a merchant database 121. If a plurality of communication protocols are utilized, the traffic manager 117 may also be provided. As is shown in the view of FIG. 1B, a plurality of input/output systems are provided to handle alternative, additional, and supplemental communication modes. For example, a telecom input/output server 123 is provided in order to manage communication with network server 109 which is conducted over landlines 133. Alternatively, receiver server 125 is provided to manage cellular communications 131. Additionally, or alternatively, a hyper-text mark-up language (HTML) or extensible mark-up (XML) server 127 may be provided to handle bi-directional input 129.

It should be understood that the location-aware clients could be location-aware clients that are wireless connected to a local area wireless network, such as those possible using 802.11 Ethernet technology. In such instances, the location-aware clients remain relatively stationary with respect to global position.

1.B.2. Wired. It should also be understood that the location-aware clients could be connected using a hard-wired network, such as a cable television communication network or a fiber optic communication network. Of course, in such hard-wired applications, the location aware client appliances remain relatively stationary.

1.C. Delivery of Content. In accordance with the preferred embodiment, transmission of information in the form of digital content can be broadcast or narrowcast in direct response to a user request, or may be broadcast or narrowcast due to the relevancy of the information to the user's current contexts.

1.C.1. Delivery in Response to User Request. User requested information is information that the user wishes to have, but must actively search for and retrieve. By this, it is meant that the information will not be presented to the user without some action taken by the user. An example of user requested content is obtaining a telephone number from directory assistance. Unless the user initiates a phone call to directory assistance and specifies the name of the individual or business for which he or she needs the phone number, the desired phone number will not seek out and deliver itself to the user.

1.C.2. Delivery Based on Context. Contextually relevant content is content that is relevant to the client's current contexts, such as time, place and preferences. Examples of contextually relevant information include: a pizza coupon delivered to a household that is in the vicinity of a pizza restaurant is contextually relevant information; and a traffic information display above a highway or interstate that displays traffic conditions on the road ahead.

1.C.3. Subscription. A subscription is a prior request or permission for information to be delivered later either in context or not.

2. Creating Value

By delivering information in context, the client device creates a great deal of value for the user by reducing the amount of time that the user spends actively seeking the information that he or she wants.

2.A. Creating Value for Users. Delivering information in context creates a great deal of value for users by reducing the amount of time that users spends actively seeking the information that they wish to have. Rather than the individual being required to take the time to locate and acquire information, contextual delivery allows the information to be sent to the user without the user's attention so that the user may view the information at his or her convenience.

2.A.1. Feeling Connected. The social nature of humans typically makes them want to feel connected to their friends and to the communities around them with which they interact. The information that provides this connected feeling includes, but is not limited to, the location and availability of other individuals, news that publicizes the current situations of celebrity individuals, events and activities involving church and community organizations, and events and activities involving friends and relatives.

2.A.2. Keeping Up with What Is Important.

2.A.3. Reminders In Time and Space. After setting and naming a geographic region and/or time range, a user can set a reminding alert to be triggered upon entry or exit of this named space.

2.A.4. Communicating.

2.A.4.a. Instant Messaging (IM). Instant messages are transferred with minimal latency between the sender and recipient. The recipient can set a notification of the incoming message. Instant messaging also allows the sender to know if the recipient is available to receive a message. Within the context of the present invention, instant messages are carried through the network as with any other routed digital content. The current status of the recipient is presented through the generalized awareness model which operates through a hidden subscription model. User status information is published and this information is pushed to users who have the proper level of authorization.

2.A.4.b. E-mail. The e-mail mode of communication is one in which text messages are keyed in by one user and communicated in a text form over network 11 to a designated recipient. The e-mail mode of communication on network 11 utilizes conventional e-mail formats and protocols. E-mail messages may be accumulated and saved in an electronic in-box, whereby the e-mail messages may be read at the leisure and convenience of the recipient.

2.A.4.c. Voice. The voice mode of communication is similar to a telephone conversation. The voice mode of communication is possible when mobile phone components and capabilities are embedded in the user's appliance. Because the voice mode of communication is performed concurrently between users in real time, it is "hotter" than e-mail, IM or chat. It is desired that the voice mode of communication on network 11 utilizes conventional cellular or digital phone formats and protocols.

2.A.5. Finding What They Need. Users are able to find what they need, such as news articles, driving directions, addresses, phone numbers, contact information, merchandise, food, clothing, and entertainment over network 11.

2.A.5.a. Contextual searches. Contextual searches include obtaining driving directions from a user's current location.

2.A.6. Rich Media Experience. The rich media experience available with the system of the present invention includes dynamic, animated, full-color graphics.

2.B. Creating Value for Developers. The following features of the present invention create value for developers.

2.B.1. Higher Level Development Environment. Through the use of scripting of Macromedia Flash, a higher level development environment is achieved.

2.B.2. "Mobile Flash" Extensions.

2.B.3. Best Environment to Create Low-Bandwidth, Rich Media, High Interaction.

2.C. Creating Value for Wireless Operators. The following features of the present invention create value for wireless operators.

2.C.1. Third generation (3G) experience on a 2.5 generation (2.5G) packet network.

2.C.2. Lets Operators Be More Than a Data Pipe.

2.C.3. First Platform That Can Be Monetized. Each and every piece of digital content is accompanied by a plurality of revenue/expense data representing revenue/expense of acquisition of the digital content, revenue/expense to deliver the digital content over various channels, revenue/expense for user to view the digital content, revenue/expense to interact with the digital content, and the like. Bookkeeping operations are performed at every stage of the transport of the digital content and balances are kept. These account balances are used to influence the delivery probabilities of the digital content.

2.D. Creating Value for Device Manufacturers. The following features of the present invention create value for device manufactures.

2.D.1. Wireless, Rich Media Reference Design.

2.D.2. Hooks to Recurring Revenue. Because the originator and transport agents of digital content on network 11 are specifically identified for each piece of digital content, ongoing revenues, if any, can be apportioned to each as they are due.

2.E. Creating Value for Merchants. The following features of the present invention create value for merchants.

2.E.1. Rich Media.

2.E.2. Contextual Analysis of Data.

2.E.3. Aggregated User Data.

2.E.4. Transactional Capability. Because the plurality of revenue/expense data associated with each piece of digital content can represent revenue for the user, merchants can set up campaigns that reward or debit users for certain behaviors, interactions, or transactions. For example, a piece of digital content which has a certain location contextual sensitivity could reward a user if they approach a physical storefront. Also, another piece of digital content representing a digital coupon upon interaction could debit a users account.

3. Basic Concepts

This section introduces and describes in detail the basic concepts that form the platform and how it operates.

3.A. Content. Content is the primary digital construct on which the platform operates. The platform is content-centric and uses a broad definition of content. Everything that is displayed, or potentially displayed, on the user's screen (e.g., text, data, graphics, and animations) is treated as content items. Music objects, such as MP3s and other audio objects used to alert and communicate with users are treated as content items. Additionally, user requests (e.g., commands to open a content item, send a message, search for a content item) are themselves treated as content items.

Because of the digital nature of the network, there exists a need to represent real-world information, such as that described above in Section 2, as digital content that a computer can store, manipulate and transmit. Information can be represented as digital content in many different textual and graphical forms. For example, a restaurant establishment may publish its address and times during which the establishment is open to patrons in a simple textual format or by generating graphical advertisements for potential patrons to see. People may wish to make their context information available in a textual format and even a picture accessible in a graphical format. Communications such as instant messages and email are typically represented in a textual format. Events such as concerts and movies are typically represented in audio or video formats. A single content model handles all of these different data formats and types.

The content-centric orientation of the platform enables a wide variety of things, that are all considered to be content items by the platform, to be treated in the same uniform, but flexible, way. The platform establishes an environment and infrastructure, in which content is created, wrapped, i.e., defined in terms of meta-data, routed, delivered, presented, and refreshed, thus satisfying the content-related objectives of both content providers and consumers. In essence this approach creates a digital analog to an organic ecosystem that is populated by content items that are treated and behave as living organisms. In this system content items can self-route and self-organize. This content-centric approach provides a unique and elegant layering between content presentation mechanisms and content delivery, packaging, and scheduling mechanisms.

3.A.1. Content Item Elements. Content items can have up to two parts: (1) a data part, (2) a meta-data part. The data part consists of information and the visual and auditory objects that are displayed and played for users. The meta-data part consists of a descriptive profile of the content item and can exist separate from the data and presentation parts.

3.A.1.a. Meta-Data (Wrapper). The meta-data part, hereafter referred to as the "wrapper," specifies the set of data and presentation content items that together form a screen-ready presentation to the user. Thus, a given content item may be composed of one or more other content items and a single content item can be linked to more than one wrapper. This permits the reuse of content items across different presentation packages and the categorization of content items at multiple cognitive levels. The full compliment of the wrapper, data, and presentation elements specified for a given content item constitutes a presentation package. Each presentation package is defined by a wrapper and unique in the platform. Empty wrappers, those pointing to zero content items, are used to probe and gather intelligence about probable content needs and to make content distribution more effective and efficient.

The data contained in the wrapper is used by the computational mechanisms in the platform to route, deliver, present and refresh the data and presentation parts of the presentation package. Thus, the wrapper provides all the information needed for the content items to behave appropriately and effectively in the platform. That is, the wrapper, by interacting with the platform's computational environment, controls the behavior of the content items throughout the system. In this way, each content item acts in ways that are congruent with its intended objectives.

Wrappers consist of data that are organized in a set of fields that are specified in a tagged format in which the tags identify each of the wrapper data fields. Wrapper data is descriptive of the content items that it links together. The platform may require that content providers, which can include users, specify data to be included in the wrapper fields as a part of the process of creating content for the platform. Alternatively, a software agent could be established which parses the content of the message and infers its content, and generates the needed wrapper data automatically. See Section 5.B. and 5.C. for a discussion of these wrapper specification methods. In accordance with the present invention, privacy, preference, and context information is utilized in order to filter, accelerate, prioritize, transmit, or block particular types of content.

Because wrappers can exist in the platform independent of the data and presentation elements they provide the ability for the platform to perform operations with information-rich meta-data without the overhead of moving all of the data and presentation elements. This is beneficial because wrappers contain data in binary and/or textual format and tend to be much smaller in size than the presentation part of content items that typically contain data in a graphical and/or audio format and tend to be much larger in size. Thus, content is often treated referentially. A data structure contained in the wrapper, called a header, contains zero or more links to content items and provides the basis for the reference between a given content item and the wrapper that points to it.

3.A.1.a.1. Purposes. Wrappers provide information for the following purposes.

1. Wrappers allow the separation of meta-data about the content from the content itself. This separation enables efficient routing and delivery of the content because the wrapper data can be used for computations related to routing and delivery without having to access and move the content.

This separation also enables presentation data and subsequent routing to be determined using a proactive probing technique. Proactive probing is used to acquire data about the potential for a given content item to reach users. In proactive probing a wrapper that describes content is created, but without linkages to data or presentation parts. This wrapper is then routed and delivered just as it would be if it included linkages. It is never actually presented to users, but the scheduler can select it. This selection data represents the potential for content with that wrapper to be seen by users.

2. Uniquely identifies content items and complete presentation packages to the platform.

3. Integrates data and presentation content items into complete presentation packages.

4. Controls both specified routing and self-routing of content. Routing is discussed in detail in Section 6.

5. Specifies parameters that control the sequencing, frequency, and duration of content presentations.

6. Specifies contextual sensitivities that impact the neediness of content in context. Neediness is discussed in detail in Section 8.A.1.b.

7. Includes an inferred preference rating that impacts the neediness of content.

8. Specifies the life span of content.

3.A.1.a.2. Components. Wrappers consist of many tagged data elements that are organized into three major structures: a header, sensitivities, and content-associations. The structures are for organizational purposes only and should not be considered a limiting construct of the wrapper. The wrapper may include the data elements listed, but is not limited to these elements and optional data elements may be present in some cases. In addition, some data elements are optional and are not required for every content item. This provides further efficiencies in processing, storage, and transmission of wrappers. Each of the major structures is described in more detail in the following sections.

3.A.1.a.2.A. Header. These wrapper fields provide identification, administration, and packaging information about the content item.

i. Content ID. The Content ID is a unique identifier that is used to identify a content item. It prevents collisions and multiple instances of the same content item by insuring with a high probability that two or more content items will not have identical IDs. An example of a unique identifier would be a CRC checksum calculated using a polynomial algorithm) generated from the content item's digital data.

ii. Search Return Descriptor. A human readable description of the content item that is returned when the content item matches a search.

iii. Searchable. A binary indicator that specifies whether or not a user can search for the content item.

iv. Object Type ID. Describes the specific format of the bytes of data (swf, mp3, txt, etc.) as well as the specific type of the various kinds of content (e.g., games, music, message, buddy, sport score, etc.).

v. Primary Flashlet (Viewer). Specifies the most desired way for the content to be displayed. That is, it specifies the Content ID for a designated viewer to display the content, e.g., sports, weather, IM, etc. This addresses the need created by the expectation that there will be branded viewers that are specific to content partners.

vi. Argument List. The start arguments that need to be passed to the primary flashlet (viewer) that gives the viewer its initial variables for run time.

vii. Node Destination. Lists one or more node ID's to which the wrapper will be routed. Node ID's refer to the nodes in the relationship network, to be discussed later. The nodes represent routing and delivery points for content. These should not be confused with content ID's. If no destination nodes are listed, then the wrapper is self-routing (See Section 6) and uses sensitivities and associations specified elsewhere in the wrapper for routing.

viii. Node Origin. The node ID from which the content originates.

ix. Delivery Latency. A time period that is used to schedule the delivery of content efficiently on the basis its presentation needs. For example, a content item that will not be presented for a week need not be delivered until it is available for presentation. This is similar to a just-in-time delivery strategy. It permits the memory on the device to be used for the neediest content.

x. Creation Time. A time stamp indicating the time and date at which the wrapper was created.

xi. Expiration Time. A time stamp indicating the time and date at which the content item will expire and no longer be available to be selected for presentation.

xii. Linkage Count. The number of content items that need to put together to form a complete content presentation package. This may be zero for probing wrappers.

xiii. Linkages List. The list of content ID's for the content items that form the complete content presentation package that is defined by the wrapper. The number of ID's must equal the value of the Linkage count variable.

xiv. Package status. A flag indicating that a presentation package is capable of being selected by Content Selection Engine (Refer to Sections 3.D.1 and 6.B.2 for a detailed description of the content selection engine.

3.A.1.a.2.B. Sensitivities. Sensitivities are expressed as context variable value conditions that are important to the content item. Matches between these value conditions and the current context trigger changes in content-related behaviors and computations. Section 3.B describes the various context variables used by the platform.

i. Prerequisite Count. The number of prerequisite presentation packages.

ii. Prerequisite List. A list of content ID's that specify the presentation packages that are prerequisites for the content item described by the wrapper. A prerequisite refers to a presentation package that must be played before the content item that lists it as a prerequisite. Thus, a prerequisite will block presentation of a package listing it until the prerequisite is presented.

iii. Space/Time Dimple Count. The number of space/time sensitivity areas.

iv. Space/Time Dimple List. The specification of times and/or places in which the neediness value of the content item is impacted. See Section 8.A.1.b. for a discussion of neediness. The impact can be either positive or negative.

1. Space/time Cylinder: Specifies the expansiveness of the sensitivity area.
   2. Sensitivity Value: Specifies the degree and direction of impact on neediness.

v. Calendar Dimple. The actual times and locations of the event, offer or action represented by the content item.

vi. Max Views. The maximum number of times the presentation package can be presented on a single device.

vii. Named Location. User specified location that has already been defined or could be defined in the future.

vii. Habit Model Category Flags. The list of habit model categories that will impact the neediness of the presentation package when they are triggered.

viii. PG-Rating Flags. These provide a means to enable parental control over the types of content to which a minor device-holder can have access. These flags provide a blocking mechanism for content.

ix. Initial Specific Rating. This is a preliminary inferred rating that is assigned to a content item on a user-by-user basis. The rating is inferred in two ways.

First, the relationship network enables device-holders to create valued links to other device-holders. One type of value associated with a link is a directed similarity rating. In creating a link and applying a similarity rating the originating device-holder is indicating that the terminating device-holder has similar content preferences, at least to the degree of the rating. When the terminating device-holder rates content these ratings are communicated through the network so as to set the preference rating for the same presentation package on the originating device-holder's device, if that same package has not yet been rated by the originating device-holder.

Second, the preference may be inferred on the basis of the content item's similarity to other content items for which the user has previously provided a preference rating.

x. Content Economy. Cost or earning associated with the use of this content. Used to track usage costs, to provide potential billing mechanism and to provide incentive mechanism for content interaction.

xi. Loneliness Time Constant. A time value that specifies the interval over which a presentation package's neediness will return to a nominal value and beyond following its presentation.

xii. Is-interruptive? Flag. A binary value, i.e., "yes" or "no," indicating whether or not the content item can interrupt the normal flow of content on the device screen. Interruptive content may have the effect of replacing currently playing content on the screen before that content is finished.

xiii. Suppress Mentor Flag. A binary value, i.e., "yes" or "no," indicating whether or not the content item, when it is explicitly rated, can be used as a mentor for selecting other content.

xiv. Manufacturers ID. The hardware manufacturer unique id that represents what device the Digital Wrapper can play on. This would most likely be based on a deal between a content provider and a manufacturer so that it would only play on that device.

xv. Carrier ID. The carrier unique id that represents what carrier network the Digital Wrapper can play on. This would most likely be based on a deal between a content provider and a carrier so that it would only play on that devices that are utilizing that carrier.

xvi. Content Search Boundary. Additional sensitivities for selecting and excluding content to be shown on specific networks and or devices. Used to segregate content.

xvii. Keywords. Proper nouns associated with content. They are the final resolving element of the piece of content in that they provide finer resolution for content searching and scheduling.

3.A.1.a.2.C. Associations. Associations (in conjunction with keywords and time-space sensitivities) are used to compute the degree of similarity among content items. The content selection engine (See Sections 3.D.1 and 6.B.2) uses content item similarity to select content items for routing and delivery on an individual user basis. On the client scheduler (See Sections 3.D.2 and 8.A.1), content similarity can be used for automatic assignment of content items to arrangements (See Sections 3.F and 8.B.2).

The set of associations constitutes a model of the abstracted semantic structure of content items. Each association is modeled as a dimension for a given characteristic of content. Dimensions can model either a unipolar association (e.g., degree to which the content item is associated with movies), or a bipolar association (e.g., degree of association from sedentary to active). There are two main types of associations: categories and properties. Categories represent relationships such as "is a" and "is a type of." For example, "The Matrix" is a movie and thus belongs to the category of movies. Jazz is a type of music and thus belongs to the category of music. Properties represent relationships such as "is" and "has." For example, watching a movie is a sedentary activity and therefore sedentary is a property of the activity of watching a movie. The movie "Casablanca" has romantic scenes and is romantic. Therefore, romantic is a property of the movie "Casablanca." Neither categories nor properties alone provide a satisfactory model of the content relationships (as content is defined herein) that are needed to produce robust inductive inferences about user preferences. A model has been developed that can represent both categories and properties in a way that permits inferences to be made from complex combinations of both.

Collectively, the content associations specify a set of semantic dimensions along which content items can be modeled. The dimensions describe an N-dimensional Euclidean space, where N is the number of dimensions. Each content item is assigned a value along each dimension. Thus, a point in the N-dimensional semantic space represents each content item.

Values are assigned to dimensions on the basis of a subjective judgment that answers the question "to what degree is the category or property that is represented by the dimension associated with the content item?" The "associated with" judgment subsumes all of the more specific types of relationships content items can have with each other. That is, the relationships such as: is, is a, is a type of, is a property of, has, has a, contains, and is contained in, among others are all included in the "associated with" assessment. Thus, the model provides a broad reach for computing similarity across complex inter-content relationships.

In the present technique inter-content item similarity is computed as a distance between the points occupied by each content item in the N-dimensional space. See Sections 3.D.1. and 6.B.2.a. for a detailed discussion. That is, the content association model defines a generic and fixed semantic structure that can be used to compute the similarity between any number of content items. This means that in applying the content association model, the number of judgments to be made is fixed and independent of the number of content items being modeled. Mapping a content item to a point in the space always involves assigning values to the same number of dimensions. Computing the distance between two content items always involves the same number of comparisons. These modeling and processing efficiencies are accomplished because the association dimensions are uncoupled from the individual content items themselves. All content items are judged on the same set of associations.

To sum up, the content association model meets the following needs and provides the following advantages. The content association model:

1. Is not category or property specific, and provides a unified treatment of categories and properties as dimensions, which enables complex multidimensional relationships that cut across both categories and properties to be identified in a manner that easily scales;

2. Incorporates a pre-defined, finite and stable number of judgments that are independent of the number of content items being modeled;

3. Defines an absolute (rather than a relative) semantic structure that is based on fixed dimensions, rather than on a specific set of content items and their relationships;

4. Employs "degree associated with" judgments that include all other specific relationships, thus, creating a greater reach by being able to establish complex multidimensional relationships that cut across specific types of relationships;

5. Provides for gradations (fuzziness) in the assignment of the dimension to content items, that is, the judgment is not simply associated or not, but handles degrees of association;

6. Can include both unipolar and bipolar dimensions; and

7. Can be used to assess similarity in a computationally efficient way.

A set of association dimensions is listed below separated into groups. The content association model is not limited to these specific associations or the specific number of dimensions.

Category Associations include:

Media associations which include: movies, TV, music, radio, books, magazines, periodicals, live performances, telecommunications, Internet, and WWW;

Music genre associations which include: classic, pop, rock, country/western, jazz, and edge;

Restaurant genre associations which include: fast food, seafood, bistro/café, barbeque, and deli;

Other genre associations which include: drama, comedy, action, horror, sci-fi, fantasy, documentary;

Recreation and activity associations which include: sports, games, food, beverages, cars, motorcycles, boats, shopping, travel, and sightseeing;

Participatory activities associations which include: games, general sports, winter sports, water sports, bicycling, roller blading, and skate boarding;

Lifestyle associations which include: lifestyle, advice, clothes, fashion, beauty, dating, romance, fitness, and health;

Gender associations which include: masculine and feminine;

Education associations which include: school, education, government, culture, and religion; and Work associations which include: jobs and public service;

Content type associations which include: message, game, entertainment item, including visual and musical, interface skins and other similar types of things, event announcement, offer, advertisement, review, data, e.g., weather, sports scores, stock quotes, question, geo notice, general news, service provider message, and personal account information from service provider or other e-commerce entity;

Ethnic associations which include: American, Cajun, British, French, Italian, Mexican, Spanish, Caribbean, Indian, Greek, German, Chinese, Japanese, African, Middle-Eastern;

Property associations which define features of the digital content;

Emotional associations which include: violence, sexual, tragedy, romance, serious, and fun;

Spatial associations which include: local, urban, and rural;

Temporal associations which include: near-term, one-time, repetitive, brief, and time-consuming;

Activity associations which include: sedentary and active;

Cognitive associations which include: popular and intellectual;

Social associations which include: solitary and shared;

Interactive associations which include: fixed, mobile, and interactiveness;

Physical associations which include: physical and virtual;

Other property associations which include: classiness, inside, outside, quiet, loud, functional, and artistic;

3.A.1.b. Data (Content Item). Content items are the element (or form) of content that contains the information that is visually and/or audibly presented to users. Content items may exist in many digital forms. They may exist as a movie in a presentation format such as a Macromedia Flash or Apple QuickTime, or they may exist as a still JPEG or GIF graphic image. Content items may also exist as textual or graphical information that must be combined with one or more additional content items for presentation, such as a an XML file that requires a Macromedia Flash movie to act as a template that parses in the XML data and presents it in a Macromedia Flash player.

As mentioned above, content items may exist in many digital forms. Macromedia Flash is an optimum format with which to deliver maximum value to all of the users of network 11. Macromedia Flash is a complete solution incorporating:

1. A compact, space-efficient file format that is well matched to current wireless data network capacities;

2. An interactive user presentation based on a time-based animation format;

3. A file format that can contain a large number of rich vector and raster image formats like JPEG and GIF, and a number of audio formats, such as MP3 and WAV;

4. A small and highly efficient graphics rendering engine well matched to current handheld device capabilities;

5. An object-based procedural scripting language; and

6. A complete set of authoring tools.

While Macromedia Flash is a complete solution, other language and data formats may be used. Other language formats include but are not limited to HTML, DHTML, CHTML, WML and Apple QuickTime. Other data formats include, but are not limited to plain text, MP3, WAV, MIDI, JPEG, GIF, and PNG.

3.A.2. Routing. Content items can be created and injected into the network from a variety of origins and need to be distributed to various destinations in the network. Routing is the process of efficiently and intelligently directing content items from their point of origin in the network to their appropriate destinations. Content items are routed in two basic ways: destination-specific routing and self-routing.

Destination-specific routing is used to direct a content item to one or more specifically identified destinations. This method is used when specific destinations in the networks are known.

Self-routing is used to direct a content item to all destinations, i.e., users, that the system predicts will need or want the content item. No specific destinations are targeted.

These predictions are formed in the process of making probabilistic content selections for individual users using several types of information about the content items, content item interrelationships, and users. See Section 6 below for a more complete discussion of routing mechanisms.

3.A.2.a. Specifically routed. Messages with a destination, such as content targeting a certain/specific place, but if a broadcast channel exists, it might be done a different way.

3.A.2.b. Self routed. Content Similarity is concerned with what it means for two pieces of content to be similar to each other, and why it is necessary to know this. This refers to how similar the wrapper context sensitivities are, not the actual content. There may be a need to probe more deeply into the actual data part of the content when it is text for certain similarity computations beyond searching.

The present invention uses the content similarity in two applications: finding content "mentors" and self-organizing grouping. Finding mentors is identifying specifically rated content that the user is likely to have a similar opinion about. Of course, this process can never be exact, but it does not have to be, it need only represent some first order approximation to a level of similarity.

The present invention limits what is compared to four categories:

1. The basic type of wrapper: game, offer, IM, question, etc. (match or no match);

2. Who the originator of the content is (match or no match);

3. Location/Time cylinder proximity (this is a value); and

4. Content Associations: the Euclidean distance between all ninety-six dimensions of associations.

The routines should be set up to filter the parameters that participate in the similarity calculation, e.g., "similar in what way?". For the first three listed above, this is use/do not use. For the associations, it is a mask for each association.

When selecting mentors, Content Associations are the primary mechanism, with location/time being secondarily used.

For grouping calculations, initially all factors are taken into consideration, but user actions can modify which fields are used for similarity testing. For example, if adding a feature to an arrangement does not alter a particular grouping, then that feature is not significant to maintaining the grouping. Furthermore, if removing something from an arrangement does not alter a particular grouping, then that feature is not significant to maintaining the grouping.

The similarity calculations are straightforward equality checks for the type of wrapper and originator of content. The location/time cylinder comparisons are relatively simple distance calculations returning a distance and an intersection flag. The content association calculations appear more complex, but are really just simple distance calculations done in an efficient way using bit-wise math.

3.A.3. Auto-updateable. This section is explained below.

3.A.3.a. Subscriptions. This topic is explained below.

3.B. Context. Context influences the delivery and presentation of content to a user. A variety of factors, circumstances, and conditions describe the current context and affect the probability of content delivery and presentation. Context is maintained on the client device through various mechanisms that obtain and store context state information including but not limited to time, location, named places (time/space cylinders) and user preferences (ratings). Different aspects of context influence content delivery and presentation in different ways. These aspects include, but are not limited to (1) device context such as battery level and network connection status; (2) objective context such as time, location, user identity and account balance; (3) subjective context such as active user interaction and PG-rating filter; and (4) preference context such as content ratings.

Context may include, but is not limited to:

3.B.1. Device context. The device context includes the following information:
 a. Is it connected to network?
 b. Is it connected to computer?
 c. Is it battery powered?
 d. Is location known?
 e. Is pipe fat?
 f. Is screen active?
 g. Is front light on?
 h. Is headphone in?
 i. What is the battery level?
 j. What is the network connection status?
 k. Where GPS status?
 l. What is the state of the input devices?
 m. Is the expansion slot full?
 n. What is the user currently doing?
 o. Is a phone call in progress?

3.B.2. Objective context. The objective context includes the following information:
 a. Location (GPS).
 1. The location-aware feature of the present invention allows the device to determine its geographical location at all times. This location information can be used by the habit modeling software on the device and it may be transmitted by the user to other users on network 11 so that the other users may maintain awareness of the location of the transmitting user. The preferred location-aware system is a conventional GPS that will be adapted such that the user may assign colloquial names, or aliases, to actual locations to maintain privacy and security when the user's location is transmitted to other users on network 11.
 2. An alternate location-aware system works in conjunction with the preferred GPS system when signals from the GPS system are weak or masked by geological features. A current alternate system uses the location of towers T1, T2, and TN and signal triangulation to supplement the GPS system. If a user is communicating over a specific tower T1, T2, or TN, and the GPS system loses location awareness, network 11 will monitor which tower T1, T2, or TN is being used. It may be possible to regain the device's approximate location through signal triangulation. Such approximate location information may be used until the GPS system regains location awareness. Recorded changes in the tower being used, made before the GPS system regains location awareness, indicate to network 11 that the user's location has changed. Location changes that are recorded due to tower changes are not assigned as much weight or reliability as location changes recorded by the GPS system. Thus, the confidence placed by network 11 in the device's actual location may be affected by the method in which the location awareness information is obtained.
 3. It should be understood that the location-aware system may also work simply with the location information from individual towers T1, T2, or TN.

b. Current space-time cylinder: According to the present invention, the range of GPS positions associated with the particular generalized location identifiers described above are modeled on the following:
 1. A two dimensional polygon space;
 2. A three dimensional polygon space;
 3. A circle;
 4. A cylinder;
 5. A combinations of shapes;
 6. Clustered circle shapes; and/or
 7. Clustered cylindrical shapes.

c. Named location category.
 1. As regions and/or time ranges are named by the user, they may be categorized into general categories such as home, school, work, etc. In this situation, the generalized location identifiers include at least user-defined general location identifiers. This location category is made available as another element of the current context which, when interacting with a matching contextual sensitivity in a digital content wrapper can influence the probability of the presentation of content in the stream.

As mentioned above, network 11 manages user location information as "fuzzy" data. In other words, network 11 does not identify the user's location in terms of raw GPS data, such as longitude and latitude, but instead manages data based upon colloquial names for the locations. For example, the designators "home," "school," "mall," "work place," "restaurant A," "restaurant B," "game arcade" may be utilized in lieu of precise GPS data. This is necessary in order to preserve the privacy of the user and to minimize safety issues relating to the precise location of users, particularly adolescents. In contrast, however, the non-adolescent entities that are members of network 11 or commercially affiliated with network 11 may, in fact, be unconcerned about the privacy and security issues related to the precise or exact location of their places of operation. For example, a video game arcade and the restaurants which are identified as places frequented by a particular user may have a precisely known location within a database on network 11.

The utilization of fuzzy data to identify user location is one means of diminishing the communication bandwidth requirements of the network 11. Another means of achieving bandwidth efficiency comes from not continuously transmitting the user's geographic location. For the present invention, there is little or no need to constantly transmit the user's GPS location, either in fuzzy form or raw data. The location of the user is only transmitted to network 11 when the user changes location. In the preferred embodiment, each time the user identifies a particular location with an alias or colloquial name, network 11 assigns and associates a selected geographic region around that particular location to the alias or colloquial name. For example, if the user goes to her work place and, while sitting at her desk, designates that location as "work," all other locations within a selected radius will also be considered by network 11 as "work." In this manner, the user is free to move about at her work place without triggering transmissions her GPS location to network 11.

Also, in order to maximize privacy and security for adolescent users, the timing and manner in which location-aware wireless communication appliances D1, D2, D3, D4, and D5 communicate their location to network 11 is largely under the control of the user. In other words, location-aware wireless communication appliances D1, D2, D3, D4, and D5 will not automatically and periodically announce their location in network 11. Location-aware wireless communication appliances D1, D2, D3, D4, and D5 will announce their location to network 11 when, and if, the individual user desires to establish an "on" status for use by network 11 and receipt of network traffic.

Figure 1C:
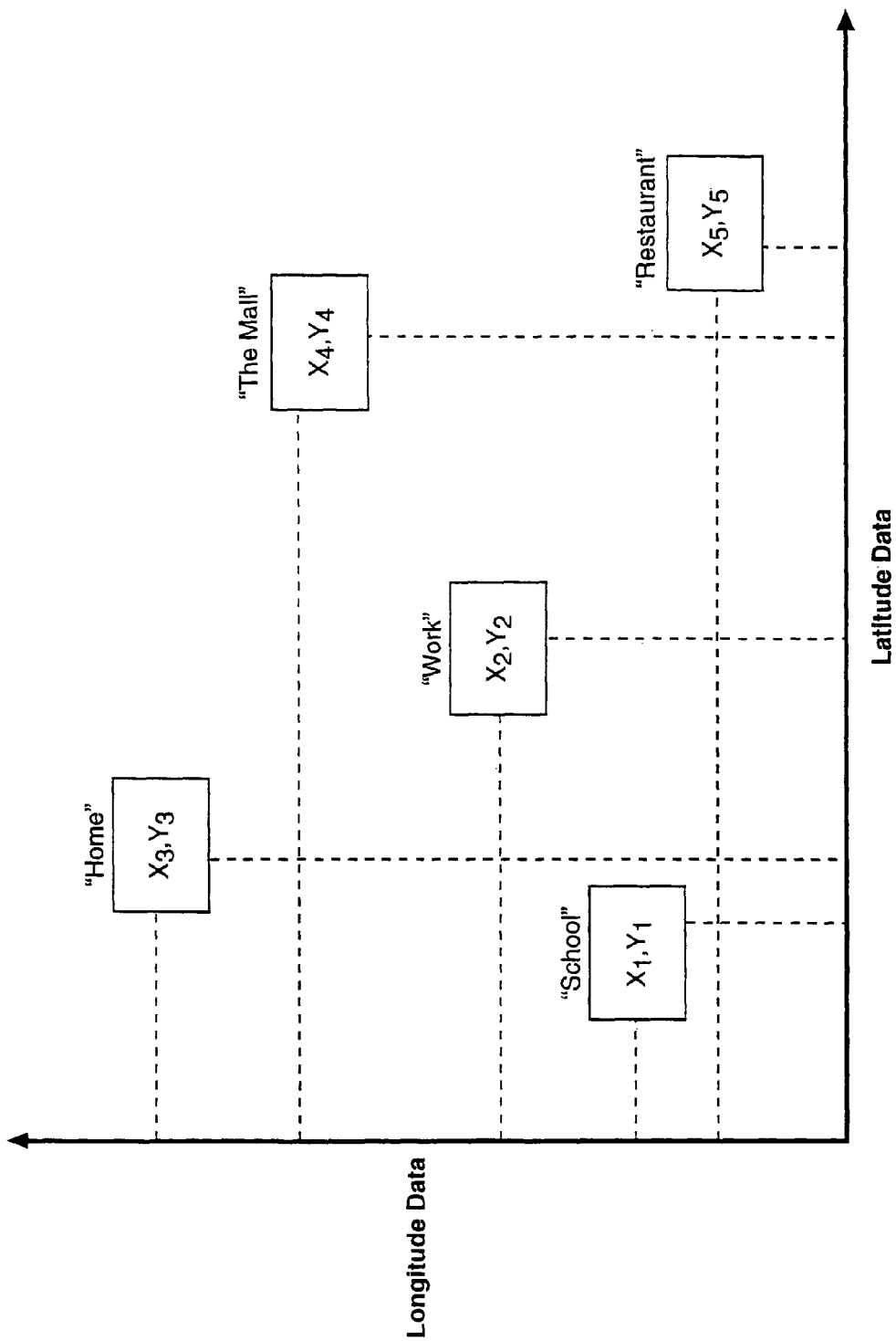
FIG. 1C is a graphical depiction of longitude and latitude correlation as implemented by the appliance and network of FIG. 1A.
Figure 1D:
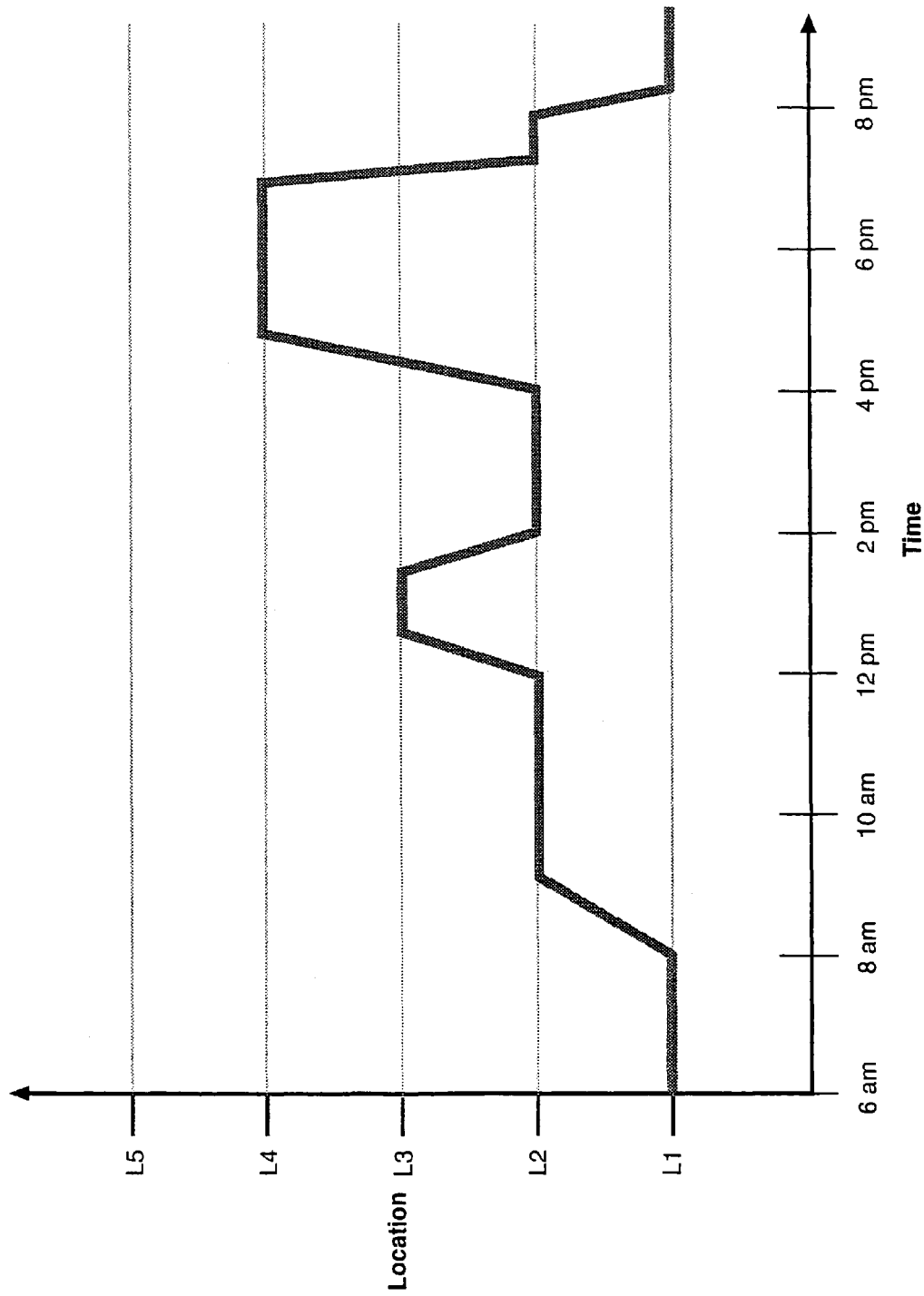
FIG. 1D is a simplified representation of the location awareness function of the appliance and network of FIG. 1A for a portion of a exemplary day for a member.
Figure 1F:
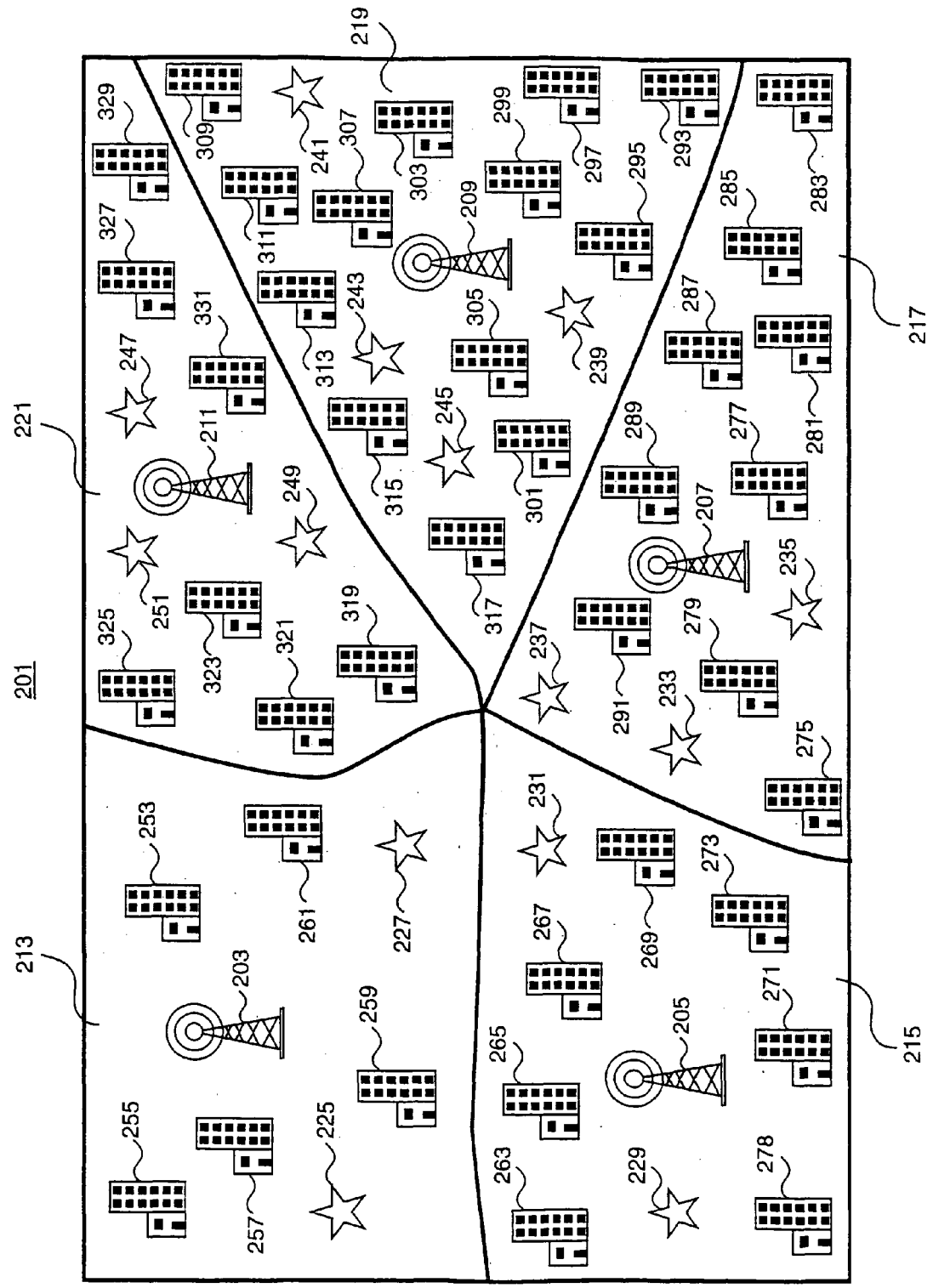
FIG. 1F is a simplified pictorial representation of a "fuzzy" management function for managing location data for the appliance and network of FIG. 1A.

FIG. 1F is a simplified pictorial representation of how network 11 of the preferred embodiment of the present invention manages location data in a "fuzzy" management style. FIG. 1F depicts a metropolitan region 201 which is serviced in general by a plurality of wireless communication towers, including towers 203, 205, 207, 209 and 211. Each tower 203, 205, 207, 209 and 211 is adapted to serve a particular service region, including service regions 213, 215, 217, 219, and 221. In other words, the communication capabilities of towers 203, 205, 207, 209 and 211 is designed in order to provide good coverage over a pre-determined service region within metropolitan region 201. In the aggregate, towers 203, 205, 207, 209, 211 provide widespread coverage throughout metropolitan region 201. If a user is traveling across the metropolitan region 201, towers 203, 205, 207, 209 and 211 will "hand off" communication tasks as the user approaches the outer boundaries of service regions 213, 215, 217, 219, and 221. Preferably, towers 203, 205, 207, 209 and 211 are located within metropolitan region 201 such that the outer boundaries of service regions 213, 215, 217, 219, and 221 overlap by a small amount, thereby ensuring continuous and complete communication coverage throughout metropolitan region 201.

Within each service region 213, 215, 217, 219, and 221, there may be a plurality of favorite locations which have been so designated by a particular user. Additionally, within each service region 213, 215, 217, 219, and 221, there is preferably a plurality of network affiliates who advertise particular goods and services over network 11. Such network affiliates may be either non-profit or for-profit entities. The network affiliates may also generate consumable digital content and provide such digital content to network 11 and all or selected users of network 11 for consumption. This digital content may be provided for a fee, at no charge in the manner of "shareware" digital content, or in the manner of conventional broadcast communications, such as radio, television, or satellite.

In the view of FIG. 1F, service region 213 includes two favorite locations selectively identified by an exemplary user, namely, favorite locations 225 and 227. Favorite locations 225 and 227 are identified within network 11 by selected colloquial designations provided by the user. A plurality of network affiliates are also located within service region 213, including network affiliates 253, 255, 257, 259, and 261. Service region 213 is serviced by wireless communication tower 203. If the user is within service region 213, and has established an "on" status, network 11 will "know" that the user is located within the coverage range of tower 203, and thus, located within region 213. Accordingly, network 11 will preferentially direct communications, digital content, and other network traffic, particularly from favorite locations 225 and 227, which are specific to service region 213 to the user.

Continuing with the example of FIG. 1F, the same applies for service region 215 which is serviced by wireless communication tower 205. In service region 215, the user has marked two favorite locations, namely favorite locations 229 and 231. Favorite locations 229 and 231 are identified within network 11 by selected colloquial designations provided by the user. A plurality of network affiliates are preferably located within region 215, including network affiliates 263, 265, 267, 269, 271, 273, and 278. If the user engages network 11 while within service region 215, the wireless communication will be conducted through tower 205. Accordingly, network 11 will "know" that the user is located within region 215. Network 11 may then preferentially direct communications, digital content, and other network traffic which are relevant to service region 215 to the user.

Continuing with the example, the same is true for service region 217. Service region 217 is serviced by wireless communication tower 207. The user has selectively identified a plurality of favorite locations within region 207, including favorite locations 233, 235, and 237. Favorite locations 233, 235, and 237 are identified within network 11 by selected colloquial designations provided by the user. Additionally, there is preferably a plurality of network affiliates located within service region 207, including network affiliates 275, 277, 279, 281, 283, 285, 287, 289, and 291, all of which provide various goods, services, or digital content. When the user engages network 11 within service region 217, network 11 will "know" that the user is located within service region 217, and may then preferentially direct digital content, messages, and advertisements that are relevant to service region 217 to the user.

Continuing with the example of FIG. 1F, service region 219 is serviced by wireless communication tower 209. The user has selectively identified a plurality of favorite locations within service region 219, including favorite locations 239, 241, 243, and 245. Favorite locations 239, 241, 243, and 245 are identified within network 11 by selected colloquial designations provided by the user. Additionally, there is preferably a plurality of network affiliates located within service region 219, including network affiliates 293, 295, 297, 299, 301, 303, 305, 307, 309, 311, 313, 315, and 317. When the user engages network 11 while located within service region 219, wireless communication will be established via tower 209. Accordingly, network 11 will "know" that the user is located within region 219. With this information, network 11 may preferentially direct communications, messages, and digital content, particularly from favorite locations 239, 241, 243, and 245, and other network affiliates located within region 219 to the user.

Continuing with the example of FIG. 1F, service region 221 is serviced by wireless communication tower 211. There is a plurality of favorite locations selectively identified by the user that are located within service region 221, including favorite locations 247, 249, and 251. Favorite locations 247, 249, and 251 are identified within network 11 by selected colloquial designations provided by the user. Additionally, there is preferably a plurality of network affiliates located within service region 221, including network affiliates 319, 321, 325, 327, 329, and 331. If the user is within service region 221, and has established an "on" status, network 11 will "know" the user is within service region 221. Accordingly, network 11 may preferentially direct digital content, messages, and advertisements that are relevant to service region 221 to the user.

In accordance with the preferred embodiment of the present invention, favorite locations 225, 227, 229, 231, 233, 235, 237, 239, 241, 243, 245, 247, 249, and 251 within metropolitan region 201 are identified through user decision and user action by the particular user. Some of favorite locations 225, 227, 229, 231, 233, 235, 237, 239, 241, 243, 245, 247, 249, and 251 represent places which are personal to the user and which have no precisely known location within network 11. For example, a relative's house may be known to network 11 only by a colloquial designation, such as "Aunt Jane's house." Additionally, the user's home may also be known only colloquially within network 11 as "home;" however, the true location, including GPS location and street address, for "home" may be known at some secure level within network 11, in order to guard the privacy and to ensure the safety of the user. For example, the address of "home" may be known by network 11 for billing and other communication purposes only. Some favorite places, such as "Aunt Jane's house," may never have a known precise location, so far as network 11 is concerned. However, network 11 will "know" what region "Aunt Jane's house" is in, merely by knowing the identity of the wireless communication tower 203, 205, 207, 209, or 211 that services the user when he or she is at "Aunt Jane's house."

The example of FIG. 1F can be considered more fully in combination with the exemplary data arrays depicted in the tables of FIGS. 1G (1 of 5) through 1G (5 of 5). FIGS. 1G (1 of 5) through 1G (5 of 5) are simplified representations of the relationships between towers 203, 205, 207, 209, and 211; service regions 213, 215, 217, 219, and 221; favorite locations 225, 227, 229, 231, 233, 235, 237, 239, 241, 243, 245, 247, 249, and 251; and network affiliates 319, 321, 325, 327, 329, and 331. FIG. 1G (1 of 5) represents tower 203 and service region 213. As is shown, service regions 215 and 221 are listed as adjoining service regions. Network 11 knows that adjoining service regions 215 and 221 are adjacent to region 213. As shown in the table, favorite places 225 and 227 have been colloquially identified by the user over time as Riding Stables 225 and Water Park 227, respectively. Some favorite locations may also be network affiliates; therefore, their precise GPS location and street address may be known to network 11. However, if a favorite location 225 or 227 is not yet a network affiliate, its precise GPS location and street address may not be known to network 11. Riding Stables 225 and Water Park 227 have been identified by affirmative action of the user and denote favorite locations and/or activities of the user. As shown in the next column of the table, a plurality of network affiliates 253, 255, 257, 259, and 261 are known by network 11 as Game Arcade 253, Video Store 255, Taco Stand 257, Book Store 259, and Riding Supply Store 261, respectively. Because these entities are network affiliates of network 11, their precise GPS location and street address are known to network 11. When the user is within region 213 and communicating with network 11 via tower 203, Game Arcade 253, Video Store 255, Taco Stand 257, Book Store 259, and Riding Supply Store 261, may have their advertisements, communications, and/or digital content preferentially directed or routed to the user's location-aware wireless communication appliance, such as appliance D1.

As will be discussed in much greater detail below, the user determines the types of messages, advertisements, and digital content that are pulled from network 11 and transmitted to the user's appliance D1. These preferences or desires may be determined by appliance D1 and network 11 through analysis of the user's behavior and activities, or through direct questioning or interaction with the user. In the current example, since the user obviously enjoys riding stables and water parks, advertisements, communications, and/or digital content originating by, through, or from Riding Supply Store 261 may be preferentially pulled from network 11 and transmitted to the user's appliance D1. Because network 11 knows, if alerted, that the user is within the communication range of tower 203, network 11 may preferentially direct such communications from Riding Supply Store 261 to the user upon the assumption that communications and advertisements made while the user is within proximity to Riding Supply Store 261 may be more effective than communications and advertisements communicated when the user is located in a region of metropolitan region 201 that is remote from Riding Supply Store 261.

As an additional example, through the extensive profiling of the user, network 11 may "know" that the user has little or no interest in video games. Accordingly, communications and advertisements from Game Arcade 253 may be blocked or barred from communication to that particular user. In the preferred embodiment of the present invention, as will be discussed in much greater detail below, there is always some possibility that communications relating to subject matters outside known interests of the user will be communicated to the user. However, network 11 includes a probabilistic modeling system for determining which communications or digital content more closely fit the user profile. Based on this probabilistic modeling system, appliance D1 determines which communications to pull from network 11 and transmit to the user. Accordingly, there is a higher probability of relevant communications occurring and a lower probability of less relevant communications occurring.

It is also important to note that if the user has established an "on" status, network 11 is aware of the service region in which the user is located and all adjoining service regions. In this manner, network 11 is capable of monitoring travel across service regions 213, 215, 217, 219, and 221, and may make sophisticated analyses of such travel based upon location, time, and changes in location and time, in order to infer action or purpose. These attributes will be discussed in greater detail below.

Continuing with the example, FIG. 1G (2 of 5) represents tower 205 and service region 215. As is shown, service regions 213, 217, and 221 are listed as adjoining service regions. Network 11 "knows" that adjoining service regions 213, 217, and 221 are adjacent to service region 215. As shown in the table, favorite places 229, 231, and 233 have been colloquially identified by the user over time as Aunt Jane's House 229, Linear Park 231, and Pottery Supply Store 227, respectively. Of course, as the user utilizes appliance D1, the user is unaware of which tower covers which service regions. Consequently, the user is unaware of the groupings of favorite places made by network 11, as they correspond to tower identification, tower coverage, and service region identification.

As is shown in this example, a plurality of network affiliates 263, 265, 267, 269, 271, 273, and 278 reside within service region 215 and are known by network 11 as 24-Hour Gym 263, Ice Skating Rink 265, Sporting Goods Superstore 267, Prom Dress Shop 269, Belgian Chocolate Store 271, Pet Store 273, and Model Train Store 278, respectively. Network 11 may be entirely unaware of the actual location of Aunt Jane's House 229, Linear Park 231, or Pottery Supply Store 233; however, network 11 will know that Aunt Jane's House 229, Linear Park 231, and Pottery Supply Store 233 are located within service region 215 which is serviced by wireless communication tower 205. This is true because appliance D1 will not broadcast raw GPS position data to network 11. Instead, appliance D1 will transmit, if permitted, that the user is located in a favorite place known as Linear Park 231. On the other hand, network 11 may be aware of the precise GPS data and street address location for Pottery Supply Store 233, especially if Pottery Supply Store 233 is a network affiliate. When network 11 is aware that the user is located within service region 215 and communicating with network 11 via tower 205, communications from network affiliates 24-Hour Gym 263, Ice Skating Rink 265, Sporting Goods Superstore 267, Prom Dress Shop 269, Belgian Chocolate Store 271, Pet Store 273, and Model Train Store 278 may have their advertisements, communications, and/or digital content preferentially directed or routed to the user's appliance D1. However, such transmission of digital content will depend upon the user profile and user preferences which have been established through prolonged interaction between the user and network 11. Accordingly, network 11 may attach a low probability of communicating a digital message from Model Train Store 278 based upon what network 11 has determined about the user's preferences. However, if network 11 has determined that the user is an animal lover, network 11 may attach a high probability to messages which originate from Pet Store 273.

Based upon derived or inferred information about user preferences, or upon selections made by the user, the digital content transmitted to the user's appliance D1 via tower 205 may be entirely different from the digital content being simultaneously transmitted to other users located within the same service region 215. For example, a second user who has a high interest in ice skating may receive digital communications from Ice Skating Rink 265; a third user interested in fitness may receive digital content from 24-Hour Gym 263; and a fourth user known to be a female senior in high school may receive communications from Prom Dress Shop 269. Based upon a network assumption that individuals interested in fitness may not be interested in high calorie, luxury foods, such as Belgian chocolate, there may be a high probability that the third user will receive digital content from 24-Hour Gym 263, but a low probability that the third user will receive digital content from Belgian Chocolate Store 271.

Continuing with the example, FIG. 1G (3 of 5) represents tower 207 and service region 217. As is shown, service regions 215, 219, and 221 are listed as adjoining service regions. Network 11 "knows" that adjoining service regions 215, 219, and 221 are adjacent to service region 217. As is shown in the table, favorite places 235 and 237 have been colloquially identified by the user over time as Candy's House 235 and Resale Boutique 237. Network 11 may not know the precise GPS and/or address location for Candy's House 235. However, network 11 does know that Candy's House 235 is located within service region 217 which is served by wireless communication tower 207. In fact, there may be no reason for network 11 to ever know the exact location of Candy's House 235. If Resale Boutique 237 is a network affiliate of network 11, the exact GPS and/or address location for Resale Boutique 237 may be known by network 11. However, if Resale Boutique 237 is not a network affiliate, network 11 may never know the precise GPS data or address location for Resale Boutique 237.

In this example, a plurality of network affiliates 275, 277, 279, 281, 283, 285, 287, 289, and 291 reside within located within region 217, and are known by network 11 to be Corn Maze 275, Aquarium 277, Museum 279, I-Max Theatre 281, Movie Theatre 283, Laser Tag Facility 285, Pizza Place 287, Zoo 289 and Public Library 291. When a user is located within service region 217, network 11 may preferentially broadcast digital messages from one or more network affiliates 275, 277, 279, 281, 283, 285, 287, 289, or 291 based upon the known, derived, or inferred preferences of the particular user. As stated before, there is always some probability that any particular message will be broadcast to a particular user; however, the probabilistic modeling system weights digital content for reception or transmission of digital content to a particular user based upon the derived, inferred, or obtained preferences of that particular user. Accordingly, if the user is known to be an animal lover, messages from Zoo 289 have a higher probability of being viewed by that user. Messages from Laser Tag Facility 287 or Museum 279 may have a low probability of either reception or transmission based upon the then-known user profiles and/or preferences.

Continuing with the example, FIG. 1G (4 of 5) represents tower 209 and service region 219. As is shown, service regions 217 and 221 are listed as adjoining service regions. Network 11 "knows" that adjoining service regions 217 and 221 are adjacent to service region 219. Through previous interaction with network 11, the user has identified favorite places 239, 241, 243, and 245 as Home 239, School 241, Work 243, and Suzy's House 245. Network 11 may or may not know the precise GPS data and/or street address for these favorite places. However, network 11 knows that these places are located within region 219 and serviced by tower 209. When the user interacts with network 11 from Home 239, appliance D1 communicates to network 11 that the user is located at Home 239. Network 11 does not know the precise location of Home 239. However, for purposes of billing and perhaps parental contact information, some portions of network 11 may be aware of the location of Home 239. Similarly, when the user is located at School 241 and engages with network 11, appliance D1 communicates to network 11 that the user is located at School 241. If the user is located at Work 243 and an "on" status has been established, appliance D1 will communicate to network 11 that the user is located at Work 243. Network 11 may never know the exact GPS data or address location for Work 243, but network 11 "knows" when the user is interacting with network 11 and is located at the unknown GPS location which corresponds in the database to Work 243. Likewise, when the user is located at Suzy's House 245, and interacts with network 11, appliance D1 communicates to network 11 that the user is located at Suzy's House 245, even though network 11 may not know where Suzy's House 245 is actually located within region 219. When the user is located within region 219, appliance D1 may preferentially direct digital content to be transmitted from network 11 to appliance D1 based upon the derived, inferred, or known user preferences. In the current example, network affiliates 293, 295, 297, 299, 301, 303, 305, 307, 309, 311, 313, 315, and 317 are known by network 11 as Mall #1 293, Mall #2 295, Chinese Food Restaurant 297, K-Mart 299, Target 301, Record Store 303, Batting Cages 305, Golf Driving Range 307, Computer Superstore 309, Boy's Club 311, Church #1 313, Restaurant #14 315, and Bicycle Shop 317. In accordance with the preferred implementation of the present invention, one or more digital messages may be directed to the user when she is within region 219 based upon inferred, derived, or known preferences. However, the means for determining whether a particular digital message is offered for presentation to a particular user at a particular time is a probabilistic modeling system governed by constrained random variation, whereby the probabilities of offering digital messages for presentation vary on a message-by-message basis. In other words, the probabilistic modeling system does not randomly select from a group of digital messages, each having an equal probability of being offered for presentation. Therefore, it is possible for the user to receive digital content relating to certain subject matter that is entirely outside of, or contrary to, his current user profile. Additionally, certain digital content will be transmitted to appliance D1 based upon location information alone. For example, the fact that the user is within service region 219 may mandate that certain particular digital content be transmitted to and received by appliance D1.

Continuing with the example, FIG. 1G (5 of 5) represents tower 211 and service region 221. As is shown, service regions 213, 215, 217, and 219 are listed as adjoining service regions. Network 11 "knows" that adjoining service regions 213, 215, 217, and 219 are adjacent to service region 221. As is shown in the table, favorite places 247, 249, and 251 have been colloquially identified by the user over time as Uncle Clay's House 247, The Gap 249, and Grandmother's House 251. Network 11 may never "know" the exact GPS data and/or street address for Uncle Clay's House 247 and Grandmother's House 251. However, network 11 does know that these favorite places are located within service region 221 and serviced by tower 211. Additionally, network 11 may know the precise GPS data and street address for The Gap 249, especially if The Gap 249 is a network affiliate. As is shown, a plurality of network affiliates 319, 321, 323, 325, 327, and 329 are known by network 11 as Metro Stop 319, Starbucks 321, Bowling Alley 323, Antique Mall 325, Tennis Facility 327, and Car Stereo Superstore 329. In accordance with the preferred implementation of the present invention, digital content or messages from Metro Stop 319, Starbucks 321, Bowling Alley 323, Antique Mall 325, Tennis Facility 327, Car Stereo Superstore 329, and other network affiliates located within service region 221 may be preferentially transmitted to the user when the user is located within region 221, based upon the theory that the user is more likely to act upon an offer of goods or services if she is physically located near the network affiliate that is making the offer. As stated previously, the user has primary control over which digital content is transmitted to appliance D1 by providing network 11 with user profile and preferences information through interaction with network 11. Network 11 determines which digital content to transmit to appliance D1 through manipulation of the derived, inferred, and known preferences provided by the user. In addition, network 11 may transmit certain digital content to the user or to appliance D1 determined in part by the physical location of the user. Thus, although the user is primarily in control of the digital content that will likely be transmitted to appliance D1, there is some probability that the user will receive digital content for material outside or contrary to the user's known preferences.

2. According to the present invention, the range of GPS locations associated with the generalized location identifiers explained above may be automatically altered over time in response to any one of the following:
  a. Additional express input of users in response to queries posed by network 11;
  b. Actions of the users, such as renaming a location that is in conflict with a prior designation or alias; or
  c. Actions taken by the users in changing any of the status items of their communication appliances.

3. It should be understood that the generalized location identifiers explained above may simply be provided by network 11 as opposed to being provided by the user.
  d. User identity includes the following:
    1. User ID;
    2. First name;
    3. Last name;
    4. Demographics, which includes:
      a. Age;
      b. Gender; and
      c. Home region.
  e. Current balances. Each and every content item is accompanied by a plurality of revenue/expense data elements representing values such as revenue/expense of acquisition of the content item, revenue/expense to deliver the content item over various channels, revenue/expense for user to view the content item, and revenue/expense to interact with the content item. By keeping this information with the content item, rather than just an identifier like a product code, the system can make decisions asynchronously and under circumstances when access to a database may be available.

Bookkeeping operations are performed at every stage of the transport of the content item and balances are maintained in these stages. These account balances are used to influence the delivery probabilities of this content item.

Because the plurality of revenue/expense data associated with each content item can represent revenue for the user, merchants can set up campaigns that reward or debit users for certain behaviors, interactions, or transactions. For example, a content item which has a certain location contextual sensitivity could reward a user if they approach a physical storefront. Also, another content item representing a digital coupon upon interaction could debit a users account. This topic is also discussed below with regard to Network Energy in Section 13.

3.B.3. Objective context—Altered (Virtual locations).

By altering the objective context of the device, the user can influence the delivery and presentation of content. By changing the location context used by the content delivery and routing mechanisms, the user may enable a form of virtual travel known as "virtual tourism" in which the user may choose to receive digital content as if he or she were actually located in a different geographic location. This change in apparent location will cause a subsequent change in the content presented, showing content with contextual sensitivities appropriate for locations nearer the altered location.

3.B.3.a. Geographic Location. The known geographical position of the device may be altered by intercepting the data from the geographical positioning mechanism and either altering the position by a known offset or by generating or manually entering a new device position. This enables the rapid relocation or "jumping" between virtual locations.

3.B.3.b. Named locations. By naming a geographical location, a user is able to later manually specify this named location, thereby changing the location context and influencing the delivery and presentation of content relevant to the previously named location. This enables the rapid relocation or "jumping" between virtual locations.

3.B.3.c. Grouped Geographic Locations. In accordance with the present invention, one or more remote geographical locations may be combined into a single "morphed" virtual space. For example, the network space for New Orleans, La. may be combined with the network space for Dallas, Tex. This morphed space creates a "sister" city metaphor, allowing content relevant to more than one location context to be delivered simultaneously. The remote geographical locations may either be specified by geographical position or by named locations.

3.B.3.d. Unique Virtual Locations. In accordance with the present invention, a user or a group of users may adopt a remote virtual space as a common virtual meeting space, and thus engage in community building. The virtual locations may be used as private spaces which are unknown to those not familiar with them. User generated content may be associated with this space so that the content becomes relevant when a user enters this virtual location. See also Sections 14.N. and 14.O. below.

3.B.4. Subjective context.

3.B.4.a. PG-rating filter. As has been stated above, in the preferred embodiment of the present invention, a high value has been placed upon user privacy. This means that user privacy preferences will predominate over the compilation of other information, including biographic data, cultural data, demographic data, and preferences information, for individual users. Additionally, user privacy settings will predominate over the goals of network 11 of presenting particular digital content to particular users. In other words, a user, or more commonly, a user's parent, may block certain types of digital content from being pulled off of network 11 by the user's appliance, and such block will have priority over the goal of network 11 to offer for presentation particular types of digital content to the user's appliance. Certainly, the user privacy preferences for the identification of his or her current location, in fuzzy terms, predominates over the goals of network 11 to know the location of the user.

It is important to note that a privacy block is different from a user preference. In a privacy block, there is a complete and absolute block on the subject digital content, and the user's appliance will not display such digital content. In other words, there is a zero percent probability that the communication will be displayed. On the other hand, a user preference, such as food preferences, entertainment preferences, and relationship preferences, are determined primarily from each user's interaction with his appliance, which includes the user's responses to inquiries, the user's trust relationship to other users, and/or inferences made by network 11. Such interaction is the primary source of the contextual user profiles which are an important feature of the present invention. Contextual user profiles will be discussed in detail below. Privacy blocks deals with blocking or filtering particular digital content, and user preferences deal with the ability of a user to aggressively seek out certain types of digital content based upon compiled user preferences. The former can be considered a digital filter, and the latter can be considered to be a digital accelerator.

3.B.4.b. Current named Place-time.

3.B.4.c. User absorption rate.

3.B.4.d. User thriftiness.

3.B.4.e. Mood.

3.B.5. Preference. An example of a preference is how well the user liked the content before. This is also referred to herein as ratings.

a. Locally resident ratings.

3.C. Rating. In accordance with the present invention, many novel and interesting applications and network functions are made possible through a data processing implemented profiling of individual user's preferences with regard to content items. Ratings represent the favorableness and utility of content items to each user. An individual user's preference profile to content is represented by ratings that the user assigns to content items. Therefore, the platform keeps a separate preference profile for each individual user. Ratable content includes, but is not limited to, games, movies, music, images, ads, offers, news, events, user-created messages, and representations of people.

Ratings enable the network platform to tune the selection and scheduling of content to each individual user's likes and needs. The meta-data provided in the wrapper is used to determine the similarity among content items. The tuning involves preferred selection of content items that are similar to other content items that are favorably rated. See Sections 3.D, 6.B.2, and 8.A, for further details on the influence of ratings on content selection and scheduling. See Section 8.F for a more detailed discussion of rating mechanisms and techniques.

3.D. Content Selection. The goal of delivering the right content items to the right people under the right circumstances can be implemented by either a single or dual stage process. The preferred method provides enhanced user privacy and system scalability by implementation in two asynchronous stages. The first stage occurs on the server at the network operation center and performs gross content item candidate selection, while the final presentation decisions are made on the client. A feedback loop from the client to the server returns content item rating information.

3.D.1. Gross—Big scheduler (Content Selection Engine). The goal of this stage is to select candidate "payloads" for delivery to the client. As content ages, expires, or is poorly rated, and as new content is introduced into the network as a whole, or the user's home location changes, the client must be replenished with new content items. Such payloads are often delivered to the client when the device is cradled or during off-peak communication times.

This stage is running asynchronously, as server capacity allows, always keeping a list of candidate content for a specific client. When the client is able to accept new content, a list of content items currently residing on the client, their byte sizes, their prioritized purge-ability, and their content-type blend, are examined and an optimal subset of the candidate list is transferred to the client. The candidate selection process is probabilistic, blending new content varieties with known preferences, and is based on historic ratings of content of one user and those users he selected as having similar tastes. This historic content's wrappers and ratings include information about content categories, features, and time and space relevancies.

3.D.2. Fine Scheduler (Little scheduler). This stage operates on the payload of candidate content held within the client, refining precisely if or when the content is presented based on the user's context. If the content is presented and explicit or implicit user rating of the content can be acquired, this information is delivered back to the first stage. The mechanism is again probabilistic, using the interaction of the content's contextual sensitivities with the current context to set probabilities of presentation.

3.E. Awareness: Awareness encompasses a wide range of different types of information, but in general, awareness is defined as those types of information that are delivered and presented based on context, as is defined in Section 1. This includes, but is not limited to friends, events, processes, news, and merchant offers and many of the types of information listed in Section 2 that provide value to users.

There are four general categories of awareness that the network and user interface are capable of supporting:

1. Awareness of what is close to and happening around a user at the present time. For example, awareness of the nearest automated teller machine or coffee shop, and awareness of a special offer at a favorite nearby restaurant delivered to the user near lunchtime.

2. Awareness of things that will happen or become effective at various times in the future. For example, awareness of an upcoming concert or soon to be released movie, awareness of invitations to parties or meetings, and awareness of new products.

3. Awareness about things that are of interest and that are happening now, but that are not near the user or directly observable. For example, awareness of the score of a baseball game, awareness of stock quotes, awareness of a package delivery, and awareness of the location of friends.

4. Awareness of state and status of user activities and the system. For example, awareness of received messages, awareness of an incoming call, awareness of pending work such as an unfinished instant message, awareness of the status of a sent message, awareness of current location, awareness of remaining battery capacity and awareness of network connection status.

Awareness may be presented at the user's "focus," it may reside in the user's "peripheral" vision, and/or it may be interruptive and require immediate user attention. The user interface provides constructs for presentation of awareness items as appropriate. Examples of awareness presented in the user's focus include, but are not limited to, news articles and the reading of an instant message that was recently received. Examples of awareness presented in the user's peripheral vision include, but are not limited to other users' locations, the time and the network connection status. Examples of interruptive awareness include, but are not limited to, a low battery condition, a lost network connection, an incoming instant message, or an incoming phone call.

| | | | |
|---|---|---|---|
| 1. | Specific items. | | |
| | a. | In arrangements. | |
| | b. | User chosen. | |
| | | 1. | Other user's location. |
| 2. | Situational awareness - Sream. | | |
| | a. | Focal point of relevant new information. | |
| | b. | Heterogeneous. | |
| | | 1. | Messages. |
| | | 2. | Breaking news. |
| | | 3. | Entertainment. |
| | | 4. | Commercial opportunities. |
| | | 5. | Warnings. |
| | | 6. | Device alerts. |
| | c. | System-initiated (scheduler). | |
| | d. | Continuous. | |
| | e. | Sequential. | |
| | f. | Contextually relevant. | |
| | h. | Ratable. | |
| | i. | Scheduled from local and server data stores. | |

3.F. Arrangements.

3.F.1. Organizational tool. An arrangement is a user interface construct for organizing content items for presentation to a user. An arrangement is an assemblage of zero or more content items that are collected, then spatially and/or temporally organized for presentation.

3.F.2. Content Item Membership is Non-exclusive. Arrangements offer users great flexibility in constructing an awareness environment that meets their individual needs. Users can define any number of arrangements and individual content items may be included in any number of arrangements.

3.F.3. Types of Arrangements. Users occasionally need to view homogenous collections of content objects formed on the basis of inherent category membership, e.g., an arrangement of all people. Traditional business-related functionality found on PDA's and desktops is designed around access to homogenous sets of information, e.g., contact lists or address books, message lists, to do lists, event lists, or calendars. These are very useful for reference, but they do not satisfy the need people have to be aware of various kinds of information, especially when the set of information itself needs to adapt in response to changes in the present context. At any given time users have the need to bring together collections of content that are diverse. Using arrangements manages to satisfy both with the same interaction model.

a. Arbitrary. Arbitrarily defined arrangements contain heterogeneous collections of content objects and other arrangements that constitute the information the user wants to be aware of or the activities the user wants to engage in at any given time. They are not collected based on context or a rule, but rather by the explicit inclusion of the content items in the arrangement by the user. The user may choose to use content associations to draw in additional content items that have associations with those explicitly included by the user.

b. Rule-based. Rule based arrangements are used to construct homogenous sets or groups of content items such as a calendar, a contact list or a phone list. In the case of a calendar, content items with time sensitivities that match those specified by the chosen calendar day, week, month or year would be gathered into an arrangement. In the case of a contact list, those content items typed as "people" would be gathered into an arrangement. Temporary arrangements may also be formed, such as the results of a search operation, pending items, or an inbox. One example is an inbox for incoming messages where unread messages are grouped until the user takes action on them.

Figure 14A:
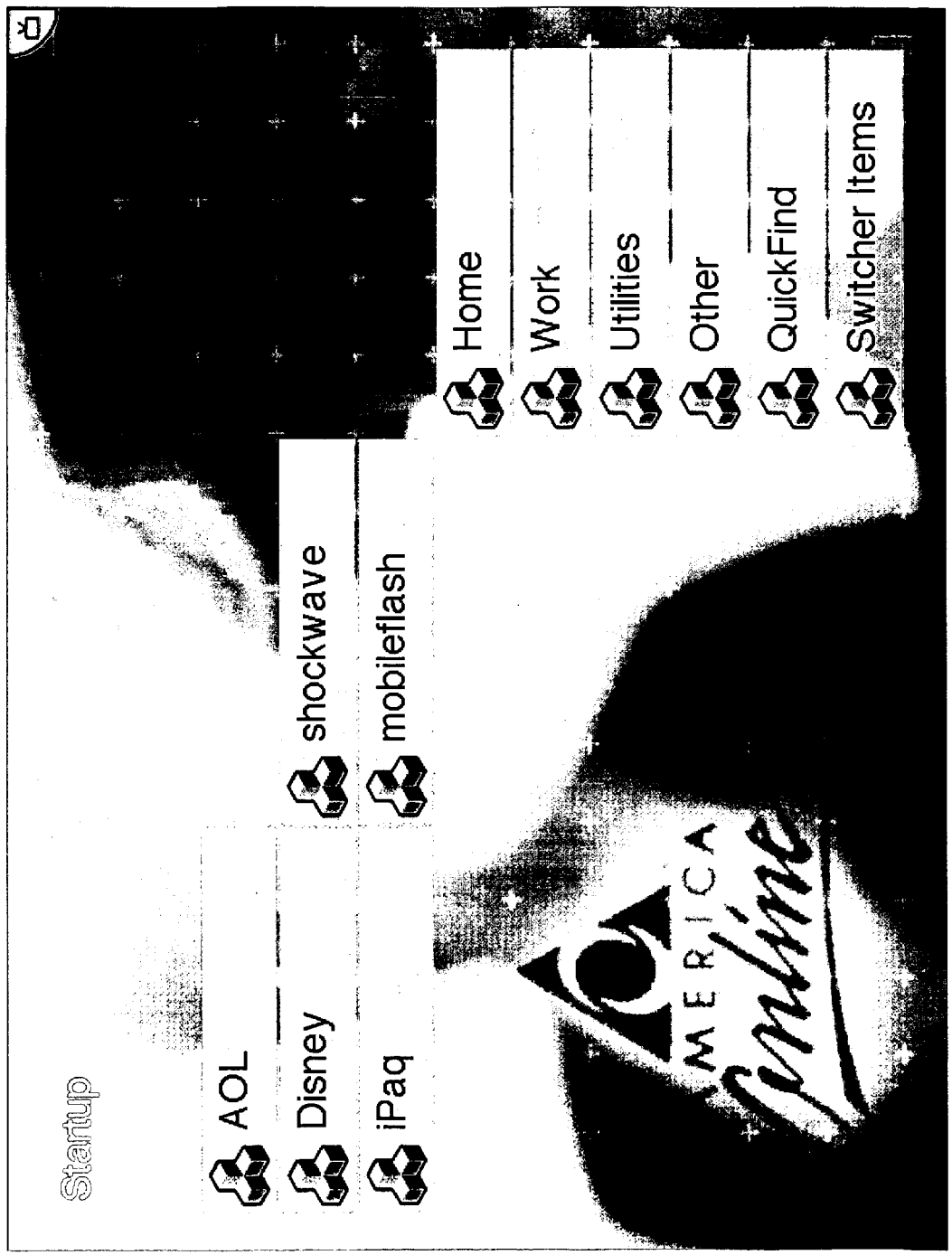
FIGS. 14A-14E are progressive screen shots illustrating the resizing and/or variable sizing of the content stream of the user interface according to the present invention.
Figure 14B:
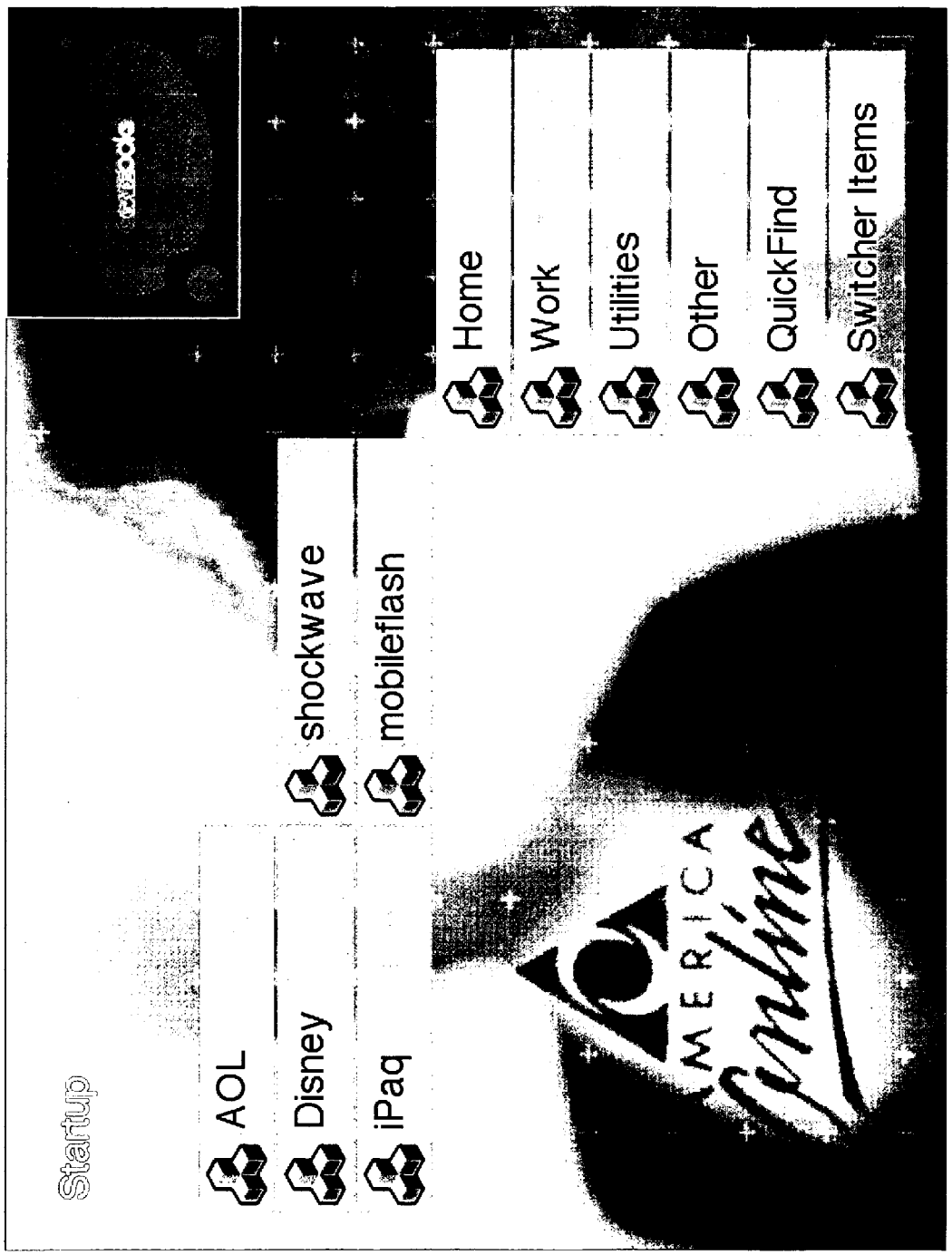
Figure 14C:
Figure 14D:
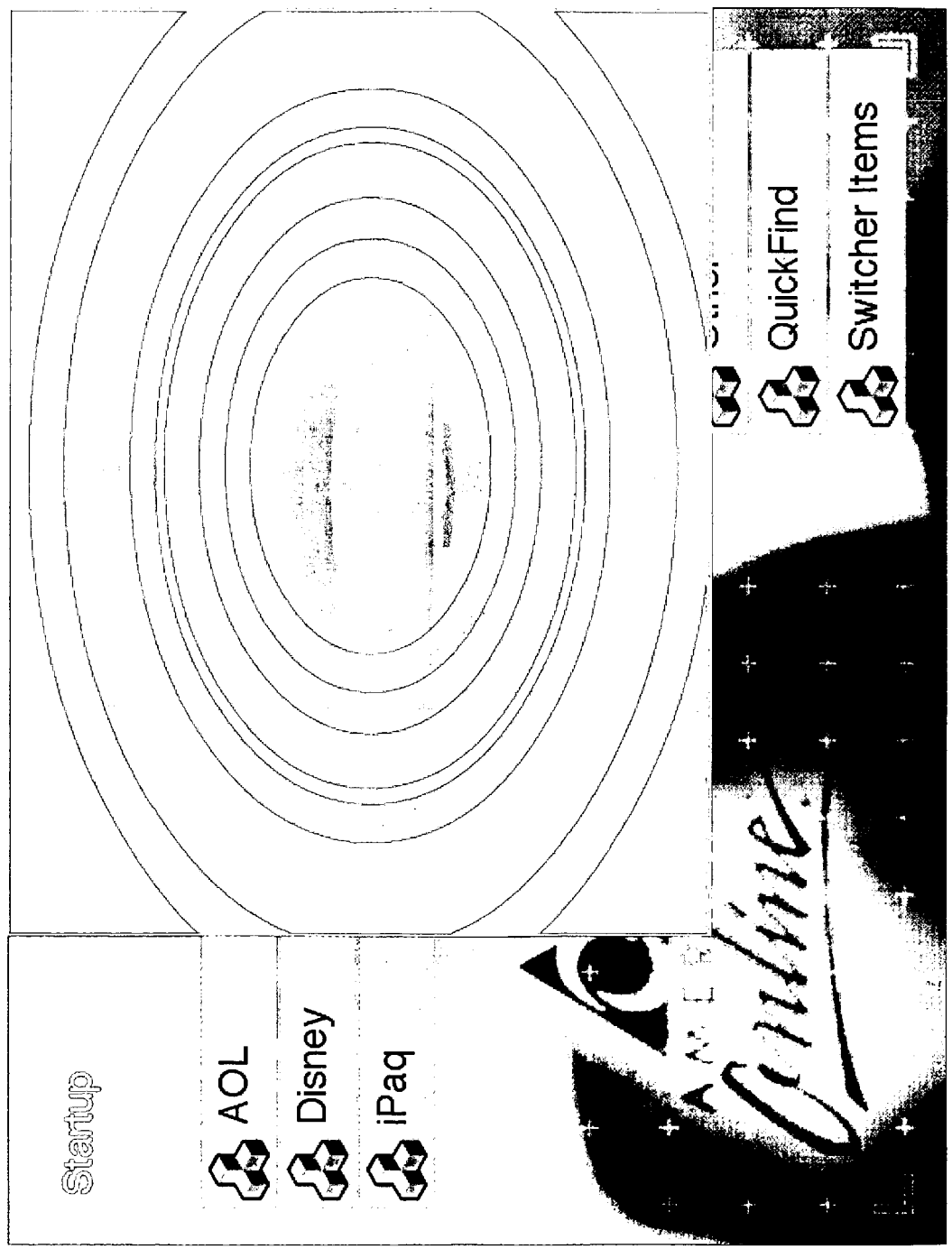
Figure 14E:
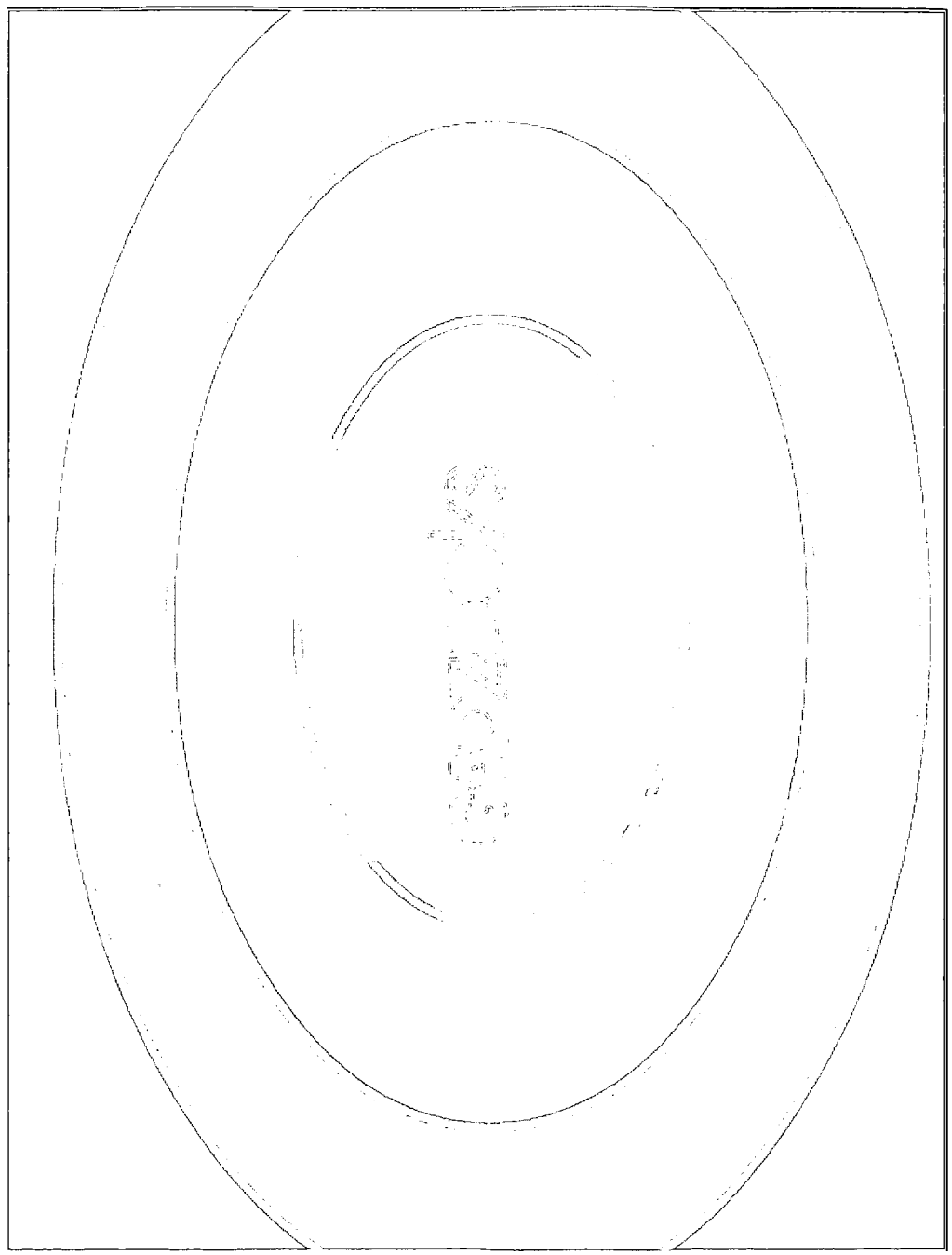

3.F.4. Representation in other arrangements. The ability to nest arrangements within other arrangements creates association links between them giving much flexibility to users in setting up their own navigational paths. In this way, the set of arrangements taken together forms a heterarchical organization of content objects. In contrast to hierarchies, heterarchies are able to be reflexive so that they can be reformulated in response to immediate and changing needs. Heterarchies are also more easily able to accommodate organizations of heterogeneous objects. The foregoing is illustrated in FIG. 14A.

3.F.5. Contextually triggered. Arrangements are treated like any other content item, so their presentation may be controlled in a similar fashion. They may be chosen for presentation based on time, location, or any specified contexts.

3.G. Communications. In accordance with the preferred implementation of the present invention, a plurality of alternative communication modes are supported within network 11. Some communication modes can be considered to be "cold" forms of communication, while other modes of communication may be considered to be "hot" modes of communication. A cold mode of communication has a high degree of delay or latency associated therewith. Conversely, a hot mode of communication is one which has a low degree of delay or latency associated therewith. Generally, hot modes of communication may be conducted in real time. Preferably, the alternative communication modes include an e-mail mode, an IM mode, a chat mode, a voice mode, and a video phone mode. The following is a description of the operation of the present invention to enable these various modes of communication as well as the escalation or de-escalation of modes of communication.

3.G.1. E-Mail. The e-mail mode of communication is one in which text messages are keyed in by one user and communicated in a text form over network 11 to a designated recipient. The e-mail mode of communication on network 11 utilizes conventional e-mail formats and protocols. E-mail messages may be accumulated and saved in an electronic in-box, whereby the e-mail messages may be read at the leisure and convenience of the recipient.

3.G.2. Instant messaging. The IM mode of communication is one in which text messages are keyed in by one user and delivered immediately to the recipient user if the recipient user's appliance is in an IM receipt mode. Instant messaging messages received while in the IM receipt mode subordinate other content on the recipient's appliance. Thus, IM is considered "hotter" than e-mail. It is desirable that the IM mode of communication on network 11 utilizes conventional IM formats and protocols.

3.G.3. Chat. The chat mode of communication is one in which a plurality of communicants have initiated a chat session in which text, graphical, or voice synthesized messages are exchanged substantially concurrently in a dialog fashion. Because the users in a chat session have affirmatively established a desire to communicate with each other, chat is "hotter" than e-mail and IM. It is desired that the chat mode of communication on network 11 utilizes conventional chat formats and protocols.

3.G.4. Voice. The voice mode of communication is similar to a telephone conversation. The voice mode of communication is possible when mobile phone components and capabilities are embedded in the user's appliance. Because the voice mode of communication is performed concurrently between users in real time, it is "hotter" than e-mail, IM or chat. It is desired that the voice mode of communication on network 11 utilizes conventional cellular or digital phone formats and protocols.

3.G.5. Video. The video-voice mode of communication is similar to a video phone conversation. The video-voice mode of communication is possible when mobile video phone components and capabilities are embedded in the user's appliance. Because the video-voice mode of communication is performed concurrently between users in real time, and involves current video, it is "hotter" than e-mail, IM, chat, or voice. It is desired that the video-voice mode of communication on network 11 utilizes conventional cellular or digital video phone formats and protocols.

3.G.6. Escalation of Communication Modes. In accordance with the preferred embodiment of the present invention, it is possible for communicants to move between modes of communication from a relatively "cold" mode of communication, such as IM, to a relatively "hot" mode of communication, such as a voice. If during an IM session, the communicants decide to "switch up" to the voice communication mode, they can simply input an appropriate command to their respective appliances, and network 11 will establish the voice connection between the users.

3.G.7. De-escalation of Communication Modes. Conversely, it is possible for communicants to de-escalate modes of communication from a relatively "hot" to a relatively "cold" mode of communication. This could be done in an effort to reduce airtime or to conserve network energy. For example, if two users are communicating to each other in the voice mode and decide to "switch down" to a chat mode which may burn less network energy, the users simply input an appropriate command to their respective appliances, and network 11 will disconnect the voice connection between the users and establish a chat session between the users.

3.H. Searches. Content items that perform find and search functions are provided so that users may search for new content items located on the network and locate existing content items already stored on their devices. Such search content items may perform specific searches and/or contextual searches. Specific searches include, but are not limited to finding certain people on the network or a particular merchant. Contextual searches include, but are not limited to, finding content items based on location, time and preferences.

A single find or search utility is extremely inadequate because it is much too difficult to provide a single, comprehensive search utility with all of the necessary options to find any possible type of information. For this reason, separate content items for finding different types of information are provided for. Users are accustomed to using different search mechanisms for different types of information. For example, when looking for directions, a user does not simply use a generic search mechanism and type in the keyword directions. The user goes to a mapping and directions site or page that has various options that make the process of getting exact directions from one location to another much easier.

Providing different content items for find and search operations provides the possibility for merchants to develop custom, branded content items that can be used to find a particular merchants locations or products. For example, a coffee shop could provide an awareness content item that simply provides a constant indication of the nearest coffee shop location. The awareness item is a search item, but the item does the search automatically based on the user's location.

Figure 10:
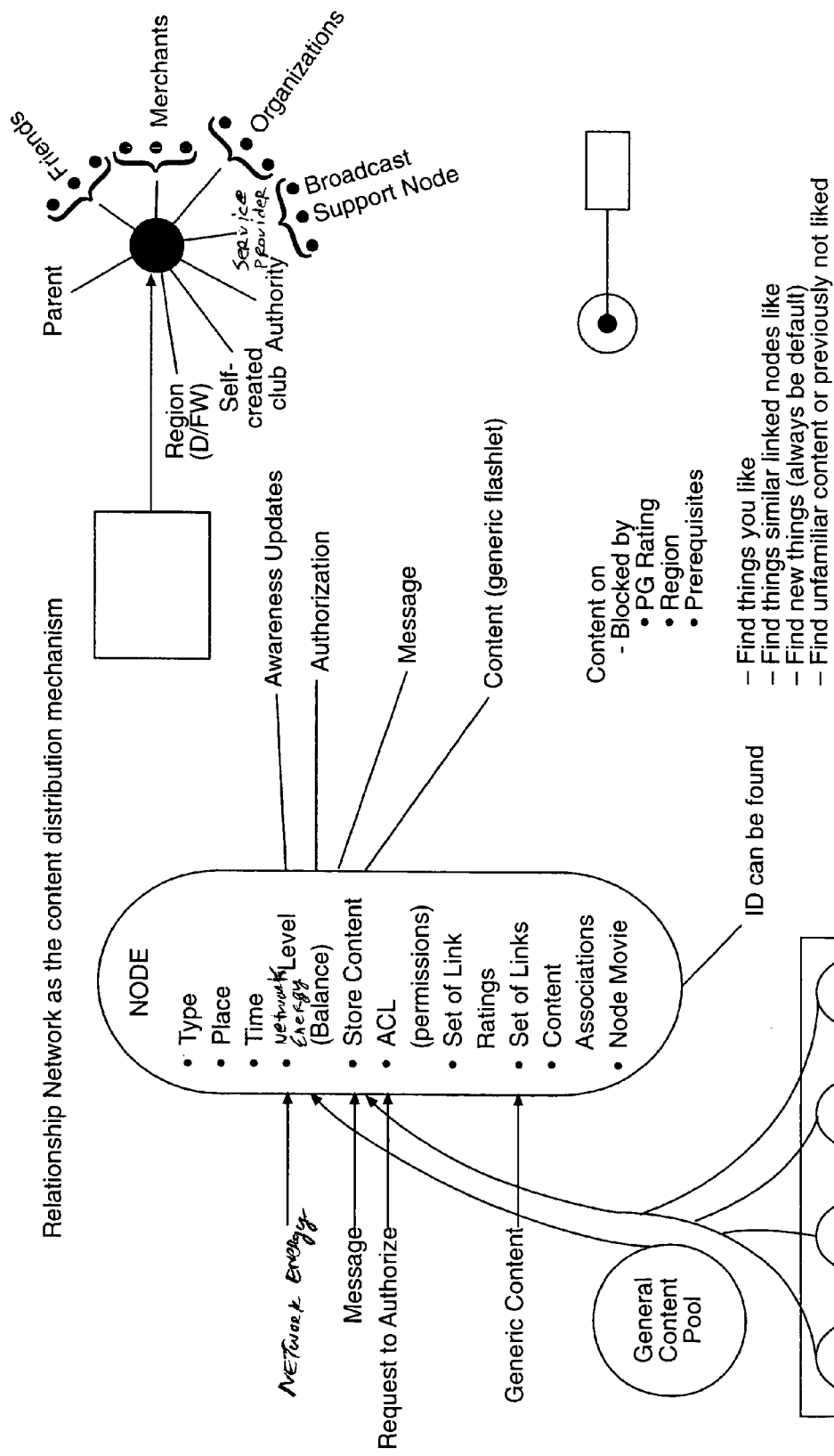
FIGS. 10A-10H are tabular representations of thumb lengths and hand lengths correlated by age, gender, and race for use with the QWERTY thumbboard according to the present invention.
FIGS. 10I-10Y are graphical representations of thumb sweep distances for various groups of individuals for use with the QWERTY thumbboard according to the present invention.

3.I. Relationship Network. Reference will now be made to FIG. 10 in the drawings. To a great degree, the present invention is directed to building a social network that facilitates the growth of relationships and enables social activities via those relationships. This social aspect of the network system of the present invention is empowered by the relationship network.

3.I.1. Overview. The relationship network is comprised of a set of nodes and edges, i.e., links between nodes. Nodes represent various entities that belong to the network. Edges represent the relationships among entities and are directionally valued.

3.I.2. Nodes.

3.I.2.a. Node Types. All nodes are defined by a common way to facilitate code reuse and simplicity. Nodes for different types of entities are differentiated by the way parameters in the common node structure are set. The generic types of entities that are represented by nodes include the following.

1. Individual device holders.
2. Merchants.
3. Parents.
4. Regions, e.g., Dallas/Fort Worth.
5. Organizations, e.g., Ski club, church group, Boy Scouts, Wilderness Society.
6. Groups, e.g., groups created by one or more individual device-holders to act as places for sharing stuff, or sending group messages.
7. Authorities, e.g., police, fire department.
8. Service Provider.

3.I.2.b. Node Attributes. Nodes have the following attributes:

1. Node ID. The Node ID uniquely identifies the node to the network. All nodes can be found by using their Node ID.
2. Node Type. The Node Type specifications are used to derive the functional and behavioral characteristics of a node.
3. Place. The Node Place is a physical place to which the node is associated. Nodes for some entities may be strongly associated with a place, i.e., concert hall, church group, while others may have no place association at all, i.e., a celebrity's fan club.
4. Time. Some nodes may be strongly associated with particular dates or times, i.e., a node for a group that gets together every week to watch football games; while others may not have time associations at all, i.e., all night pizza delivery service, the fire department.
5. Network Energy Level (Balance). All nodes have an economy associated with their existence. This economy's mechanism is network energy. Nodes can get network energy and use network energy.
6. Nodes can store content. Nodes can have a content store. Some of the content may be publicly available throughout the network, while some may be private and need authorization and permissions to access.
7. Permissions. these specify appropriate authorizations for other nodes to send content to, store content in, or access content from the node.

8. Set of link ratings. This is the set of ratings for links that originate from the node to other nodes.

9. Set of links. This is the set of links that originate from the node.

10. Content association ratings. The same set of associations that are used to characterize content are used to characterize nodes.

11. Node Movie. Each node needs a representation of itself so that when it is visited by another node it can be "viewed."

3.I.2.c. Node Operations. Nodes can perform the following operations:

1. Acquire network energy.
2. Receive messages.
3. Receive a request to authorize interaction with another node.
4. Receive generic content.
5. Receive parental controls from a parent node.
6. Send updates to another node.
7. Authorize interaction with another node and send notice.
8. Send messages to another node.
9. Send generic content to another node.

3.I.3. Links. Links represent node-to-node relationships. Some relationships are established by default and are not rated, i.e., links from all nodes to the service provider node or nodes. The nodes themselves, or actually the entities that the nodes represent, establish additional node-to-node links in the network.

3.I.4. Ratings. The node created links can be rated in two ways: (1) degree-of-trust; and (2) degree-of-similarity.

The degree-of-trust rating is a directed rating from the origination node to the linked node and is used to compute relationships on the basis of referential trust. Referential trust can be established between two nodes that are not directly linked when (a) each node trusts, or has a trust link to, a third, intermediate node; and (b) that intermediate node trusts each of the nodes.

The degree-of-similarity rating is also a directed rating from the origination node to the linked node. Similarity ratings are used to expand the pool of content delivered to a given device holder in terms of either breadth or depth.

Content breadth can be expanded by an individual-to-individual link. Basically, the similarity link establishes a way for content liked by one individual to affect the content seen by another individual. In this way, an individual can expand the set of content they see by using the combined set of content viewed and rated by other individuals. The degree of the rating influences the magnitude of the effect. The explicit rating provided by the linked node is used as the "preliminary specific rating" of preference for that content on the little scheduler of the device whose associated node had created the link.

Content depth can be expanded by an individual-to-merchant, or individual-to-organization, link. In this example, the link is creating a way to receive a greater quantity of content from a single source. The degree of the rating influences the magnitude of the content.

3.I.5. Content Routing and Scheduling. A major function of the relationship network is to provide an efficient means of routing content among nodes, and in so doing, providing the right pool of content to each node connected to a device holder. The pool of content from which each device's scheduler is replenished will be somewhat different for each device holder and will be a subset of the total set of content in the network. Note that compiling this pool and selecting from it in a probabilistic manner is generally the functionality performed by what has been referred to as the "big scheduler."

The device-dependent content pools will consist of content-items that, for the most part, are expected to be highly preferred by each device holder. The pool will not contain certain types of content that is inappropriate, such as the following:

1. Content for the wrong geographic location;
2. Content that falls outside parental authorizations (e.g., parental controls via PG ratings);
3. Content that has prerequisites which are not in the pool; and
4. Content that is already on the device.

Basically, the pool will consist of content that the device holder is expected to like, but will also contain some content that is not similar to other content the device holder has seen, i.e., unfamiliar content, and some content that the device holder had previously indicated as undesirable. The purpose for including, the later types of content is to provide for the possibility that the device holder tastes have evolved.

The device-dependent content pool for an individual device holder will be compiled using aggregated/group data based on the group nodes to which each device holder belongs, or is linked. This group approach avoids the computational intensity that would be needed to select each device's content from a general pool of all content in the network.

3.J. Economy of content delivery: See Section 3.B.2.e. above.

3.K. Abstraction of location. In accordance with the preferred embodiment of the present invention, location-aware wireless communication appliances D1, D2, D3, D4, and D5 and network 11 collaborate over time in order to generate a novel profile of the user associated with a particular location-aware wireless communication appliance D1. The most basic location-related information is the identification of places which the user frequents. This is depicted in simplified form in the view of FIG. 1C. Location-aware wireless communication appliances D1, D2, D3, D4, and D5 interact with corresponding users and network 11 in order to determine the identity of different "places" which are frequented by the individual users. A particular user is associated with a particular location-aware wireless communication appliance D1. Accordingly, the location-aware wireless communication appliance D1 "maps" or correlates latitude and longitude data to particular places. For example, the latitude and longitude data X1, Y1 may be determined over time to correspond to the "school" attended by the owner of that particular location-aware wireless communication appliance D1. Additionally, the latitude and longitude data corresponding to X2, Y2 may be determined over time to correspond with the "work place" associated with that particular user. Additionally, the latitude and longitude data X3, Y3 may be determined to correspond to the "home" of that particular user. Additionally, the acquired latitude and longitude data X4, Y4 may be determined over time to correspond to a location known as "the mall" which is frequented by the user. Additionally, the latitude and longitude data X5, Y5 may be determined over time to correspond to a "restaurant" frequented by that particular user.

In accordance with the preferred embodiment of the present invention, during normal non-emergency operation, location-aware wireless communication appliance D1, D2, D3, D4, and D5 will rarely or never communicate latitude and longitude data to network 11. Instead, as location-aware wireless communication appliance D1, D2, D3, D4, and D5 identifies and catalogs the various places frequented by the user, it is the colloquial identification of those places which is communicated to network 11. Accordingly, the network may know that a user is at "home," at "work," at "school," at the "mall," or at a particular "restaurant," but will not know the actual or precise location of those particular places. This is necessary in order to protect the privacy of the user. In the first commercial implementation of the present invention, the users will likely be adolescents, so there are additional safety and security reasons for rarely or never transmitting precise GPS data from location-aware wireless communication appliance D1, D2, D3, D4, and D5 to network 11. However, as will be explained below, there is some ability to "track" location in a general manner by knowing which particular tower or towers a particular location-aware wireless communication appliance D1, D2, D3, D4, or D5 is communicating with.

FIG. 1D is a simplified representation of user profiling for a portion of one exemplary day. As is shown, the graph of FIG. 1D includes an x-axis which is representative of a time period from 6:00 a.m. to 8:00 p.m. and a y-axis which is a histographic representation of five previously-identified locations L1 through L5. As is shown, for the user associated with a particular location-aware wireless appliance, such as appliance D1, the day starts at location L1 which is known by appliance D1 and network 11 as "home." The user is located at home until approximately 8:00 a.m. At approximately 8:00 a.m., the user begins travel from location L1 to location L2. In this example, location GR2 is known by appliance D1 and network 11 as the "school" for this particular user. Between approximately 9:00 a.m. and approximately 12:00 p.m., the user is located at the "school." At approximately 12:00 p.m., the user travels from location L2 to location L3. Location L3 is known by appliance D1 and network 11 as the "mall" for this particular user. At approximately 1:00 p.m. the user travels from location L3 to location L2. This corresponds to a return by the user to the "school" from the "mall." At approximately 4:00 p.m., the user's location changes again. This time, the user travels from location L2 to location L4. Location L4 is known by appliance D1 and network 11 to be the "work place" for this particular user. The user remains at location L4 until approximately 7:00 p.m. At approximately 7:00 p.m., the user travels from location L4 to location L2. This corresponds to a return by the user to the "school" from the "work place." Then at approximately 8:00 p.m., the user travels from location L2 to location L1. This corresponds to a return by the user to "home" from "school."

In this manner, appliance D1 and network 11 may profile a particular portion of a day for the user. When this is done over relatively long intervals of time, an accurate location and time profile may be established for this particular user. For example, if location and time are monitored in this manner over an interval of several months, very reliable patterns will be detected, including patterns within particular days, as well as, patterns within longer time intervals, such as weeks or months. In accordance with the preferred embodiment of the present invention, these location and time profiles may be stored in memory within appliance D1 and/or network 11 and assigned various confidence intervals which represent a quantitative or qualitative conclusion relating to the reliability of such a profile. Once a time and location profile is established for a particular user, network 11 may more intelligently manage digital messages, also referred to herein as "digital content," communicated by network 11 and/or affiliated entities, such as merchants, to ensure that messages or content are directed to the user at appropriate times, places, and manners. For example, the type of message that network 11 may deem appropriate for a user that is actually or likely located at the "mall" differs substantially from the types of messages that are appropriate for the user when he or she is at "school" or "home." As will be discussed in significantly greater detail below, in accordance with the preferred embodiment of the present invention, the user has a great deal of control over the content of messages, information, or digital content communicated to his or her location-aware wireless communication appliance D1. The establishment of profiles based upon time and location is one fundamental element of providing intelligent, effective, and predominately user-controlled messaging.

1. Named places.
2. Named times.
3. Named events (place/times).
3.L. Authorization. Authorization is permission of awareness items and of content.

4. Create

4.A. Macromedia Flash. Macromedia Flash is an excellent solution for many of the problems faced in creating, delivering and presenting graphically rich, interactive content. Macromedia Flash is a platform with which applications can be quickly built using widely available Flash authoring tools, and a platform upon which the applications can be played back on a variety of popular computing platforms and devices. In addition, the Flash development community is much larger than both the Palm OS and Windows CE development communities combined, providing a wealth of graphically rich, interactive content.

Flash consists of several pieces: (1) a compact file format; (2) an image rendering engine; (3) an object-oriented scripting language and script interpreter; and (4) mature, cross-platform content authoring tools. Because Flash offers easy-to-use development tools and generates low-bandwidth animation files, it has quickly become a dominant tool for creating interactive animations.

4.A.1. File Format. Macromedia Flash utilizes two different file formats, a first one that is well suited to store all of the authoring environment media and settings, and a second that is distilled from the first that is extremely compact and well suited to delivering the final presentation content over a low bandwidth network.

The first file format stores all of the authoring tool settings, user preferences and document information that can be created and imported into the authoring tool. This allows the file to be reopened and changes to be made at a later date without losing any document information or needing to reconstruct any parts of the document. These settings and information include movie properties, imported sounds and images, symbols, scripts, color swatch collections, layers and user preferences. This file format is identified by the 'FLA' extension on Windows platforms.

The second file format stores a distilled version of the original document for playback by the target audience. This file format only stores the necessary subset of information from the original document that is required for playback as an interactive movie experience. This file format is identified by the 'SWF' extension on Windows platforms.

The use of these two file formats allows an author to maintain all of his or her work in the 'FLA' document where file size is not an issue, yet export a distilled version of the movie in a 'SWF' format that is small and easily portable to multiple platforms over low bandwidth data networks. This is very similar to working with digital video files that are typically recorded with maximum fidelity as raw data or with a lossless compression algorithm, but that have subsequent lower fidelity versions created from the original that are compressed with lossy compression algorithms to allow transmittal over low bandwidth networks or for inclusion on small storage media such as compact discs (CDs) or digital video discs (DVDs). The original high fidelity video can always be used to create new lower fidelity versions without suffering the losses typically seen when creating new versions from second or third generation copies. This is important for "delivery" of content.

4.A.2. Rendering Engine. A Macromedia Flash SWF file is executed using a player that is available on multiple platforms, and that may be ported to other platforms not directly supported by Macromedia. Because Flash SWF files are essentially documents similar to Word .doc files or graphics JPG files that are executed by a player, the files are inherently portable across platforms. But, they rely a great deal on the functionality of the player that runs as a native application on each platform, similar to the viewers of the Word .doc files and graphics JPG files mentioned previously. This means that key graphical functions of the player such as vector drawing, bitmap manipulation and text rasterizing are all written directly on the native OS API. Because the player code is available to be ported to other platforms, it is possible to provide Flash SWF file playback on a variety of devices, including handheld wireless devices.

The rendering engine includes many functions:
1. A Javascript Interpreter;
2. JPEG Image Compression;
3. MP3 Sound Compression;
4. An XML Parser;
5. ZLIB standard compression (.zip);
6. Network communications using industry standard sockets;
7. Vector drawing;
8. Bitmap manipulation;
9. Text glyph rasterization;
10. User interaction through an event model and event loop;
11. Input device support for mouse and keyboard;
12. Output device support for visual displays and audio; and
13. Ability to append platform specific device functionality.

The foregoing is important for "presentation" of content.

4.A.3. Authoring Tools. There are many cross-platform, authoring tools available for creating Flash SWF files.

Macromedia has developed an authoring tool called "Flash" that allows authors to visually draw interface elements in an unrestricted fashion and define behaviors for these elements either through animation or scripting in ActionScript. This tool is responsible for saving the FLA files mentioned previously as well as distilling SWF files.

Macromedia has also developed a batch processing tool called "Generator" that uses templates to do batch processing of Flash SWF files. Generator allows SWF files to be created automatically without human intervention by batch processing templates that instruct Generator how to merge together information contained in SWF files with textual and/or graphical information contained in a database.

Other tools are also available for creating specific content in Flash SWF format. One example is Swift3D by Electric Rain which imports three-dimensional models and generates animated versions of the models in SWF format. Another example is SWISH that allows an author to quickly apply predefined behaviors to text and graphics to generate animated titles.

In addition, specialized authoring tools are available on other platforms such as
Solaris (UNIX) and Linux for generating SWF files.
The foregoing is important for "creating" content.

4.A.4. Scripting Language. Macromedia Flash incorporates a fully object-oriented scripting language called ActionScript. Beginning with Flash version 5, ActionScript follows the grammar and syntax of JavaScript, an established and widely-used scripting language for internet-based applications contained in hypertext markup language (HTML) documents and executed with web browser applications like Netscape navigator and Microsoft Internet Explorer.

ActionScript is very similar to JavaScript, but utilizes a different document object model (DOM) than JavaScript. This is because ActionScript it is designed to execute inside the context of a Flash movie, while JavaScript executes inside the context of a HTML document. For this reason, the DOM of ActionScript models, movie clips, timelines, objects, and structure of a Flash movie. JavaScript, in contrast, models the images and structure of an HTML document.

The Flash rendering engine includes a complete script interpreter that executes the ActionScript commands contained in a Flash SWF file. As a result, Flash SWF files execute similarly on all supported platforms, relying on the script interpreter implemented in each platform version of the Flash player. As such, a Flash player is a non-generic application that runs as a native application on each platform, similar to any normal media viewer where all key graphical functions (vector drawing, bitmap manipulation, text rasterizing, full-screen anti-aliasing) are written directly on the native OS API.

The foregoing is important for "creating" content.

5. Wrapping Content

All content items have at least one wrapper. Wrappers describe content items, define how they will be manipulated and used in computations throughout the network, and enable them to be referenced throughout the network without the presentation and data elements of the content item having to be moved or accessed. See Section 3.A.1.a. for a detailed discussion of wrapper data and its relationship to content.

Content can be wrapped either manually or automatically. Tools have been created to assist content-creators in wrapping content manually and to automatically wrap text-based content. These tools use prototypical wrappers as a basis for beginning the manual and automatic wrapping process.

5.A. Prototypical wrappers. These are wrapper templates for content of various classes. The templates incorporate predefined values for selected applicable wrapper fields. A new wrapper to be created for a specific content item can be primed by inheriting the predefined values from an appropriate prototype. There are two methods for defining a prototypical wrapper.

5.A.1. Least Common Denominator Method. In this method the prototype is assigned values that would be generally held by any specific content instance that belonged to the class, e.g., all restaurants are highly associated with food. Thus, only those fields in which there is a high-degree of correlation across all instances of the class would be assigned values. Using these inherited values as a starting point, content-creators would then assign values to the remaining fields, those whose values that tend to have a low correlation across instances of the class, to fully specify a particular content instance.

5.A.2. Stereotype Method. In this method the prototype is assigned values that are held by a stereotypical instance of the class being prototyped, e.g., a specific restaurant is used as a model for all restaurants. The stereotype would be selected on the basis of having similar characteristics to many instances of the class but having few or no extreme characteristics.

Thus, the assigned values tend to be average. Using these inherited values as a starting point, content-creators would adjust the predefined values to match the characteristics of a particular content instance.

5.B. Wrapper Assistant Tool. This tool assists content-creators in specifying all applicable wrapper fields. See Section 3.A.1.a.2. for a detailed description of wrapper fields. The tool incorporates computational mechanisms for computing the values of various wrapper fields, inheritance mechanisms, and a graphical user interface that combines forms-based text entry and menu selection with direct manipulation interaction techniques. Generating appropriate association values is the most difficult part of wrapper definition. This tool provides two primary ways for assisting content-creators in assigning association values.

5.B.1. Weighted Multi-Wrapper Association Value Averaging. This feature enables content-creators to select one or more previously defined wrappers from an available set and to each selected wrapper assign a similarity-weight. The predefined wrapper set can include both prototypical wrappers and wrappers from actual content items. The similarity-weight represents the degree of similarity between the content item of the selected wrapper and the content item whose wrapper is being defined. The tool computes and assigns association values for the new wrapper using a weighted averaging of all selected wrappers.

5.B.2. Content Item Validity Check. As the new wrapper association values are being computed based on the weighted averaging technique, another feature of the tool computes the similarity of those association values to the association values for each of a set of previously wrapped content items. These content items are then displayed to the tool user in descending order of similarity, thus providing an internal validity check.

Figure 11:
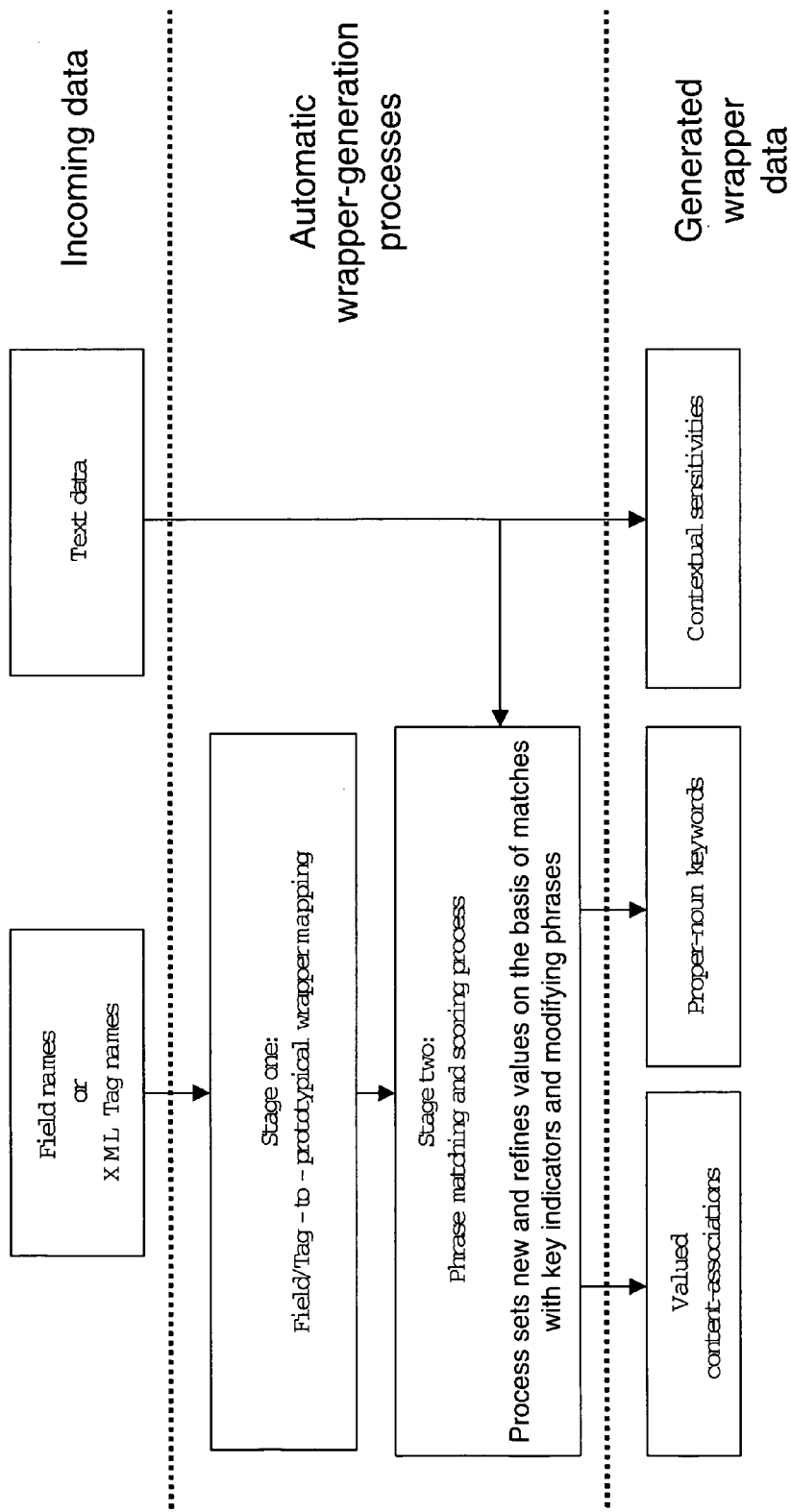
FIG. 11 is a schematic of the two-stage automatic digital content wrapping process according to the present invention.

5.C. Automatic Wrapping Tool. This tool automatically generates wrappers for text-based content items and generates wrapper association values for those content items. The analysis consists of a two-stage process and is illustrated in FIG. 11.

In stage one input data in the form of field or tag names that describe and accompany text-based content are mapped to a set of predefined prototypical wrappers. As discussed above, the selected prototype provides initial values to applicable fields as a starting point for specifying the new wrapper.

In stage two, the textual content is searched for matches to a set of directive phrases. The phrases consist of indicator terms alone or combined with modifiers. Each indicator term is linked to one or more of the wrapper association fields. If found in the text, content indictor terms provide evidence toward how the association should be valued with regard to the content. The presence of modifying terms provides further evidence for the strength and direction of the association. A scoring method has been developed to assign values to associations and to adjust values that are provided by the prototype selected in stage one.

The text content is also analyzed to identify key words and contextual sensitivities that are included in the content. Identification data is also added to the newly generated wrapper.

5.D. Content Registration. Before a content item can be routed though the network it needs to be registered. This involves some verification, security, and database updating processes. Part of the registration process involves computing the similarity of the content item to all other registered content items. Similarity is computed using a distance calculation that uses data specified in each content item's wrapper. Specifically, the association values, key words, and location-time sensitivities are included in computing content similarity. Section 6.B.2.a. describes the similarity calculation in detail. Because content similarity is calculated at registration time it does not need to be calculated at selection time, thus making the content selection process more efficient.

5.E. Wrapper Abstract. Wrappers consist of data organized in a set of fields that are specified in a tagged format in which the tags identify each of the wrapper fields. Not all wrapper fields are applicable to each content item. Some content items will have full wrappers that have data specified for each field, but many will have varying degrees of fields that have no data. The tagged format used to specify the wrapper permits the fields with data to be abstracted from those that do not apply. This enables thinner wrappers to be used, thus minimizing storage, processing, and transmission burdens on the system.

6. Routing Mechanisms

Routing is the process of efficiently and intelligently directing content items from their point of origin in the network to their appropriate destinations. Routing processes will identify where content is to be delivered. Separate processes discussed in Section 7 handle the actual delivery of a content item from the server to the client destination. Content items are routed in two basic ways each discussed below.

6.A. Destination-Specific Routing. This method of routing is used to direct a content item to one or more specifically identified destinations. The destinations are specified in the content item's wrapper in the Node Destination field either by the content creator or by an automated process.

Generally, content items that are destination-specific include:
1. Instant messages;
2. User requests for specific content items;
3. Search results;
4. Content items sent in the process of performing a high-level activity or transaction (a confirmation);
5. Dynamic awareness data updates obtained through subscriptions;
6. Content items accessed through browsing; and
7. Payload fills.

6.B. Self-routed.

Figure 1H:
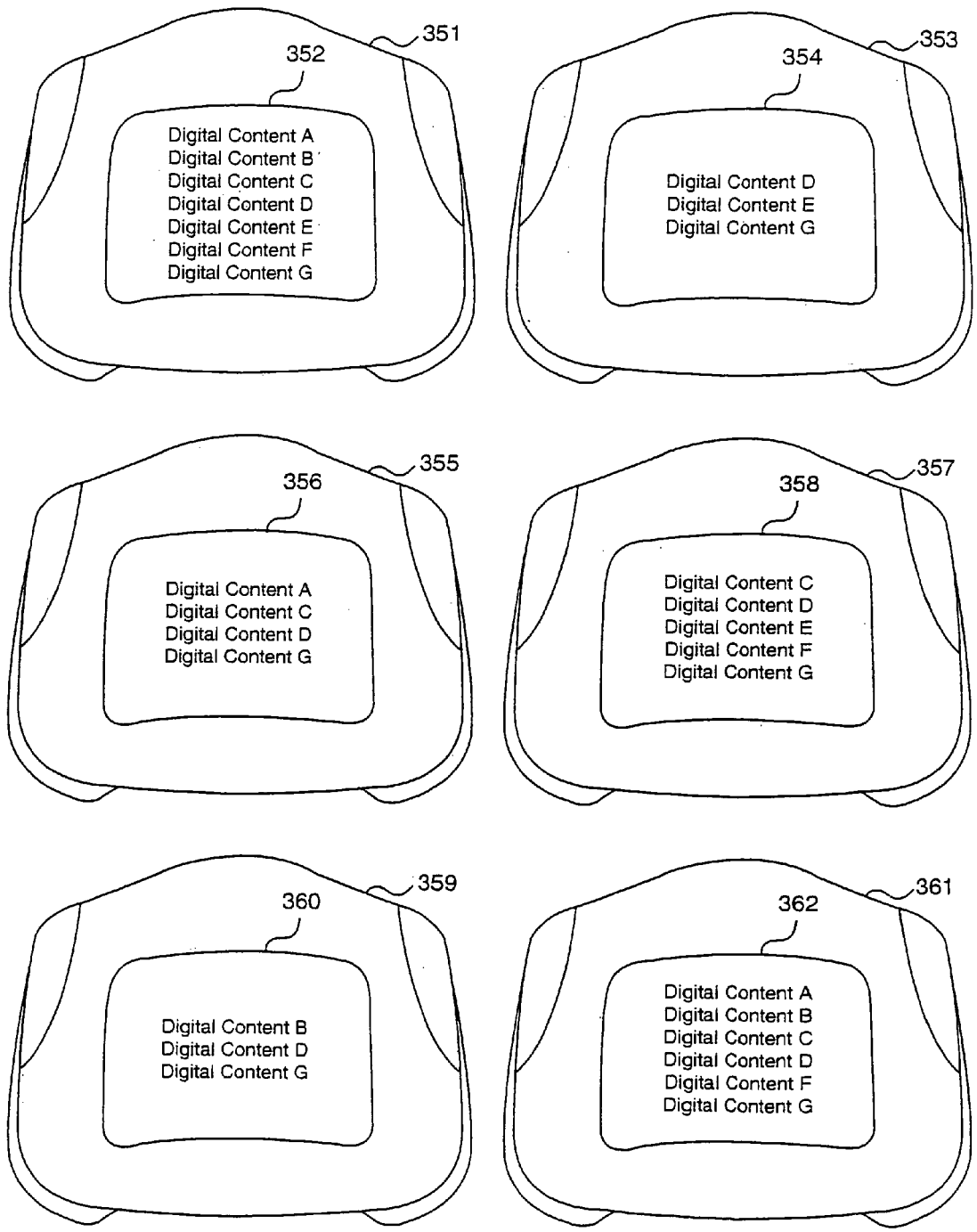
FIG. 1H is a highly simplified representation of a plurality of the appliances of FIG. 1A.

6.B.1. Simultaneous Distribution of Unique Experiences. While it is possible for each individual user within a particular service region to receive completely different digital content in his location-aware wireless communication appliance, there will be a great deal of overlap, such that certain groups of users within a certain service region will have common digital content displayed or played on their location-aware wireless communication appliances. Essentially, the overlap in digital content between users or groups of users represents a form of shared virtual environments. This will be described in high-level overview with respect to FIGS. 1H and 1I. FIG. 1H depicts a plurality of location-aware wireless communication appliances 351, 353, 355, 357, 359, and 361 in highly simplified form. Each appliance 351, 353, 355, 357, 359, and 361 includes an always-visible display 352, 354, 356, 358, 360, and 362, respectively, for displaying digital content. For example, appliance 351 is displaying digital content identified symbolically by Digital Content A, B, C, D, E, F, and G; appliance 353 is displaying Digital Content D, E and G; appliance 355 is displaying Digital Content A, C, D and G; appliance 357 is displaying Digital Content C, D, E, F and G; appliance 359 is displaying Digital Content B, D, and G; and appliance 361 is displaying Digital Content A, B, C, D, F, and G.

In FIG. 1H, Digital Content A, B, C, D, E, F, and G may consist of text messages, graphical elements, changing text elements, and/or changing audio-visual elements. Displays

352, 354, 356, 358, 360, and 362 may be segmented or proportioned to allow a plurality of unrelated digital content elements to be displayed or executed simultaneously. In the preferred embodiment of the present invention, a rendering engine, such as Flash, will be utilized as a primary user interface, so that the Digital Content A, B, C, D, E, F, and G may represent various digital "movies" which are graphics and/or textual elements which change with respect to time, and which are simultaneously displayed or displayed in an overlapping or complementary manner. As will be explained in more detail, whether particular Digital Content A, B, C, D, E, F, or G is displayed on appliances 351, 353, 355, 357, 359, or 361 is not coincidental. Further, whether Digital Content A, B, C, D, E, F, and/or G is displayed is not merely dependent upon the user's current longitude and latitude.

FIG. 1I is a tabular representation of how digital content is aggregated and assembled for further analysis. A table 363 includes a Digital Content ID column 365 which contains a plurality of digital content messages: Digital Content A, B, C, D, E, F and G. For each Digital Content A, B, C, D, E, F and G, nine columns of exemplary data are illustrated: a playable digital content column 367, a source column 369, a type column 371, a subject column 373, an energy required to play column 375, an energy earned by playing column 377, a preferred location column 379, a preferred time column 381, and a period column 383. The data from columns 367, 369, 371, 373, 375, 377, 379, 381, and 383 for each Digital Content A, B, C, D, E, F and G combine to define a specific electronic "wrapper" for each Digital Content A, B, C, D, E, F and G. Thus, Digital Content A, B, C, D, E, F and G have wrappers 385, 387, 389, 391, 393, 395, and 397, respectively, whereby each column 367, 369, 371, 373, 375, 377, 379, 381, and 383 represents a separate wrapper field.

Playable digital content column 367 contains the actual playable digital content, for example, a movie, an executable file, a graphical icon, a text message, or the like. Source column 369 identifies the source of each Digital Content A, B, C, D, E, F and G. Type column 371 contains a general description of each Digital Content A, B, C, D, E, F and G, or of the format of each Digital Content A, B, C, D, E, F and G. Each Digital Content A, B, C, D, E, F and G may be analyzed and "coded" as corresponding to particular types of content. For example, Digital Content A relates to content subjects X and Y, Digital Content B relates to weather, Digital Content E relates to content subjects L and M, and Digital Content F relates to sporting events. According to the present invention, the user may be required to "burn" selected amounts of network energy to view, play, or execute certain types of digital content. Energy required to play column 375 contains the amount of network energy, in network energy units, required to view, play, or execute each Digital Content A, B, C, D, E, F and G. On the other hand, the user may be able to "earn" selected amounts of network energy by viewing, playing, or executing certain types of digital content. Energy earned for playing column 377 contains the amount of network energy, in network energy units, which may be earned for viewing, playing, or executing each Digital Content A, B, C, D, E, F and G. In simplified terms, if the user does not have enough network energy to view or play certain digital content, he must perform an activity on network 11 for which he may earn network energy.

It should be understood that different digital content elements may have different wrapper fields, or that certain wrapper fields may not be applicable to certain digital content messages. For example, Digital Content A, C, D, and G do not contain data for the "Object Type ID" wrapper field, subject column 373. Although only nine exemplary wrapper fields have been depicted in FIG. 1I, it will be appreciated that particular digital content messages may have hundreds of wrapper fields, including wrapper fields that qualify or quantify certain other wrapper fields.

Digital content may be "offered for presentation" to the user according to a variety of methods, including: immediate full display, incremental display with time, incremental display with location, and user initiated. A digital content element designated as "immediate full, display" is displayed immediately in its fullest possible display format, regardless of time, user location, or user intervention. A digital content element designated as "incremental display with time" grows larger, becomes more prominent, or is offered at increased frequency as the preferred display time approaches. A digital content message designated as "incremental display with location" grows larger, becomes more prominent, or is offered at increased frequency as the user physically approaches the preferred display location. A digital content message designated as "user initiated" only grows larger, becomes more prominent, or is offered when the user initiates a request or search for such digital content. This "bubbling up" of digital content is discussed in more detail in conjunction with the description of the preferred graphical user interface.

As is shown, Digital Content A is an advertisement in the form of a movie from Merchant #12 for which a user may earn five units of network energy simply by playing the movie. Merchant #12 has designated that Digital Content A should preferably be offered for presentation to the user after school hours. The offer of presentation of Digital Content A to the user will grow larger or more prominent as the user incrementally approaches a preferred longitude and latitude LAT-LONG1, such as Merchant #12's retail outlet. Digital Content B is a severe weather warning in the form of text and an alarm from a government entity. Digital Content B is displayed immediately at various times and changing physical locations, such as the locations of users in the path of a severe storm. Digital Content C is an e-mail message from a Friend #1 is available for presentation to the user for a period of seven days, such period being established through various means, including designation by the sender, the user's responses to inquiries, the user's trust relationship to Friend #1, and/or inferences made by network 11. The receiving user will "burn" two units of network energy should he choose to read Friend #1's e-mail message.

Digital Content D is a request for chat from Acquaintance #3. Digital Content D is displayed as a graphical icon and will be available for response by the user for a period of three hours. Digital Content C and D have no preferred location. Digital Content E is a survey in an executable spreadsheet format from Merchant #2. As is depicted, the user can earn a relatively large amount of network energy, twenty units, by completing the survey. It will "cost" the user five units of network energy to respond to Digital Content D. Digital Content E will be offered for presentation to the user during the specific twenty-five day period between December 1st and December 25th. Digital Content F is a textual announcement from the user's school pertaining to a particular sporting event, such as a football game. As is depicted, Digital Content F will be incrementally displayed between 8:00 p.m. and 10:00 p.m. over a seven day period. Thus, the offer for presentation of Digital Content F will grow larger, become more prominent, or be offered at increased frequency as the time of the football game approaches. Digital Content G is a schedule in a calendar file format from the user's Soccer Team. Digital Content G will only be offered for presentation if initiated by the user by a query of search. Of course, if the user does initiate the offer for presentation of Digital Content G, he will burn three units of network energy.

In practice, network 11 may manage millions of digital content elements in hundreds or thousands of categories, each digital content element possibly having hundreds of wrapper fields. Network 11 may require that members, including users and network affiliates, enter or select category designations or key words to allow sorting and analysis of the content subjects. Alternatively, a software agent could be established which parses the digital content or the associated wrappers and infers the content subject. Although use of such a software agent would lessen the burden on network affiliates and users, some misidentification or miscategorization of the digital content may result. As will be discussed below, in accordance with the present invention, privacy, preference, and content subject is utilized to filter, accelerate, prioritize, or block particular digital content elements. Additionally, as has been discussed previously, the user's current location information may also be an important basis for determining whether certain digital content should be offered for presentation.

Figure 1J:
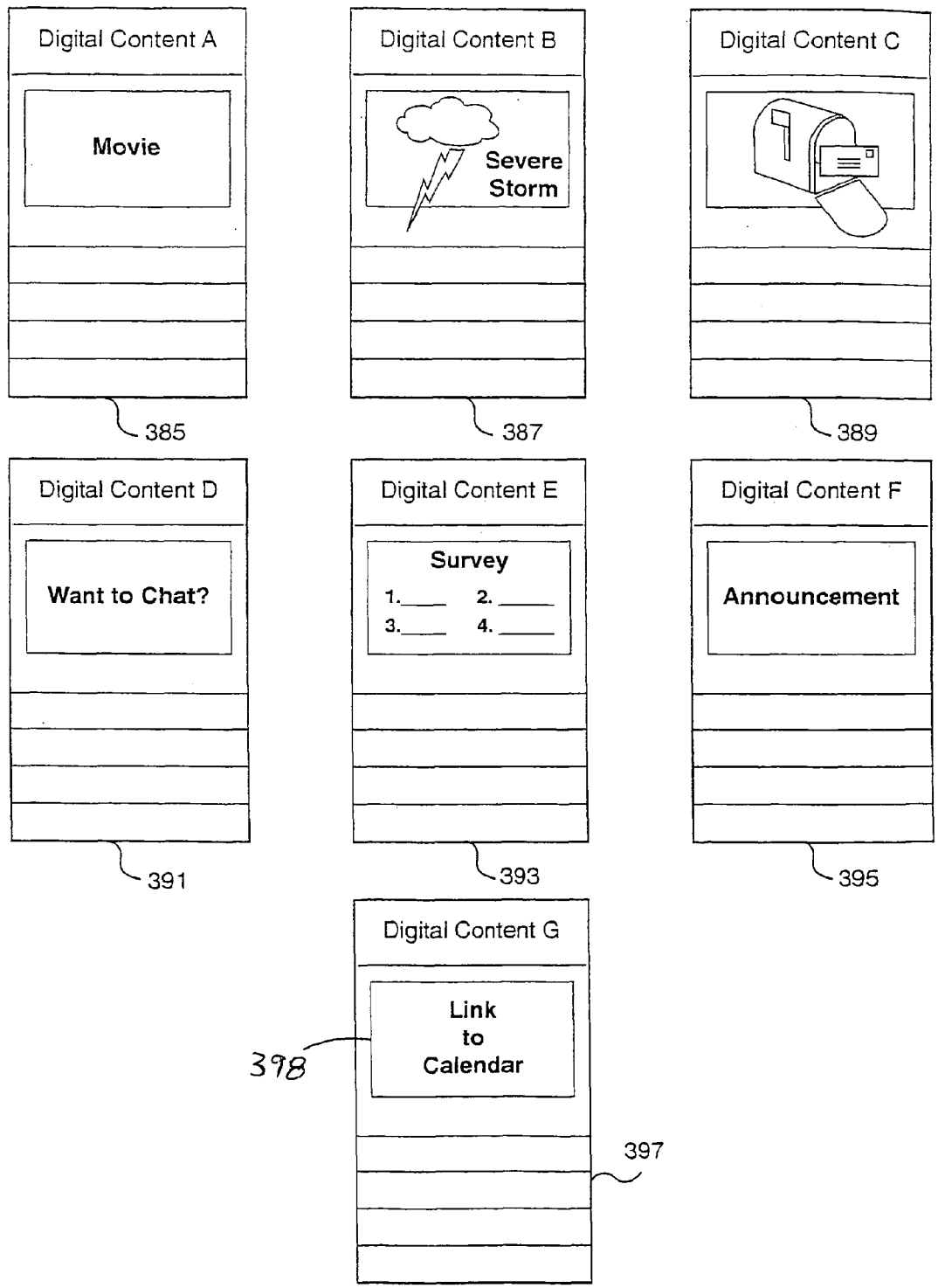
FIG. 1J is a high-level, simplified representation of novel electronic wrappers for the digital content of FIG. 1I.

Wrappers 385, 387, 389, 391, 393, 395, and 397 for Digital Content A, B, C, D, E, F, and G, respectively, are illustrated in high-level, simplified representations in FIG. 1J in the drawings. In certain instances it may be necessary to separate the playable digital content from the other wrapper fields to conserve cache memory 392 and 396, or when wireless communication bandwidth is insufficient. Such separation is particularly useful when the playable digital content requires a large amount of storage, or when the scheduler determines that the probability of the playable digital content being displayed for a particular user is low. For instance, the playable digital content for Digital Content G is a soccer schedule in a calendar file format. Should the soccer schedule require a large amount of cache memory, it is possible for the actual playable digital content to reside on network server 109. In such instances, a wrapper link 398 is provided within wrapper 397 to point to or provide an electronic link to the soccer schedule file. Should the user decide to retrieve or display the soccer schedule, wrapper link 398 would cause the soccer schedule file to be retrieved or played. Wrapper link 398 is a method of conserving cache memory. It should be understood that, aside from pointing to digital content, such wrapper links can be used for a wide variety of purposes, such as pointing to other data or memory locations, and as place holders for future data.

Figure 1K:
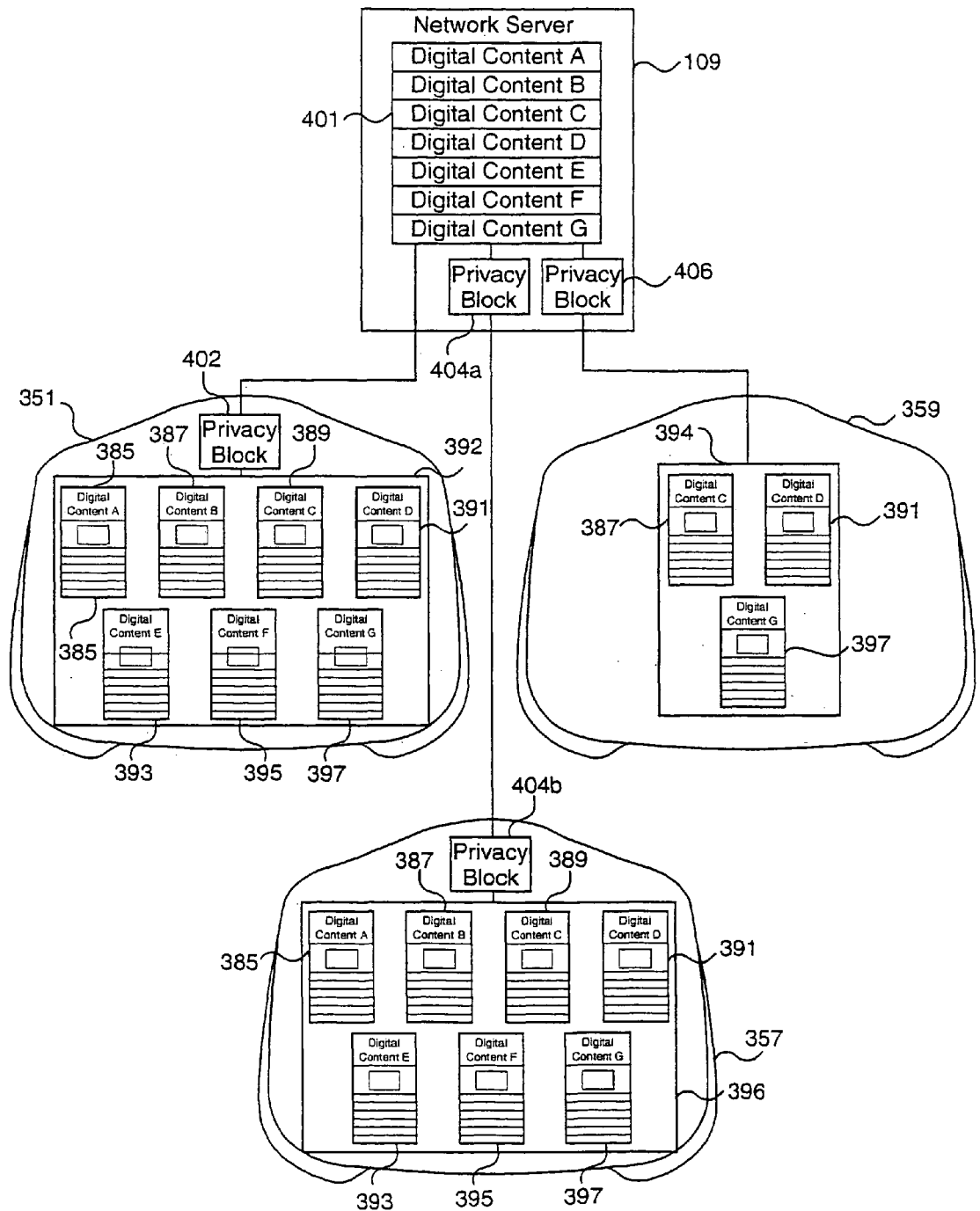
FIG. 1K is a simplified representation of the aggregation and assembly of the digital content of FIG. 1I.

Referring now to FIG. 1K in the drawings, a further explanation of the aggregation and assembly of digital content is illustrated. Appliances 351, 357, and 359 include cache memory 392, 394, and 396, respectively. Digital Content A, B, C, D, E, F, and G are periodically transmitted and temporarily stored in cache memory 392, 394, and 396 prior to presentation to the user. FIG. 1K also includes a depiction of the implementation of privacy blocks on digital content. Such privacy blocks are set by the user or the user's parents to ensure that certain categories or types of digital content are never offered for presentation to the user, regardless of the user's preferences, wrapper fields, or the scheduling model. In all instances, Digital Content A, B, C, D, E, F, and G, represented by reference numeral 401, are stored on network server 109. In the preferred method, an electronic privacy block 402 resides, in its entirety, on appliance 351. In the preferred method, all Digital Content A, B, C, D, E, F, and G is transmitted at the preferred off-peak time to appliance 351, but certain digital content is permanently blocked from ever being offered for presentation to the user. The block occurs entirely on appliance 351. In an alternate method, a privacy block has a first part 404a residing on network server 109, and a second part 404b residing on appliance 357. In this embodiment, Digital Content A, B, C, D, E, F, or G may be blocked from ever being transmitted to appliance 357 by first part 404a, or Digital Content A, B, C, D, E, F, or G may be transmitted to appliance 357 at the preferred off-peak time, but blocked from being offered for presentation to the user by second part 404b. In another alternate method, a privacy block 406 resides, in its entirety, on network server 109. In this method, Digital Content A, B, C, D, E, F, and G is transmitted at the preferred off-peak time to appliance 359 only if it is not blocked by privacy block 406.

FIG. 1L in the drawings is a tabular representation of a novel contextual user profile according to the present invention. A table 407 has a user/appliance column 409 which lists each appliance 351, 353, 355, 357, 359, and 361. Contextual user profiles 411, 413, 415, 417, 419, and 421 are represented by the rows of table 407, and correspond to appliances 351, 353, 355, 357, 359, and 361, respectively. Contextual user profiles 411, 413, 415, 417, 419, and 421 go far beyond what may traditionally be thought of as a "profile." As will be explained in more detail below, contextual user profiles 411, 413, 415, 417, 419, and 421 may reside on appliances 351, 353, 355, 357, 359, and 361, but preferably reside on the network server. Each user profile 411, 413, 415, 417, 419, and 421 is comprised of certain "static" data components 423, represented by columns 423a, 423b, and 423c, and certain "dynamic" data components 425, represented by columns 425a, 425b, 425c, 425d, 425e, 425f, 425g, and 425h. Dynamic data components 425 may be separated into at least two categories: "hard" dynamic data components 427a, represented by columns 425a, 425b, 425c, and 425d, and "soft" dynamic data components 427b, represented by columns 425e, 425f, 425g, and 425h. Hard dynamic data is generally objective and concrete, while soft dynamic data is generally subjective and fungible. It should be understood that contextual user profiles 411, 413, 415, 417, 419, and 421 may consist of many other static and dynamic data components. It is the combination of static data components 423 and dynamic data components 425 that create the unique "contextual" user profile.

Static data components 423 consist of data that remains relatively constant, such as the accumulated biographic data of column 423a, demographic data of column 423b, and cultural data of column 432c. On the other hand, both hard dynamic data components 427a and soft dynamic data components 427b consist of data that may change frequently, such as the date and time, the user's current location, network-inferred data, and the user's preferences data, as compiled through the inquisitiveness functions and responses to queries. Examples of hard dynamic data include the user's actual longitude and latitude data of column 425a, the time of day of column 425b, the date of column 425c, and the user's available network energy 425d. Examples of soft dynamic data include the user's food preferences of column 425e, the user's entertainment preferences of column 425f, the user's relationship preferences of column 425g, in some instances the user's privacy blocks, and other such data derived from the habit modeling functions and inquisitiveness functions of network 11. In other words, user profiles are constantly changing and adapting to reflect the user's current state of being, in terms of location, time, and personal likes and dislikes.

The broad diversity of contextual user profiles 411, 413, 415, 417, 419, and 421 is depicted in table 407. The user of appliance 351 has the following exemplary static data components: biographical data B1, demographic data DM3, and cultural data C1; the following exemplary hard dynamic data components: current latitude and longitude LATLONG1, current time of 4:00 p.m., current date of December 5th, and available network energy of 130 units; and the following soft dynamic data components: food preferences data F1, entertainment preferences data E1, relationship preferences data R3, and privacy blocks P1. In a similar fashion, the user of appliance 353 has the following exemplary static data components: biographical data B3, demographic data DM2, and cultural data C2; the following exemplary hard dynamic data components: current latitude and longitude LATLONG2, current time of 4:30 p.m., current date of December 5th, and available network energy of 43 units; and the following soft dynamic data components: food preferences data F2, entertainment preferences data E3, relationship preferences data R2, and privacy blocks P2. The user of appliance 355 has the following exemplary static data components: biographical data B2, demographic data DM1, and cultural data C3; the following exemplary hard dynamic data components: current latitude and longitude LATLONG3, current time of 5:00 p.m., current date of December 5th, and available network energy of 62 units; and the following soft dynamic data components: food preferences data F3, entertainment preferences data E2, relationship preferences data R1, and privacy blocks P3.

Continuing with table 407 of FIG. 1L, the user of appliance 357 has the following exemplary static data components: biographical data B1, demographic data DM2, and cultural data C1; the following exemplary hard dynamic data components: current latitude and longitude LATLONG4, current time of 4:00 p.m., current date of December 5th, and available network energy of 227 units; and the following soft dynamic data components: food preferences data F3, entertainment preferences data E1, relationship preferences data R1, and privacy blocks P4. In a similar fashion, the user of appliance 359 has the following exemplary static data components: biographical data B3, demographic data DM3, and cultural data C2; the following exemplary hard dynamic data components: current latitude and longitude LATLONG5, current time of 4:30 p.m., current date of December 5th, and available network energy of 39 units; and the following soft dynamic data components: food preferences data F2, entertainment preferences data E3, relationship preferences data R2, and privacy blocks P5. The user of appliance 361 has the following exemplary static data components: biographical data B1, demographic data DM3, and cultural data C3; the following exemplary hard dynamic data components: current latitude and longitude LATLONG6, current time of 5:00 p.m., current date of December 5th, and available network energy of 200 units; and the following soft dynamic data components: food preferences data F1, entertainment preferences data E2, relationship preferences data R3, and privacy blocks P6.

Each biographic data B1, B2, and B3, each demographic data DM1, DM2, and DM3, and each cultural data C1, C2, and C3 represents a broad collection of information specific to a particular user, with some information overlapping for specific users. Similarly, each food preference data F1, F2, and F3, each entertainment data E1, E2, and E3, and each relationship data R1, R2, and R3 is a collection of related data compiled from the users' responses to many inquiries made over a relatively long period of time, as well as, from certain inferences made by network 11. Privacy blocks P1, P2, P3, P4, P5, and P6 are specific to each user and are either set up by the user or the user's parents. It should be understood that a large number of each of these types of preferences will exist in network 11. In FIG. 1L, the small number of preferences have been chosen to illustrate the potential for overlapping preferences among contextual user profiles.

Although the foregoing description includes static components 423, hard dynamic components 427a, and soft dynamic components 427b in the contextual user profile, in the preferred embodiment of the present invention, hard dynamic components 427a are considered context, and soft dynamic components 427b are used to define a separate user preference profile. These concepts are discussed in more detail in connection with Section 3.B.

6.B.2. Content Selection Engine. The content selection engine works from a profile of content items that indirectly represent a profile of users. The basic process is outlined below.

a. Compute Content Item Similarities. Content item similarities are determined by the following factors:
      1. Relevant location;
      2. Relevant time;
      3. Associations;
      4. Categorizations;
      5. Features;
      6. Proper key words; and
      7. Originator.
   The routines are set up to filter the parameters that participate in the similarity calculation. For the first three listed above, this is just "use" or "do not use," for the associations. It is a mask for each association. When selecting mentors, content associations are the primary mechanism, with location/time being secondarily used.
   The similarity calculations are straightforward equality checks for the type of wrapper and originator of content. The location/time cylinder comparisons are relatively simple distance calculations returning a distance and an intersection flag. The content association calculations appear more complex, but are really just simple distance calculations done in an efficient way using bit-wise math.
   b. Through Explicit or Implicit Means Acquire Positive and Negative Content Item Ratings From Users. Content item ratings are associated with individual content items (specific or prototypical) and may have associated time and location contexts.
   c. Locate Candidate Content Items Through Constrained Random Selection.
   d. Calculate Probabilities of Candidate Content Items. Probabilities of candidate content items are calculated based on proximity to previously rated content items, those nearer in similarity space to positively rated content items having a higher probability than those nearer in similarity space to negatively rated content items. In addition, when a content item is selected, the content items around it in similarity space have their probabilities temporarily diminished.

Content Selection Services are responsible for creating content payloads on the network for each individual user. A content payload is made up of a single user ID with a group of content ID's associated with it. As soon as a user registers her device, a content payload is created and available on the network for her. Initially the content payloads will be filled with random content. Once the user begins to rate content the payloads will become more tailored to each individual user's preferences. Each time the user's device makes a request for content, the user's existing content payload (space allotting) on the network is sent to the user and the available space in their content payload account on the network is refreshed with new content. The content in each payload is selected through a series of complex calculations determining the most appropriate content for each specific user along with a few completely random pieces.

When a user buys a device it comes with a set of random content. When he registers his device with the network, a content payload account is created with more random content and stored on the network for him. Users begin to rate content and buddies on their device over time. These ratings are sent over to the network on a regular basis. Each rating is stored with a time, location, and value (positive or negative). The ratings are kept in a historical format.

From time to time, general content requests are received from a user. Based on the amount of space available on the user's device for new content, the existing payload for that user is reviewed and the appropriate content is selected and sent to their device (see Section 3 above). The user's content payload is also refilled in parallel. As stated above, the payload starts out as generic content, but over time becomes tailored to each individual's preferences.

The payload is refilled by randomly selecting positive ratings from the user ratings history for that particular user. The network then searches for content in the general content pool that is close to it based on a Euclidean distance measure, which is the straight line distance between two points, plus space and time parameters of where the particular rating was made.

6.B.3. Relationship Influence. As mentioned earlier, users can rate other users. These ratings enable the ratings provided by other users to impact the content selected for the user who has rated others. When a user rates a content item, the rating propagates out anonymously to everyone who has rated that user positively.

7. Delivery

Delivery involves timely and efficient transfer of data to the device such that it is available for presentation when needed. The goal is to maximize the relevance and EN utility of the content available to the user while simultaneously minimizing the transfer cost to the user.

7.A. Optimizing Across Delivery Factor. An intelligent system has been developed that can optimally schedule and distribute the transfer of data to a client using various channels such that the availability of the correct data on the client is maximized while the transfer costs are minimized. This data delivery system uses both low-level optimization and high-level optimization processes. The two levels consider different sets of factors.

Low-level optimization utilizes the factors of urgency of receipt, acceptable risk of late delivery, cost of delivery, acceptable risk of incurring higher costs, and storage capacity in the client. High-level optimization is done through the anticipation of the delivery needs of the user based on that user's behavioral history.

There are adjustable factors that balance the equations under different situations:
1. Availability of the content;
2. Availability of a connection; and
3. Availability of client storage space.

The acceptable risk factors for latency and delivery costs are used to find an optimal solution.

7.A.1. Transfer costs.

The transfer of data has costs associated with it based on many factors, including the cost of spectrum licensing, infrastructure build-out, operational costs, etc. Due to issues such as limited available spectrum and more complex equipment, wide area wireless data transfer is traditionally more expensive.

The characteristics of various modes of connection will now be discussed.

7.A.1.a. Fixed Location. Fixed location connections provide:
1. Faster transfer of data;
2. High availability/low-risk of transfer failure; and
3. Lower cost.

Fixed location connections have a more predictable cost due to the common practice of fixed cost for time of use, rather than based on data transfer amounts.

Representative connections of this type include high-speed wired modem connection, Digital Subscriber Line (DSL), cable modem, broadband fixed wireless, and local area wireless based on the 802.11 or BlueTooth and other standards.

7.A.1.b. Wide Area Wireless Off-Peak. Off-peak wireless connections provide:
1. Limited to moderate transfer of data;
2. Moderate availability/moderate risk of transfer failure;
3. Moderate cost; and
4. Moderate cost risk due to complex pricing models.

A representative connection of this type is a wide area cellular network in non-rush hour times and late at night when mobile voice traffic is reduced to well below network capacity.

7.A.1.c. Wide Area Wireless Peak. Peak-time wireless connections provide:
1. Limited to moderate transfer of data;
2. Reduced availability/high risk of transfer failure;
3. High cost; and
4. Moderate cost risk due to complex pricing models.

A representative connection of this type is a wide area cellular network during rush hour or other peak usage times.

To some degree the categorization of the modes of connection is dynamic and is influenced by current events and conditions through people's reaction to those conditions, such as weather or traffic delays increasing the amount of voice traffic on a network. These dynamic conditions can be monitored and included with the more static assumptions in the optimizations.

7.A.2. Delivery Times. Optimal delivery has constraints with various levels of negotiability, for example, under tight constraints:
1. Data must first be available before it can be sent;
2. Data cannot be sent without a connection.

With loose constraints:
1. Space must be available on client (or made available through purging);
2. Cost of delivery of content, mitigated by acceptance of risk of incurring higher cost; and
3. Delivery on time, mitigated by acceptance of risk of late delivery.

7.B. Optimal delivery approaches.

7.B.1. Intelligent Pre-Caching. The nature of wireless communications constrains the ability to transfer a specific amount of data at a specific time. The factors contributing to this include potential unavailability of the network and limited throughput of the transfer of data. The network can be unavailable due to poor radio frequency reception or through network capacity limitations. Transfer costs also modify the desirability of sending data under certain conditions.

To assist in getting the specified data to the client by the specified time or under the specific contextual circumstances, anticipation of need must be made, and delivery as available through the lowest cost channel must be done.

In the preferred embodiment, an asynchronous data transfer and caching scheme is utilized to mediate network usage and deliver a data responsiveness that exceeds what is possible with synchronous data delivery over narrowband wireless networks.

Narrowband, wireless packet data networks such as CDPD and GPRS cannot provide data delivery response times as low as those which users have become accustomed to with wideband or broadband packet data network connections such as ISDN, DSL or dedicated leased lines. As a result, wireless enabled devices tend to have long response times after a user requests data from the network until the data is completely transmitted to the wireless device. In addition, the maximum capacity of current wireless networks is limited and demand may exceed capacity during peak usage times, further slowing data transfer. Also, wireless network usage during peak times can be more expensive than usage during off-peak times, making it financially beneficial to utilize off-peak time.

By utilizing the scheduling invention illustrated herein, it is possible to transfer pre-selected data to a memory cache on a device and later present the information to the user automatically and/or when the data is requested. The transfer of pre-selected data is performed asynchronously from the data presentation, allowing a wide-band connection and/or off-peak narrowband connection to be used to transfer the data to the memory cache in the device. In this way the presentation of the data makes it appear that the data transfer is exceeding the maximum theoretical bandwidth of the wireless network. Examples of content types that would be transferred asynchronously include ads, games, future events, entertainment, and news. Examples of content types that need to be transferred synchronously include messages, invitations, and awareness updates.

7.B.2. Optimizing the Transfer of Subscription Update Data. The platform provides services that enable users to subscribe to dynamic data sources that require periodic updates to be sent to the device in a timely manner. The platform utilizes several mechanisms to optimize the user's awareness of the updates at minimum transfer costs.

First, Subscriptions are set up such that the updated data can be transferred independently of the presentation elements and viewer. For example, in updating the score of a baseball game only the new score needs to be transferred to the device. The graphics and other elements of the presentation that are displayed along with the score do not need to be refreshed.

Second, the data update can be used to trigger the presentation of additional graphical elements that already reside on the device. For example, an update of "cloudy" for a weather subscription could trigger the presentation of a graphic showing clouds. Because the cloud graphic is already stored on the device it does not need to be transferred again.

Third, the platform automatically suspends and resumes the transfer of data updates on the basis of the current visibility of the subscription presentation on the user's screen. If the user has an open subscription, but the subscription is off screen, the updates to the subscription are suspended.

Fourth, Users can set various conditions for being alerted to specified changes in subscribed data even when the updates for that subscription are suspended. For example, if a user subscribed to stock price updates the user could set a condition to be alerted if the price reached a specified value. If the stock reached the specified price, the user would be alerted even if the updates had been suspended. A common grammar for setting conditions across subscriptions has been developed. Among other things the grammar addresses a set of common comparison conditions such as one variable being greater than, less than, and/or equal to another variable.

7.B.3. Separation of Data and Presentation Elements. Presentations may be made up of several elements that can exist independently of the presentation (See Section 3.A for a detailed discussion). This independence among the elements enables the system to decompose the presentations into their base parts. This factoring of presentations produces several efficiencies:

1. Data transfer volume is minimized because only the elements that are needed to complete a presentation need to be sent to the device;

2. Resources can be shared. For example, logos can be kept separate from ads, so one logo can be used in numerous ads;

3. One template can be used to present the same type of data numerous places. For instance, one news viewer used by numerous news content providers; and 4. In subscriptions, separation reduces the size of the data update.

8. Present

8.A. Content's Context Sensitivities Interacting with Current Context. The calculation of neediness is discussed below. The network of the present invention allows interaction between the sensitivities and the actual situation.

8.A.1. Client Presentation Scheduler.

The Client Presentation Scheduler determines the most contextually relevant piece of content to be presented in the content stream based on the interactions of the contextual sensitivities contained within the content wrapper and the current context of the device.

Under most conditions the content is presented serially in time, with each informational or preview piece of content playing through its duration. Under special circumstances an urgent piece of content may interrupt the this normal presentation mode.

Each of the contextual factors contributes to a single number representing the current "need" a piece of content has to be seen. This number is converted to an initial probability, which is then normalized and used for the final, random selection process.

The use of a constrained random approach to presentation creates a unique and spontaneous presentation for the user, and provides a non-greedy algorithm for the optimization of content presentation.

Figure 1M:
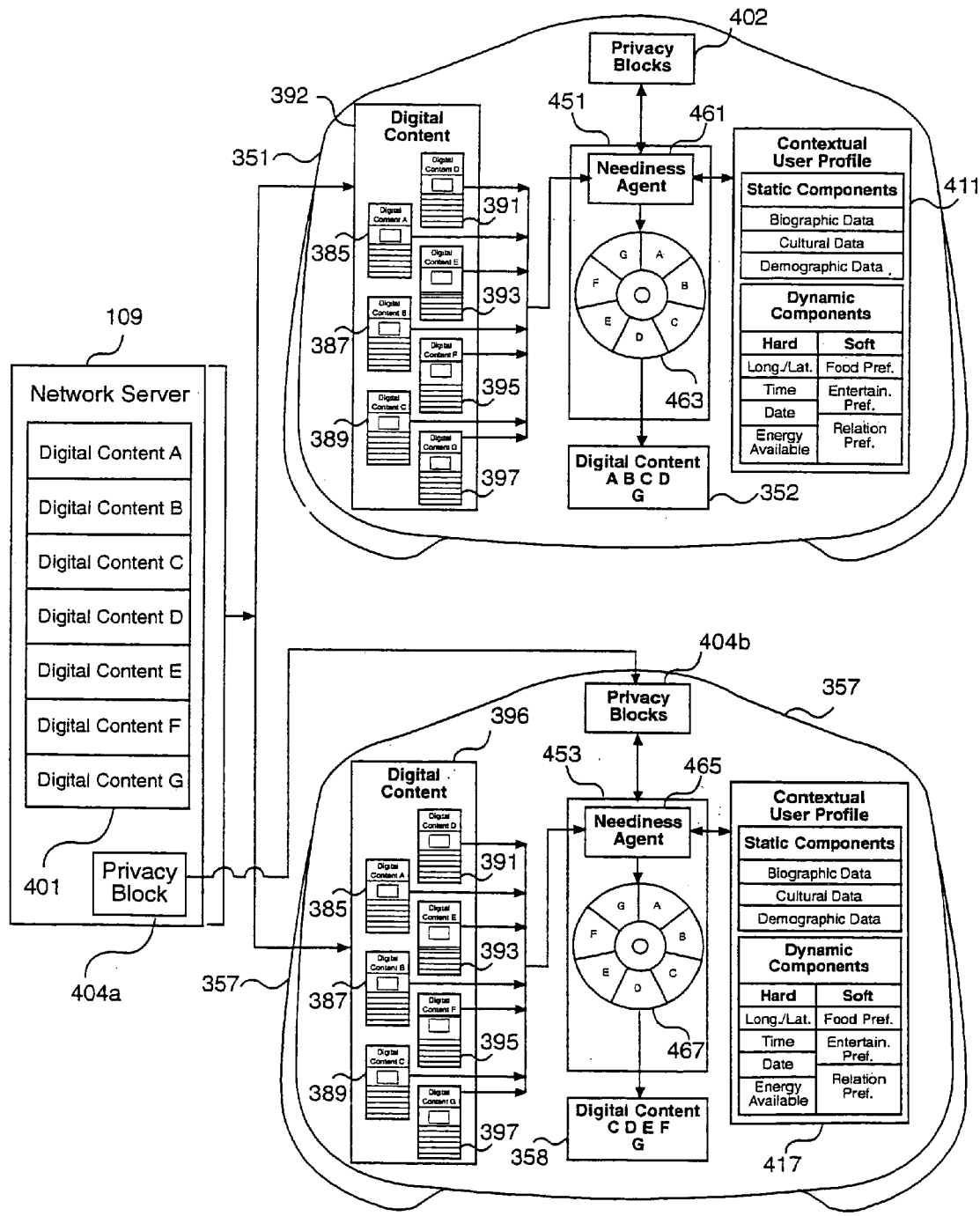
FIG. 1M is a high-level simplified representation of a scheduler software of the appliance and network of FIG. 1A in an initial state.
Figure 1N:
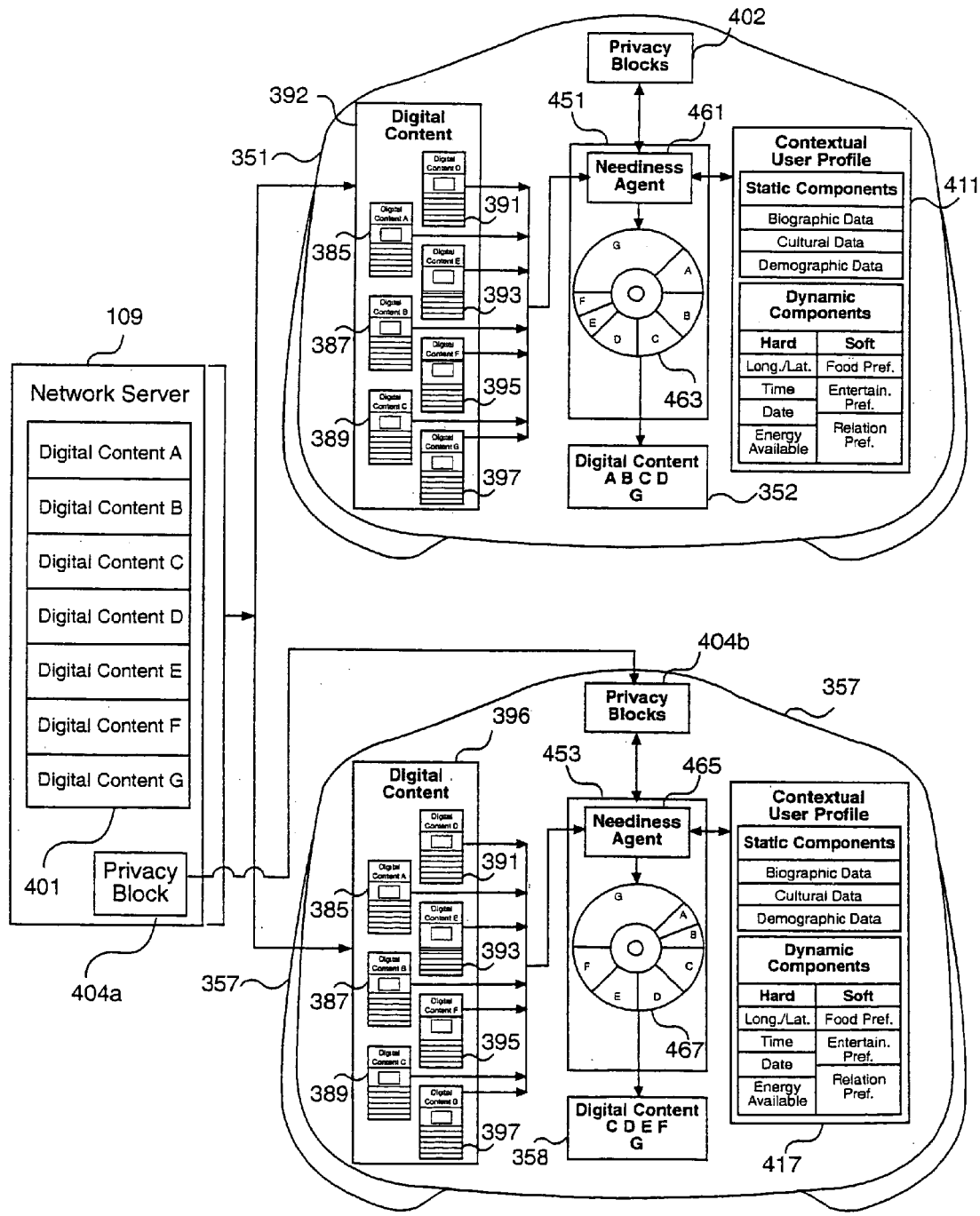
FIG. 1N is a high-level simplified representation of the scheduler software of FIG. 1M in a subsequent state.

8.A.1.a. Probabilistic Selection. In accordance with the preferred implementation of the present invention, a software routine or module known as a "scheduler" is utilized to manage the presentation and refresh scheduling of digital content on each appliance 351, 353, 355, 357, 359, and 361. The scheduler operates to select digital content for either or both of transmission and reception in accordance with a scheduling model. The presentation of all content items is controlled, managed, or monitored by the scheduler. The scheduler probabilistically selects content items for presentation using constrained random variation. This can be better understood with reference to FIGS. 1M and 1N in the drawings. FIG. 1M is a high-level, simplified representation of the operation of the scheduler with respect to appliances 351 and 357 at an initial state. FIG. 1N is a high-level, simplified representation of the operation of the scheduler with respect to appliances 351 and 357 at a subsequent state.

In the preferred embodiment, the scheduler resides in its entirety on appliances 351 and 357. However, it should be understood that the scheduler may reside and be executable on network server 109, on appliances 351 and 357, or on a combination of network server 109 and appliances 351 and 357. Irrespective of the location in which the scheduler resides, the scheduler functions and operates in a similar manner. Therefore, the following discussion will not identify any particular location for the scheduler, and will be primarily focused on the scheduling functions and operations performed by the scheduler. As is illustrated, a scheduler 451 resides on appliance 351, and an identical scheduler 453 resides on appliance 357.

Plurality of messages 401 reside on network server 109 and are available for communication to appliances 351 and 357, the users of which are likely located in a particular geographic region, such as geographic region GR1 (see FIG. 1A). Digital Content A, B, C, D, E, F, and G having corresponding wrappers 385, 387, 389, 391, 393, 395, and 397, respectively, are preferably transmitted from network server 109 to appliances 351 and 357 at a pre-selected time and stored in cache memory 392 and 396 for a predetermined duration. It is preferred that transmissions from network server 109 be performed at a time when wireless communication bandwidth is at a maximum and connection charges are at a minimum, typically late at night, or early in the morning. Of course, some digital content may be transmitted or updated "live," as it happens. As discussed previously, in certain instances it may be necessary to separate the playable digital content from the other wrapper fields to conserve cache memory 392 and 396, or when wireless communication bandwidth is insufficient.

As explained above, contextual user preference profiles 411 and 417 are compiled and reside on appliances 351 and 357, respectively. Schedulers 451 and 453 analyze Digital Content items A, B, C, D, E, F, and G and perform a comparative analysis between each Digital Content items A, B, C, D, E, F, and G and each contextual user profile 411 and 417. Schedulers 451 and 453 consider the location of the user, the time of day, the day of the week, the date, the identity or source of the digital content, the type of digital content, the preferences previously established by the user, and the content subject of the digital content. Schedulers 451 and 453 also consider the privacy settings previously established by the user or his parents. These privacy settings are maintained in privacy block data 402 residing on appliance 351, and privacy block data 404a and 404b residing on both appliance 357 and network server 109, respectively. Schedulers 451 and 453 filter, sort, and prioritize Digital Content items A, B, C, D, E, F and G in a manner which is consistent with the foregoing considerations. However, in the preferred implementation of the present invention, schedulers 451 and 453 are not rigid systems, but are instead probabilistic models which associate weights or values with each Digital Content A, B, C, D, E, F, and G that is available for presentation to the users at any particular time. Additionally, schedulers 451 and 453 may associate a confidence measure with each weight and value. Accordingly, a weight and a confidence measure may be utilized in determining whether Digital Content A, B, C, D, E, F, and G will be offered for presentation to the users, and, if so, in what order Digital Content A, B, C, D, E, F, or G will be communicated to the users, relative to each other.

According to the preferred scheduling model, all digital content has a finite probability of being offered for presentation to the users of appliances 351 and 357, unless such digital content is absolutely and completely blocked for privacy reasons. This is so because the operations of schedulers 451 and 453 are governed by constrained random variation as described herein. In other words, a mere reference value of "Low" will not preclude particular digital content from being offered for presentation to a user.

Continuing with reference to FIGS. 1M and 1N, each scheduler 451 and 453 is comprised of a software "neediness agent" and a "probabilistic wheel" arranged like a roulette wheel having a plurality of bins located around the periphery. Schedulers 451 and 453 generate a bin for each digital content message, regardless of the quantity; however, the bins vary in size, as determined by the ever changing probability that a particular digital content message will be offered for presentation. Scheduler 451 has a neediness agent 461 and a probabilistic wheel 463. Likewise, scheduler 453 has a neediness agent 465 and a plurality of probabilistic bins 467. This is depicted graphically in FIGS. 1M and 1N. FIGS. 1M and 1N are identical in all respects with the exception that FIG. 1M represents an initial state or time, and FIG. 1N represents a subsequent state or time. The following discussion will pertain to FIG. 1N only.

An example of the mapping of a neediness value to an un-normalized probability value with a scale, whereby much-liked content is seen fifteen times more often than the least liked content is as follows:

$$\text{Value} = e^{[0.2708050211 \times Neediness + 1.3540251005]}$$

All data from Digital Content items A, B, C, D, E, F, and G, contextual user profiles 411 and 417, and privacy blocks 402, 404a, and 404b is input into neediness agents 461 and 465. The comparative analysis between each Digital Content item A, B, C, D, E, F, and G and contextual user profile 411 is performed by neediness agent 451. In identical fashion, the comparative analysis between each Digital Content item A, B, C, D, E, F, and G and contextual user profile and 417 is performed by neediness agent 453.

This "normalizing" function operates by identifying other pieces of content that are in the same probability range and suppressing their probability in proportion to the number of values of similar value. The purpose of this algorithm is to insure the relative probabilities for the instances of each probability are preserved. This avoids the problem of a great deal of lower probability content overwhelming the selection of higher probability content. For example, if, all other contexts being equal, the probability was based on the users relative preference for a category of content, a larger number of less desirable candidates would not overwhelm a lesser number of more desirable candidates. A specific example: if through preference calculations it had been decided that the user wished to see information on Mexican food restaurants twice as often as information on Italian food restaurants, but there were seven Italian restaurants and two Mexican restaurants available, this algorithm presents an instance of a Mexican restaurant twice as often as any instance of an Italian restaurant.

One such normalizing function is as follows:

$$Correction(k) = \sum_{j=1}^{n} \frac{1}{1 + [Value(k) - Value(j)]^4}$$

$$AdjustedValue(k) = \frac{Value(k)}{Correction(k)}$$

As is shown, probabilistic wheel 463 includes Bin A, Bin B, Bin C, Bin D, Bin E, Bin F, and Bin G, each being sized to correspond to at least the weight accorded each Digital Content items A, B, C, D, E, F and G, respectively. Similarly, probabilistic wheel 467 includes Bin A, Bin B, Bin C, Bin D, Bin E, Bin F, and Bin G. The weighing may additionally take into account the confidence measure associated with the weight determination. According to the probabilistic scheduling model, there is a much greater probability of selection and presentation of digital content associated with larger bins. Neediness agent 461 has made Bin G the largest bin on probabilistic wheel 463. Similarly, neediness agent 465 has made Bin G the largest bin on probabilistic wheel 467. Therefore, of Digital Content items A, B, C, D, E, F and G, it is most probable that Digital Content G will be transmitted, received, and offered for presentation to the users of appliances 351 ad 357. The large size of Bin G on probabilistic wheels 463 and 467 may be the result of the weight accorded to Digital Content G, the confidence measure for the weight accorded to Digital Content item G, or some combination of weight and confidence measures.

As is shown on probabilistic wheel 463, Bin A, Bin B, Bin C, and Bin D are relatively uniform in size, but smaller in size than Bin G. Further, Bin E and Bin F are uniform in size, but are the smallest bins on probabilistic wheel 463. Thus, Digital Content A, B, C, and D have an equal probability of being offered for presentation to the user of appliance 351, albeit a lower probability than Digital Content G. In contrast, although Bin E and Bin F have an equal probability of being selected for presentation, such probability is the lowest of the bins on probabilistic wheel 463. As for probabilistic wheel 467, Bin C, Bin D, Bin E, and Bin F are relatively uniform in size, but smaller in size than Bin G. Further, Bin A and Bin B are uniform in size, but are the smallest bins on probabilistic wheel 467. Thus, Digital Content items C, D, E, and F have an equal probability of being offered for presentation to the user of appliance 357, albeit a lower probability than Digital Content item G. In contrast, although Bin A and Bin B have an equal probability of being selected for presentation, such probability is the lowest of the bins on probabilistic wheel 467.

It is important to note that schedulers 451 and 453 intelligently consider the amount of network energy required to play particular digital content, and the amount of network energy that is available for use by each user. If a user is low on network energy, neediness agents 461 and 465 will decrease the probability of presenting digital content that "burn" large amounts of network energy. Instead, neediness agents 461 and 465 will increase the probability of offering for presentation digital content for which the users may "earn" network energy. For example, if the user of appliance 351 is low on network energy, neediness agent 461 will decrease the probability of offering for presentation Digital Content item D, which requires five units of network energy to execute. On the other hand, neediness agent 461 will increase the probability of offering for presentation Digital Content item E, for which the user may earn 20 units of network energy for completing the survey.

According to the present invention, the user does not know what digital content has been stored in cache memory to be offered for presentation. However, the user indirectly controls what digital content is offered for presentation by the user's interaction with network 11. However, the user may initiate a search session in which the user requests particular digital content information. Because network 11 is highly user centric, such user-initiated searching receives a high priority. For example, if the user of appliance 357 initiates a search session to determine the starting time of the user's next soccer game, neediness agent 465 will immediately and greatly increase the probability of offering Digital Content item G for presentation to the user. Such user-initiated interaction with appliance 357 will predominate over other goals of network 11. The other goals of network 11 are secondary to user-initiated interaction.

Neediness agent 461 analyses and compares Digital Content items A, B, C, D, E, F, and G with contextual user profile 411. The comparative analysis necessarily includes consideration of privacy blocks 402. As a result of this comparative analysis, neediness agent 461 determines the relative size of the bins on probabilistic wheel 463 and then randomly selects which digital content should be offered for presentation to the user of appliance 351. The relative size of the bins will depend upon either the weight accorded the digital content messages or the confidence level associated with the weighing. As is shown, it is most probable that Digital Content item A, B, C, D, and G is presented, in some form or another, on display 352 (see also FIG. 1H). It should be noted that Digital Content A is displayed incrementally larger or more prominently as the user approaches LATLONG1, the preferred location set by Merchant #12. The severe weather warning of Digital Content item B is displayed immediately to any user in the path of the severe weather. Digital Content items C and D will likely be displayed as soon as possible. Finally, Digital Content G will be available for presentation should the user initiate such presentation by way of searching or otherwise interacting with appliance 351. Scheduler 451 constantly changes and updates the sizes of Bin A, Bin B, Bin C, Bin D, Bin E, Bin F, and Bin G on probabilistic wheel 463, depending upon date, time, user location, available user energy, and many other parameters associated with contextual user profile 411. This is illustrated by the differences in the sizes of Bin A, Bin B, Bin C, Bin D, Bin E, Bin F, and Bin G between FIGS. 1M and 1N. It should also be noted that the probability of presentation of a particular digital content message is independent of the period for which the digital content is to be displayed. For example, the fact that Digital Content item D has been designated to be available for three hours may have little affect on whether Digital Content item D is offered for presentation.

Scheduler 453 of appliance 357 operates in a similar fashion. For scheduler 453, Digital Content items A, B, C, D, E, F, and G are analyzed and compared to contextual user profile 417. Neediness agent 465 analyses and compares Digital Content items A, B, C, D, E, F, and G with contextual user profile 417. The comparative analysis necessarily includes consideration of privacy blocks 404a and 404b. As a result of this comparative analysis, neediness agent 465 determines the relative size of the bins on probabilistic wheel 467 and then randomly selects which digital content should be offered for presentation to the user of appliance 357. The relative size of the bins will depend upon either the weight accorded the digital content messages or the confidence level associated with the weighing. Due to the different relative sizes of the bins, it is most probable that Digital Content items C, D, E, F, and G is presented, in some form or another, on display 358 (see also FIG. 1H).

An example formula for constrained random selection is as follows:

$$Bin(k) = \sum_{j=1}^{k} AdjustedValue(j)$$

A random uniform random number is chosen between 0.0 and the value in the highest bin. This chosen random number is compared to each of the bins and the highest indexed bin with a value that is less than or equal to the random number is the chosen index.

It will be appreciated that one implementation of the present invention may be the generation of a "scheduling agent" which is identified with a particular user. This scheduling agent may be extremely sensitive to location of the particular user as he or she moves between service regions 213, 215, 217, 219, and 221 within the network 11 (see FIG. 1F). The implementation of such scheduling agents allows schedulers 451 and 453 to generate location-dependent changes in the relative sizes of the bins of as probabilistic wheels 463 and 467 as the users move about between service regions 213, 215, 217, 219, and 221 (see FIG. 1F). In this manner, the probability that location-dependent digital content will be offered for presentation to the user is increased as the user approaches the optimum location for presentation of the digital content, as determined by the sponsoring entity. This type of intensely local targeted communication can be extremely effective, particularly if the digital content is an advertisement. This will be discussed in greater detail below in several examples of offering certain digital content for presentation based primarily upon location information.

Additionally, schedulers 451 and 453 may be "adaptive," such that schedulers 451 and 453 change over time. Such changes may either be "reactive" or "predictive." These adaptive changes to schedulers 451 and 453 are different than changes in contextual user profiles 411 and 417, which are constantly updated. Reactive changes to schedulers 451 and 453 may represent "step function" changes, such as a relatively long-term relocation of a user to a new distant locale, or "incremental" changes, such as a maturing of the user of a long period of time. This sensitivity to subtle changes can correspond to, be responsive to, and tracked with, changes in taste and preferences for the individual user. A step function adaptive change would occur in scheduler 451 if the user went on a vacation across the country for two weeks. Scheduler 451 would recognize this long-term change in location and adapt by offering different digital content, possibly digital content relating to the new location, for presentation. Further, the interests of a user who is seven or eight years old may differ substantially from the interests of a user who is fourteen or fifteen years old. If the user is a member of network 11 for that entire interval of time, from age seven to age fifteen, the user will be presented with repeated opportunities to update, modify, and supplement contextual user profile 411. As a result, incremental adaptive changes occur in scheduler 451 as the user ages over long periods of time. As tastes change due to maturation or other factors, scheduler 451 may also change and accord different weights to different sources, types, and subject matter of digital content. This type of response to either step function changes or incremental changes can be considered to be reactive changes.

On the other hand, schedulers 451 and 453 allow for and encourage certain types of "predictive" changes. As contextual user profiles 411 and 417 are compiled, network 11 is better able to predict far in advance the types of digital content which may be or could be of interest to the users, even before the users actually develop an interest in such subject matter. This allows network 11 to "lead" the user to digital content which may be of interest to the user based upon inferences generated from contextual user profiles 411 and 417. This contrasts with the reactive changes discussed above which can be considered a form of "lagging" behind changes in the users' conditions. Predictive changes in schedulers 451 and 453 can be useful in targeted advertising as the information for all users can be analyzed and patterns can be determined for likes, dislikes, and preferences from the aggregated data of thousands of users. One example would be the advertisement of a particular book or type of music based upon a statistically reliable inference that users which like one type of book or music may also like another type of book or music which is somehow stylistically or otherwise related.

8.A.1.a.1 Delivery of Content Based Upon Known User Preferences. In the example of FIGS. 1H, 1I, 1J, 1K, 1L, 1M, and 1N, the differences between the digital content displayed on appliances 351, 353, 355, 357, 359, and 361 can be explained by differences between the users, as determined through examination of the respective contextual user profiles, such as contextual user profiles 411 and 417. By examining appliances 351, 353, 355, 357, 359, and 361 in FIG. 1H, it is clear that certain digital content is more common to some users, but less common to other users. For example, there is a significant overlap between the digital content items received by the user of appliance 351 and the digital content received by the user of appliance 361. This overlap is based upon similarities in the respective contextual user profiles. In contrast, there is little similarity between the digital content received by the user of appliance 353 and the digital content received by the user of device 355. This lack of overlap is based upon differences in the respective contextual user profiles. Note that Digital Content D and G are communicated to all appliances 351, 353, 355, 357, 359, and 361. Thus, it is highly likely that LATLONG1, LATLONG2, LATLONG3, LATLONG4, LATLONG5, and LATLONG6 are all located within a single service region, such as geographic region GR1.

Users that have largely overlapping digital content can be considered as users who are "sharing" virtual space. If two or more users know one another and also share common virtual space through the receipt of generally similar digital content items, their user-experience can be richer and more enjoyable, and they can begin to build "community" within network 11 based upon common interests. This may take many forms including the creation, distribution, and sharing of digital content. It can also take the form of "virtual introductions." Essentially, there is a substantial opportunity for the development of community systems. Community systems and novel functions enabled by the present invention will be discussed in greater detail below when the preferred community systems are discussed.

8.A.1.a.2 Primacy of User Privacy Preferences. Privacy is primary for network 11. User preferences, not network or merchant preferences, have priority.

8.A.1.a.3 Inferred Action and Purpose. One additional novel function enabled by the present invention is the ability of network 11 to infer action and purpose of the user based upon certain types of data. Of course, contextual user profiles are extremely useful in inferring action and purpose. However, location information and time information are equally important in inferring action and purpose. In the simplest form, the action and purpose of a particular user can be inferred through the analysis of location information only. For example, if the user communicates with network 11 from a "school" location, it would be reasonable to assume that the user is present for purposes related to obtaining an education. However, it may be useful to also consider time information in addition to location information to better determine or infer action and/or purpose of a particular user. For example, the communication by the user from a "school" location during a weekend or holiday may infer different types of action or purpose, such as attendance at a sporting event. Certainly, determinations based upon location and time are likely to be more accurate than determinations based upon location information alone.

It is also possible for network 11 to analyze changes in either or both of location and time in order to infer action and purpose. For example, if the user has traveled from a first known location to a second known location in a particular time frame, it may be possible for network 11 to examine the time and location data from the user's contextual user profile to determine the most likely activity in which the user is about to become engaged. For example, with reference to FIGS. 1E, 1F, and the related tables of FIGS. 1G (1 of 5) through 1G (5 of 5), if the user has traveled from service region 219 from Home 239 to service region 213, on a particular day and time, network 11 can reasonably conclude that the user is going to either Riding Stables 225 or Water Park 227. In addition, network 11 can examine date information to determine if it is more likely that the user is going to Water Park 227 or Riding Stables 225. For example, in a winter season, it is unlikely that the user will be traveling to Water Park 227. Furthermore, an examination by network 11 of the user's profile, which has been compiled over a relatively long period of time, such as months, may result in a determination that the user ordinarily takes his riding lessons on a particular day and time, such as Saturday at 10:00 a.m. With this known data, network 11 can make reasonably accurate determinations about the actions and purposes of the user. Thus, travel on a particular day and time between service region 219 where Home 239 is located to service region 213 where Riding Stables 225 are located may give rise to a very reliable inference that the user is going to take riding lessons.

The following are several concrete illustrations of the utilization of location information only, location and time information, and changes in either of location and/or time information in order to infer action and/or purpose of the user. This information is useful because certain types of digital content may be more appropriate, relevant, or effective if offered for presentation at a particular time relative to an inferred action or purpose. For example, offering for presentation a commercial message from stores located in a particular mall is much more effective and relevant if network 11 can reasonably infer that a user is located at or in route to that particular mall.

8.A.1.a.4 Use of Location Information Only to Infer Action. Network 11 might infer that if a user is at "work," she is working. The system can exploit this knowledge by giving higher priority to content items that are associated with work-related activities.

8.A.1.a.5 Use of Location and Time Information to Infer Action and/or Purpose. Network 11 might infer that if a user is at "school" on a weekend night, she is attending a sporting event. For example, if the user is at school after hours or on a weekend in the fall, the action and purpose of the user may be inferred to be non-educational, such as attendance at a football game.

8.A.1.a.6 Use of Changes in Location and/or Time to Infer Action and/or Purpose. In addition, if the user travels from one "known" location to another, network 11 may be able to infer the activity that the user is about to become involved in. For example, network 11 may infer that if a user is traveling from "Restaurant A," at which the user was located for the last hour, toward "work," that the user is going back to work.

The relative probabilities assigned to each content item and used by the that the scheduler vary with the current context and the contextual sensitivities of the set of content items being scheduled. The relative probabilities are computing using the neediness measures calculated individually for each content item. This calculation is discussed in the following section.

8.A.1.b. Neediness. Neediness is an aggregated relevancy based on many factors which determine how important a piece of content is to a user under their current context. Essentially, neediness is a combination of effects that are mapped back to a value.

Components that affect neediness include:

1. Content;
2. Context (kept current all the time), which includes:
   i. Device;
   ii. Objective;
   iii. Subjective; and
   iv. Preferences; and
3. Preferences (Ratings).

Neediness changes for the following, reasons:
1. Content Changes - Something a user has an awareness to escalates to a higher level of wanting to be seen, i.e., awareness trigger.
2. User Actions that change context, for example, find something, send a message.
3. Device Status - docked status, signal conditions, etc.
4. PG Rating - rating flag is a hard limit on what can be seen.
5. Prerequisites - list of content that must have been seen within a certain space/time cylinder, which can be positive or negative.
6. Interruptiveness - immediate pass-through.
7. Loneliness - used to suppress repeat content. Individual time-constant based.
8. Space/Time Sensitivity - cylinder list intersections.
9. Habits (categorized place/time) - The platform enables individual device-holders to model their habits in terms of times, locations, and system-defined categories. At their discretion, device-holders are able to name the locations that they want their device to remember. These location names are used when device-holders choose to expose their location information to other selected device-holders. The device "looks up" the current named place/time wherever the user is. It currently uses the smallest cylinder as their location if the user is in two overlapping cylinders in order to make the user's location more specific.

In addition to providing their own names for locations, device-holders can assign a habit category to a location. Actually, they can do this whether or not they provide a name for the location. The system service provider provides a plurality, preferably sixteen, predefined habit categories from which device-holders can choose. The habit categories represent places at which it can be inferred that a variety of typical behaviors and activities will take place. The habit categories will also have a predefined radius based on what category it is. Content creators can take advantage of these inferred behaviors and activities and use them to affect the neediness of their content. A content creator can make the neediness of a given presentation package be sensitive to habits by listing applicable habit categories in the wrapper for that presentation package. An exemplary set of habit categories is listed below. This set is may be adapted as necessary.

10. Habit Categories:
    i. Home.
    ii. School.
    iii. Work/Job.
    iv. Culture & Education.
    v. Church.
    vi. Mall.
    vii. Restaurant/Café.
    viii. Concert Hall/Venue.
    ix. Movie theater.
    x. Sports Stadium.
    xi. Downtown.
    xii. City Park.
    xiii. Amusement Park.
    xiv. Public Transportation.
    xv. Participatory Sports.
    xvi. Friend's/Relative's House.

11. Ratings—how the user rated it as well as when and where (time and place) he rated it.
   i. Specific—Specific Ratings are explicit ratings for previously rated content—these are affected by the time and location of the previous ratings.
   ii. Inferred—Inferred Ratings refer back to other content on the device to make a rating. Each wrapper includes a key comprised of ratings, provided by its creator, to a plurality of, preferably ninety-six, characteristics, called content associations. The content association key provides a ninety-six-feature description of a presentation package that is mapped to a ninety-six dimensional space. The key provides a basis for inferring a preference rating for its associated presentation package in the absence of an explicit rating provided by the device-holder or a preliminary specific rating provided by the relationship network for it.

The preference inference process is carried out by a content mentoring mechanism. Basically, any content item that is explicitly rated by a device holder will act as a potential mentor for other content whose content association key is similar. The degree of similarity between any two presentation-packages is determined by computing a Euclidean distance measure between the content association keys of the presentation-packages. Because the associations keys have four levels of strength of association for each of the ninety-six dimensions, the distance metric ranges from 0 (identical) to 29.39. The set of content associations is divided up into several categories. At the most fundamental level there is a distinction between category associations and property associations. Category associations provide a characterization of content in terms of taxonomic distinctions. Property associations provide a characterization in terms of properties that cut across the various categories. In this way, content similarity, or closeness, is sensitive to both categorical and property descriptions.
   iii. Identifying Mentors—Identifying Mentors is used to infer the preference of a piece of content that has not been rated yet to an explicitly rated piece of content, i.e., a mentor. This happens based on some similarity of the unrated content and the mentor. A piece of content can have more than one mentor.
   iv. Preliminary—Preliminary Ratings come from the relationship network.
12. Energy Balance—works to keep balance at a certain level (centered).
13. Transfer balance (number of bytes)—budgets the amount of bandwidth usage—space it out over a month period, which can be context driven.
   i. Context driven.

8.B. User Interface.

8.B.1. Overview.

8.B.1.a. User-Centered Design. The design of the UI follows a user-centered process that began with identifying the various uses the network was going to provide to its intended users. Attention to the uses that applied to device users was balanced by insuring that merchant and other content provider needs and uses were also addressed. This included insuring that the capability to extend uses with additional services was an inherent part of the architecture. The uses identified in this process were further expressed in the context of real world scenarios and formalized by applying use-case modeling techniques. Use-case analysis describes the different uses of a system (or subsystem) by each of the different types of its users. The analysis of usage was refined several times and resulted in identifying three primary high-level uses:
   1. Acquiring and maintaining awareness;
   2. Communicating; and
   3. Searching.

These would later be augmented with keeping and referencing personal data (PDA-like functionality), and playing games, music, and other entertaining types of content. In addition, many lower-level use-cases were derived from these major uses.

In addition to the major use-cases and those derived from them, other ancillary use-cases were also identified. These included personalization, system support, and back-end accounting. For the most part, these ancillary uses did not drive the definition of the UI framework, but the framework does have to accommodate them. An exception to this is personalization of which there are two distinct types:
   1. Giving users maximum flexibility in specifying the information they wanted to be aware of and how it was arranged.
   2. Providing users with the capability to create their own content, either to share with others on the network or to self-brand their device with their individual styles.

Only the first personalization use, that is, the need to provide users with flexibility in selecting and organizing information, became important to defining the UI framework.

8.B.1.b. Awareness as Primary Function. Of the major uses, awareness was the use that most set the network apart from other devices. Further, it is the integration of awareness services with other familiar features that makes the network a truly compelling product. Focus group studies, ecological studies, and quantitative evaluations help both in refining and in supporting the value of the identified combination of uses. The UI should be highly effective in:
   1. Providing awareness; and
   2. Integrating other features coherently and consistently with the awareness structures in the UI.

As used herein, awareness encompasses a wide range of different types of information about friends, events, processes, news, and merchant offers, among other things. Awareness is also manifested in different ways. Four forms of awareness that the network and its UI should be capable of supporting are as follows:
   1. Awareness of what is close to you and happening around you at the present time. For example, awareness of the nearest ATM or Starbucks, and awareness of a special offer at a favorite nearby restaurant delivered to you near lunchtime.
   2. Awareness of things that will happen or become effective at various times in the future. For example, awareness of an upcoming concert or soon to be released movie, awareness of invitations to parties or meetings, and awareness of new products.
   3. Awareness about things that are of interest and that are happening now, but that are not near you or directly observable. For example, awareness of the score of a baseball game, awareness of stock quotes, awareness of a package delivery, and awareness of the location of friends.
   4. Awareness of state and status of your activities and the system. For example, awareness of received messages, awareness of pending work such as an unfinished IM, awareness of the status of a sent message, and awareness that the battery is low or that you have lost connectivity.

8.B.1.c. Designating Awareness Content. To be effective in a mobile environment the network should filter these different forms on the basis of context and individual user preference. Also, users would not have the patience to maintain their awareness by always requesting information. Users would need the device to attend to them and to actively bring needed information to them. Thus, the network needs to share the initiative with the user in actively controlling the UI. The result is that, in the network, awareness services need to be delivered such that they are useful with little attention or engagement from users.

The network should learn what kinds of information each user liked and disliked, so that over time the information brought to each user would increasingly be the information that each individual user needed and wanted. This behavior would significantly reduce the problem of "spamming" users with information they did not want, especially a concern with advertisements. It is preferred that the network should learn from explicit information that each user would provide rather than from information gathered implicitly. However, we did not want to be obtrusive to users in collecting explicit information about their likes and dislikes. In addition to being bothersome, obtaining information up front with a survey or form would not account for the evolution of a user's likes and dislikes.

Three complimentary ways were defined for users to unobtrusively and explicitly tell the network what they liked and disliked.

1. Users could rate content using a physical responder bar;
2. On a periodic basis, questions in the form of content would be displayed and users could choose to answer them. The questioning, or conversational, interface became a foundational mechanism for network user interaction known as inquisitiveness.
3. Users declare their preference through reference to another user. Users can rate other users in terms of their desire to receive the content (or at least have a greater probability of receiving the content) that the referenced user rates as desirable. Across all users this mechanism sets up another foundational mechanism called the relationship network.

The benefit to users for taking the time to provide input is that the network would serve up more useful content to them.

Rating and inquisitiveness both provide for obtaining information about users' likes and dislikes in an ongoing way, but they will tend over time to narrow the scope of what a user sees by increasingly providing only information the network knows users like. The network includes additional mechanisms to handle this undesirable tendency. First, to track changes in users tastes, content similar to content that was once rated as disliked should, after some time has passed, be presented again to determine if the user still dislikes it. The network accomplishes this by including a rating forgetting mechanism. Second, in addition to learning each users preferences, we wanted the system to mimic real-world systems in having some uncertainty that would continually broaden the users experience rather than constrain it. The network needed to sometimes present content or ask questions that are new and different. This is accomplished by another foundational mechanism of the network, called the scheduler, which resides on each user's device. The scheduler selects content on the basis of context (including user-preference) but it does so in a probabilistic fashion that exhibits a behavior of constrained random variation. The random nature of the scheduler insures that some low probability content is occasionally displayed.

8.B.1.d. The Nature Of Content In the Network. One major type of content was merchant advertisements and offers. As discussed previously, the inclusion of advertisements argued heavily for having an active self-initiating interface and for learning user preferences. In addition, the presence of advertisements also argued for a rich graphics medium so that they could be engaging and entertaining to users. The teen market segment also argued for rich graphics and animation capabilities. Additionally, rich graphics was especially attractive for allowing game playing.

The combination of using a rich graphical and animated interface with various types of information that users would want to be aware of and that merchants would want to present to them fostered the notion of thinking about content as short programs. Not like computer programs, but something like TV programs. This is in contrast to thinking about content as messages. Content could be divided into program-like segments and delivered as separable objects. Selecting Flash as the graphical foundation for the UI reinforced this notion because content would be created, delivered, and displayed in the form of Flash movies.

In following this line of reasoning, everything that gets presented on the screen is a flash movie. This includes the basic components that make up the UI. The UI then becomes a Flash movie, or set of them, that can be used to display other movies in a consistent and coherent framework. Because, in this scheme, content exists as Flash movies that may or may not also have associated data, every kind of information or, for that matter, any other kind of interactive entity is treated as a content item. Content items thus become the basic informational and functional structure of the network.

So the problem of how to get the right information to the right people in the right context becomes the more well-defined problem of routing and selecting content items for the users who want them at the time and place they need them. Routing and scheduling content then becomes the problem of characterizing content items such that:

1. Their similarity or differences could be measured; and
2. Their sensitivities to various contextual variables could be evaluated with regard to current context.

These content characterization needs are satisfied by defining a set of meta-data about each content item. This meta-data is declared in a mechanism called the content wrapper. The content wrapper structure is capable of characterizing any content item and each content item has an associated wrapper. The content wrapper enables content items of all sorts to be treated uniformly by the network. The network uses context sensitivity information in the wrapper to evaluate against the current context held in each device to establish the neediness of that content item. This neediness is translated and normalized by the scheduler into a probability for selection.

The network includes a context model that, among many other variables, evaluates current location. Location provides one component of context that affects the probability of selecting a content item, however, location is also treated as awareness content that each user can choose to expose to trusted friends. The network does not expose location in the form of coordinates, rather it uses abstracted locations that are named and categorized by users. This mechanism not only allows users to safely expose location information; it also extends the context model to take advantage of users' habits in the form of routinely visited locations that users can name. The habit model (another foundational mechanism) enables users to associate predefined generic categories, e.g., work, school, home, etc., to their named locations. These categories are defined so as to imply the functions and activities that take place at the associated locations. Content providers can include these categories in the wrappers of content items, thus setting functional context sensitivities for that content.

Thinking about content as movies naturally broadens to thinking about awareness in terms of other programmed and interactive media. This permits the extension of these different media paradigms and a more deep examination of their applicability to the handheld wireless environment. As a result, the network brings together multiple media paradigms in a single media system that has the ability to deliver all the forms of awareness that our research and analysis told us users needed.

8.B.1.e. Network Mechanisms Form A Foundation For The UI. The analyses of usage, the computational models and mechanisms, and the uniform treatment of content are all discussed here as a preface to the UI description because they are designed to enable all of the behaviors and interactions users need to accomplish with content items. As such, they form the foundation that determines the behaviors and interactions that the UI framework needs to support.

The network is a solution to the problem of supporting the awareness, connectivity, personal data, and entertainment needs of people who live increasingly mobile lifestyles. The network solution succeeds because: (a) its computational mechanisms behave in a manner fashioned to serve the needs of users as defined by front-end analyses about usage; and (b) it breaks down the problems associated with delivering awareness into manageable parts, each of which employ powerful models and efficient algorithms. Specifically the network incorporates:

1. A uniform model of content;
2. A powerful mechanism that can quickly calculate content similarity;
3. A powerful mechanism to predict the content that each individual user will want and need to see;
4. An elegant method to identify the contextual-sensitivities of each content item;
5. An elaborate model of context;
6. A factored and tractable method for computing the most needed content item at any given time; and
7. A constrained-random selection method that provides for variability in content selection and for accounting for the evolution of user interests.

The network provides individual users with an unprecedented level of awareness that is specifically tailored to them. It combines these awareness services with a range of communication capabilities, traditional personal data capabilities, and entertainment features. The network also incorporates, as an integral and inherent part of the way it works, the ability for its services and features to be extended indefinitely. These extensions simply come into the network as new content items and are accounted for within the uniform model of content. Finally, the UI delivers all of these services and features to users through a Flash-based user interface capable of rich graphics, animations, and sound.

The UI needs to preserve and to carry forward the behaviors enabled by the network mechanisms. It needs to create a framework that visually and interactively supports all the forms of awareness. It needs to integrate into this framework the capabilities for communication, search, reference, and entertainment. It also needs to provide for the extensions to services and features as more diverse and capable content items are developed. To accomplish this the UI needs to leverage the notion that content items are treated uniformly and embed this into the behavior and interaction models it defines.

8.B.1.f. High-Level Introduction to the Current UI. The challenges for the design of the UI are numerous. Major ones are listed below.

1. The UI incorporates rich graphics, but these graphics have to work effectively in a small-screen (320×240 pixel) hand-held device format.

2. The UI can provide a rich assortment of sounds and music but these must be managed across many usage situations that have sound conflict.

3. The UI must balance of use of rich dynamic graphics and sound across the spectrum of activities a user would be doing without overextending the processor, and thus degrading the user experience.

4. The UI must mitigate the user's perceptual motor limitations in controlling interactions with small format graphical objects. The manual controls need to take advantage of users' kinesthetic skills for gesturing with controllers.

5. The UI has to accommodate a set of new awareness services, and define new display techniques to support the effective and easy use of these services. These services incorporate aspects of interactive television, the world-wide-web, and dynamic billboards, but none of the UI paradigms for any of these are adequate for creating the network user experience.

6. The UI must integrate the awareness services with the wide range of other services it supports. User interfaces for these other services do exist to varying degrees in current cell phones that incorporate data services, PDA's, internet appliances, web browsers, and conventional desktop computing environments. But, the UI must establish a new interaction framework that is consistent, coherent, and integrated across all its functionality. It cannot serve the user well by establishing one interactive framework for the awareness services and another for its other services in the same UI.

7. The UI framework must accommodate continuous extensions to services and features incorporated into new content items.

For these reasons the UI had to be designed from a new perspective. Getting the UI for the awareness services right was imperative because these are the truly new services offered by the network. The UI could adopt successful interaction techniques and paradigms from other UI's, but only to the extent that they could be made to fit consistently with the UI for the awareness services.

The forms of awareness services that the UI needs to support were identified previously.

In the mobile environment, awareness about things close by (the first form) must adapt to changes in location. So, the set of content items that users are keeping aware of, changes. Also, awareness about things not around you (the third form) may become physically closer in the future because users change locations. Although in the mobile environment users want all four forms of awareness, the mechanisms to deliver the awareness are restricted by limitations of handheld devices, wireless connectivity, and transmission bandwidth. These restrictions further the need to have powerful mechanisms for predicting the content that each user needs to be aware of and for scheduling the presentation of the content with respect to each user's context.

In the network, the computational mechanism closest to the UI is the content scheduler that resides on each user's device. The content scheduler performs the computations that manifest the desired awareness behaviors of selecting the right content to send to the UI for the current context. The content scheduler is designed to meet the user expectations for awareness and it is the final process in bringing content and context together. Since the scheduler already incorporates and satisfies the behavioral criteria for meeting users' awareness needs, the UI has to establish a presentation and interaction framework that preserves and carries forward the behaviors from the scheduler to the UI without distortion.

Four major behavioral principles about awareness drive the scheduler and other network mechanisms, and in turn need to drive the behavior of the UI.

The first principle is that the most needed content would have the greatest probability of being selected for presentation. Need is computed based on several factors for each content item and normalized with regard to all content items on the scheduler. This computation accounts for several complex behaviors of content. For example:

1. Content that users need immediately, or in the very short term, can interrupt other content that is currently in the UI.

2. Content presentation repetitions are controlled to eliminate short inter-presentations times. When a content item has been presented its probability of being displayed again soon based solely on the fact that it was just presented is reduced to zero and then grows at a specified rate for a time to a nominal value. After a further time, if the scheduler has not selected it, its probability is increased again to a specified value above nominal.

3. System-level notifications and alerts are treated as content.

The second principle is that the system needed to actively push content to the user. That is, the network itself takes the initiative to drive the UI for the user. In this behavior, it is quite distinct from task-based systems that let users take the initiative and then respond to their actions. In total, because the network includes task-based features, the UI needs to work with a mixed initiative paradigm, driven both by the network and the user. The rationale for an active UI is twofold.

1. The active interface dramatically reduces the amount of attention users need to devote to the network (and the device) to get utility from it. In a mobile environment users will be doing other activities while they are engaged to various degrees with the network. The network is designed to be useful even when the user's attention is primarily elsewhere.

2. Merchant advertisements have to actively be presented rather than waiting for users to access them.

The third principle is that content items can provide users with continual and dynamically updated awareness of the information they choose. To accomplish this, content items can cause data channels to be established that periodically feed new information from the back end system directly to the content items that are visible on the user's screen.

The fourth principle is that all content is treated uniformly. In the network all content is routed and selected for presentation based on a common set of characteristics. The values of these characteristics for each content item determine where the content item is routed and how it behaves.

8.B.1.g. UI Constructs. The UI is based upon several fundamental constructs that provide for display of content items in accordance with the aforementioned principles. These fundamental constructs include:

1. Content items, and
2. A visual framework for the display and manipulation of these content items.

Content items are the most basic construct in the network and the UI. Content items represent unique pieces of content such as buddies, events, offers, games, news items, utilities, arrangements and other things that the user can manipulate, create, find, subscribe to, send and receive. They are described in detail in the following sections.

The visual framework provides various mechanisms for the display of and user interaction with content items. The visual framework consists of four layers that all work together to:

1. Allow users to rapidly switch between tasks without requiring all tasks to be running concurrently.

2. Utilize screen space as efficiently as possible due to the constraints of small displays on handheld devices.

3. Mediate processor utilization by managing user actions in an efficient manner.

Figure 12:
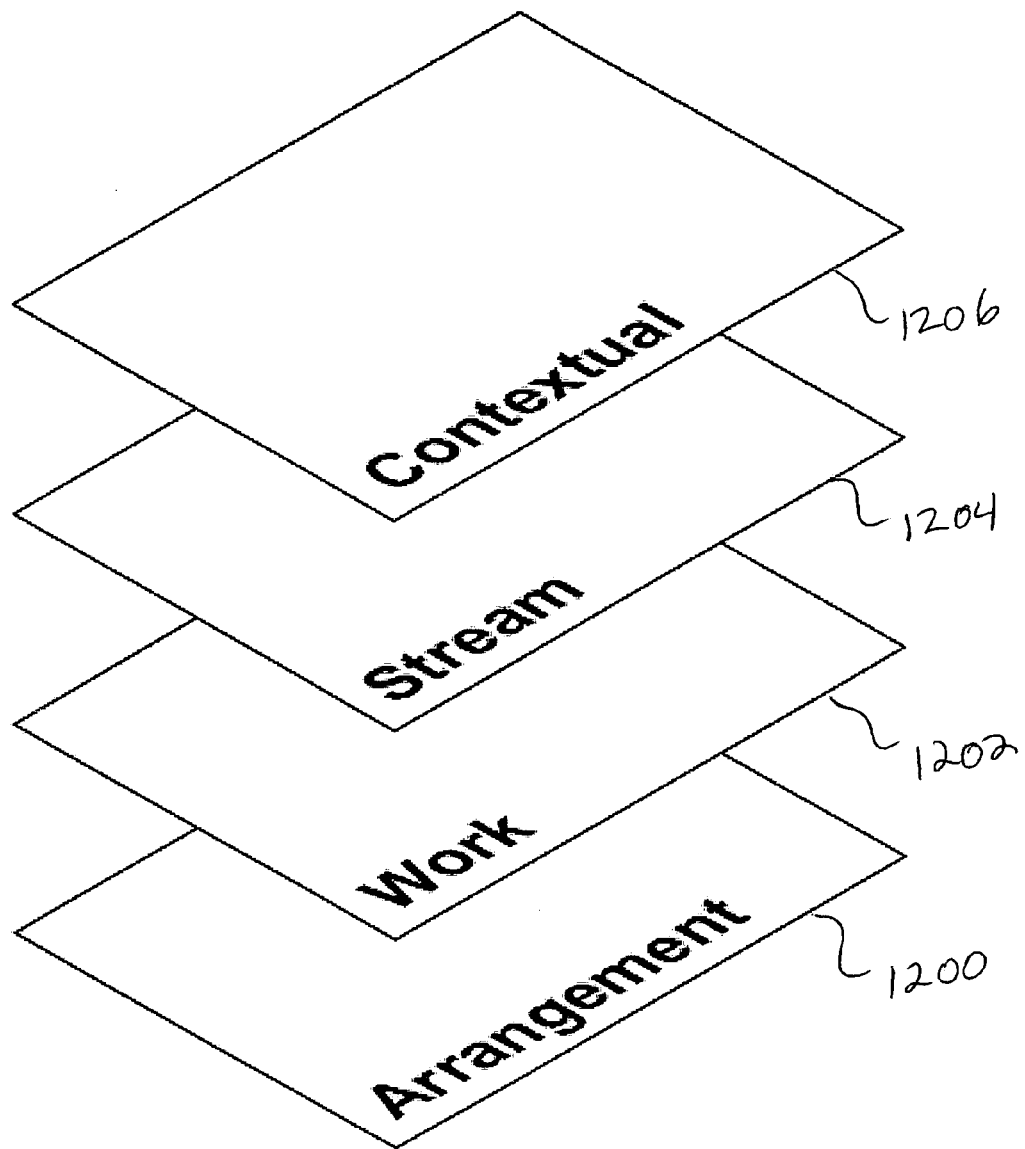
FIG. 12 is a layer diagram of the visual layers of the user interface according to the present invention.

Referring now to FIG. 12 in the drawings, the four layers are:

1. Arrangement Layer;
2. Work Layer;
3. Stream Layer; and
4. Contextual Layer.

The four visual framework layers are described in detail in the following sections.

These fundamental UI constructs unite the several major information/interactive media themes:

1. Active and transient presentation of content items (TV);
2. Context-based presentation of content (billboards and other targeted marketing, interactive and on-demand TV, program scheduling related to events);
3. Learning user preferences (Tivo, various web-based learning mechanisms);
4. Actively updated and ongoing presentation of user-selected content items (e.g., CNN-headline news and breaking news coverage except for the user-selected part); and
5. User defined hyper-linked-like navigation among context-based arrangements of content items (web navigation, favorites lists and bookmarks);

In addition to the fundamental constructs discussed above, the UI framework incorporates additional supporting constructs to assist and enable users to effectively use them. These supporting constructs are:

1. An arrangement construction mechanism;
2. An arrangement navigation (or switching) mechanism;
3. Contextual menus;
4. A mechanism to copy objects from one arrangement to another;
5. Various feedback cues, alerts, and notification mechanisms;
6. Search mechanisms; and
7. Various interactive elements for the user to manipulate objects and enter inputs such as a cursor, text fields, onscreen buttons, and physical input devices (keys, joysticks, and responder bar).
8. Control panels for setting UI and device preferences These supporting constructs enable users to perform the following basic operations:

1. Grabbing content items from the content stream to keep in awareness;
2. Constructing arrangements;
3. Navigating (switching) among arrangements;
4. Searching for content items; and
5. Interacting and performing tasks with content items.

8.B.2. Content Items (Awareness Items). Content items are the most basic construct in the network and the UI. Content items represent unique pieces of content such as buddies, events, offers, games, news items, utilities, arrangements and other things that the user can manipulate, create, find, subscribe to, send and receive.

Even though all content items are treated in a uniform manner by the network, content items exist in the UI as distinctly unique items that can have unique graphical and functional characteristics. There are mandatory visual states and properties for content items, and a set of optional visual states and properties that content developers can take advantage of if they choose.

Beyond a few basic operations, individual content items embed the functionality that determines what users can do with them. Some content items, such as those listed below, have been developed and are available from the network similar to the way a desktop operating system is delivered with some bundled applications like a text editor, a graphic file viewer and a web browser. However, content developers will be able to develop many diverse types of content items with functionality very different from existing content items. As long as these content items conform to the network rules for content, they will be handled transparently by the network and the UI. Putting the functionality into content items is the way by which the UI integrates awareness services with other capabilities such as communication, personal data functions, entertainment, and so forth, in a manner that is totally consistent with the awareness interaction framework. This approach also provides for seamless expansion of services and features.

8.B.2.a. Visual States. In the current implementation, content items can exist in multiple graphical states, similar to the way that a files exist in current operating systems such as Microsoft Windows, Microsoft WindowsCE, Apple MacOS or 3COM PalmOS.

Figure 13A:
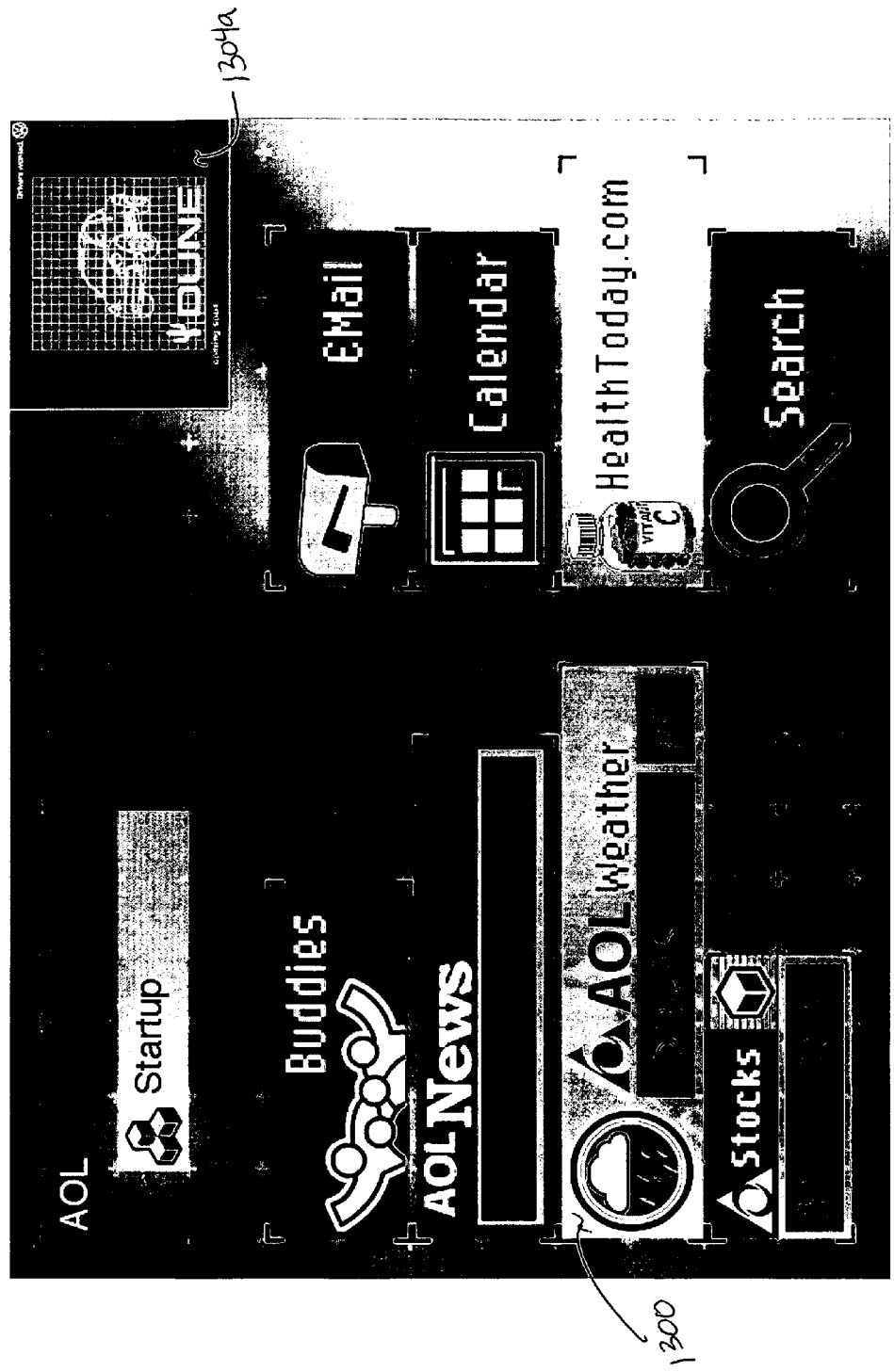
FIGS. 13A and 13B are screen shots of the user interface according to the present invention.

Referring now to FIG. 13A in the drawings, the first state is a small "minimized" state that is suitable for displaying the content item among a group of other content items, such as a list or other visual grouping. This is similar to an icon in the file system of the aforementioned operating systems. In this minimized state, the content item provides a graphical representation that allows for user manipulation of the item, such as selecting and moving the item, and that may display a small amount of static or dynamic information that is deemed important to the user. An example of a content item in this state is a weather item 1300 with a graphical representation that displays a selected city and its current temperature. This minimized state would not provide any mechanisms for changing the selected city nor would it consume unnecessary screen space to display less important information like barometric pressure. As such, it allows the user to maintain awareness of a desired piece of dynamic information concurrently with other content items that also provide awareness information without the need for the user to actively focus on, open, search for and acquire the information. This visual state is mandatory.

Figure 13B:
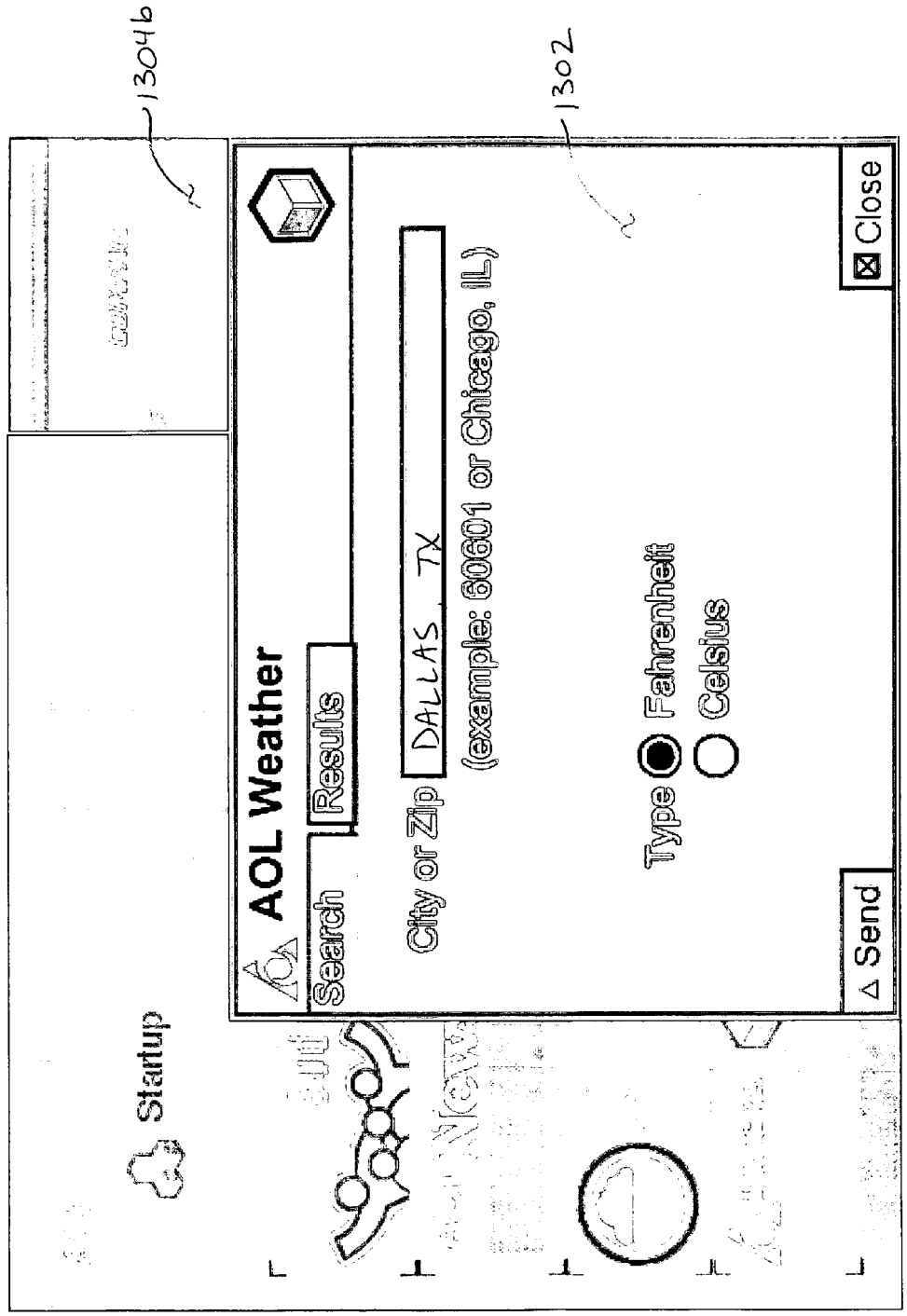

Referring now to FIG. 13B in the drawings, the second state is a "maximized" state that is suitable for extensive user interaction and the rich display of information. This maximized state is similar to the open or running state of files and applications on the aforementioned operating systems. This maximized state is displayed when the user launches or opens a particular content item, wishing to actively focus on and use the content item. Continuing with the previous weather item example, the weather item in the maximized state 1302 could provide a more extensive user interface a list of multiple cities for the user to choose from, controls for selecting which weather condition to be displayed in the minimum state (temperature, pressure, humidity, etc.), and a richer graphical display of all current weather conditions. In this state, the content item consumes much more screen space, but it is acceptable as the user chose to focus on this particular task and information. When the user is finished, the content item may be closed so that it no longer consumes screen space and the user can simply observe the information displayed in the minimized state when interested. This visual state is optional, but is necessary if the content developer wishes to provide anything other than an absolute minimal functionality of the minimized state.

Referring now to both FIGS. 13A and 13B in the drawings, the third state is a teaser or "trailer" that is used to attract the user's attention to the availability, importance or characteristics of the content item. There is no equivalent to this in the file systems of the aforementioned operating systems, but an equivalence can be illustrated with commercials on TV and the splash screens typically seen on electronic arcade games. Commercials on TV are typically short and are intended to entice the user into taking further action to view or purchase the product being advertised. In a similar way, the splash screens on electronic arcade games attempt to entice the viewer into stopping to play the game. This trailer state allows a small file to be transmitted over a low bandwidth network in order to entice the user to acquire the content item 1304*a*, 1304*b*, thereby completing the content package by acquiring the minimized and maximized states of the item. This visual state is optional.

8.B.2.b. Functional Types. Content items can be divided into several distinct classes based on their functionality:
1. People;
2. Events;
3. Awareness;
4. Utilities;
5. Controls and User Settings;
6. Finding and Searching;
7. Arrangements; and
8. Other.

8.B.2.b.1. People. A "people" item represents an entity (or contact) that is typically listed in a phone book or address book, such as a person or a business. A "people" item stores email addresses, instant message addresses for different messaging gateways (ICQ, AIM, MSN, etc.), phone numbers, physical addresses, and any other information that is pertinent to a contact, including system settings for when and how to notify the owner of the device about the status and whereabouts of the friend. An example of a minimized "people" item is content item 1800 in FIG. 18D for a person named "Sean."

8.B.2.b.2. Events. Event items are content items whose primary purpose is storing time and date information and associations. While any content item can have time associations that can be used to affect its display in arrangements with time association functionality, events are those that start life as a time and/or date related event. For example, user-created meetings, reminders or to do items that were created in a calendar arrangement. An example of a reminder alert 1804 for an event item is shown in the content stream 1802 in FIG. 18D.

Figure 18A:
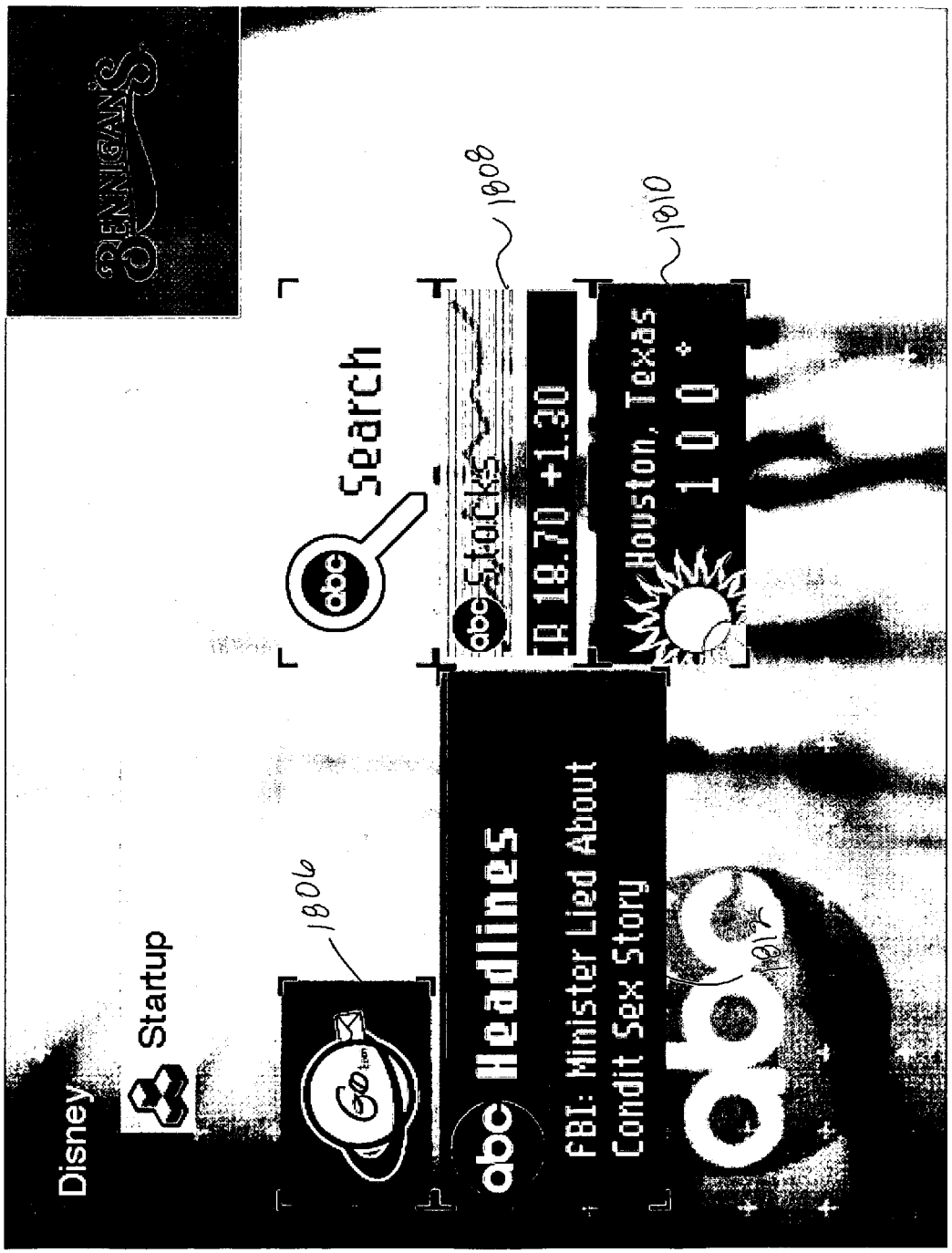
FIGS. 18A-18D are screen shots illustrating various arrangement items of the user interface according to the present invention.

8.B.2.b.3. Awareness. Awareness items are content items that obtain information on behalf of the user without user intervention. They include such things as the number of new messages in an email box 1806, stock quotes 1808, weather 1810, news 1812, sports scores, etc. as shown in FIG. 18A.

Figure 18B:
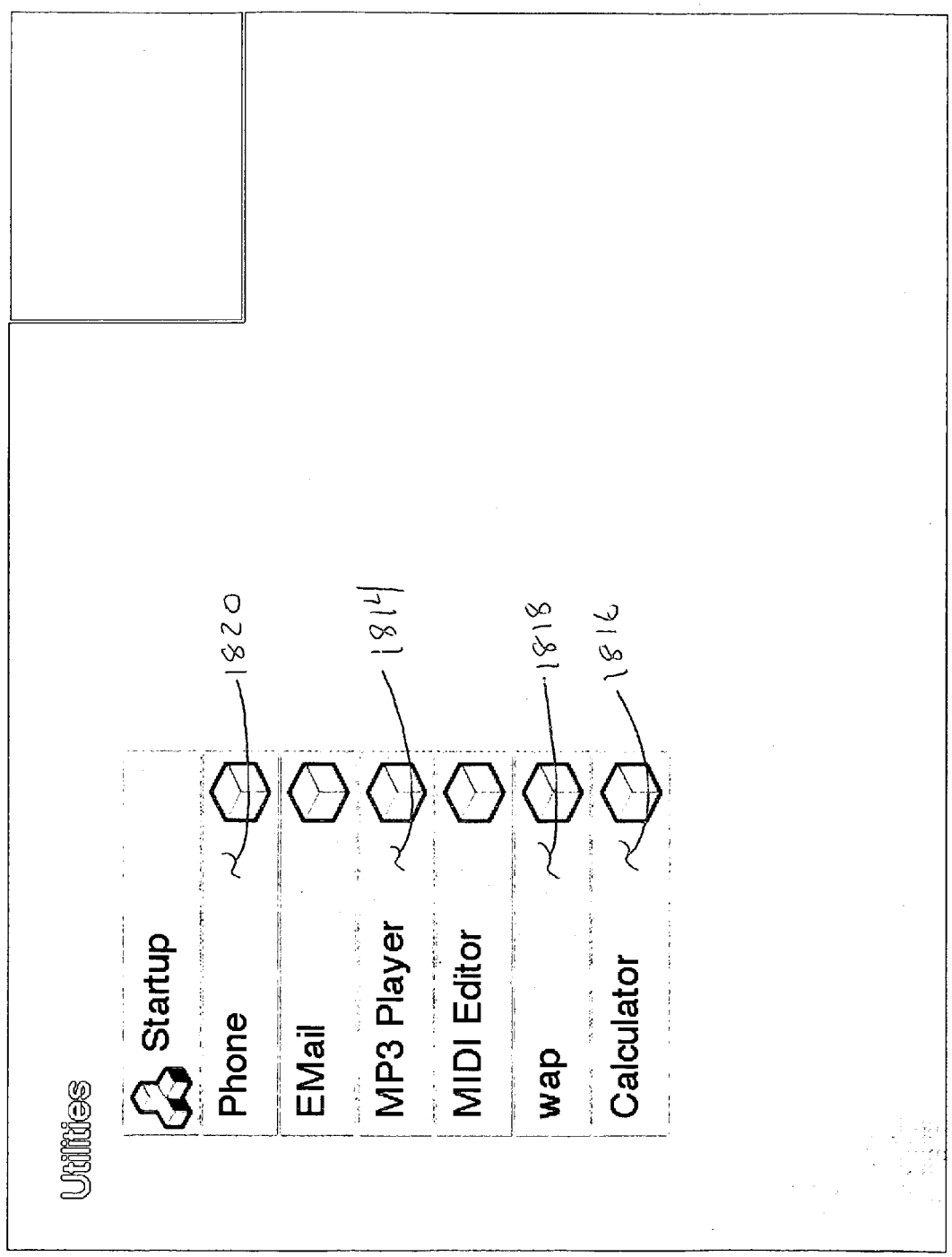

8.B.2.b.4. Utilities. Utilities are items that the user uses to change device settings and configuration. They include such things as audio players 1814, calculators 1816, browsers 1818, voice phone 1820, as well as system level things like software updaters and content downloaders as shown in FIG. 18B.

Figure 18C:
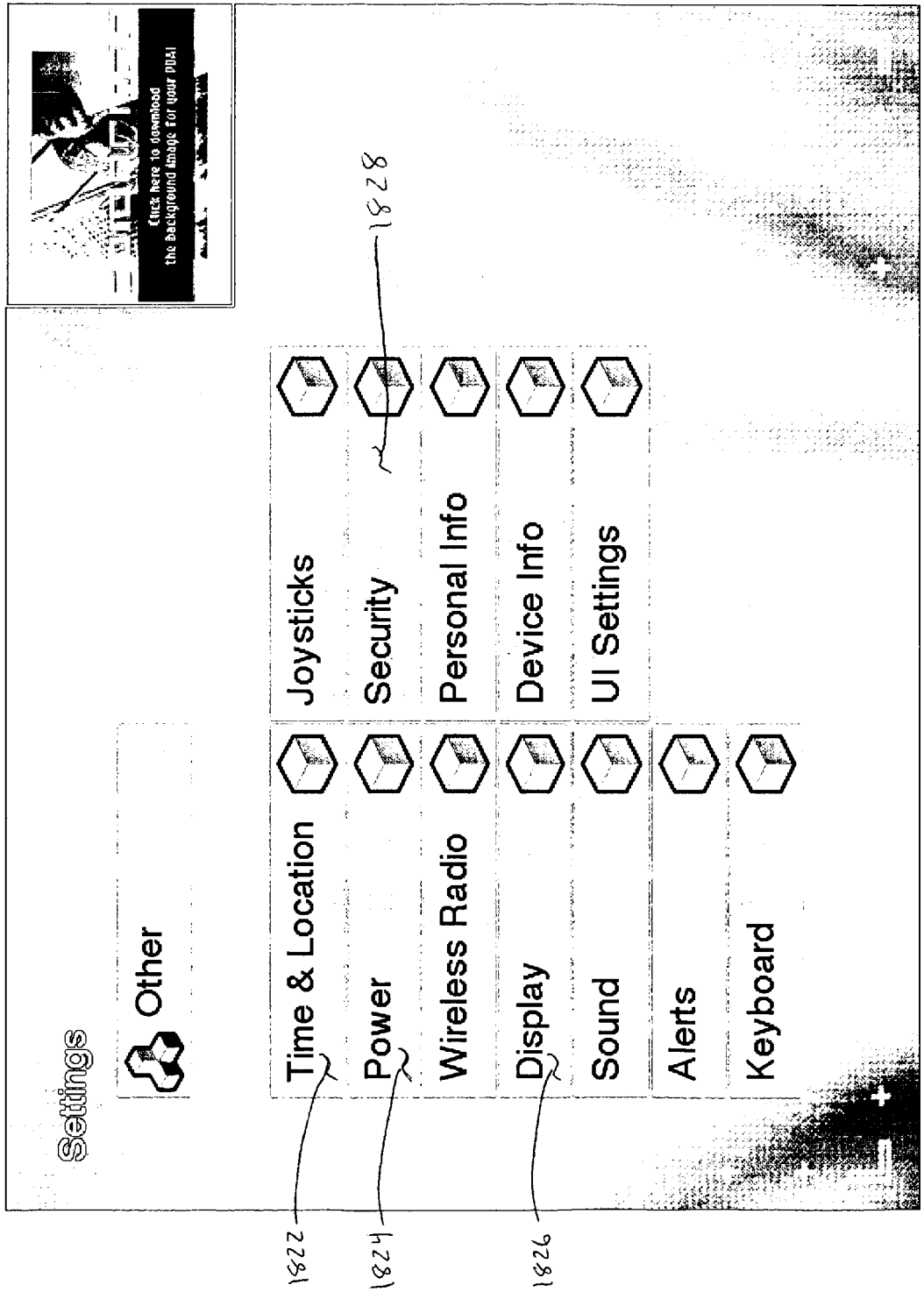
Figure 18D:
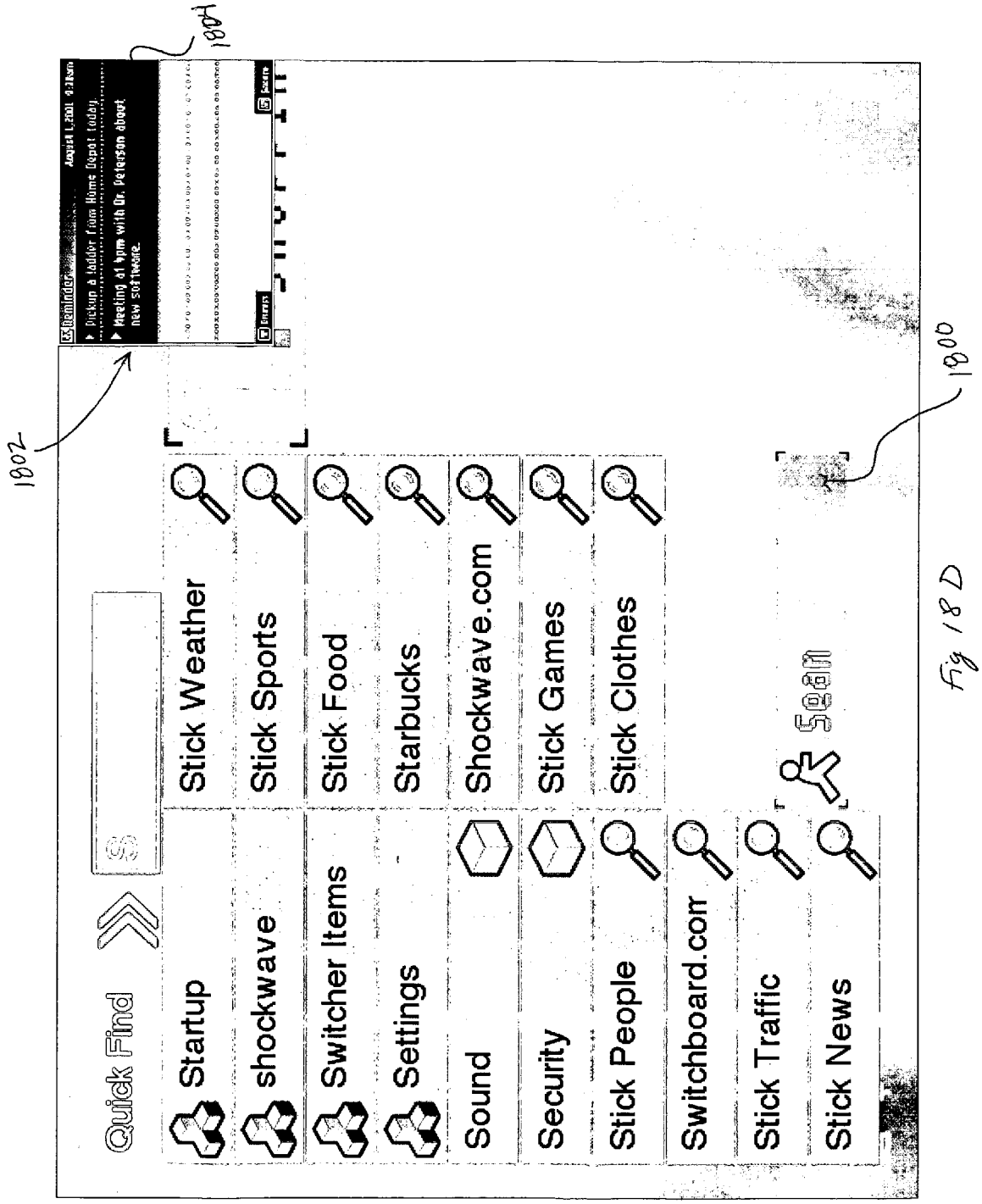

8.B.2.b.5. Controls and User Settings. Controls and Settings are items that the user uses to change the device configuration and settings. They include such things as time and location 1822, power management 1824, display settings 1826, security settings 1828, etc. as shown in FIG. 18C.

8.B.2.b.6. Finding and Searching. Finding and searching items are items that the user uses to locate and download other content items. For example, an item such as a weather item that pulls and updates the current weather for the user is an "awareness" item. If the user does not have a weather item, the user would have to use a find or search item to locate an awareness item capable of tracking the weather.

Find and search items would include such items as finding people, finding merchants, finding activities and events. Finding and searching can be done in three domains:

1. On the local device;
2. On the content network:
    a. From native network content; and
    b. From content acquired through external gateways; and
3. On the WWW.

8.B.2.b.7. Arrangements. An arrangement is a construct for displaying and organizing content items in their minimized states. An arrangement is an assemblage of zero or more content items whose association to the arrangement is either based on rules or an explicit inclusion by the user. A rule based arrangement collects and assembles specific content items and spatially organizes these items based on predefined rules (or queries). Arrangements based on explicit inclusion and spatial organization of content items by the user are termed user-defined or arbitrary arrangements.

Together with the content stream in the stream layer, arrangements provide users with the four forms of awareness in an integrated yet flexible way. An arrangement item contains the collection of content items (including other arrangement items) that constitute the information the user wants to be aware of or the activities the user wants to engage in at any given time.

Arrangements offer users great flexibility in constructing awareness environments that meet their individual needs. Users can define any number of arrangements and individual content items can be part of any number of arrangements. Providing for user-defined arrangements permits users to define to a large degree what their interfaces look like. The ability to nest arrangements within other arrangements creates association links between them giving users a lot of flexibility in setting up their own navigational paths. In this way, the set of arrangements taken together forms a heterarchical organization of content items. In contrast to hierarchies, heterarchies are able to be reflexive so that they can be reformulated in response to immediate and changing needs. They are also more easily able to accommodate organizations of heterogeneous objects.

Research shows that users will occasionally need to view homogenous collections of content items formed on the basis of inherent category membership, e.g., an arrangement of all people. Traditional business-related functionality found on PDA's and desktops is designed around access to homogenous sets of information, e.g., contact lists or address books, message lists, to do lists, event lists or calendars. These are very useful for reference, but they do not satisfy the need people have to be aware of various kinds of information, especially when the set of information itself needs to adapt in response to changes in the present context. At any given time users have the need to bring together collections of content that are diverse. Using arrangements manages to satisfy both with the same interaction model.

Examples of different functional arrangement items include:
1. Day—assembles items with a time sensitivity of a specified day.
2. Week—assembles items with a time sensitivity within a specified week.
3. Month—assembles items with a time sensitivity within a specified month.
4. Year—assembles items with a time sensitivity within a specified year.
5. Today—similar to "Day" arrangement, but the specified day is fixed to the current day.
6. Buddy List—assembles items with assigned instant messaging addresses.
7. Contact List (or Phone Book)—assembles all people items.
8. Phone Book—assembles items with assigned telephone numbers.
9. To Do—assembles event items with assigned to-do tasks.
10. Everything—assembles all content items.
11. All Arrangements—assembles all arrangement items.
12. Controls and User Settings—assembles all control and user setting items. A Controls and User Settings arrangement item is shown in the maximized state in FIG. 18C.
13. Find and Search Items—assembles all find and search items.
14. Utilities—assembles all utilities. A Utilities arrangement item is shown in the maximized state in FIG. 18B.
15. Storage Card—assembles all items on an external storage media such as a compact flash card.
16. Location—assembles all items with a location sensitivity at a specified location or within a specified area.
17. Arbitrary—assembles items that the user explicitly included in a user-defined arrangement item. An Arbitrary arrangement item is shown in the maximized state in FIG. 18A.
18. In Box—assembles people items with pending incoming instant messages.
19. Pending—assembles items with unacknowledged data such as an unfinished and unsent instant message that was interrupted by another incoming message.
20. Switcher items—assembles items that have been explicitly included in the switcher (see Contextual layer-Switcher below).
21. QuickFind—assembles items that have names that partially match a user specified string. A Quickfind arrangement item is shown in the maximized state in FIG. 18D, wherein content items beginning with the user-specified string "s" are assembled.

Arrangement items should not construed in a limiting sense to include only the functionality listed here. Many other diverse assemblages of items may be possible.

8.B.2.b.8. Other. Other items are content items that don't fit into any other particular pre-defined class.

8.B.3. Arrangement layer. Referring now to FIG. 12 in the drawings, the arrangement layer 1200 is a graphical layer for the display of maximized arrangement items. When a minimized arrangement item is maximized, it maximizes or opens into the arrangement layer. In the current embodiment, the arrangement layer can display one maximized arrangement item at a time. This is done for several reasons:

1. Because screen space is limited on small handheld devices, the amount of information that can be displayed is also limited.
2. Because maximized arrangement items display minimized content items that can provide dynamic awareness information, restricting the number of maximized arrangements limits the number of visible minimized content items that may be simultaneously competing for processor time and sharing network bandwidth.
3. By limiting the amount of information that can be displayed at one time, the amount of graphical "management"

that is required by the user is reduced. This is important because handheld devices typically have poor or clumsy input devices that make manipulation of items in a graphical interface difficult. In a windowing desktop interface, it is relatively easy to have multiple windows open and to move an obscuring window out of the way with a cursor controlled by a mouse to access information in an obscured window. But with poor and clumsy input devices and a lack of dexterity typically caused by the conditions of a mobile environment (standing or walking while using handheld device), this kind of interaction becomes extremely difficult.

4. By having a single maximized arrangement item at a time, a first maximized arrangement item can be minimized and a second minimized arrangement item can be maximized upon launching the second item. This helps automatically manage the interface elements for the user without requiring user intervention to close the first maximized arrangement item.

The arrangement layer should not be construed in a limiting sense, however, to displaying a single maximized arrangement item at a time. It should be understood that methods may be employed to allow the simultaneous display of multiple maximized arrangement items, such as an animated transition in which a first maximized arrangement item is replaced by a second maximized arrangement item by slowly panning the first arrangement item out of view while concurrently panning the second arrangement item into view. On devices that have larger or higher resolution displays, it should be understood that it may be possible to display several maximized arrangement items simultaneously in the increased screen space.

In the preferred embodiment, the arrangement layer is the deepest layer in the visual stack. This allows the user to have a partial view of awareness items in the current maximized arrangement item while working on maximized content items in the work layer or content items playing in the content stream.

Arrangement items can be created, opened (maximized), edited, closed (minimized) and deleted by the user. When an arrangement item is opened, its maximized state is displayed. Deleting an arrangement does not delete the content, but content may be directly manipulated through an arrangement.

The minimized state of an arrangement item should have a unique graphical representation that indicates that it is an assemblage of content items.

8.B.4. Work layer. The work layer 1202 is a graphical layer for the display of maximized content items, with the exception of arrangement items that maximize into the arrangement layer. When a minimized content item (other than an arrangement item) is maximized, it maximizes or opens into the work layer. In the current embodiment, the work layer can display one maximized content item at a time. This is done for several reasons.

In the current embodiment, the work layer lies just above the arrangement layer in the visual stack. This allows content items to be maximized into the work layer to obscure less important awareness items in the maximized arrangement item in the arrangement layer below. As stated below, in this scenario, user focus switches to the active task in the work layer and the other information becomes less important. However, many content items are designed to utilize only part of the screen space when maximized. This allows the user to still maintain some awareness of the content items in the arrangement layer below.

8.B.5. Stream Layer. The stream layer 1204 is a graphical layer for the display of the content stream. The content stream or "stream" is a construct that provides a continuous and sequential display of heterogeneous content items that are selected by the scheduler based on contextual relevancy. Content items may include offers, movies, games, warnings, alerts and other information that is contextually relevant to the user's location, time, habits and likes. The stream displays the trailer state of content items or the maximized state if no other states are available.

The stream lies in front of the work layer and can obscure both the work layer and the arrangement layer. The stream is variable in size from invisible to full screen, as is depicted in the progressive views of FIGS. 14A-14E, and can vary based on explicit user input or by programmatic control from the scheduler based on contextual relevancy of the current content item being displayed and on user interactions with other user interface constructs. By allowing the stream to overlap other user interface elements and because it is modeless in operation, the stream does not completely interrupt other tasks that the user may be focused on, nor does it force the user to acknowledge the content item or information that the stream is presenting. It is left to the user's discretion as to whether they choose to interact with the stream content or to dismiss it and minimize the stream, remaining in the same task they were in before the stream politely interrupted. The stream provides a more considerate method of information presentation than do the modal dialog boxes typically found in desktop operating systems that require the user to acknowledge them before returning focus to the previous task.

In the preferred embodiment, the stream layer can display a single content item at a time. This is done to make most efficient use of screen space on small displays and to mediate the processor usage which will increase with increased graphical complexity and item count. In addition, the user need not be inundated with information when the user's focus may be on other user interface elements.

The stream layer should not be construed in a limiting sense, however, to displaying a single content item at a time. It should be understood that methods may be employed to allow the simultaneous display of multiple content items, such as an animated transition in which a first content item is replaced by a second content item by panning the first content item out of view while panning the second content item into view at a relatively slow speed. On devices that have larger or higher resolution displays, it should be understood that it may be possible to display several content items simultaneously in the increased screen space.

| a. | Menus. | |
| b. | Pickers. | |
| c. | Alerts. | |
| d. | Switcher. | |
| | 1. | Features. |
| | 2. | Operation. |

The contextual layer 1206 (see FIG. 12) is a graphical layer for the display of modal user interface elements such as menus, pickers and the switcher. By using a visual layer separate from the arrangement, work and stream layers, it is possible to make use of the entire device screen rather than a small subset of it. This alleviates several developer problems:

1. When a UI element is placed close to the edge of a display screen, the UI element may expand when acted upon, but depending on the location of the element on the screen, the element may need to accommodate the placement and draw itself differently based on its placement. By using the full screen, the placement no longer is an issue and may be ignored. In addition, by using the full screen, a developer will typically have more screen space to work with. The developer is not limited by constraints based on its placement in the interface.

2. Can provide larger interface elements because screen does not need to be shared.

3. Take over input devices due to modal nature of contextual layer elements.

Typically, the actions that a user invokes from UI elements are modal. That is, a user must complete one action before performing another subsequent action. This allows UI elements to be exclusive in behavior and each use the full screen space available in the contextual layer.

8.B.6.a. Menus. Referring now to FIG. 15 in the drawings, a contextual menu is a list of actions that is hidden from view until the user wishes to invoke an action on a content item. A contextual menu 1850 lists all of the actions that are appropriate to invoke on a particular content item. To invoke a contextual menu, the user performs an action, such as clicking on a content item, and the system temporarily displays the menu 1850 for the user in the contextual layer 1206 (see FIG. 12).

Unlike desktop operating systems that rely on a mouse to move a pointer to select menu items, the interface of the present invention utilizes gestures on a joystick to invoke a particular menu item. It is possible to generate at least eight distinct gestures which allows for at least nine unique menu items when the central (neutral) position is included. This is illustrated in FIG. 19.

Contextual menus provide many benefits over always visible menus and toolbars:

1. No screen space is wasted presenting inactive menus and/or toolbars.

2. The graphical representations of content items may be made smaller because there is no need to display individual buttons that invoke actions on the content item. By interacting with the content item, a contextual menu may be opened, offering the user all relevant actions and operations for the item.

3. There is no need to maintain active/inactive state of visible menus, toolbar items or buttons on graphical representations of content items.

4. Many more menu items are allowed because there is no need to show all menu items at once. Only the menu items appropriate to the content item being acted upon need be displayed.

5. Less navigation is required to reach the menu. The user simply targets the content item to be acted upon and invokes the contextual menu from that same screen position.

8.B.6.b. Pickers. Pickers provide user interface elements for the selection of data from a list or range of data. Examples include:

1. A single selection list. This is the equivalent to a pop-down menu in Windows where the user selects a single item from a list of choices.

2. A multiple selection list. Similar to single selection list, but the user is allowed to select multiple items simultaneously.

3. A time picker. This is a mechanism for designating a specific time or time range between a specific start and end time.

Figure 16:
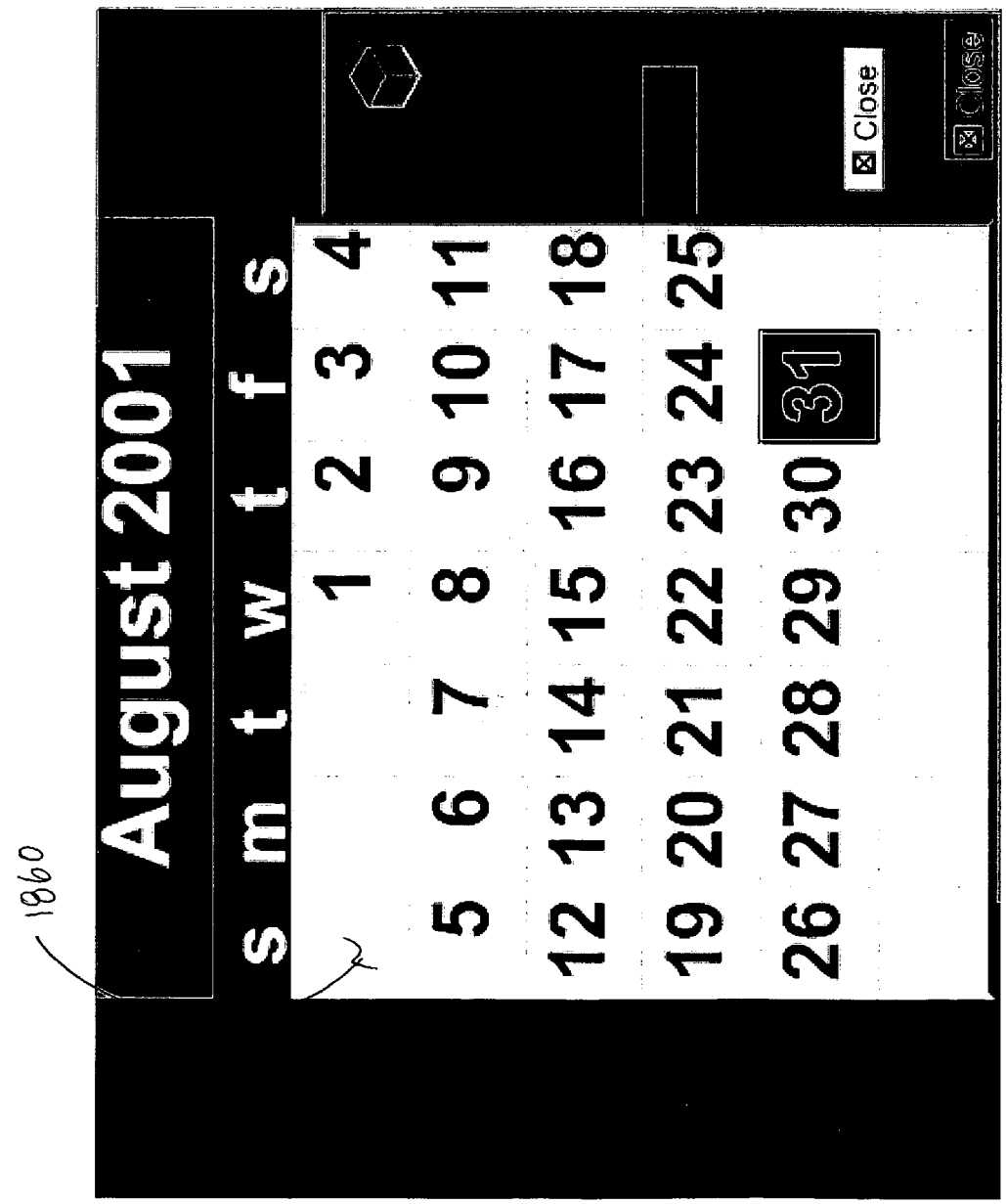
FIG. 16 is a screen shot of a date picker of the user interface according to the present invention.

4. A date picker. This is a mechanism for designating a specific date or date range between a specific start and end date. An example of a date picker 1860 is illustrated in FIG. 16.

By using the full screen of the contextual layer, graphically rich interfaces can be provided for these interface elements rather than simple text fields with arrows for incrementing or decrementing the field values, as is typically seen in many desktop applications.

8.B.6.c. Alerts.

8.B.6.d. Switcher. The switcher provides a quickly accessible method to maximize one of multiple pre-defined content items. The switcher is used as a rapid navigational tool to shift user focus from one content item to another content item.

Figure 17A:
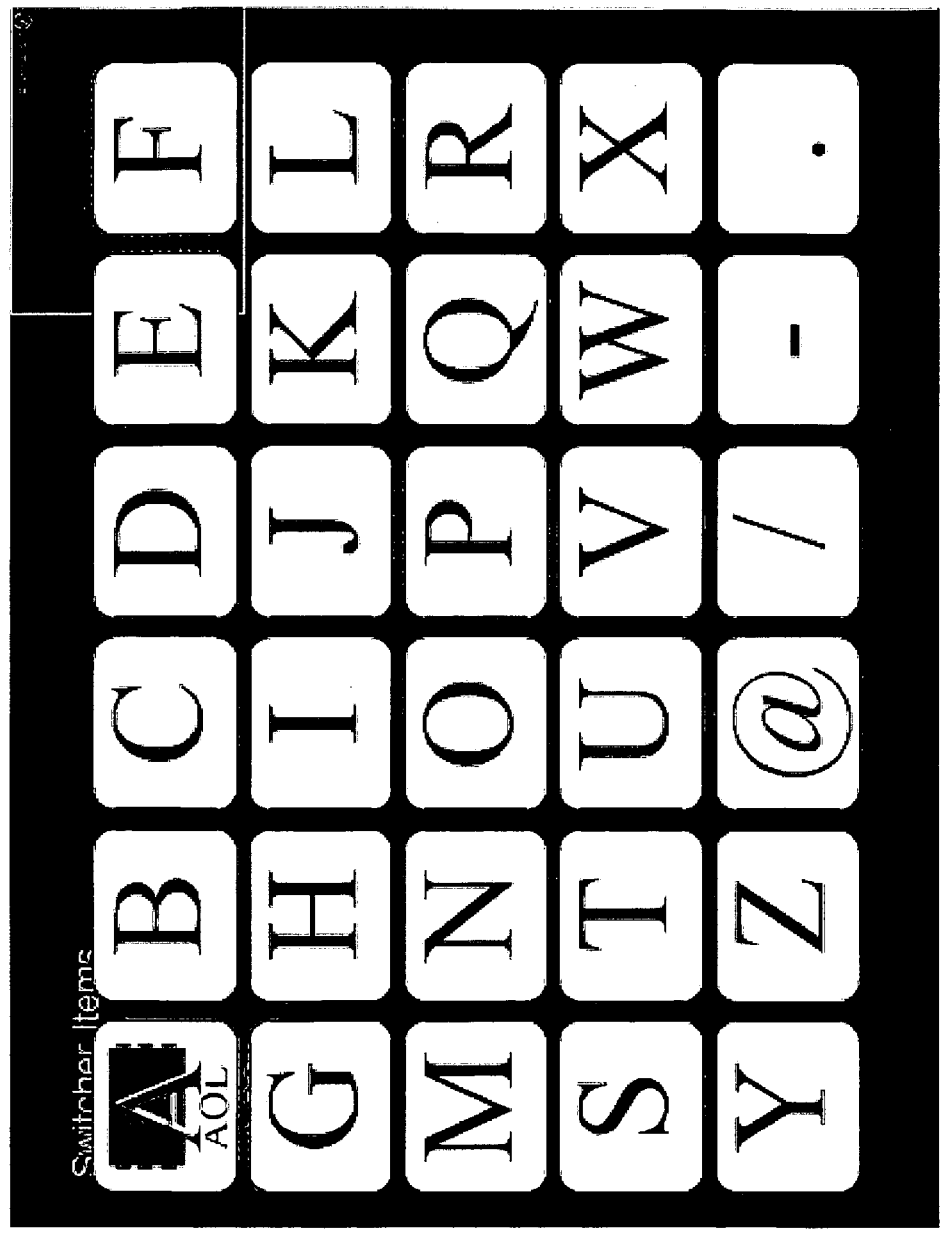
Figure 178:
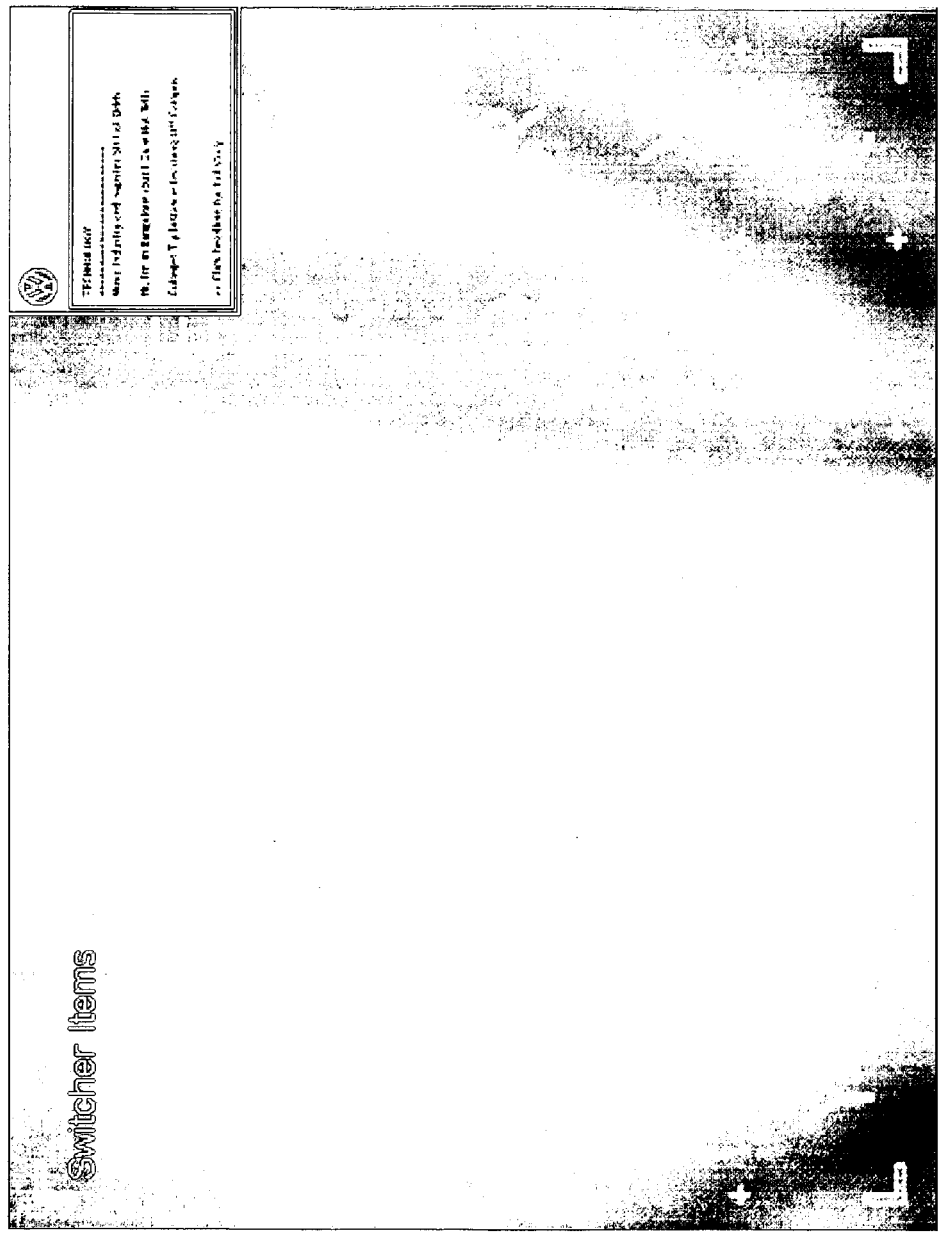
Figure 17C:
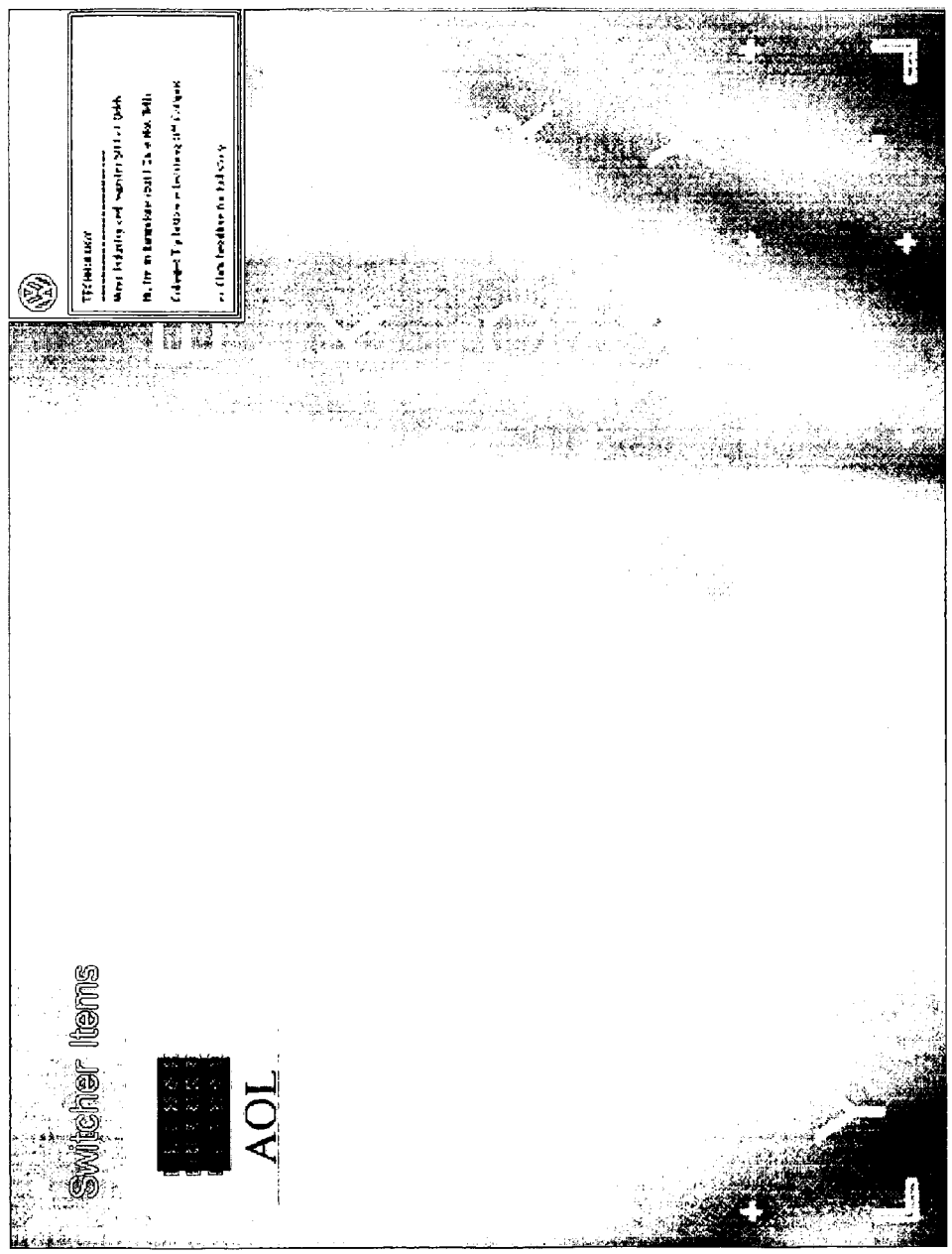
Figure 17D:
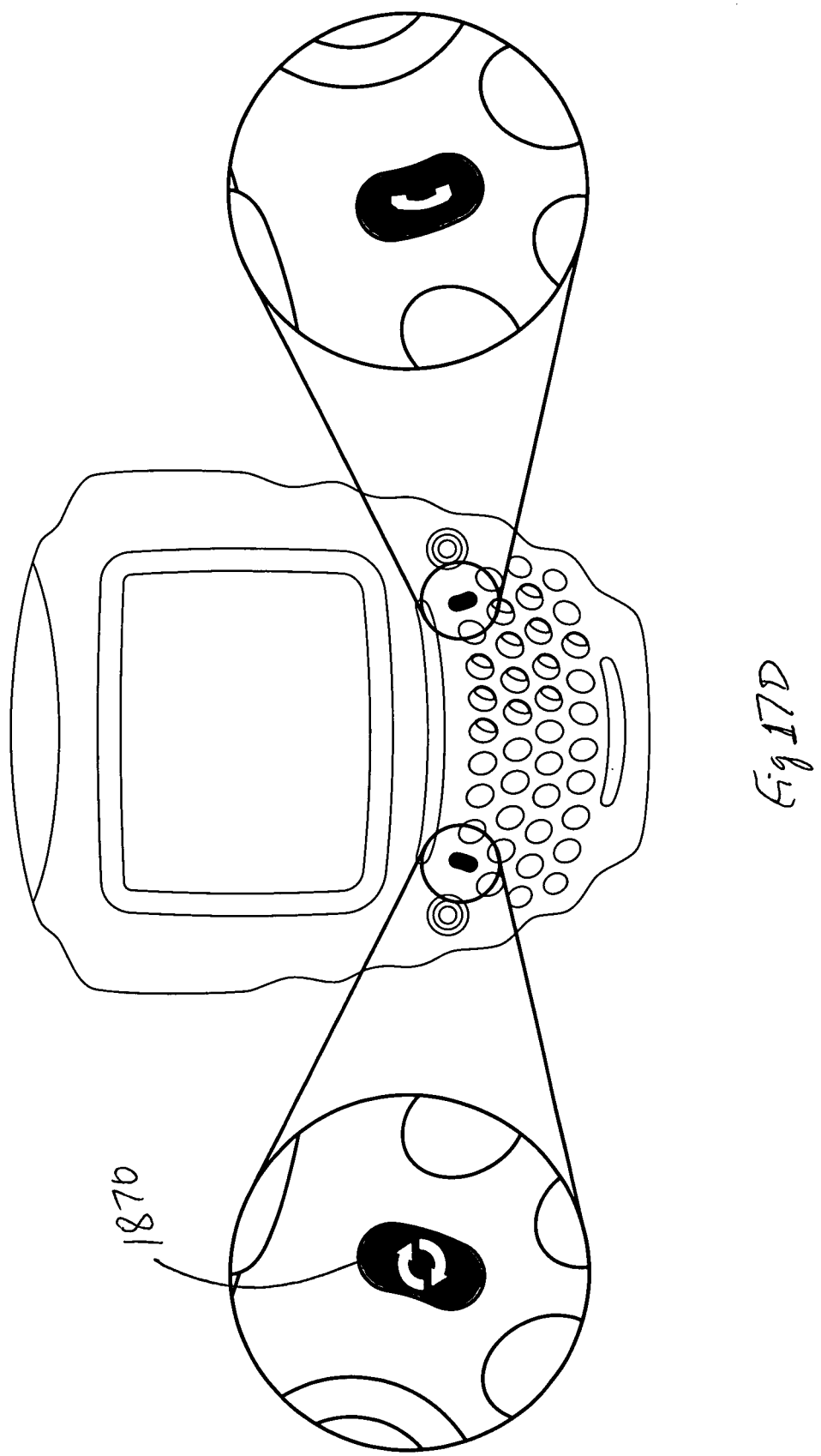
FIG. 17D is schematic illustrating user input devices for activating the contextual switcher of the user interface according to the present invention.

The switcher provides a dedicated mechanism that can be assigned to a hardware button, such as button 1870 in FIG. 17D or mechanism on a device to provide rapid access to frequently used content items.

8.B.6.d.1. Features.

1. Universal accessibility. The switcher should always be available for immediate access, regardless of current user focus. It should never be blocked by or buried under another non-temporal interface element including the stream, content pane or arrangement.

2. Single gesture access to the switcher. A dedicated key is always available to bring up the switcher, regardless of current user focus or context.

3. Use of joystick gestures for item selection. The layout and hierarchy of items should allow the use of gestures to select a specific item. The user should not have to use the cursor.

4. Temporal. The switcher exists on-screen only as long as it is required to select a content item or until it is dismissed or canceled by the user. The switcher should be hidden so that it does not take up any area on the "active" region of the screen.

5. Self-restoring state. The switcher is "stateless" in that selecting an item does not change the state of the switcher for subsequent accesses. In other words, if the switcher supports hierarchical ordering, accessing a deeply-nested item in the hierarchy does not require manual "clean-up" to restore access to the top-level.

6. Access to a completely user-configurable set of items. The user controls exactly what appears in the contextual switcher. Nothing is added to or removed from the contextual switcher during the course of normal usage, except as a result of explicit actions by the user.

7. Narrowness of focus. The switcher only contains items that exist as minimized content items such as people, events, settings, arrangements, etc.

8.B.6.d.2. Operation. The switcher can contain any minimized content item.

The switcher can be pre-loaded with content items that are part of the bundled distribution, such as brightness control, and volume control, day, week, month and year arrangement items, buddy list arrangement item, etc. These content items may be locked.

Can invoke the switcher and select items graphically with a cursor or can assign content items to keys to select them with a subsequent key press.

Content items are added to the switcher by explicitly adding them to the Switcher Items arrangement. This is shown in FIGS. 17B and 17C. Specifically, FIG. 17B illustrates the Switcher Items arrangement with no items included. FIG. 17C illustrates the same Switcher Items arrangement in which a content item has been assigned to the "A" position. FIG. 17A illustrates the contextual switcher as it appears in the contextual layer 1206 (see FIG. 12) after the item has been assigned to the "A" position.

8.C. UI (Alternate).

8.D. UI Audio.

8.E. UI Themes.

8.E.1. Demographically Configured. In accordance with the preferred embodiment of the present invention, the contextual user profile can have secondary uses, including determining the scheme, design, layout, and/or content of graphical user interfaces (GUI's) for the location-aware wireless communication appliances. The determination of a GUI which might be most pleasing and acceptable to a member may be determined by and based upon the location information and demographic information for that particular member. Data regarding regional or demographical preferences may be aggregated to determine the most appropriate GUI.

8.E.2. Personality Configured. Alternatively or additionally, a GUI may be determined, at least in part, by the personality of a particular member, based upon biographical, personal, and preferences data gathered for that particular member. Such data can be aggregated for a large number of users to determine the types of GUI's that are most pleasing to those types of members.

8.F. Rating Mechanisms. As mentioned in Section 3.C., ratings enable the network platform to tune the selection and scheduling of content to each individual user's likes and needs. This tuning is the benefit accrued by the user for making the effort to rate content. However, rating is always an optional activity. See Sections 3.D., 6.B.2., and 8.A. for further details on the influence of ratings on content selection and scheduling.

8.F.1. Explicit Methods. One method of acquiring ratings is by collecting explicit input form each user with regard to presented content. As content is presented, users are provided with the opportunity to rate the presented content. Nominally, the content item currently being presented in the Stream is the focus for the rating. The opportunity to rate is provided unobtrusively and is a natural way of interacting with the system. Because the Stream is generally continuous, the opportunity to rate content items is also generally continuously available.

The system is also inquisitive and can actively make inquiries of the user. For example, a content item may ask the user a generic question such as "Do you like pizza?" A question of this sort can act as a mentor to the selection of other more specific content items related to it, e.g., an offer from a specific pizza restaurant. The inquisitiveness of the system is inherent in the manner in which content items are scheduled. The Inquisitiveness manifests itself in a conversational style that can be used to initiate a dialog-like interaction with the user.

A mechanism used to collect ratings explicitly from users is an analog responder mechanism that enables the user to make a choice among a one-dimensional spectrum of inputs ranging from unfavorable to favorable. The spectrum of choices can be continuous or discrete, in which case the analog nature of the response is approximated. The analog responder mechanism can be enabled in hardware, software, or some combination of both. In any case, the analog responder mechanism is made readily available to the user when needed and can register a rating with a single input action from the user. Section 11.A.3. provides a detailed description of this mechanism.

8.F.2. Implicit methods: An alternative method of acquiring ratings is by implicitly gathering information about user behaviors with regard to content and automatically assigning ratings on the basis of the behaviors. For example, the degree to which a user interacts with a given content item, either in terms of duration, or breadth and depth of exploration, can be collected and used to assign a rating, i.e., the greater the interaction the more favorable the rating.

8.F.3. Forgetfulness. Ratings of specific and prototypical content, whether obtained from explicit or implicit methods, provide information about each user's likes and dislikes in an ongoing way. Over time, ratings will tend to narrow the scope of content a given user sees by increasingly biasing the selection of content toward what the user is known to like. This tuning is desirable, and it adapts well to changes in a user's taste in the favorable to unfavorable direction. However, it is also desirable for the system to be able to adapt to changes that are in the unfavorable to favorable direction. To accomplish this, the system incorporates a forgetting mechanism. Ratings lose their strength with time. The longer the interval since a rating was collected the lower its influence over content selection will be.

8.F.4 Contextually Situated Ratings. Context can be a major factor in the utility or desirability of content. For example, an offer for a free cup of coffee may be very welcome and useful on the way to work in the morning, but not late at night at home. To account for the impact of context on preference, ratings are collected with time and location associations. Thus, a user's preferences relate to both the characteristics of the content and the context in which it is used. This can tailor the presentation of otherwise not time/space context sensitive content to appear in the context which received higher ratings.

8.F.5. Ratings of people. People are represented in the system as content items. Users can rate these "people" content items. In doing so, users establish relationship links that enable the ratings that other users give to content items to influence their own content selection and scheduling. See section 3.I. and 6.B.3. for further details.

8.F.6. Ratings Accumulation. Multiple ratings are taken over time of a given piece of content which are accumulated into the current rating. In the preferred embodiment of the present invention, user ratings range from −5 to +5 and are accumulated in a way that weights newer ratings more highly. Example of ratings accumulation:

$$\text{Existing\_rating\_weight} = e^{-Age\_of\_last\_rating\_in\_days}$$

$$\text{Adjusted\_rating} = \frac{\text{Existing\_rating\_weight} \times \text{Existing\_rating} + \text{This\_rating}}{\text{Existing\_rating\_weight} + 1} + \frac{\text{This\_rating}}{10}$$

8.F.7. Rating summary points. The following points summarize the rating system of the subject invention:
 a. A user's profile is represented as a set of preference ratings to content items;
 b. Ratings help to tune content selection and scheduling;
 c. Ratings may be acquired through explicit (user specified) or implicit (behaviorally derived) methods;
 d. Users can input ratings using a responder mechanism that includes a spectrum of value choices (either in analog or discrete form);
 e. The influence of ratings dissipates with time;
 f. Ratings are associated with the context in which they are acquired; and
 g. People (represented by content items) can be rated, and such ratings can be applied to broaden the content selection and scheduling process.

8.G. Inquisitiveness. Inquisitiveness in the form of a content item that embeds a question that is rated was discussed briefly above. However, the mechanisms and techniques of inquisitiveness have broader application and are discussed in greater detail here. In accordance with the preferred implementation of the present invention, location-aware wireless communication appliances D1, D2, D3, D4, and D5 are systems which initialize and configure themselves through highly anthropomorphic dialogs between appliances D1, D2, D3, D4, and D5 and the corresponding users. In this manner, appliances D1, D2, D3, D4, and D5 can generally be considered "plug and play" in their ease of use during the initialization and configuration operations. The following is a discussion of an exemplary or illustrative dialog between appliance D1 and the user during the initialization and configuration.

As discussed briefly above, the user may also be "profiled" by network 11 through direct interaction, preferably through highly anthropomorphic dialogs between network 11 acting through the particular location-aware wireless communication appliance D1 and the user. In other words, the dialog will appear to the user to be a dialog with a human. In order to enhance this illusion network 11 may assign a name, identity, communication style, and even a personality type to the dialog. In accordance with the preferred embodiment of the present invention, network 11 includes a number of software agents that operate to initiate a dialog or interleave a series of questions which are utilized by network 11 to gather certain types of information about each particular user. Such dialog or series of questions will be referred to herein as "inquisitiveness." The information may include biographical data, which relates only to a particular user; demographic data, which may, in aggregation, provide generally useful information to network 11; and preferences data, which provides very particular information about each user, but which may also be aggregated in order to provide high-level information which may be useful to network 11.

In accordance with the preferred implementation of the present invention, this inquisitiveness takes the form of a highly human dialog between one or more particular software agents running on network 11 and the particular user. The series of questions or dialogs may be interleaved or dispersed among or between other types of communications and/or digital content. In other words, there is no requirement that the user be subjected to an experience similar to responding to a written questionnaire or responding to an interrogation. In sharp contrast, in accordance with the preferred implementation of the present invention, the questions may be spaced out over a relatively long time interval, for example, many months, and presented in a manner which is not offensive, burdensome, or taxing to the user; but which instead may take the form of interesting dialogs or exchanges between network 11 and the user. The inquisitiveness experience may become even more interesting and rewarding to the user when an identity and/or personality is assigned to the inquisitiveness software agents operating to obtain the information. Also, in accordance with the preferred embodiment, there is no requirement that the information be gathered in any particular order; therefore, each user may have a unique experience in terms of dealing with or responding to an inquisitive questioning or dialog initiated by the software agents operating in network 11. Over relatively long time intervals, however, the same types of information can be amassed for each particular user.

FIG. 1E is a simplified table representation of some types of basic information that can be aggregated or assembled for a particular user. In FIG. 1E, three broad categories of data are shown: biographical data 151, demographic data 153, and preferences data 155. For each broad category 151, 153, and 155, three columns of exemplary data are illustrated: a data element column 157, a confidence column 159, and a correlation column 161. Data element column 157 contains particular data elements. Confidence column 159 contains either a quantitative or qualitative determination by the software agent of a confidence level in the accuracy of the data element. Correlation column 161 contains either a quantitative or qualitative record of an internal cohesiveness or coherence of the data element as determined through dialogs or inquiries specifically utilized to uncover inconsistencies or incongruities in the data elements.

Broad categories 151, 153, and 155 may each have subcategories. For example, biographic data category 151 may include the following subcategories: name subcategory 163, gender subcategory 165, age subcategory 167, and ethnic background subcategory 169. As is shown, data element column 157 contains the data element "Sue" in name subcategory 163, the data element "female" in gender subcategory 165, the data element "13" in age subcategory 167, and the data element "Chinese-American" in ethnic background subcategory 169. In this example, confidence column 159 includes a qualitative confidence determination of the accuracy of the data elements. As is shown, confidence column 159 contains the qualitative determination of "High" for the data element "Sue" in name subcategory 163 and for the data element "female" in gender subcategory 165; but only the qualitative determination of "Medium" for the data element "13" in age subcategory 167 and for the data element "Chinese America" in ethnic background subcategory 169. Thus, at the time of the example illustrated in FIG. 1E, network 11 has high confidence in the name and gender information, but only medium confidence in the age and ethnic background information. In this example, correlation column 161 includes a qualitative determination of the relative correlation of the data elements. As is shown, correlation column 161 contains the qualitative determination of "Yes" for the data element "Sue" in name subcategory 163, for the data element "female" in gender subcategory 165, and for the data element "13" in age subcategory 167; but the qualitative determination of "No" for the data element "Chinese American" in ethnic background subcategory 169. Thus, correlation column 161 indicates that the name, gender, and age data has been correlated through different queries and that they are coherent or cohesive; but that the ethnic background data has not been correlated, resulting in some uncertainty as to this data element. In practical terms, this type of determination is consistent with someone having a dual ethnicity, such as a "Chinese-American."

Continuing with the example of FIG. 1E, demographic data category 153 may include the following subcategories: culture subcategory 171, region subcategory 173, and likely family income subcategory 175. As is shown, data element column 157 contains the data element "American" in culture subcategory 171, the data element "East Coast" in region subcategory 173, the data element "High" in likely family income subcategory 175. In this example, confidence column 159 contains the qualitative determination of "High" for only the data element "East Coast" in region subcategory 173; but only the qualitative determination of "Low" for the data element "American" in culture subcategory 171 and for the data element "High" in likely family income subcategory 175. Thus, at the time of the example illustrated in FIG. 1E, network 11 has high confidence in the region information, but only low confidence in the culture and likely family income information. As is shown, correlation column 161 contains the qualitative determination of "Yes" for the data element "East Coast" in region subcategory 173; but the qualitative determination of "No" for the data element "American" in culture subcategory 169 and for the data element "High" in likely family income subcategory 175. Thus, correlation column 161 indicates that the region data has been correlated through different queries and that it is coherent or cohesive; but that the culture and likely family income data have not been correlated, resulting in some uncertainty as to these data elements.

Preferences data category 155 may contain information on the particular likes, dislikes, and preferences for a particular user. In the example of FIG. 1E, preferences data category 155 may include the following subcategories: action movies subcategory 177, hip-hop music subcategory 179, and clothing from The Gap subcategory 181. As is shown, data element column 157 contains the data element "High Interest" in action movies subcategory 177, the data element "Low Interest" in hip-hop music subcategory 179, the data element "High Interest" in clothing from The Gap subcategory 181. In this example, confidence column 159 contains the qualitative determination of "High" for the data element "High Interest" in action movies subcategory 177 and for the data element "High Interest" in clothing from The Gap subcategory; but only the qualitative determination of "Low" for the data element "Low Interest" in hip-hop music subcategory 179. Further, correlation column 161 contains the qualitative determination of "Yes" for the data element "High Interest" in clothing from The Gap subcategory 181; but the qualitative determination of "No" for the data element "High Interest" in action movies subcategory 177 and for the data element "Low Interest" in hip-hop music subcategory 179. Thus, in the example of FIG. 1E, the user has a "high interest" in action movies, and this information has been accorded a "high" confidence level, but which has not been correlated through other queries or interaction. Additionally, the user has a "low interest" in hip-hop music, but this information has been accorded a "low" confidence level, and there has been no correlation through other queries or interaction. Additionally, this particular user has a "high interest" in clothing from The Gap, with a high confidence level for this data, and verification of the information through correlation with other queries or other interaction.

As is evident from the example of FIG. 1E, a great deal of information can be gathered relating to a particular user. In practice, there may be thousands of data elements which are determined over a relatively long interval of time through repeated, interesting, highly-conversational, and anthropomorphic interaction between network 11, operating through location-aware wireless communication appliance D1 and the user. In this manner, the user can be modeled quite accurately and extensively. This modeling information can be very useful to a service provider for network 11, and for any affiliated entities. Such entities may include non-profit community entities, but may also include for-profit enterprises which provide goods or services to the users of network 11. Having a great deal of highly-accurate, detailed information, relating to the user's schedule-location, personal information, demographic information, and particular preferences can be highly advantageous for tightly focused, narrowcasted advertisements or solicitations. This type of focused advertising has been determined by experts to be extremely effective. However, the goals of the present invention are not entirely commercial.

This type of information is also useful in allowing adolescents to identify others with similar or different backgrounds, habits, likes, dislikes, and other preferences. This is useful in establishing a network of friends and acquaintances, and is especially useful in building "community" through the network established utilizing the location-aware wireless communication appliances D1, D2, D3, D4, and D5. For adolescents, there is generally high interest in such community activities.

Figure 3A:
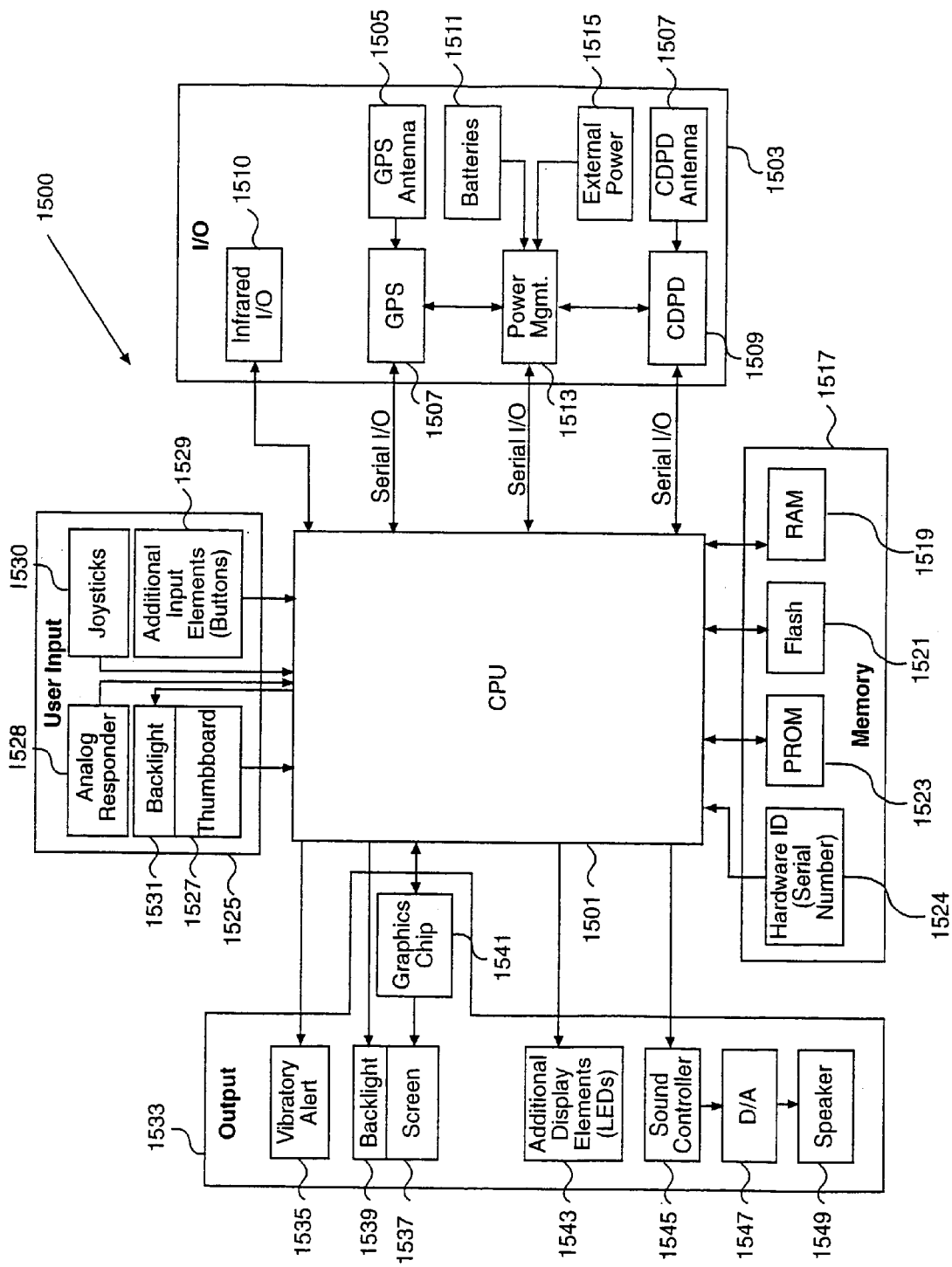
FIG. 3A is a block diagram representation of a low-cost version the appliance of FIG. 1A.
Figure 3B:
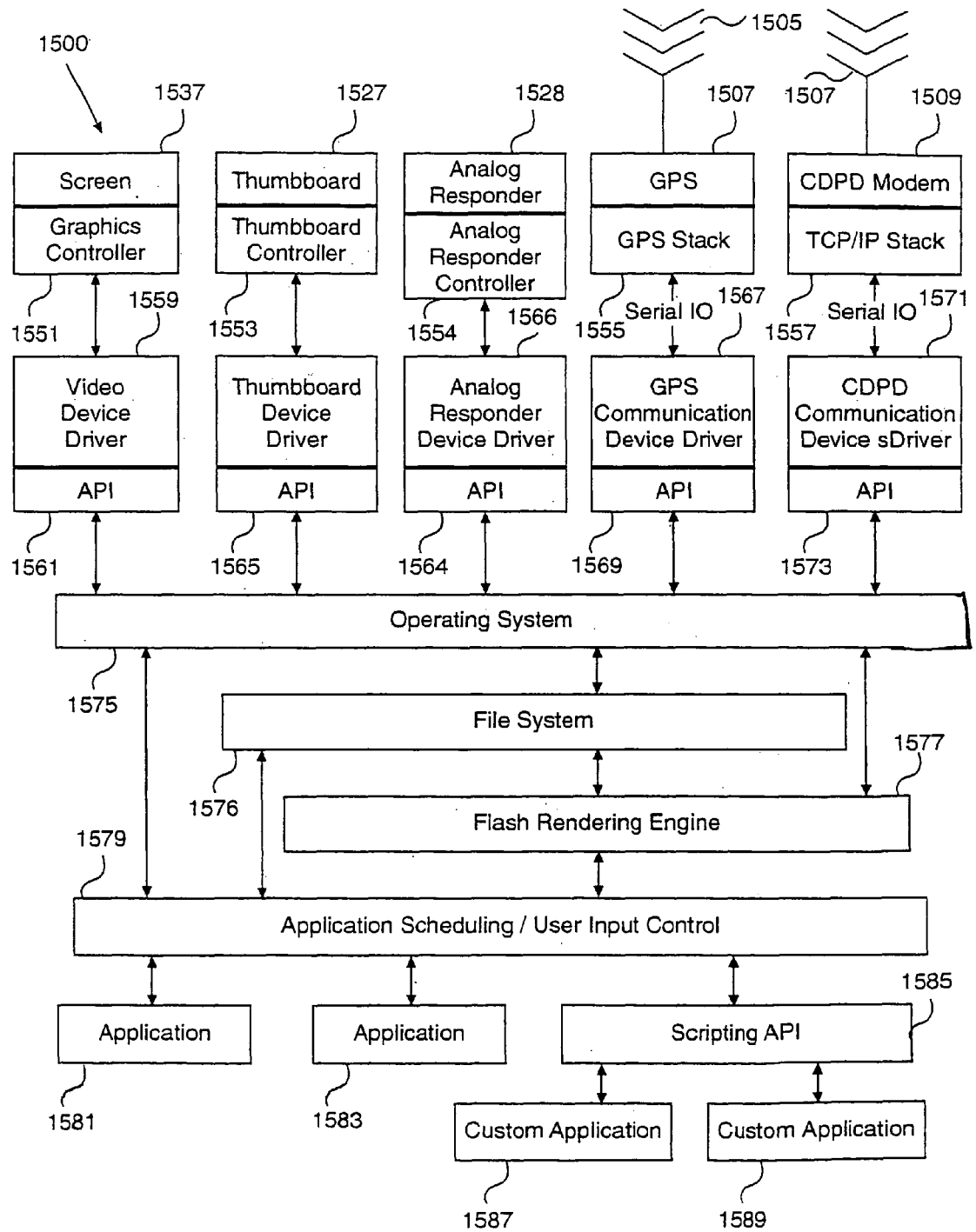
FIG. 3B is a block diagram representation of a preferred operating system of the appliance of FIG. 1A.

8.H. Prioritized Interrupts. Referring now to FIG. 3B in the drawings, a block diagram representation of the preferred operating system for the appliance of the present invention is illustrated. As is shown, a graphics controller 1551 serves to manage the digital content displayed on display screen 1537. A thumbboard controller 1553 is dedicated for controlling the operation of thumbboard 1527. An analog responder controller 1554 is dedicated for controlling the operation of analog responder 1528. A GPS stack 1555 is associated with GPS module 1507 which transmits and receives GPS data and information from GPS antenna 1505. A TCP/IP stack 1557 is associated with CDPD modem 1509 which transmits and receives CDPD data through CDPD antenna 1507. A video application program interface (API) 1561 is associated with a video device driver 1559 which is communicatively coupled with graphics controller 1551. A thumbboard API 1565 is associated with a thumbboard device driver 1563 which is communicatively coupled with thumbboard controller 1553. An analog responder API 1564 is associated with an analog responder device driver 1566 which is communicatively coupled with analog responder controller 1554. A GPS API 1569 is associated with a GPS communication device driver 1567 which is communicatively connected via a serial input/output port to GPS stack 1555. A CDPD API 1573 is associated with a CDPD communication device driver 1571 which is communicatively coupled via serial input/output to TCP/IP stack 1557. API's 1561, 1565, 1569, and 1573 are communicatively coupled to an operating system 1575. Joysticks 1530, sound controller 1549, and additional input elements 1529 may be associated with comparable API's and device drivers.

Operating system 1575 is preferably a conventional operating system, such as ThreadX available from Express Logic, Inc., which has been ported to function with CPU 1501, and which has been customized to function on network 11. A conventional file system 1576, preferably FileX available from Digital Filing Solutions, Inc., operates in conjunction with operating system 1575 and manages data and files on appliance 1500. In accordance with the preferred implementation of the present invention, a Flash rendering engine 1577 is communicatively coupled to operating system 1575 and file system 1576. It is preferred that the dynamic user interlace (DUI) is predominantly a series of Flash movies, graphics, or animations which are rendered or displayed on display screen 1537 and adapted to provide information to the user in the form of messages or other communications, and to receive input from the user from either thumbboard 1527, analog responder 1528, joysticks 1530, or additional input elements 1529. As is shown, an application scheduling module 1579 is provided for application scheduling and user input control. A plurality of applications, such as application 1581 and application 1583, may be running simultaneously on appliance 1500. Application scheduling module 1579 manages applications 1581 and 1583 by allocating system resources so that network 11 and appliance 1500 function properly and efficiently. A scripting API 1585 may also be provided in communication with application scheduling module 1579. Scripting API 1585 manages and controls a plurality of custom applications, such as custom application 1587 and custom application 1589.

8.I. Messaging Centric Network System with Low Latency. In accordance with the preferred implementation of the present invention, messaging functions are accorded a primary status within the network and device operation. Accordingly, interrupts within the device which are associated with external communication are given a priority of operation over other applications which are running locally within any particular location-aware wireless communication appliance. This results in a low latency in communication.

8.J. Suspend/Resume of Awareness Subscriptions.

9. Refresh

Section 3.E describes various types of awareness that the platform provides. This section describes an awareness mechanism that has been developed for enabling users to keep aware of the current status and changes in data of interest to them. Data of interest could be about a wide range of things, e.g., stock prices, sports scores, weather, airline flights, news headlines, the nearest coffee shop, the abstracted location and messaging availability of a friend, and could be generated from a wide range of sources. The awareness mechanism uses a subscription model.

The platform provides services that can establish subscriptions to dynamic data sources that require periodic updates to be sent to the device in a timely manner. The subscription mechanism is hidden from users in that the content item on the client that displays the dynamic data itself automatically establishes a connection with the server.

Content providers publish data by sending it to the platform where it is trans-coded into an appropriate format, if necessary, and stored. Users can also publish, with selected authorizations, data related to them, e.g., abstracted location.

Content items that contain viewers for data and that have the ability to set up a connection to the platform server and subscribe to the data it is intended to display are made available to users. Users can obtain these content items by grabbing them from the stream in the UI or by conducting a search for them. In either case, once the user saves the content item on the device the data connection is automatically set up, and the most recent data on the server is sent to the device and displayed in the content item.

See Section 7.B.2. for a discussion of subscription suspend and resume mechanisms.

10. Network

10.A. Packet data. The present invention preferably utilizes a CDPD protocol for the communication of digital content. However, it should be understood that network 11 may be adapted to utilize other communication protocols, such as the 3rd Generation (3G) protocol supported by the consortium led by AT&T and Ericson, other protocols supported by other wireless communication consortia, Global System for Mobile Communications (GSM), General Packet Radio Service (GPRS), and/or other global standards.

10.A.1. CDPD.

10.A.2. GPRS.

10.B. Gateways. In accordance with the preferred implementation of the present invention, one or more modes of communication which are possible utilizing network 11 and appliances 351, 353, 355, 357, 359, or 361 may be integrated with the e-mail and/or instant messaging functions of either or both of America Online, ICQ, and/or MSN and others.

11. Device

11.A. Hardware.

11.A.1. Physical configuration. Until now, handheld, wireless devices have primarily been used for person-to-person communication by voice, transmitting and receiving voice data in real-time. These "mobile phone" devices have allowed users to go wherever they like and still be in touch with their friends and colleagues just as though they were using a wired phone at home or work. Communication by textual means, such as e-mail, has been performed almost exclusively over land-based copper and fiber optic phone lines, because the wireless communication networks have simply not had the capacity or capability to provide cost effective, wireless transmission of textual data. However, recent advancements in wireless technology have made it possible to provide cost-effective data transfer over existing wireless networks.

The most common means of textual communication has been e-mail, but a relatively new form of messaging called "instant messaging" (IM) has caught on and has grown very rapidly in popularity in the last several years. Unlike e-mail which sits in an electronic mailbox until the user retrieves his or her e-mail messages, IM occurs nearly instantaneously, producing a notification and a dialog box on a user's screen alerting the user that the user has an incoming message. In addition, users have the ability to know if the recipient is on-line and available to receive am IM message.

Many handheld, wireless devices are beginning to provide access to e-mail, but their functionality is currently very limited. The user is usually limited to browsing, that is receiving and reviewing the information, not authoring and sending data. Much like retrieving voice messages from a voice mailbox, the user is only able to retrieve e-mail messages from their e-mail in-box. The primary reason is that authoring messages requires a convenient method of alphanumeric data entry. Users are hesitant or reluctant to enter a message if the data entry process is slow and difficult. This is a problem that conventional devices cannot properly address due to user interface limitations, i.e., the capabilities, design, and layout of the physical devices. While e-mail may require entry of a moderate length message in response to a received message, such data entry usually happens at a time the user deems appropriate and convenient, not at a time dictated by the sender of the message. This is very much like the user being able to periodically check voice messages in a voice mailbox, and respond at the user's convenience.

IM, however, is more real-time and intrusive than e-mail, the same way that an incoming phone call is more real-time and intrusive than checking voice messages. IM is a much more frequently accessed and used system than an e-mail client; therefore, IM requires a network and appliance that are much more convenient to use than an e-mail client. Such a level of convenience has been possible with wired connections and desktop computers. With traditional desktop computers, the computer is placed on or near the work surface and the display and keyboard are easily accessible. The user can immediately see incoming IM messages presented on the display, then respond to the IM messages using the keyboard. The user does not have to remove a device from the user's belt clip or pocket and open the device to see the IM message. Neither does the user have to then locate a work surface for support and connect a peripheral keyboard in order to compose a response.

To be convenient for IM, a device must be able to support effortless reading of incoming IM messages and rapid entry of responses. Such support minimizes the inconvenience of the intrusion of the IM message. The device should allow a minimum amount of effort to perform the tasks involved when using IM. An ideal IM device requires the following unique and distinct features:

1. A display that is always visible. If, for example, the device must transition from a closed state (maximum portability) to an open state (maximum usability), the display should be visible in each state. Users are very intolerant of a device that must be opened and closed each and every time am IM message or notification occurs. Ideally, the display should be large enough and have the capabilities to display both textual and graphical information, allowing for a rich presentation of information;

2. A data entry means that is large enough for human hands and that is designed for rapid entry of moderate length alphanumeric messages;

3. An overall size which allows the device to be operated, ideally, with one or two hands, and which makes the device convenient for portable use; and 4. A design that allows the user to quickly interact and perform minimal responses to incoming IM messages, even if the device is in a closed state.

In order to be appropriate for mobile use, the device should be small and convenient to carry and use. For this reason, the features listed above are typically mutually exclusive. There are a variety of devices available that are capable of providing wireless access to textual information, such as mobile phones, PDA's, handheld computers, and two-way pagers, but the compromises in all of their designs limit their suitability as IM devices. For some of these devices, the displays are always visible and easy to see, but the device lacks an input device, has a small and inappropriate input device, has a slow and error prone method of data entry, or requires additional peripheral devices and a work surface for support. For other devices, a suitable input device is present, but the device transforms between multiple states which prevent the display from being seen in one of the states, limiting the convenience of using the device on a frequent basis.

Conventional wireless communication devices can be categorized into several distinct configurations:

1. Mobile phones, commonly known as "cellular phones;"
2. Personal digital assistants, commonly referred to as PDA's;
3. Handheld computers, commonly referred to as palmtop computers; and
4. Two-way pagers.

The configuration of a mobile phone typically consists of:
1. A small display that is always visible;
2. A keypad for numeric data entry; and
3. An internal communication module that can transmit and receive analog and/or digitized voice data.

The mobile phone configuration has the following disadvantages:

1. The display is typically very small and inappropriate for display of large amounts of textual data. They are typically proportioned for one or two rows of phone numbers and proper names, not textual data in the structure of a written sentence;
2. The keypad is commonly located adjacent to the display, increasing the overall size of the unit;
3. On some units, the device has a clamshell design that obscures both the keypad and display when closed;
4. The keypad is typically a twelve-digit keypad designed for numeric data entry, although the keyboard usually supports alphanumeric character entry for the purpose of entering proper names into an address book maintained in the phone's memory. The commonly used method of accessing alphanumeric characters is to switch the device into a text entry mode, then press a key repeatedly to access a particular one of a subset of characters available for each key. This method is extremely slow, awkward, error prone, and is not appropriate for a device intended to transfer textual data on a regular basis; and
5. The communication module is typically engineered to support voice communication, and in only the latest device versions, limited retrieval of alphanumeric data.

The configuration of a PDA typically consists of:
1. A large display that is always visible;
2. A touch screen and stylus for data entry;
3. No keyboard for data entry; and
4. No internal communication module.

The PDA configuration has the following disadvantages:
1. The device has no keyboard, so alphanumeric data entry is usually performed in one of two ways: (a) the user taps with a handheld stylus on a "soft" keyboard that is drawn on the display, or (b) the user writes on screen with a handheld stylus and the processor converts the user's writing into text data;
2. An optional detachable keyboard may be available, but the keyboard usually requires a flat surface for support during use as it is tethered to the device by a cable or attaches in such a way that it will easily become detached if tilted. This makes the keyboard extremely awkward for use in one hand while on the move; and
3. The device lacks a communication module. Modules may sometimes be added, but at the expense of consuming the port available for connecting the optional keyboard to.

The configuration of a palmtop computer typically consists of:
1. A large display screen;
2. A complete keyboard;
3. A clamshell design where the display closes over the keyboard, or a flat layout where the display is located adjacent to the display; and
4. No internal communication module.

The palmtop configuration has the following disadvantages:
1. The clamshell design renders the display non-visible when the device is closed. The clamshell design affords protection to the display and keyboard when the device is closed, but is not adequate for frequent presentation of information to a user on the move; and
2. The relatively large size makes the device prohibitive for use as an IM device. When a large display and keyboard are present, the device becomes inconvenient for the user to carry on a regular basis. When the device dimensions are reduced to yield a more convenient size, the usability of the display and keyboard are greatly reduced.

The configuration of a two-way pager typically consists of:
1. A small display screen;
2. A small, complete keyboard; and
3. A flat layout where the keyboard is located adjacent to the display, or clamshell design where the display folds over the keyboard when closed.

The two-way pager configuration has the following disadvantages:
1. Units with a flat layout have displays that are always visible, but to keep the overall device size down, the display and keyboard are reduced to minuscule dimensions which greatly reduces their usability; and
2. Units with a clamshell design, render the display non-visible when the unit is closed, adding inconvenience when the user must look at the display.

The distinction between each category of devices is blurring daily, but a trend is very evident in all the previously mentioned devices. The devices are either:
1. Designed primarily for voice communication and have limited alphanumeric entry capability, or a capability that is not suited to use in your hands while on the move; or
2. Designed primarily for occasional retrieval and display of textual information and have a design that is very inconvenient for frequent input and viewing of data while on the move.

The present invention is a new and improved configuration of a handheld, wireless communication device that overcomes the limitations of current handheld, electronic devices that serve or can be adapted to the purpose of bi-directional, wireless communication of textual information. The appliance of the present invention is a small, electronic device that can be held and operated with one or two hands, in a convenient and comfortable manner under usage conditions typically encountered with a mobile phone device. In addition, the appliance is configured such that it can be held and minimally operated in one hand. The appliance has a display screen, preferably color, capable of displaying textual and graphical information, and an input device that allows rapid and comfortable entry of alphanumeric data. The display may be protected by a cover made of either a rigid or flaccid material to afford protection from damage. The cover may be of a material such as a clear plastic or rubber that allows the display to remain visible even when covered. The appliance transitions between at least two states, each of which allows viewing of presented data, and acknowledgement of and response to received messages.

One device state maintains a small footprint, whereby the device consumes a minimal amount of volume and affords a greater level of portability and concealment, hereafter called the "closed" state. A second device state affords a more efficient level of alphanumeric data entry, hereafter called the "open" state. The device can transition from the open state to the closed state easily and with a minimum of effort, preferably with one hand. In the preferred embodiment, the appliance's display remains visible in either state, allowing the user to observe incoming messages without having to manipulate the device to transition it from one state to another, such as from closed to open.

The appliance of the present invention comprises at least the following components:

1. An alphanumeric input device, such as a keyboard or thumbboard;
2. A display device, such as an LCD, LED, or LEP display screen;
3. A processor;
4. A power source, such as a battery or mechanical generator like a wind-up spring mechanism;
5. A wireless communication module, such as a CDPD, CDMA, or GSM modem; and
6. A body consisting of at least two distinct parts—one containing the display device and one containing the input device, the remaining required components may be located in either or both of these two parts.

Figure 2A:
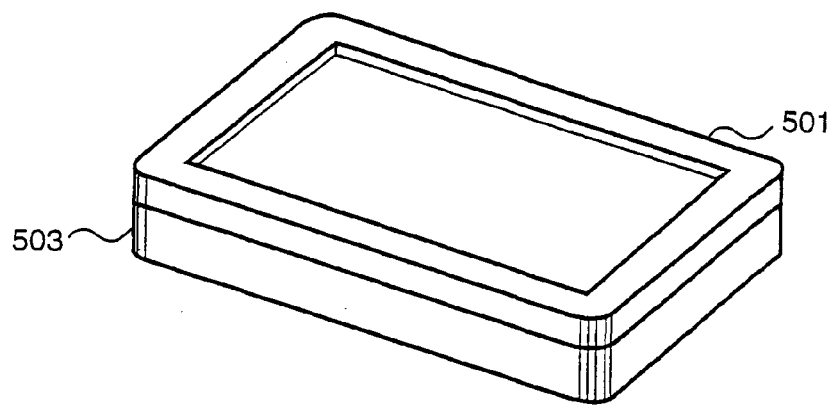
FIG. 2A is a perspective view of a simplified representation of the appliance of FIG. 1A having a constantly visible display that translates relative to a body portion.
Figure 2B:
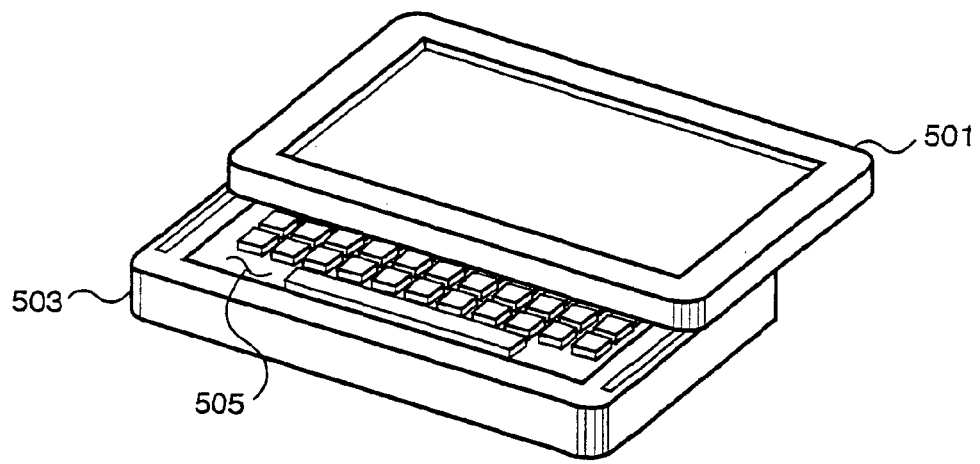
FIG. 2B is a perspective view of the appliance of FIG. 2A depicting how the constantly visible display translates relative to the body portion to expose a keyboard or other data input devices that are integrated into the body portion.
Figure 2C:
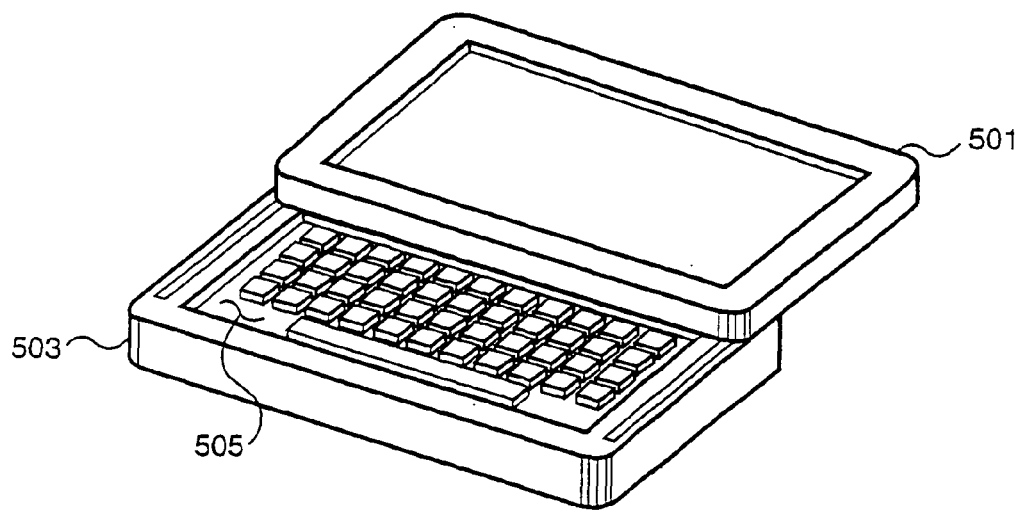
FIG. 2C is a perspective view of the appliance of FIG. 2A with the constantly visible display in a position which fully reveals the keyboard or data input devices.
Figure 2D:
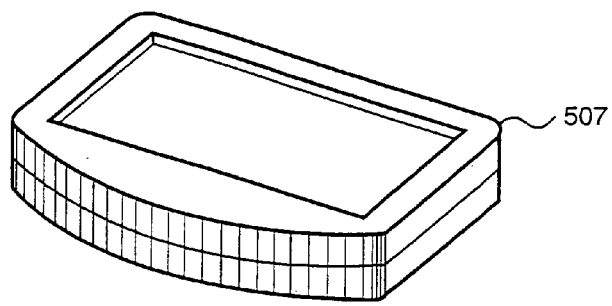
FIG. 2D is a perspective view of an alternate simplified representation of the appliance of FIG. 1A having a constantly visible display that pivots relative to a body portion to reveal a keyboard or other data input devices that are integrated into the body portion.
Figure 2E:
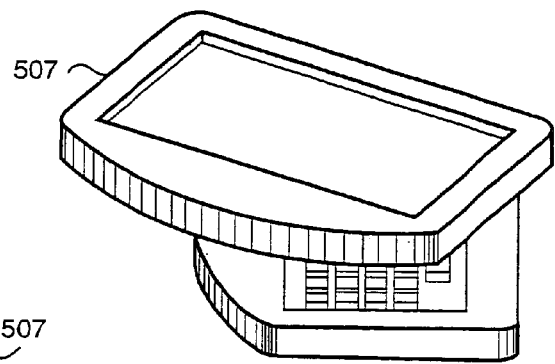
FIG. 2E is a perspective view of the appliance of FIG. 2D depicting how the constantly visible display pivots relative to the body portion to reveal the keyboard or other data input devices.
Figure 2F:
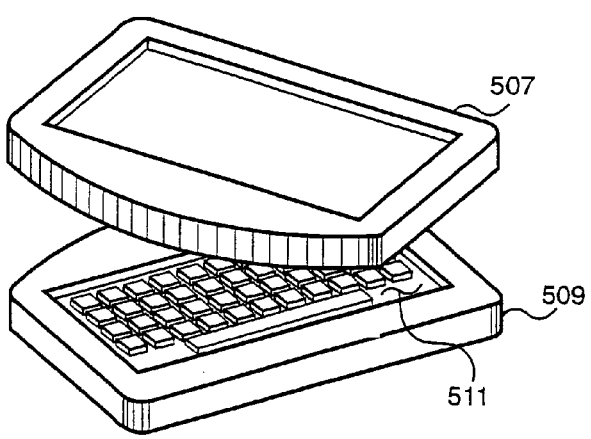
FIG. 2F is a perspective view of the appliance of FIG. 2D depicting how the constantly visible display further pivots relative to the body portion to reveal the keyboard or other data input devices.
Figure 2G:
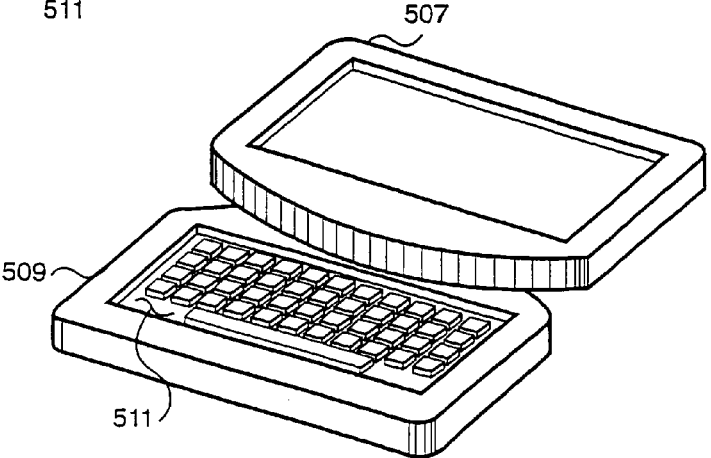
FIG. 2G is a perspective view of the appliance of FIG. 2D with the constantly visible display pivoted to fully reveal the keyboard or other input devices.

In a first device configuration:
1. The display remains visible when the device is in either the open or closed state;
2. In the closed state, the display remains visible, but obscures the input device;
3. The display is movable such that it reveals the input device obscured below the display when the device is transitioned from the closed state to the open state; and
4. When transitioning from the closed state to the open state, the display moves in one or a combination of a sliding, hinging, or pivoting movements as illustrated in a very broad sense in FIGS. 2A-2G. In FIGS. 2A-2C, an always visible display 501 translates relative to a body portion 503 to reveal an input device 505. In FIGS. 2D-2G, an always display 507 pivots relative to a body portion 509 to reveal an input device 511.

Figure 2H:
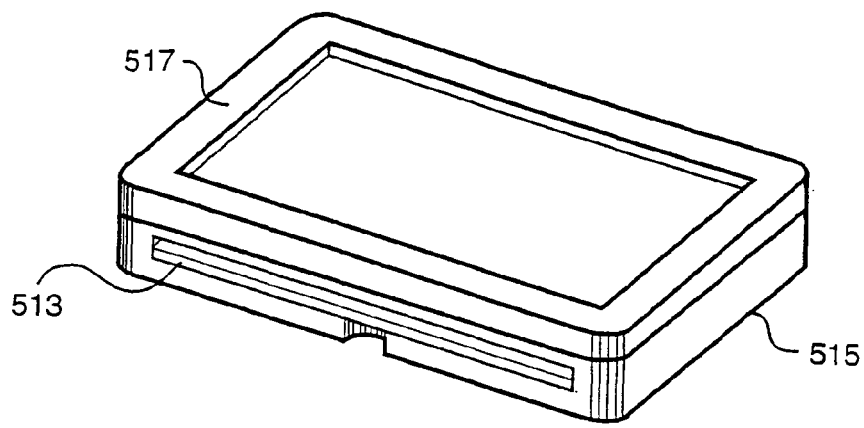
FIG. 2H is a perspective view of an alternate simplified representation of the appliance of FIG. 1A having a constantly visible display integrated into a body portion and a keyboard or other data input devices that extend outward from the interior of the body portion.
Figure 2I:
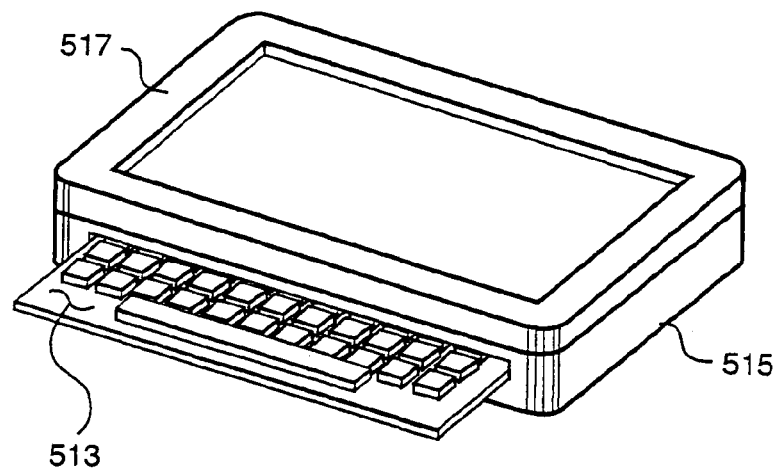
FIG. 2I is a perspective view of the appliance of FIG. 2H depicting how the keyboard or other data input devices extend outward from the interior of the body portion.
Figure 2J:
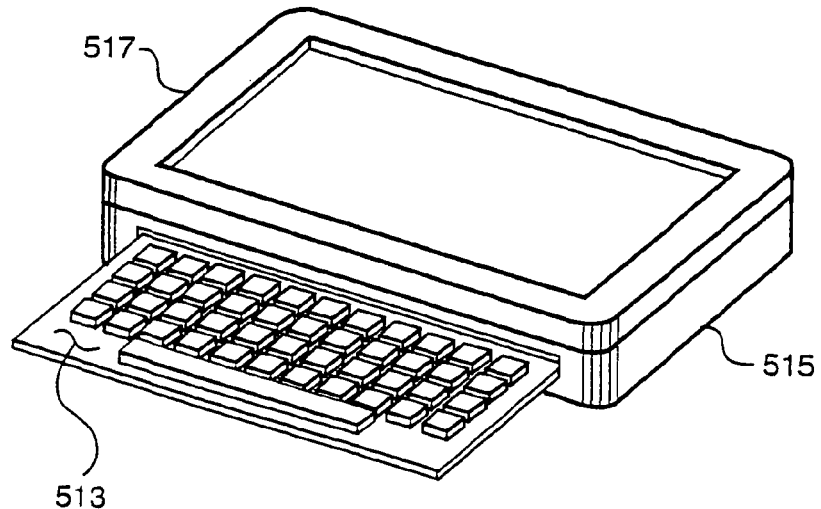
FIG. 2J is a perspective view of the appliance of FIG. 2H with the keyboard or other data input devices in a fully extended position.

In a second configuration:
1. The display remains visible when the device is in either the open or closed state;
2. In the closed state, the display remains visible, but obscures the input device;
3. The input device is movable such that it is revealed from below the display when the device is transitioned from the closed state to the open state; and
4. When transitioning from the closed state to the open state, the input device moves in one or a combination of a sliding, hinging, or pivoting movements as illustrated in a broad sense in FIGS. 2H-2J. In FIGS. 2H-2I, an input device 513 translates into a body portion 515 which carries an always visible display 517.

Figure 2K:
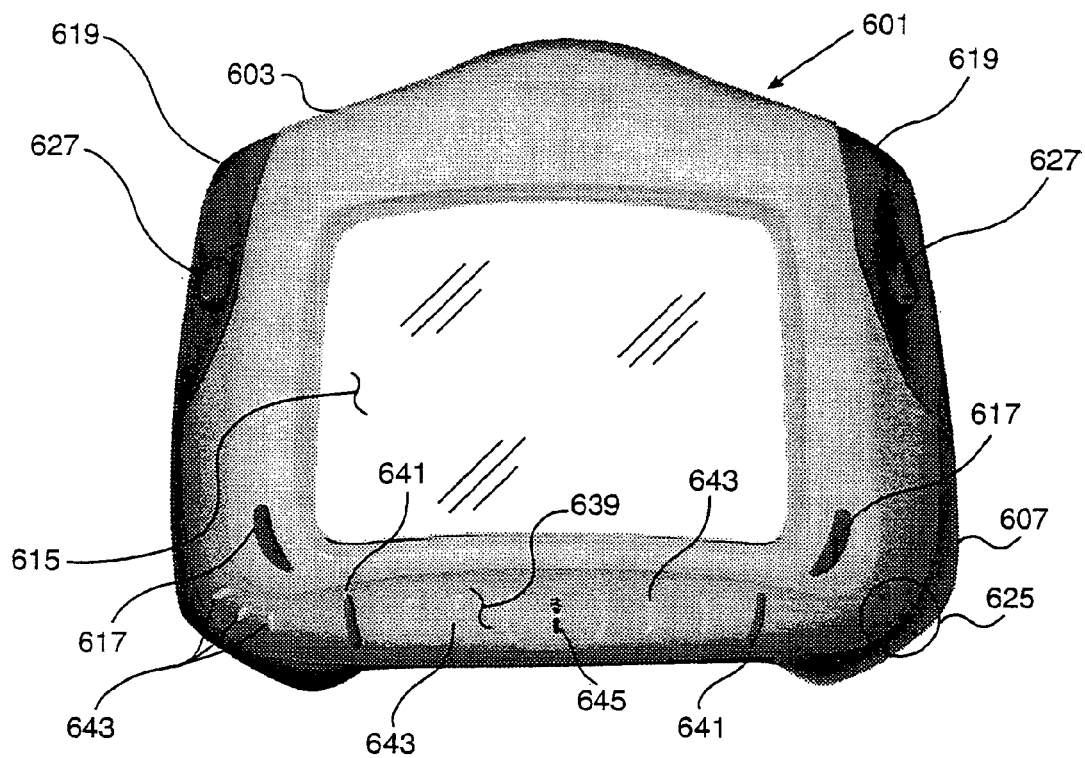
FIG. 2K is a front view of the preferred embodiment of the appliance of FIG. 1A having a constantly visible display that translates relative to a body portion to reveal a thumbboard or other data input devices that are integrated into the body portion, and having an analog electronic data input device using slider movement according to the present invention.
Figure 2L:
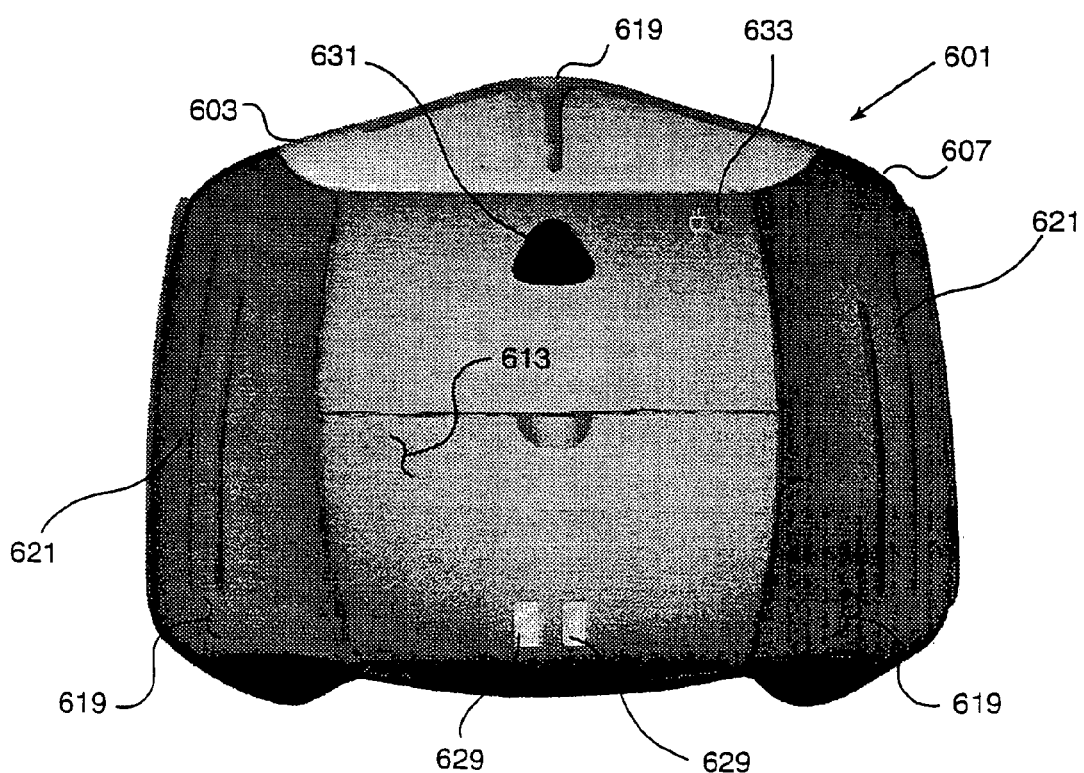
FIG. 2L is a rear view of the appliance of FIG. 2K.
Figures 2M, 2N:
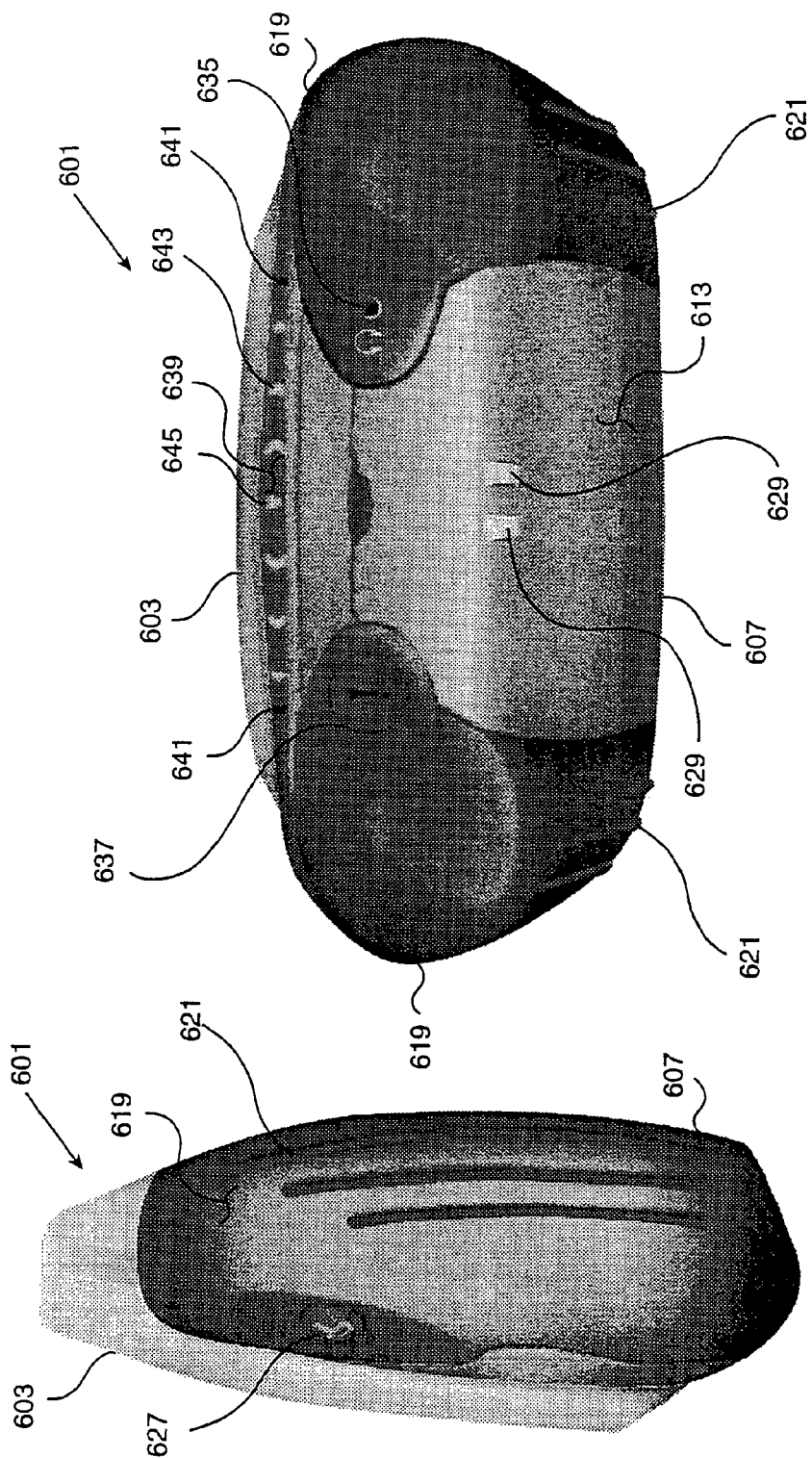
FIG. 2M is a right side view of the appliance of FIG. 2K.
FIG. 2N is a bottom view of the appliance of FIG. 2K.
Figure 20:
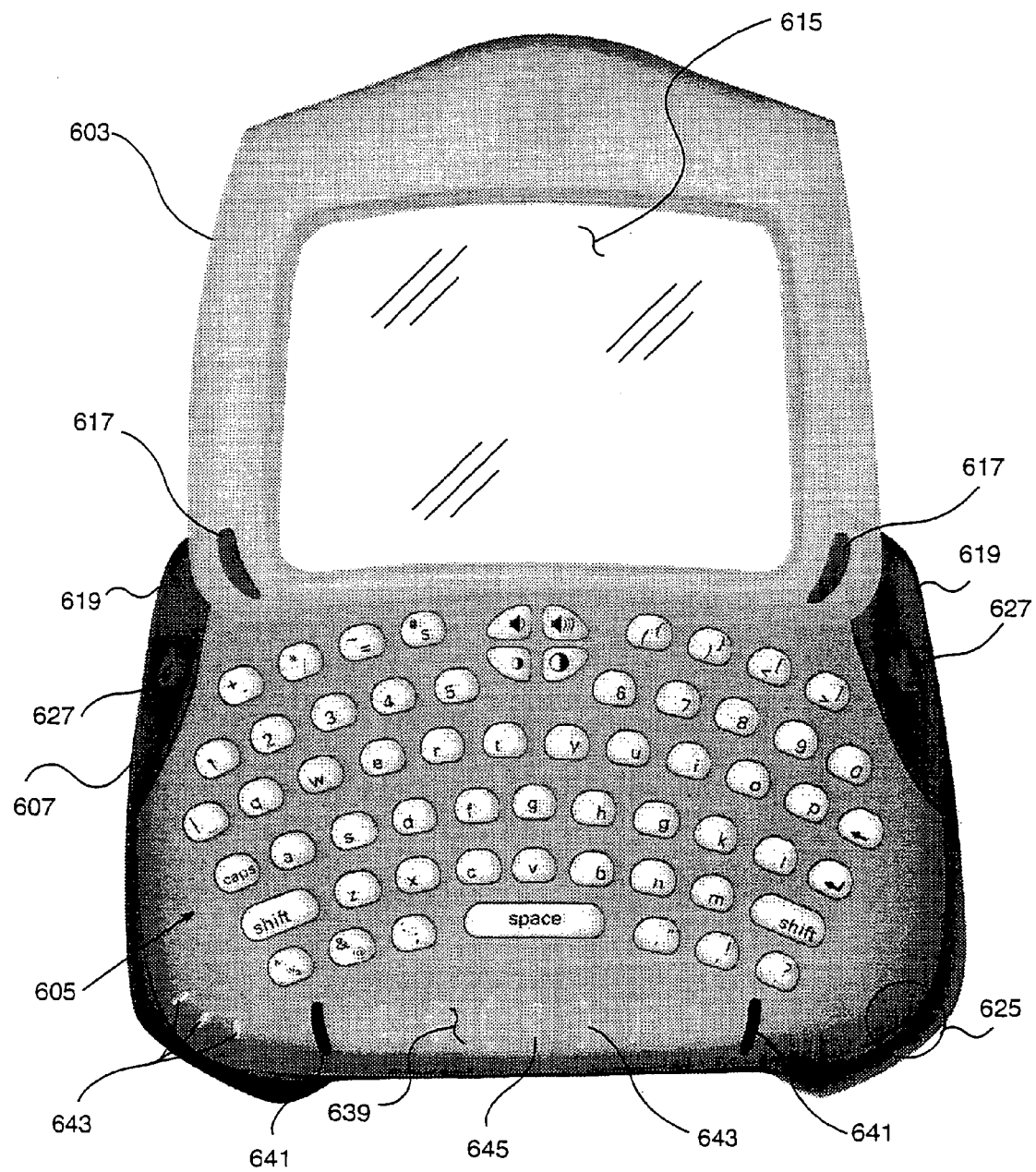
Figure 2P:
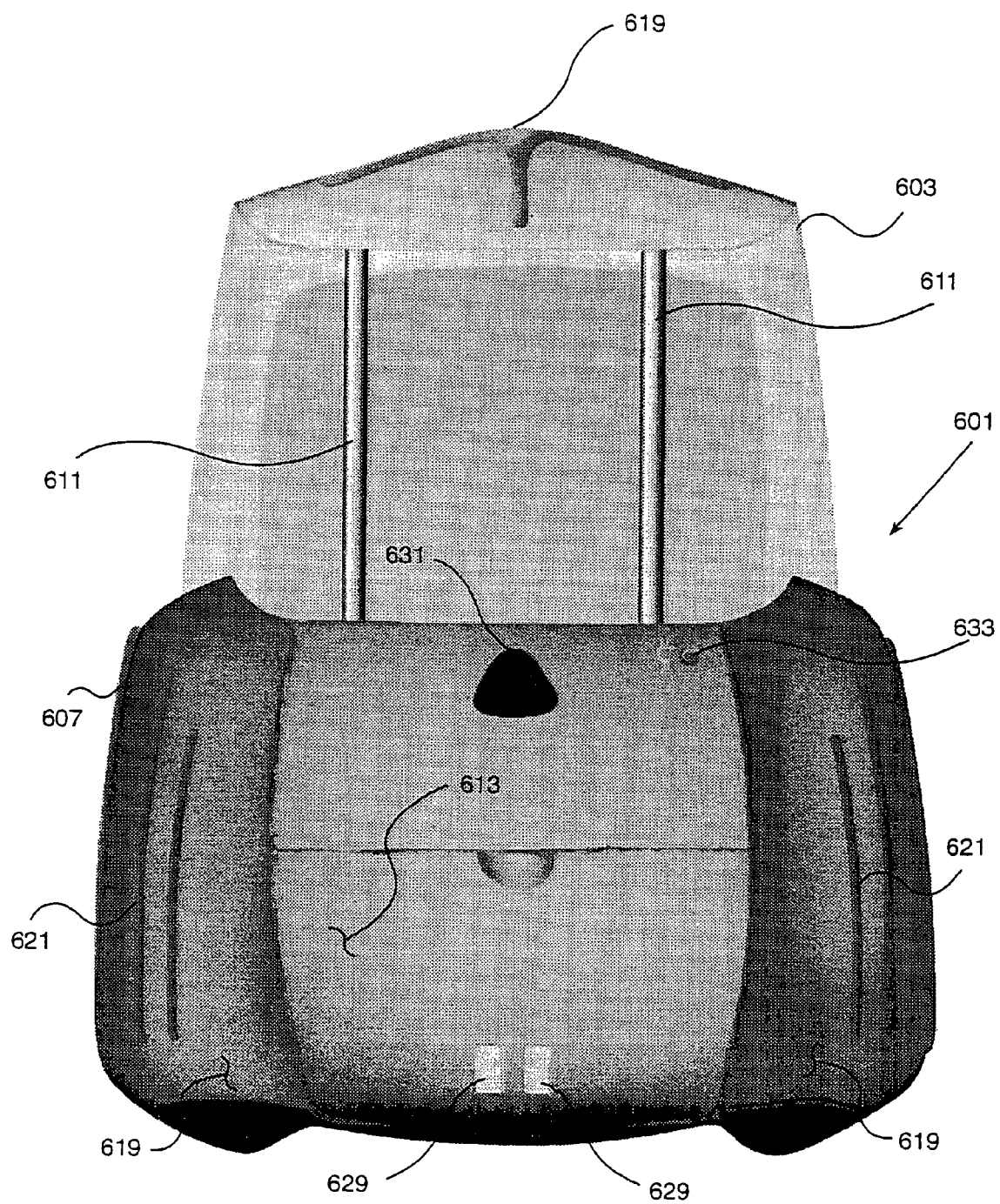
FIG. 2P is a rear view of the appliance of FIG. 2K awhile in the open state of FIG. 2O.

11.A.1.a. First Translating Design. The preferred configuration of an appliance 601 according to the present invention is illustrated in FIGS. 2K-2P. FIG. 2K is a front view; FIG. 2L is a rear view; FIG. 2M is a right side view; FIG. 2N is a bottom view; FIG. 2O is another front view; and FIG. 2P is another rear view of appliance 601. In FIGS. 2K-2N, appliance 601 is shown in the closed state in which an always visible display portion 603 conceals a novel QWERTY thumbboard 605 that is carried by a body portion 607. QWERTY Thumbboard 605 will be discussed in more detail below with respect to Section 11.A.5. In FIGS. 2O and 2P, appliance 601 is shown in an open state in which display portion 603 has been translated relative to body portion 607 to reveal thumbboard 605. As is best seen in FIG. 2P, display portion 603 may include a plurality of rigid support rails 611 that telescope into body portion 607 to provide additional support of display portion 603 while appliance 601 is in the open state. It should be understood that other support means, such as interlocking grooves on display portion 603 and body portion 607 may also be used to provide additional support for display portion 603. Display portion 603 is dimensioned to house a plurality of components (not shown). Such components may or may not be directly related to the display of images, such as a GPS antenna and integrated circuit boards. Likewise, body portion 607 is dimensioned to house a plurality of electronic components and systems and necessary integrated circuit boards, such as the microprocessor (not shown) and cache memory 392, 394, and 396 (see FIG. 1K).

Display portion 603 includes a display screen 615. Display screen 615 is preferably a high-resolution, 16-bit color, reflective LCD screen being 320×240 pixels having a diagonal display area of about 3.8 inches. It should be understood that other comparable display screens may be used. Although always visible, display screen 615 will cycle down to a "power save" mode during periods of non-use to conserve power. A cover or shade (not shown) may be utilized to protect display screen 615 from damage, to enhance visibility, to prevent glare, or to alleviate or minimize other common problems associated with such display screens. In the preferred embodiment, display screen 615 is covered by a protective bezel (not shown).

Appliance 601 is powered by a portable power supply (not shown), such as batteries. In this regard, a power supply cover 613 is provided to cover and protect the portable power supply. In the preferred embodiment, the portable power supply is rechargeable by placing appliance 601 in a docking station or charging station (not shown). Although appliance 601 operates on DC current, appliance 601 may be plugged into and powered by a conventional 110-Volt wall outlet (not shown) with the use of a conventionally functioning AC to DC power transformer (not shown).

A plurality of push pads 617 are located at selected locations on display portion 603. Push pads 617 are preferably located such that the user may translate display portion 603 relative to body portion 607 by pushing on push pads 617 with his thumb or thumbs. In the preferred embodiment, display portion 603 is preferably made of rigid, molded plastic or similar material. Body portion 607 is preferably made of a similar material. As has become popular in recent years, display portion 603 and/or body portion 607 may be partially transparent or translucent, having a colored tint. A plurality of protective bumpers 619, preferably made of rubber or rubberized plastic, are coupled to display portion 603 and body portion 607 at selected locations. A plurality of raised grips 621 may be integrated into protective bumpers 619 to facilitate handling of and interaction with appliance 601. Appliance 601 may be of modular construction so that a plurality of the external components may be quickly and easily interchanged. Such interchangeability allows the user to choose from a wide variety of exterior styles and designs, thereby customizing appliance 601 to the user's particular tastes. In this manner, the appearance of appliance 601 can be modified to suit the user's ever changing moods and attitudes.

Appliance 601 includes a plurality of input/output devices, such as LED's 623, at least one speaker 625, a plurality of joysticks 627, conductive power terminals 629 for attachment to the docking station, an infrared (IR) port 631 for the transfer of data, a DC adapter port 633 for attachment of the power transformer, a headphone jack 635 for use with headphone speakers, an on-off switch 637 for toggling appliance between an "on" state, an "off" state, and/or a "standby" state, as further explained herein, and an analog responder 639. Analog responder 639 will be discussed in considerable detail below. It will be appreciated that LED's 623, joysticks 627, and on-off switch 637 may be multi-functional. For instance, LED's 623 are preferably full-spectrum color LED's that can be selectively programmed by the user to display selected colors at selected intensities and/or selected flash frequencies in response to certain conditions. LED's 623 are particularly useful when display screen 615 has cycled down into the power save mode. This allows the user to interact with appliance 601 without transitioning appliance into the open state. By using only LED's 623, speaker 625, joysticks 627, IR port 631, and analog responder 639, a user can perform a considerable amount of input/output without transitioning appliance 601 into the open state.

Analog responder 639 is a one-dimensional, electronic touch pad disposed within appliance 601. Analog responder 639 is activated by the user touching selected areas of appliance 601. Preferably, analog responder 639 is disposed within and centrally located along a lower edge of body portion 607 closest to the user. Such location allows analog responder 639 to be usable when appliance 601 is either in the closed state or the open state, i.e., when display portion 603 is translated relative to body portion 607. It is preferred that analog responder 639 be adjacent or in close proximity to display screen 615, because analog responder 639 functions primarily to manipulate a cursor or graphical images being displayed on display screen 615. The one-dimensional functional boundaries of analog responder 639 are preferably indicated by raised end ridges 641 or similar visual indicia. For example, one boundary may be indicated by a "−" sign and the opposing end boundary may be indicated by a "+" sign. Such indicia are particularly useful because a primary function of analog responder 639 is to allow the user to selectively input a response to a query from an analog range of possible responses. Using the current example, the end boundary indicated by the "−" might represent a negative response by the user to a query, such as "I do not like pizza;" whereas the end boundary indicated by the "+" might represent a positive response by the user to the same query, such as "I love pizza." In a similar fashion, analog responder 639 is visually segmented, preferably by raised intermediate ridges 643, or similar visual indicia placed incrementally along the length of analog responder 639 between end ridges 641. In the preferred embodiment, intermediate ridges 643 are more pronounced at the center 645 of analog responder 639 and decrease in size or shape, if applicable, toward end ridges 641. This allows the user to quickly determine which portion of analog responder 639 the user is touching, tapping, or depressing.

Analog responder 639 may be programmed for response in either an "absolute" mode or a "relative" mode. In absolute mode, locations along the length of analog responder 639 are directly mapped to locations on display screen 615. For example, if the user touches the analog responder at right end ridge 641, the cursor or movable graphical image being displayed on display screen 615 would appear at the rightmost portion of display screen 615. On the other hand, in relative mode, locations along the length of analog responder 639 are not mapped directly to any specific location on display screen; rather, movements along analog responder 639 are programmed to provide programmed movement of a cursor or graphical image relative to the current location of the cursor or graphical image on display screen 615. For example, if the user drags her finger along the length of analog responder 639 from the right to the left, the cursor or graphical image being displayed on display screen 615 will respond by a moving from the right to the left. Absolute and relative mapping of analog responder 639 will be discussed in more detail below with respect to FIGS. 5A-5G.

11.A.1.b. Second Translating Design. Referring now to FIGS. 2Q-2S in the drawings, an alternate embodiment of the appliance of the present invention is illustrated. FIG. 2Q is a front view; FIG. 2R is a rear view; and FIG. 2S is a right side view of appliance 701. As with appliance 601, appliance 701 has an always visible display portion 703 and a body portion 707. Display portion 703 carries a display screen 715, similar in form and function to display screen 615. Display portion 703 translates relative to body portion 707 to reveal a QWERTY thumbboard (not shown) which is similar in form and function as thumbboard 605. As is shown, appliance 701 includes similar input/output ports and devices as appliance 601, such as LED's 723, at least one speaker 725, a plurality of joysticks 727, and an analog responder 739. In addition, appliance 701 includes a conventional two-dimensional touch pad 729 on the backside of appliance 701. Touch pad 729 is located such that it can be utilized by the user while appliance 701 is in either the closed state or the open state. Touch pad 729 may be programmed to map to display screen 715 in either an absolute mode or a relative mode.

Figures 2T, 2U:
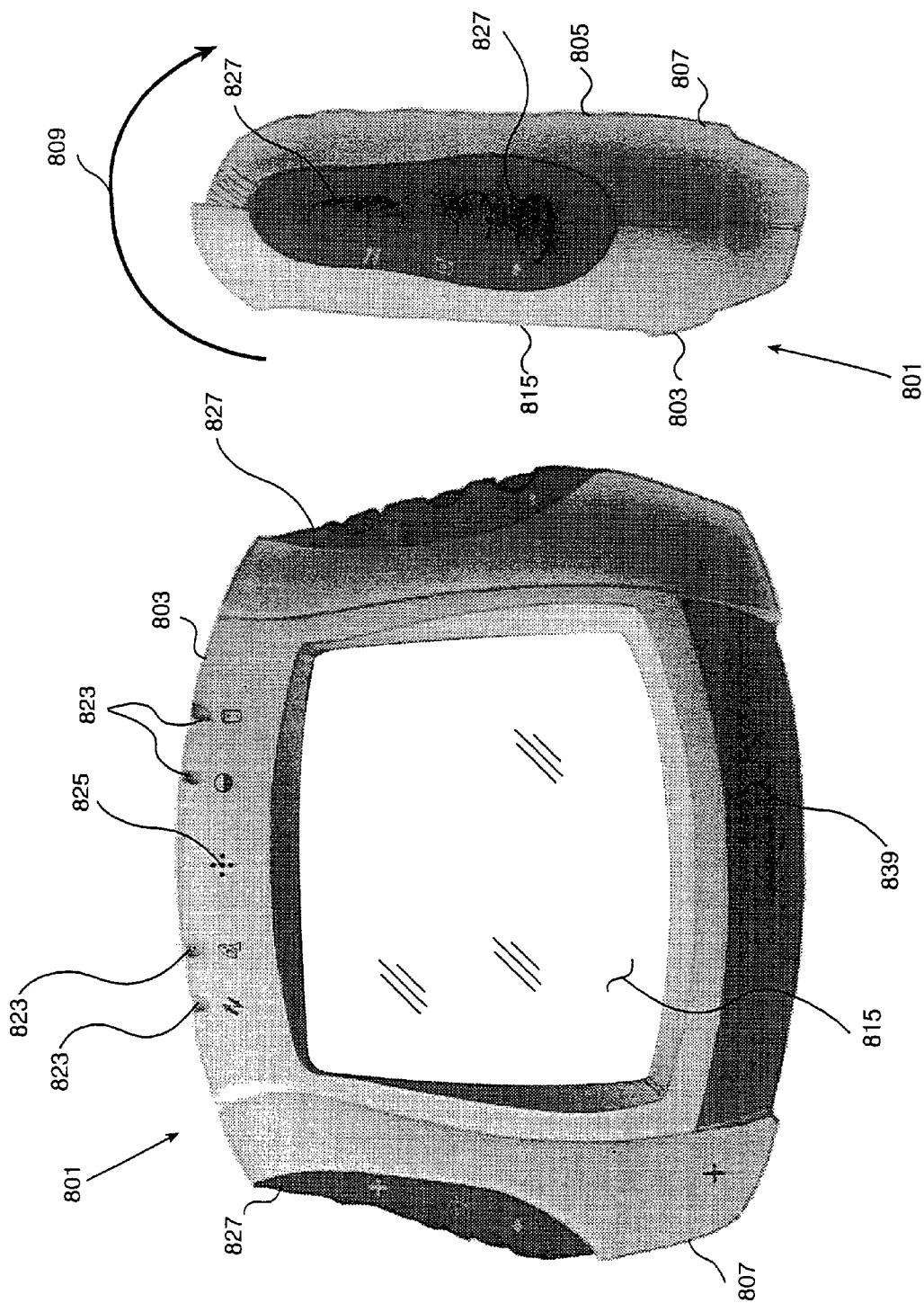
FIG. 2T is a front view of another alternate embodiment of the appliance of FIG. 1A having a constantly visible display that hingedly moves relative to a body portion to reveal a keyboard of other data input devices that are integrated into the body portion, and having an analog electronic data input device using slider movement according to the present invention.
FIG. 2U is a right side view of the appliance of FIG. 2T.
Figure 2V:
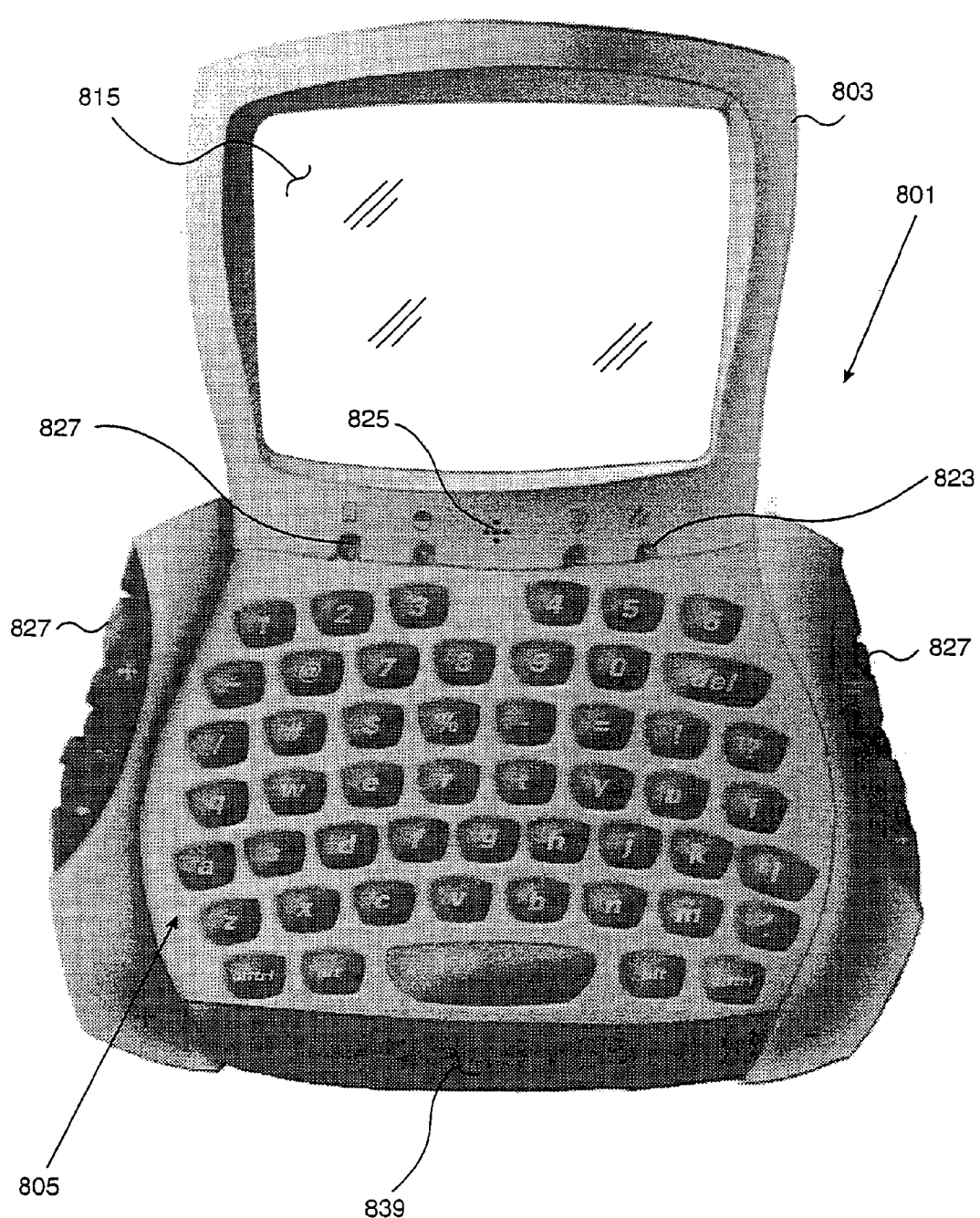
FIG. 2V is a front view of the appliance of FIG. 2T with the constantly visible display hingedly moved relative to the body portion to fully reveal the keyboard or other input devices.

11.A.1.c. Clam-Shell Design. Referring now to FIGS. 2T-2V in the drawings, another alternate embodiment of the appliance of the present invention is illustrated. In this embodiment, an appliance 801 has a clam-shell design. FIG. 2T is a front view; FIG. 2U is a right side view; and FIG. 2V is another front view of appliance 801. As with previously discussed embodiments, appliance 801 has an always visible display portion 803 and a body portion 807 which carries a novel QWERTY thumbboard 805. In this embodiment, a screen display 815 on display portion 803 thumbboard 805 both face outward and are on opposite sides of body portion 807 when appliance 801 is in the closed state. As appliance 801 transitions to the open state, display portion 803 hingedly pivots relative to body portion 807 as indicated by arrow 809 in FIG. 2U. In the open state, display screen 815 is adjacent to and visible above thumbboard 805. As is shown, appliance 801 includes similar input/output ports and devices as appliance 601, such as LED's 823, at least one speaker 825, a plurality of joysticks 827, and an analog responder 839.

Figure 2W:
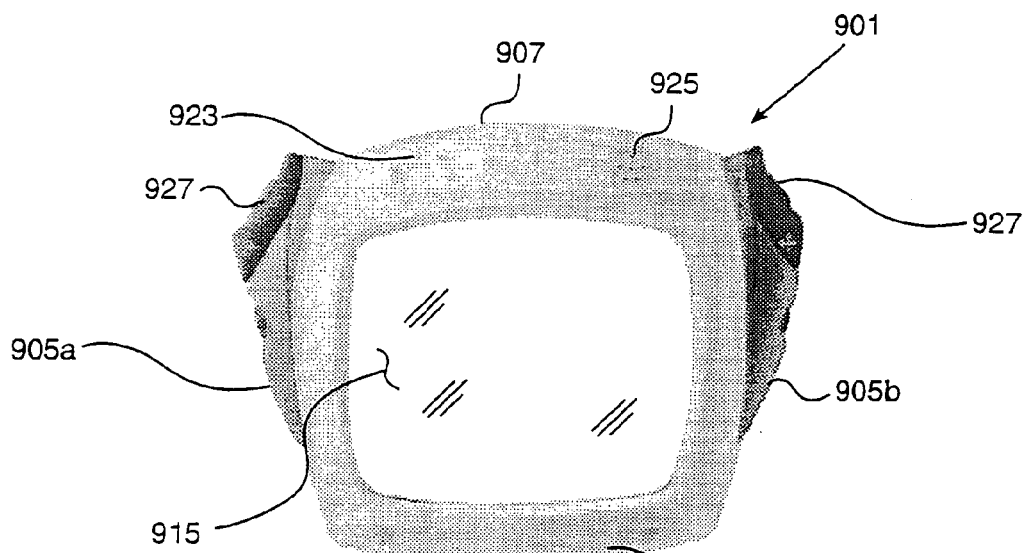
FIG. 2W is a front view of another alternate embodiment of the appliance of FIG. 1A having a constantly visible display and thumbboards or other data input devices that extend out from the interior of a body portion, and having an analog electronic data input device using slider movement according to the present invention.
Figure 2X:
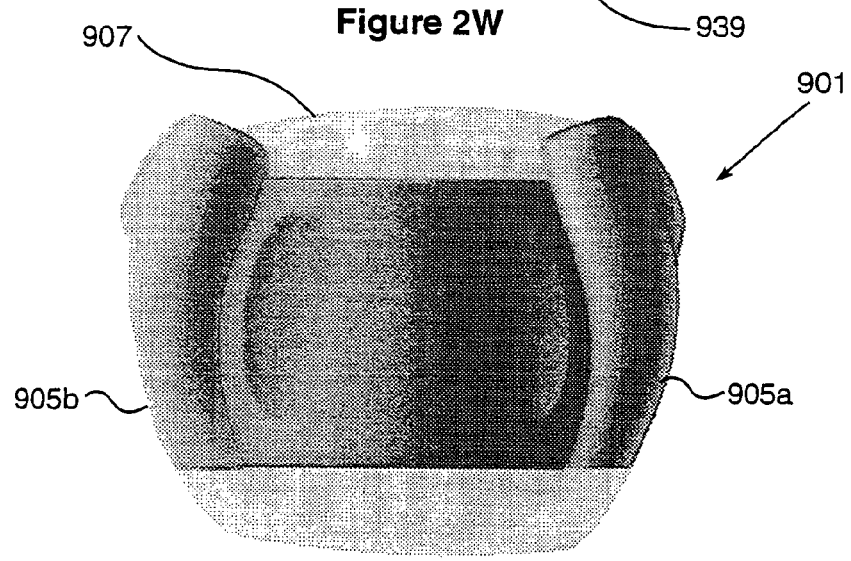
FIG. 2X is a rear view of the appliance of FIG. 2W.
Figure 2Y:
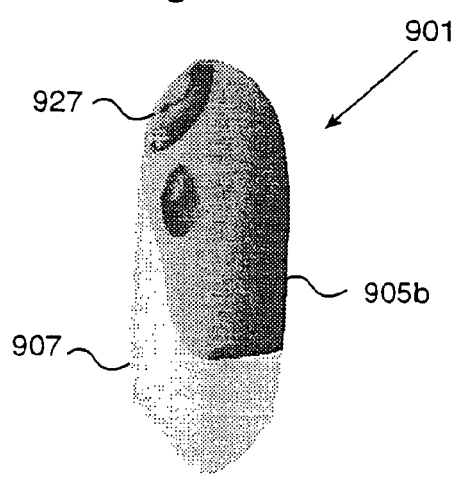
FIG. 2Y is a right side view of the appliance of FIG. 2W.
Figure 2Z:
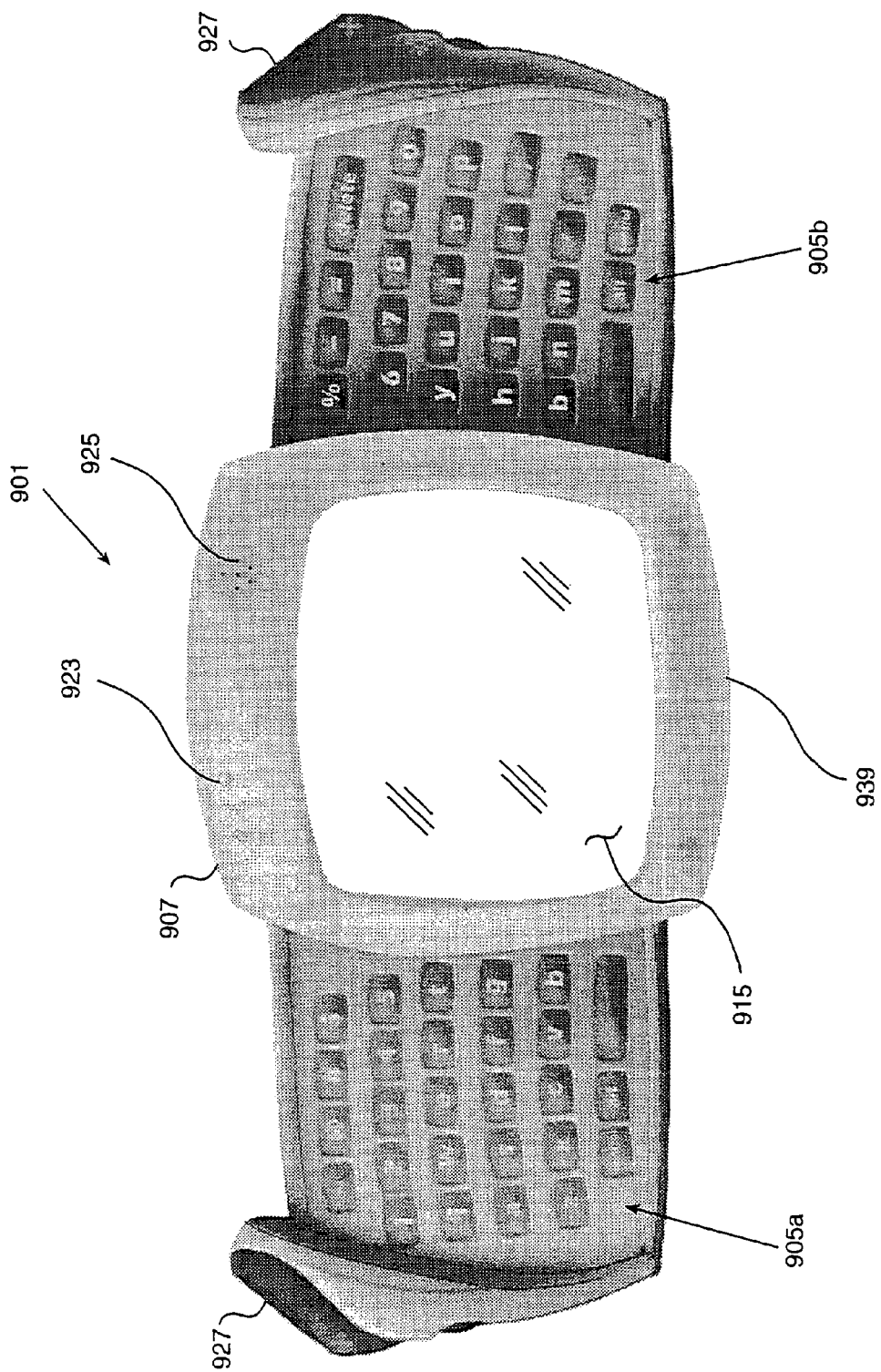
FIG. 2Z is a front view of the appliance of FIG. 2W with the keyboards extended outward from the interior of the body portion.

11.A.1.d. Telescoping Design. Referring now to FIGS. 2W-2Z in the drawings, another alternate embodiment of the appliance of the present invention is illustrated. In this embodiment, an appliance 901 has a telescoping design. FIG. 2W is a front view; FIG. 2X is a rear view; FIG. 2Y is a right side view; and FIG. 2Z is another front view of appliance 901. As with previously discussed embodiments, appliance 901 has an always visible display screen 915. Display screen 915 is carried by a body portion 907 into which a novel, two-piece QWERTY thumbboard 905a and 905b telescopes into from opposing sides of body portion 907. As is shown, appliance 901 includes similar input/output ports and devices as appliance 601, such as LED's 923, at least one speaker 925, a plurality of joysticks 927, and an analog responder 939. Joysticks 923 are carried on each piece of thumbboard 905a and 905b.

11.A.2. Internal Device Hardware.

11.A.2.a. The Ideal Device. A preferred "ideal" device may include a variety of additional conventional functions and features. These additional functions and features, include interchangeable components, personal information management (PIM) functionality, and synchronization capabilities with other personal computing devices and desktop PC's. These additional features and functionality are limited only by the appliance's physical size, the appliance's available memory, the capacity of network 11, the bandwidth of network 11, and the cost of airtime.

11.A.2.b. The Intermediate Device. The preferred "intermediate" device includes a combination of components, features, and functionality from both the "ideal" device and the "low-cost" device.

11.A.2.c. The Low-Cost Device. Referring now to FIG. 3A in the drawings, a block diagram representation of a preferred "low-cost" version of a location-aware wireless communication appliance 1500 of the present invention is illustrated. As is shown, a central processing unit (CPU) 1501 is provided for executing programs in the form of executable program instructions and data. In practice, CPU 1501 may include several separate processing systems, each being dedicated to a particular function or functions. CPU 1501 is preferably a 206-Megahertz microprocessor and chip set available from Intel Corporation under the model name StrongARM. CPU 1501 has been customized for operation with appliance 1500 and network 11.

An input/output system 1503 is provided for transmitting and receiving GPS and GPRS data and information. More particularly, a GPS module 1507 is carried within appliance 1500. GPS module 1507 transmits and receives GPS data through a GPS antenna 1505. A GPRS modem module 1509 is also carried within appliance 1500. GPRS module transmits and receives GPRS data and information through a GPRS antenna 1507. Appliance 1500 "knows" its location through receipt of GPS signals from GPS antenna 1505 after processing by GPS module 1507. Appliance 1500 receives and transmits communications to network 11 utilizing a GPRS protocol over GPRS modem module 1509 and GPRS antenna 1507. An additional means of communication may be provided in the form of an IR input/output module 1510. IR input/output module 1510 allows appliance 1500 to communicate with other electronic devices, such as computers or other location-aware wireless communication appliances utilizing IR signals. A power management module 1513 is carried within appliance 1500. Power management module 1513 receives power from portable power source, such as batteries 1511 or external power supply 1515, and regulates and supplies power to CPU 1501 and all other components of appliance 1500. Each of these input-output systems 1507, 1509, 1510, and 1513 is in electrical communication with central processing unit 1501, preferably serial communication.

A memory system 1517 is provided which includes RAM 1519, flash memory 1521, programmable read-only memory (PROM) 1523, and a hardware identification module which holds a unique serial number for each appliance 1500. Each of these memory systems 1519, 1521, 1523, and 1524 is in electrical communication with central processing unit 1501, preferably serial communication. It should be understood that other types of memory modules may be utilized depending upon the desired application.

A user input system 1525 is provided which includes a novel QWERTY thumbboard 1527, an analog responder 1528, joysticks 1530, and a plurality of additional input elements 1529. Thumbboard 1527 may be illuminated by a backlight 1531 to allow use in low light conditions. Thumbboard 1527 may include a touch pad which controls a graphical pointing device or a separate touch pad may be provided (see FIG. 2R). Additional input elements 1529 include buttons or switches that are accessible from the exterior of appliance 1500 and which control basic operations or dedicated functions.

An output system 1533 is also provided which includes a vibratory alert module 1535, an always visible display screen 1537 which is driven by a graphics chip 1541, a plurality of additional display elements 1543, a sound controller 1545, a digital/analog (D/A) converter 1547, and at least one speaker 1549. Additional display elements 1543 include LED's, such as multi-functional LED's 623 (see FIGS. 2K-2P). Vibratory alert module 1535 allows appliance 1500 to alert the user to some condition, such as the receipt of an incoming message. Display screen 1537 may be illuminated by a backlight 1539 to allow use in low light conditions. Graphics chip 1541 is provided to receive and process display information from CPU 1501 and display the information on display screen 1537. Additional display elements 1543 are preferably full-spectrum color LED's that can be selectively programmed by the user to display selected colors at selected intensities and/or selected flash frequencies in response to certain conditions, such as the presence or absence of messages of a particular type. Additional display elements 1543 are particularly useful when display screen 1537 has cycled down into the power save mode. Such functionality allows the user to interact with appliance 1500 without transitioning appliance 1500 into the open state. Sound controller 1545 is provided for receiving instructions and data from central processing unit 1501 and for driving D/A converter 1547 which energizes speaker 1549. Sound controller 1545, D/A converter 1547, and speaker 1549 allow device 1500 to generate sounds as an output, such as music or audio for movies or animations.

11.A.3. Analog responder. In accordance with the preferred embodiment of the present invention, the location-aware wireless communication appliance may include a novel electronic data input apparatus. The electronic data input apparatus is so easy and intuitive to utilize that the user will be encouraged to interact with network 11 during data gathering operations. Particularly, the present invention includes an electronic data input apparatus which facilitates the entry of data or information in response to digital content, including queries, or series of queries. The user manipulates the electronic data input apparatus and a corresponding electrical signal is generated. The electrical signal is processed and converted into the user's response to the digital content. FIG. 5A is a tabular representation of the preferred embodiment of an electronic data input apparatus, or analog responder, according to the present invention and alternate embodiments thereof.

As is depicted in FIG. 5A, the electronic data input apparatus according to the present invention may exist in a variety of forms, or embodiments. In general, each embodiment is distinguished by a particular type of input element and certain operational parameters. A table 3001 includes a Type of Input Element column 3003, a Non-Biasing column 3005, a Starting Position column 3007, a Needs On-Screen Indicator column 3009, and a Continuous column 3011. The rows 3013, 3015, 3017, 3019, 3021, 3023, 3025, 3027, 3029, and 3031 set forth the type of input element and operational parameters for ten exemplary embodiments of the analog responder, row 3013 representing the preferred embodiment of a one-dimensional touch pad. Type of Input Element column 3003 describes the physical characteristics of each of the different embodiments. Non-Biasing column 3005 indicates whether the particular embodiment is non-biasing, i.e., whether an initial default response is presented to the user, with "Yes" meaning that the embodiment is non-biasing, i.e., that the embodiment does not require, or performs best without requiring, an initial default setting or default response; and "No" meaning that the embodiment is not non-biasing, i.e., that the embodiment does require, or performs best with, a default setting or default response. Starting Position column 3007 indicates whether the particular embodiment requires a predetermined starting position, with "Yes" meaning that the embodiment does require, or performs best with, a predetermined starting position; and "No" meaning that the embodiment does not require, or performs best without, a predetermined starting position. Needs On-Screen Indicator column 3009 indicates whether the particular embodiment requires an on-screen indicator to convey the status of the input element to the user, with "Yes" meaning that the embodiment does require, or performs best with, an on-screen indicator; and "No" meaning that the embodiment does not require, or performs best without, an on-screen indicator. Continuous column 3011 indicates whether the input element for the particular embodiment is continuous, i.e., a single button or graphical element, with "Yes" meaning that the input element is continuous; and "No" meaning that the input element is not continuous, i.e., having multiple buttons or separate graphical elements.

In table 3001 of FIG. 5A, row 3013 represents the preferred embodiment of the electronic data input apparatus: a one-dimensional touch pad. As is shown, the one-dimensional touch pad is non-biasing, does not require a starting position, needs no on-screen indicator, and is continuous. A first alternate embodiment of the input element is set forth in row 3015: an elongated button. The elongated button is non-biasing, does not require a starting position, needs no on-screen indicator, and is continuous. A second alternate embodiment of the input element is set forth in row 3017: a touch screen with a graphical slider. The touch screen with a graphical slider is non-biasing, does not require a starting position, needs an on-screen indicator, and is continuous. A third alternate embodiment of the input element is set forth in row 3019: a jog wheel. The jog wheel is not non-biasing in that an initial neutral response is presented to the user, has a neutral starting position that is predetermined by spring biasing, needs an on-screen indicator, and is continuous. A fourth alternate embodiment of the input element is set forth in row 3021: a scroll wheel. The scroll wheel is not non-biasing in that an initial neutral response is presented to the user, does not require a starting position, needs an on-screen indicator, and is continuous. A fifth alternate embodiment of the input element is set forth in row 3023: a thumb wheel. The thumb wheel is not non-biasing in that an initial neutral response is presented to the user, does not require a predetermined starting position, needs an on-screen indicator, and is continuous. A sixth alternate embodiment of the input element is set forth in row 3025: a linear sliding knob. The linear sliding knob is not non-biasing in that an initial response is presented to the user, does require a predetermined starting position, does not need an on-screen indicator, and is continuous. A seventh alternate embodiment of the input element is set forth in row 3027: touch screen with graphical radio buttons. The touch screen with graphical radio buttons is non-biasing, does not require a predetermined starting position, does need an on-screen indicator, and is not continuous in that the user must choose a single response from a plurality of discreet responses. An eighth alternate embodiment of the input element is set forth in row 3029: dedicated buttons on a keyboard. The dedicated buttons on a keyboard are non-biasing, do not require a predetermined starting position, do not require an on-screen indicator, and are not continuous in that the user must choose a single response from a plurality of discreet responses. A ninth alternate embodiment of the input element is set forth in row 3031: two-dimensional touch pad. The two-dimensional touch pad is non-biasing, does not require a predetermined starting position, does not require an on-screen indicator, and is continuous.

Each of these embodiments of the input element will be discussed in more detail. The preferred embodiment will be discussed with reference to FIGS. 6A-6G, and the alternate embodiments will be discussed with reference to FIGS. 7A-7I. All of the different embodiments of the input element produce an electrical signal that corresponds to the user's activation of the input element. The overall function and operation of the electronic data input system and apparatus is independent of the embodiment of the input element employed. As such, the overall function and operation of the electronic data input system and apparatus will be discussed with respect to the preferred embodiment.

Figure 6A:
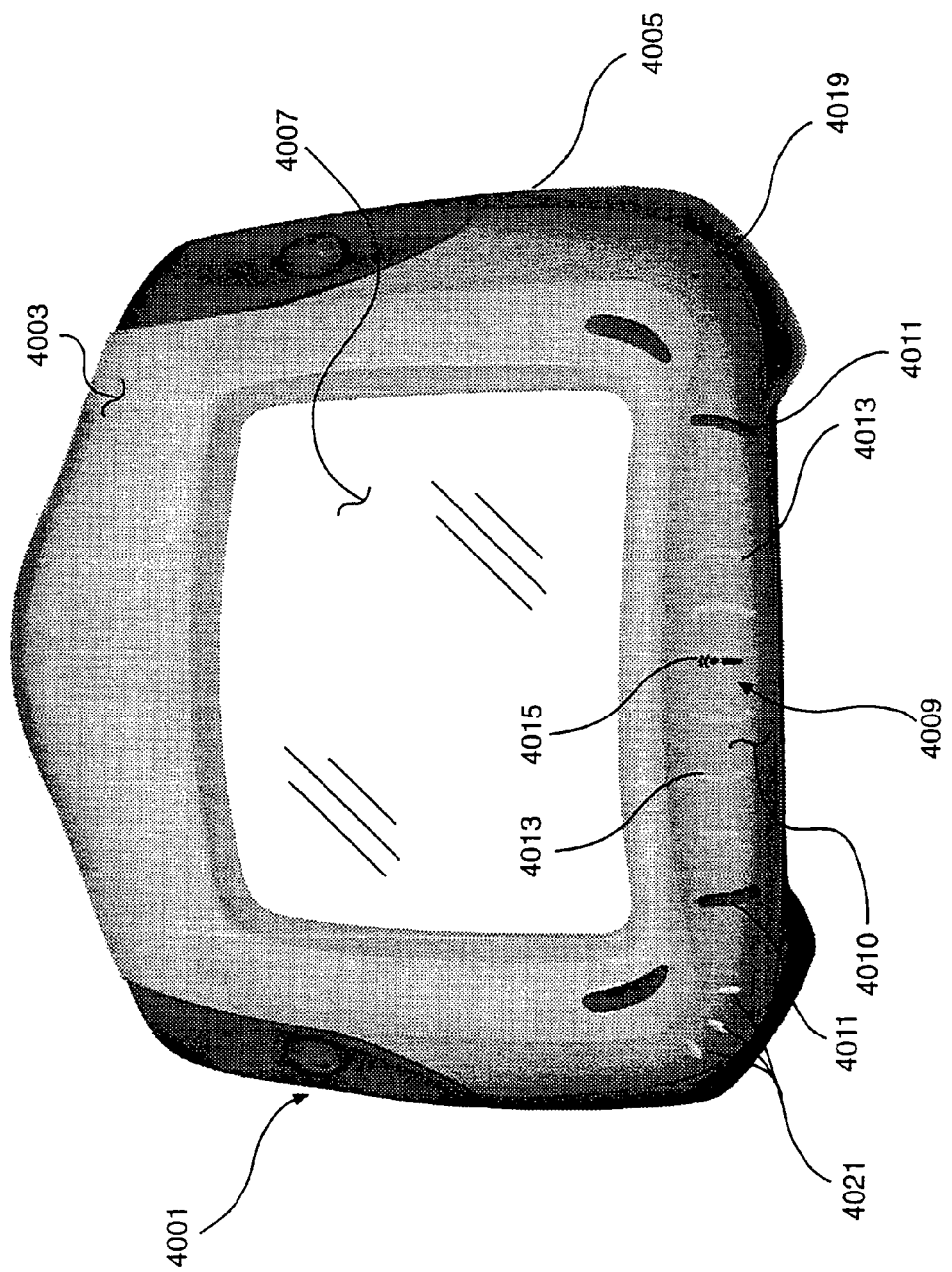

11.A.3.a. One-Dimensional Touch Pad. The one-dimensional touch pad embodiment of the input element is the preferred embodiment of the electronic data input apparatus. The physical characteristics of the one-dimensional touch pad and the overall function and operation of the electronic data input system and apparatus are described with reference to FIGS. 6A-6G. As is shown in the view of FIG. 6A, a location-aware wireless communication appliance 4001 includes an always visible display portion 4003 and a body portion 4005. Display portion 4003 translates relative to body portion 4005 to reveal a QWERTY thumbboard (not shown, but similar in form and function to thumbboard 605 in FIG. 2O). A display screen 4007 is carried by display portion 4003. Display screen 4007 is preferably a high-resolution, 16-bit color, reflective LCD screen being 320×240 pixels and having a diagonal display area of about 3.8 inches. An electronic data input apparatus, also referred to as an analog responder, 4009 is operably associated with appliance 4001. Analog responder 4009 is identical in form and function to analog responder 639 discussed above with reference to FIGS. 2K-2P. Thus, analog responder 4009 has as an input element an elongated one-dimensional touch pad 4010 which is activated by the user touching designated areas of appliance 4001. By "one-dimensional," it is meant that the elongated touch pad is configured or digitized to capture only the longitudinal component of any touch input, regardless of where the user actually makes contact with the touch pad. Thus, if the user activated one-dimensional touch pad 4010 by touching in an upper right-hand location, only the longitudinal component, and not the transverse component, of the input would be captured and recorded.

One-dimensional touch pad 4010 may be integral with the surface material of body portion 4005 or may include a separate elongated digitized element disposed within body portion 4005. In the latter situation, the surface material of body portion 4005 is flexibly configured to allow depression of body portion 4005 and activation of one-dimensional touch pad 4010. Preferably, analog responder 4009 is centrally located along a lower edge of body portion 4005 closest to the user. Such location allows analog responder 4009 to be usable when appliance 4001 is either in the closed state or the open state, i.e., when display portion 4003 is translated relative to body portion 4005. It is preferred that analog responder 4009 be adjacent or in close proximity to display screen 4007. However, it should be understood that in certain personal computing device installations, such as on computer keyboards (see FIG. 8D) or as a modular add-on accessory (see FIG. 9), it may not be possible to locate analog responder 4009 adjacent the display screen. Analog responder 4009 functions to capture data input from the user in response to digital content being displayed on display screen 4007. In addition to capturing touch inputs from the user in response to digital content, analog responder 4009 may manipulate a cursor or graphical images being displayed on display screen 4007. The one-dimensional functional boundaries of analog responder 4009 are preferably indicated by raised end ridges 4011 or similar visual indicia. In a similar fashion, analog responder 4009 is visually segmented by raised intermediate ridges 4013 or similar visual indicia placed incrementally along the length of analog responder 4009 between end ridges 4011. In the preferred embodiment, intermediate ridges 4013 are more pronounced at a center ridge 4015 of analog responder 4009 and decrease in size or shape toward end ridges 4011. This allows the user to quickly determine which portion of analog responder 4009 the user is touching, tapping, or depressing. End ridges 4011, intermediate ridges 4013, and/or center ridge 4015 may be of a variety of shapes, including corporate logos or trademarks, as illustrated by center ridge 4015.

Analog responder 4009 may be programmed for response in either an "absolute" mode or a "relative" mode. In absolute mode, locations along the length of one dimensional touch pad 4010 are directly mapped to locations on display screen 4007. For example, if the user touches one dimensional touch pad 4010 at right end ridge 4011, the cursor or movable graphical image being displayed on display screen 4007 would appear at the rightmost applicable portion of display screen 4007. If the user dragged his finger back and forth from one end ridge 4011 to the opposing end ridge 4011, the cursor would move from one extreme to the other within its graphical boundary on display screen 4007. For instances when movement along one dimensional touch pad 4010 manipulates a graphical image of an animation, if the user dragged his finger back and forth from one end ridge 4011 to the opposing end ridge 4011, the graphical image or animation would respond by displaying all of the frames of the scenes or frames of the graphical image or animation. The absolute mode helps make analog responder 4009 be non-biasing, as explained below.

On the other hand, in relative mode, locations along the length of one dimensional touch pad 4010 are not mapped directly to any specific location on display screen 4007; rather, movement along one dimensional touch pad 4010 is programmed to provide movement of a cursor or graphical image relative to their current location on display screen 4007. For example, if the user drags her finger along the length of one dimensional touch pad 4010 in a direction from right to left, the cursor of graphical image being displayed on display screen 4007 will respond by a moving in a direction right to left. In the preferred embodiment, if, while responding to a query, the user removes her finger from one dimensional touch pad 4010, the cursor remains stationary on display screen 4007 until the user repositions her finger on one dimensional touch pad 4010 and begins movement again, whereupon the cursor again tracks the movement of the user's finger along one dimensional touch pad 4010.

Figure 6B:
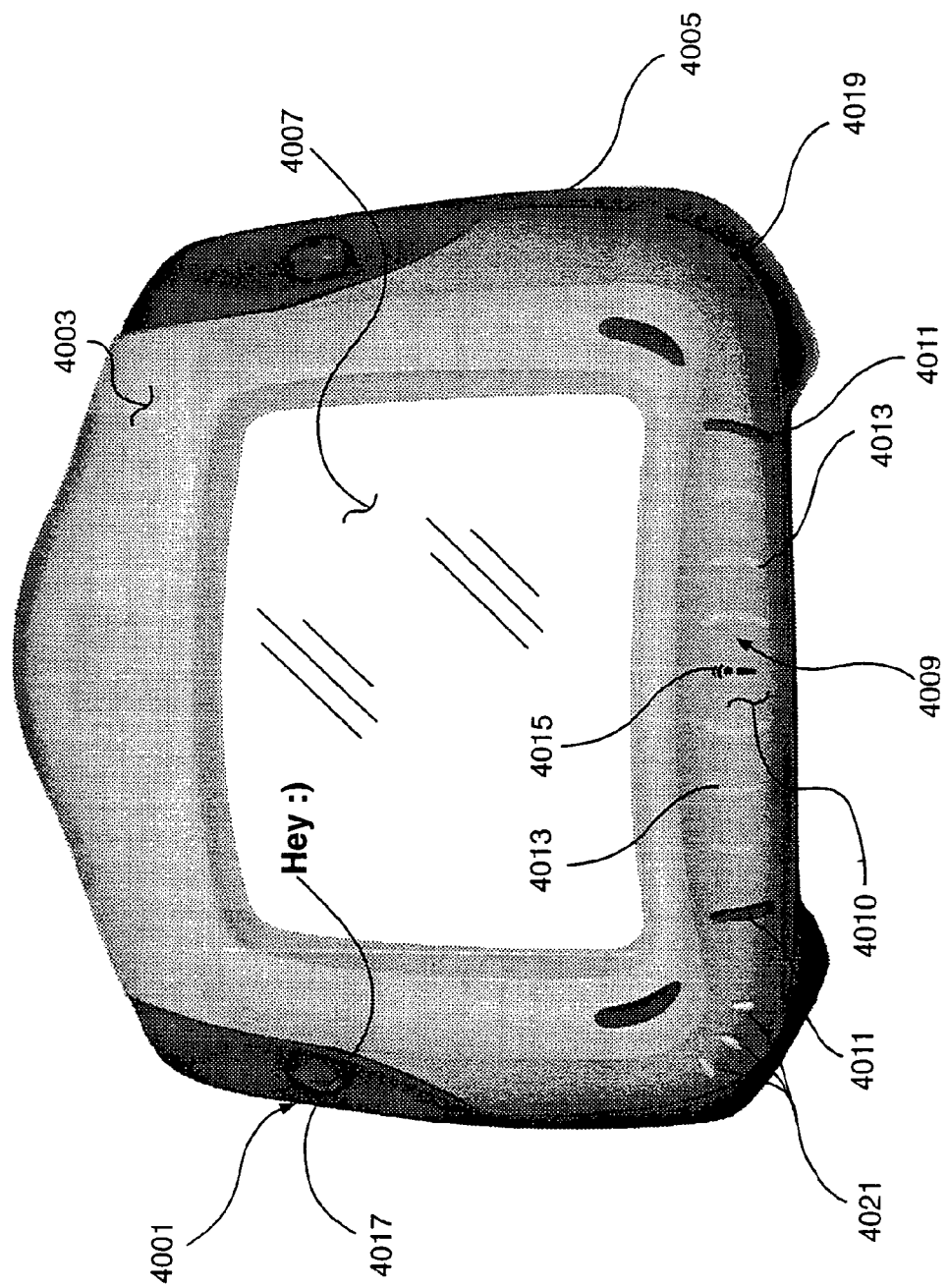
Figure 6C:
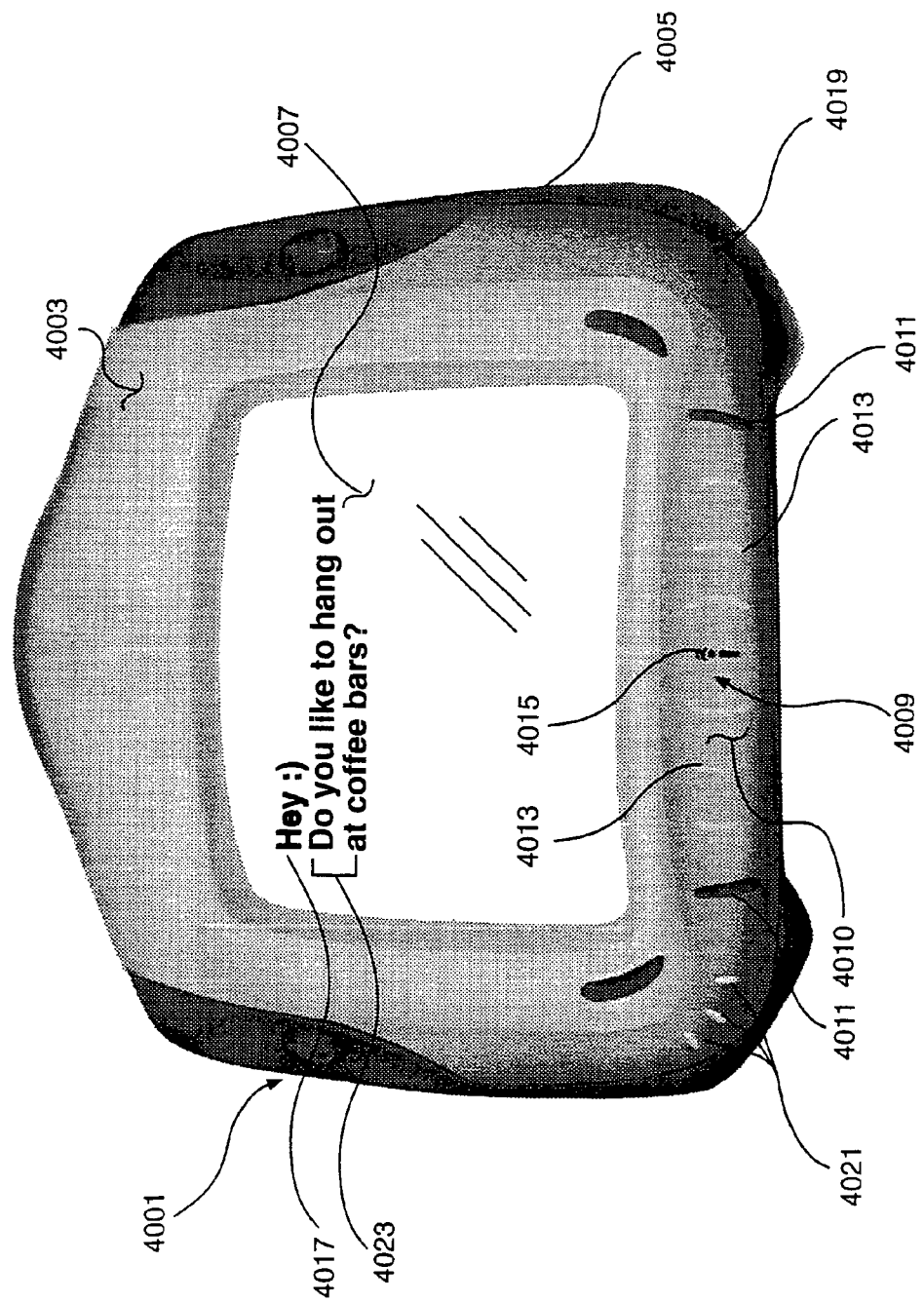

In operation and as is shown in the view of FIG. 6B, a text message 4017 may be displayed on display screen 4007 to gain the user's attention. The user's attention may also be requested by an audio announcement through a speaker 4019, or by the illumination of LED's 4021. Next, as is depicted in the view of FIG. 6C, digital content, in this case, a query 4023 is displayed. In the present example, query 4023 is displayed in text form. However, it should be understood that query 4023 may be presented in textual form, graphical form, audio form, or any combination thereof. Also, as explained below, it is not necessary that a query be presented to the user. In such instances, analog responder 4009 is used to directly capture the user's opinion of digital content being displayed on display screen 4007. Continuing with the present example, query 4023 asks a particular question: "Do you like to hang out at coffee bars?". Next, as is shown in the view of FIG. 6D, a graphical element 4025 is displayed on display screen 4007 in close physical proximity to query 4023. Graphical element 4025 defines an elongated active element 4027 having boundary text or other indicia 4029 displayed in close proximity that provides a qualitative or quantitative metric which allows the user to input a scaled response to the digital content, in this case, query 4023. In the present example, the scaling text messages 4031 and 4033 allow the user to select a response to query 4023 within an analog range established by the quantitative or qualitative boundaries established or associated therewith. It is important to note that the user does not have to choose from a limited set of discreet responses.

In the present example, the user's response to query 4023 may range from "Hate 'em," as depicted by scaling text message 4031 to "Love 'em," as depicted by scaling text message 4033. In the preferred embodiment of the present invention, the operation of analog responder 4009 is non-biasing. This means that there is no "default" or initial response from which the user begins to make his response. Such default responses, even if presented as a "neutral" response, can affect how the user responds to the digital content. To record a response to query 4023, the user taps, touches, or drags her finger along one-dimensional touch pad 4010 in an manner which activates a movable, graphical shuttle element 4035 in a desired location between the boundaries established by scaling text messages 4031 and 4033. To maintain the non-biasing nature of one-dimensional touch pad 4010, it is preferred that graphical shuttle element 4035 does not appear on graphical element 4025 until the user makes contact with one-dimensional touch pad 4010. In this manner, the user's response to the digital content, in this case query 4023 about coffee bars, is not influenced by a default or initial response condition. As the user moves her finger along one-dimensional touch pad 4010 from left end ridge 4011 to the right end ridge 4011, graphical shuttle element 4035 moves correspondingly from scaling text message 4031 to scaling text message 4033. This is possible because graphical element 4025 is mapped to the available quantitative or quantitative range of values for an acceptable response. Such mapping may be either absolute or relative, depending on the desired application and response. In the preferred embodiment, when the user releases her finger from one-dimensional touch pad 4010, analog responder 4009 generates a corresponding electrical signal which is captured and recorded in appliance 4001.

Figure 6E:
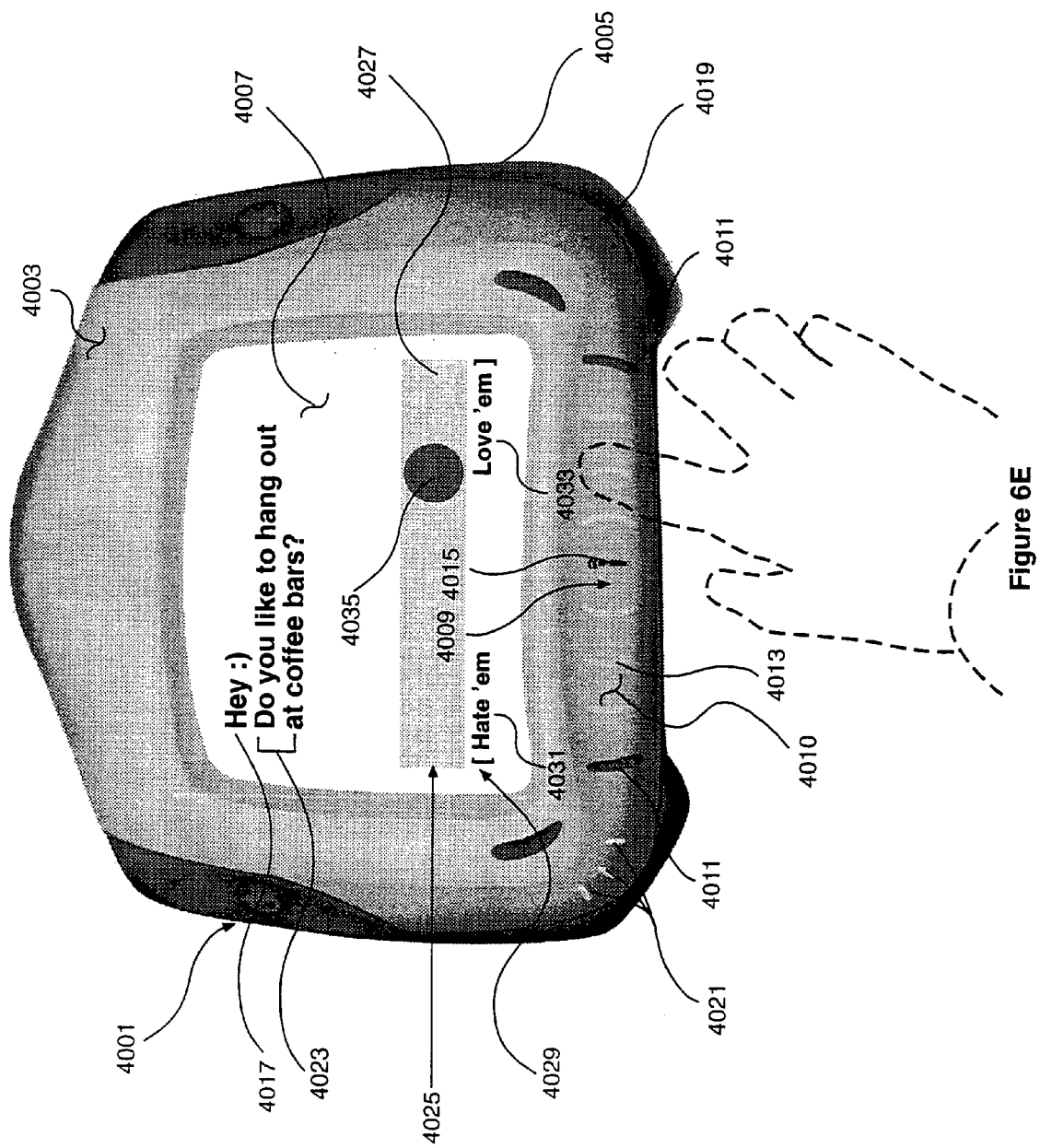

From the user's perspective, graphical element 4025 is very easy to use and may be manipulated with easy motions. In this manner, network 11 may obtain a reasonably accurate response, opinion, or rating from the user of the digital content with only a minimum of intrusion into the user's experience. FIG. 6E depicts graphical element 4025 after graphical shuttle element 4035 has been moved by the user. From the position of shuttle element 4035, it is clear that the user "favors" or "likes" hanging out in coffee bars, but the user does not "love" hanging out in them. More importantly, this preference information, or rating, has been obtained easily and quickly.

Figure 6F:
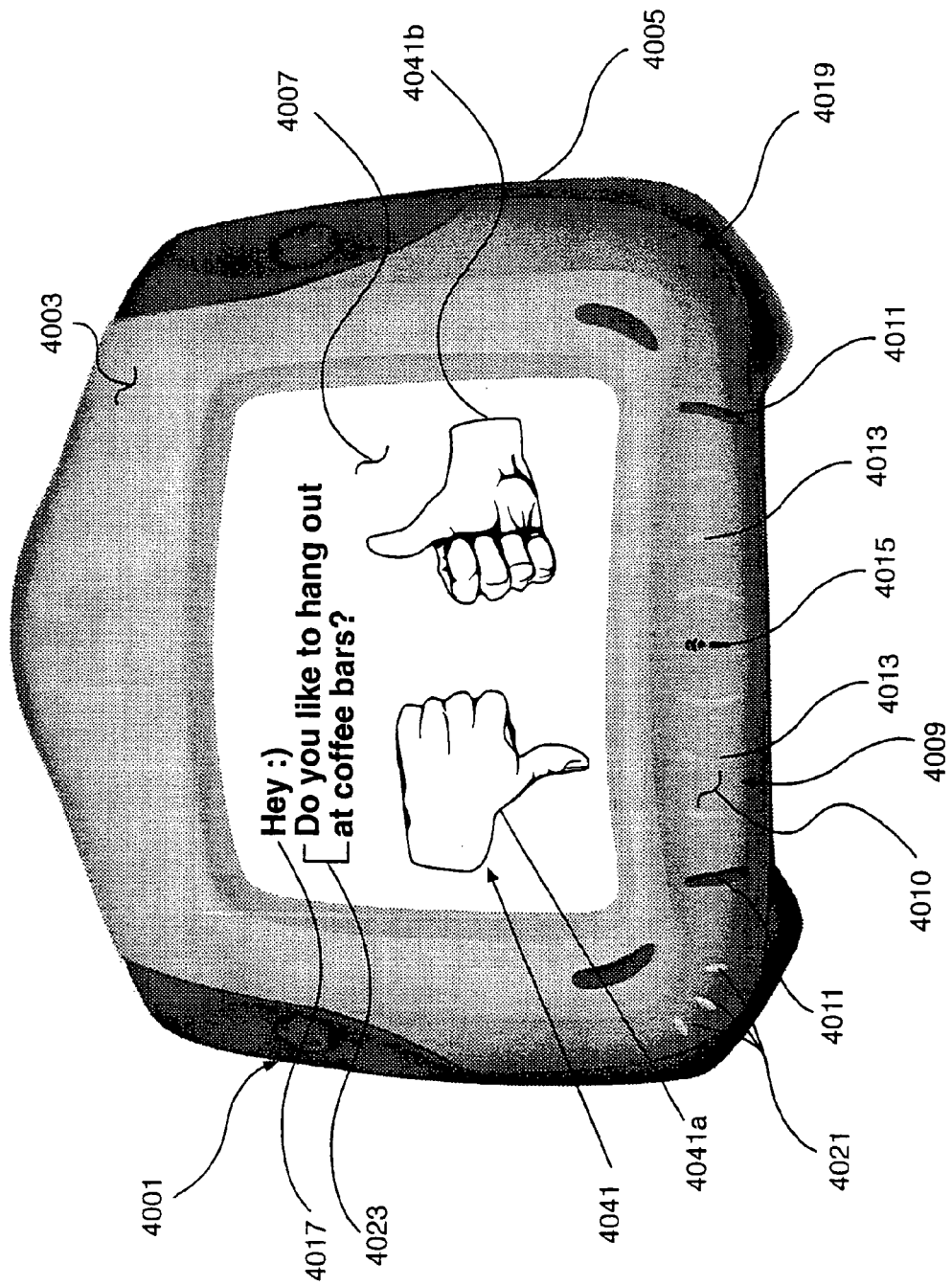
FIGS. 6F and 6G are schematics representing a graphical scaling element having graphical scaling messages which correspond with the electronic data input system and apparatus according to the present invention.
Figure 6G:
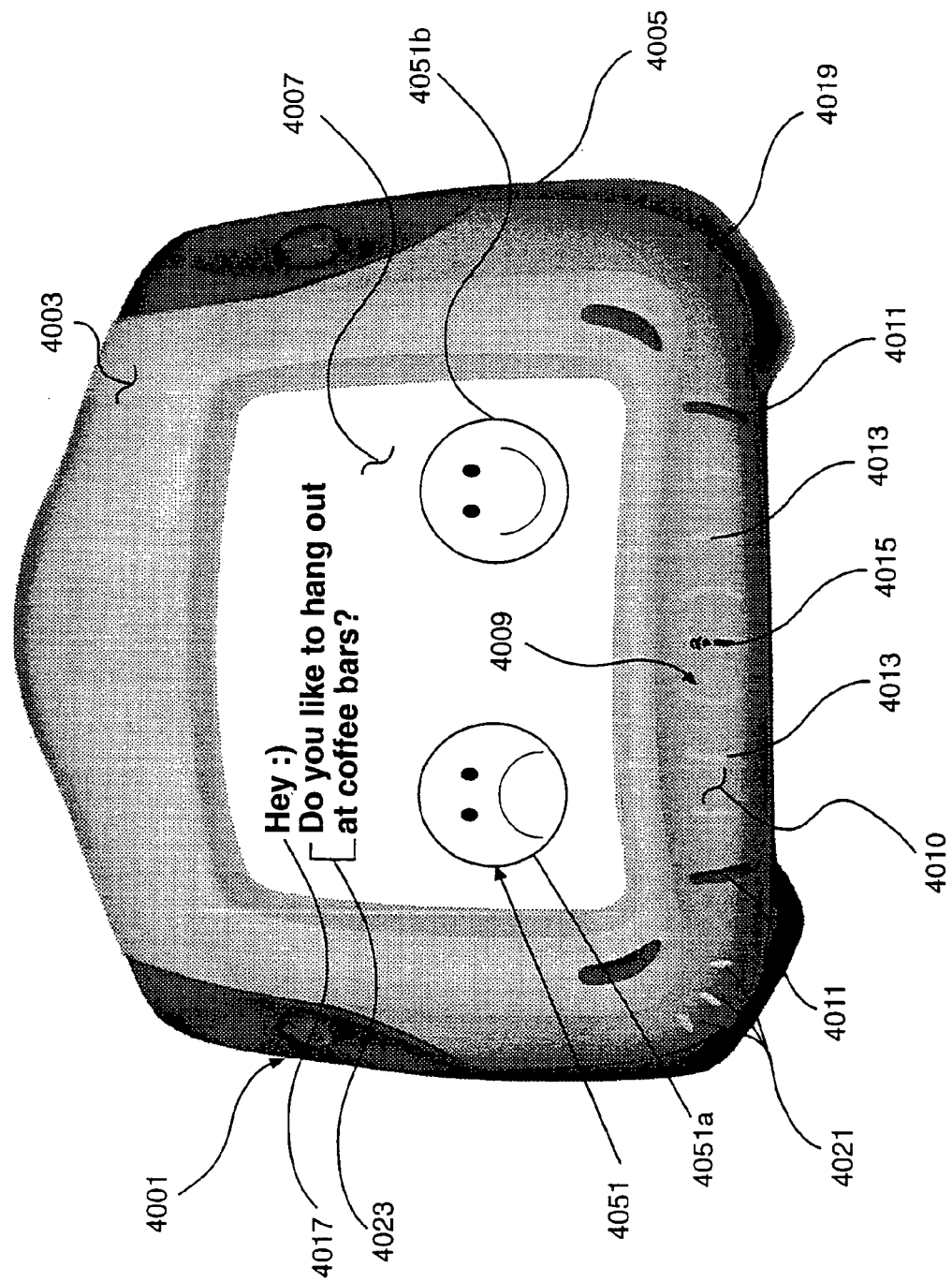

Referring now to FIGS. 6F and 6G in the drawings, alternate embodiments of graphical element 4025 are illustrated. In FIG. 6F, graphical element 4025 having elongated active element 4027 and movable shuttle element 4035 of FIGS. 6A-6E have been replaced by scaling graphical message 4041. Scaling graphical message 4041 is a continuous series of graphical images of a human hand in poses ranging from "thumbs down" 4041a to "thumbs up" 4041b. In FIG. 6F, although both extreme boundary conditions of thumbs down 4041a and thumbs up 4041b are shown for clarity, in actual operation, only one continuously changing view of scaling graphical message 4041 would be shown. In the example of FIG. 6F, boundary text or other indicia 4029 are not necessary, because scaling graphical message 4041 is inherently defined by common usage. As with the example of FIGS. 6A-6E, scaling graphical element 4041 is displayed in close proximity to the digital content, in this instance, query 4023. In response to query 4023, the user activates one-dimensional touch pad 4010 in an appropriate fashion. As the user moves her finger back and forth along the length of one-dimensional touch pad 4010, scaling graphical message 4041 transitions or animates back and forth from thumbs down 4041a to thumbs up 4041b, thereby providing a qualitative or quantitative metric corresponding to the user's scaled response to query 4023. In this example, scaling graphical message 4041 allows the user to select a response to query 4023 within an analog range established by the quantitative or qualitative boundaries established or associated therewith.

In FIG. 6G, scaling graphical message 4041 has been replaced with scaling graphical message 4051. Scaling graphical message 4051 functions similarly to scaling graphical message 4041, with the exception that instead of ranging from thumbs down 4041a to thumbs up 4041b, scaling graphical message 4051 continuously ranges from a "frowning face" 4051a to a "smiling face" 4051b. It should be understood that a large variety of such images may be utilized as scaling graphical images due to their common use in public and the inherent message that is conveyed when they are viewed. It will be appreciated that the same preference information can be captured whether the user responds by manipulating a scaling text message or a scaling graphical message.

In some instances, analog responder 4009 is used to capture a response from the user to digital content being displayed on display screen 4007, but does not manipulate any textual or graphical image being displayed. For example, while digital content in the form of a movie is being displayed on display screen 4007, the user might touch one-dimensional touch pad 4010 at a selected location which indicates that the user is enjoying the movie, i.e., near the right end ridge 4011. In this manner, analog responder 4009 is used to capture the user's opinion or rating of the digital content without the use of any on-screen indicator as described above with reference to FIG. 5A.

Regardless of the manner in which the preference information is obtained from the user's interaction with analog responder 4009, or which embodiment of the input element is employed, the preference information can be captured, recorded, stored, maintained, and used for many useful and valuable purposes. For example, this user initiated preference information may be used to update the user's contextual user profile, thereby affecting the probability that the same digital content will be offered again for presentation to the user, or the probability that related digital content will be offered for presentation to the user. This preference information may also be used by service provider to perform or infer referential preferences as explained above. In this manner, one user's responses may have an affect or impact upon other members' experiences, thereby expanding network 11 and creating community.

Figure 7A:
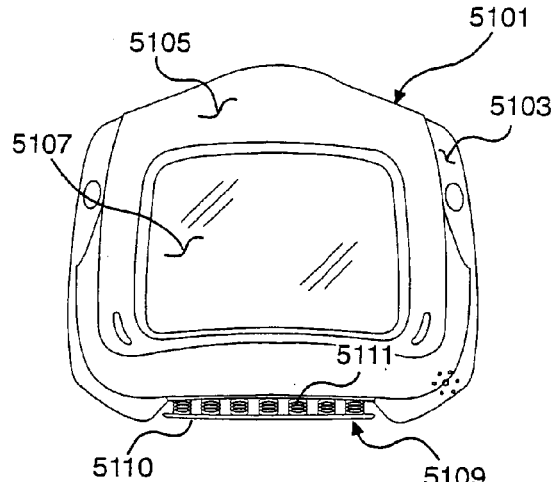
FIGS. 7A-7I are schematics of alternate embodiments of the input element of the electronic data input apparatus according to the present invention.

11.A.3.b. Elongated Button. Referring now to FIG. 7A in the drawings, the alternate embodiment of the electronic data input apparatus in which the input element is an elongated button is illustrated. An appliance 5101 has a body portion 5103 and a display portion 5105. A screen display 5107 is carried by display portion 5105. An electronic data input apparatus 5109 includes an input element in the form of an elongated button 5110. Elongated button 5110 is spring biased by a biasing means, such as a plurality of springs 5111, into a position that is away from body portion 5103. This clearance is exaggerated in FIG. 7A for clarity. It should be understood that elongated button 5110 may be biased by other conventional means employed to bias keys and buttons into static start positions. Elongated button 5110 may be either rigid, such that as the user depresses elongated button 5110 at a selected location, elongated button 5110 generates a corresponding electrical signal; or elongated button 5110 may be a flexible button, such that as elongated button 5110 is depressed at a selected location, elongated button 5110 deforms inwardly at the selected location and generates a corresponding electrical signal.

Figure 7B:
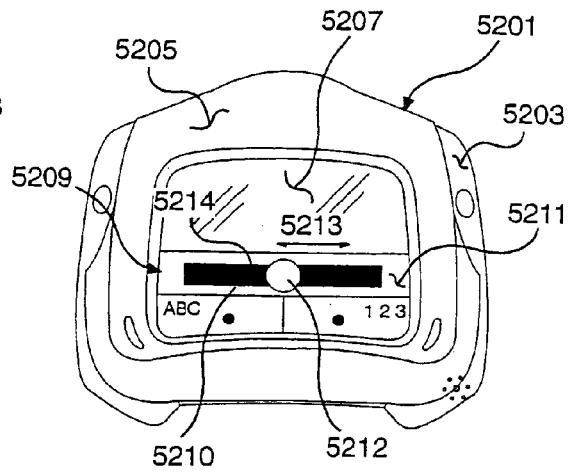

11.A.3.c. Touch Screen with Graphical Slider. Referring now to FIG. 7B in the drawings, the alternate embodiment of the electronic data input apparatus in which the input element is a touch screen with graphical slider is illustrated. An appliance 5201 has a body portion 5203 and a display portion 5205. A screen display 5207 is carried by display portion 5205. An electronic data input apparatus 5209 includes an input element in the form of a touch screen with graphical slider 5210. Touch screen with graphical slider 5210 is a digitized touch screen 5211 which may integrated into screen display 5207 if screen display 5207 is a digitized touch screen, or may be separate from screen display 5207 if screen display 5207 is not a digitized touch screen. Touch screen with graphical slider 5210 includes a graphical shuttle element 5212 that is operably associated with a graphical slider element 5214. Upon the presentation of digital content, graphical slider element 5214 is displayed on digitized touch screen 5211. The user activates touch screen with graphical slider 5110 by touching graphical slider element 5214 with her finger, a light pen, or a stylus. It is preferred that graphical shuttle element 5212 not be displayed until the user makes an initial contact with digitized touch screen 5211. This preserves the non-biasing feature of touch screen with graphical slider 5210, in that no default or starting condition is displayed that might influence the user's response. After the user makes initial contact with digitized touch screen 5211, her motions in the directions of arrow 5213 along graphical slider element 5214 are tracked by graphical shuttle element 5212. When the user releases her finger, the light pen, or the stylus, the location of graphical shuttle element 5212 with relation to graphical slider element 5214 is recorded and a corresponding electrical signal is generated. The user may also record her response by touching a separate designated portion of digitized touch screen 5211. In this manner, the user's response or rating of the digital content is obtained.

Figure 7C:
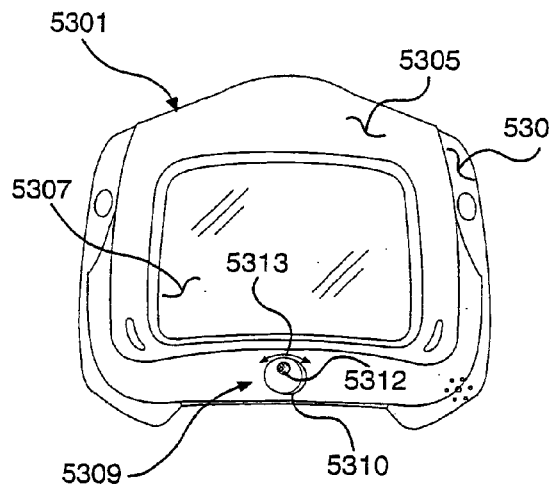

11.A.3.d. Jog Wheel. Referring now to FIG. 7C in the drawings, the alternate embodiment of the electronic input apparatus in which the input element is a jog wheel is illustrated. An appliance 5301 has a body portion 5303 and a display portion 5305. A screen display 5307 is carried by display portion 5305. An electronic data input apparatus 5309 includes an input element in the form of a jog wheel 5310 which rotates in a plane parallel with screen display 5307. In a typical installation, jog wheel 5310 is spring biased toward a center, or neutral, position. Jog wheel 5310 has a recessed area 5312 with which the user may rotate jog wheel 5310 in either a clockwise or counter-clockwise direction as indicated by arrow 5313 to input his response to digital content. In this embodiment, clockwise and counter-clockwise rotation of jog wheel 5310 is equivalent to back and forth movement of the user's finger upon one-dimensional touch pad 4010. As the user rotates jog wheel 5310, an on-screen indicator (not shown, but similar to the on-screen indicators discussed above with reference to FIGS. 6A-6G) is manipulated to allow the user track his response. Once the user has selected his response as indicated by the on-screen indicator, he records his response by clicking down on jog wheel 5310, leaving jog wheel 5310 in a specific position for a predetermined amount of time, or by any other appropriate means. When the user selects his response, a corresponding electrical signal is generated by jog wheel 5310. It should be understood that jog wheel 5310 may be non-biased so that there is no default start or trim position.

Figure 7D:
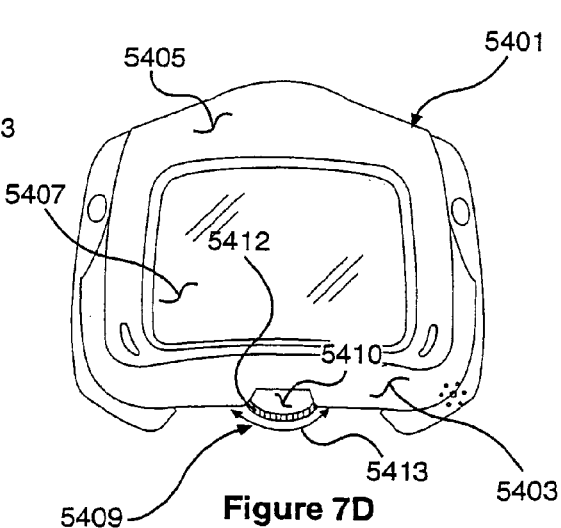

11.A.3.e. Scroll Wheel. Referring now to FIG. 7D in the drawings, the alternate embodiment of the electronic input apparatus in which the input element is a scroll wheel is illustrated. An appliance 5401 has a body portion 5403 and a display portion 5405. A screen display 5407 is carried by display portion 5405. An electronic data input apparatus 5409 includes an input element in the form of a scroll wheel 5410 which rotates in a plane parallel with screen display 5407. As opposed to jog wheel 5310, scroll wheel 5410 is not spring biased in any start or default position. Scroll wheel 5410 has a knurled edge 5412 with which the user rotates scroll wheel 5410 in either a clockwise or counter-clockwise direction as indicated by arrow 5413 to input his response to digital content. In this embodiment, clockwise and counter-clockwise rotation of scroll wheel 5410 is equivalent to back and forth movement of the user's finger on one-dimensional touch pad 4010. As the user rotates scroll wheel 5410, an on-screen indicator (not shown, but similar to the on-screen indicators discussed above with reference to FIGS. 6A-6G) is manipulated to allow the user track his response. Once the user has selected his response as indicated by the on-screen indicator, he records his response by clicking inward on scroll wheel 5410, leaving scroll wheel 5410 in a specific position for a predetermined amount of time, or by any other appropriate means. When the user selects his response, a corresponding electrical signal is generated by scroll wheel 5410. It should be understood that scroll wheel 5410 may be spring biased so that there is a default start or trim position.

Figure 7E:
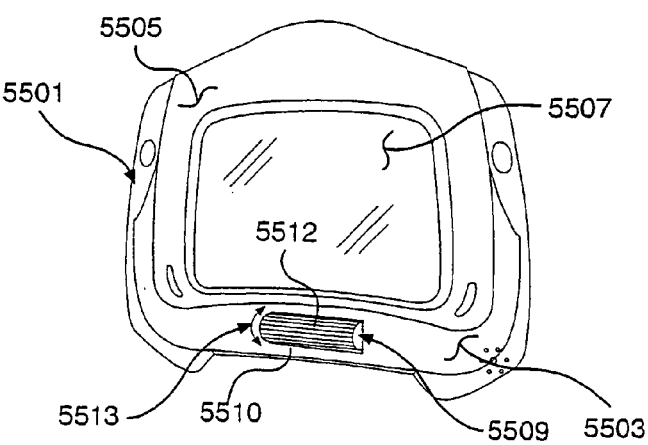

11.A.3.f. Thumb Wheel. Referring now to FIG. 7E in the drawings, the alternate embodiment of the electronic input apparatus in which the input element is a thumb wheel is illustrated. An appliance 5501 has a body portion 5503 and a display portion 5505. A screen display 5507 is carried by display portion 5505. An electronic data input apparatus 5509 includes an input element in the form of a thumb wheel 5510 which rotates in a plane perpendicular with screen display 5507. As with scroll wheel 5410, thumb wheel 5510 is not spring biased toward a start or default position. Thumb wheel 5510 has a knurled edge 5512 with which the user rotates thumb wheel 5510 in either a forward or reverse direction as indicated by arrow 5513 to input her response to digital content. In this embodiment, forward and reverse rotation of thumb wheel 5510 is equivalent to back and forth movement of the user's finger upon one-dimensional touch pad 4010. As the user rotates thumb wheel 5510, an on-screen indicator (not shown, but similar to the on-screen indicators discussed above with reference to FIGS. 6A-6G) is manipulated to allow the user track her response. Once the user has selected her response as indicated by the on-screen indicator, she records her response by clicking inward on thumb wheel 5510, leaving thumb wheel 5510 in a specific position for a predetermined amount of time, or by any other appropriate means. When the user selects her response, a corresponding electrical signal is generated by thumb wheel 5510. It should be understood that thumb wheel 5510 may be spring biased so that there is a default start or trim position.

Figure 7F:
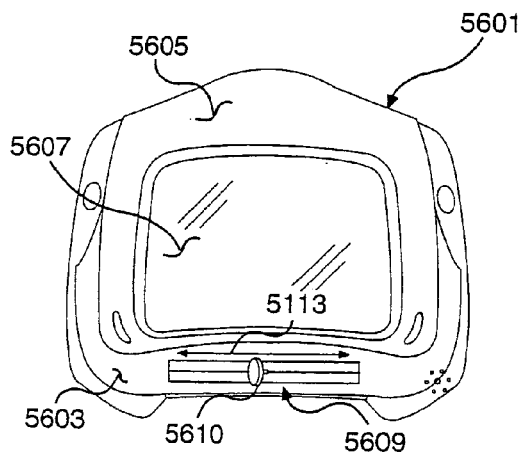

11.A.3.g. Linear Sliding Knob. Referring now to FIG. 7F in the drawings, the alternate embodiment of the electronic input apparatus in which the input element is a linear sliding knob is illustrated. An appliance 5601 has a body portion 5603 and a display portion 5605. A screen display 5607 is carried by display portion 5605. An electronic data input apparatus 5609 includes an input element in the form of a linear sliding knob 5610 which translates in a plane parallel with screen display 5607. Linear sliding knob 5610 is preferably a linear potentiometer. The user translates linear sliding knob 5610 in a back and forth direction as indicated by arrow 5613 to input her response to digital content. In this embodiment, back and forth translation of linear sliding knob 5610 is equivalent to back and forth movement of the user's finger on one-dimensional touch pad 4010. In this embodiment, no on-screen indicator is necessary for the user to track her response because the relative location of linear sliding knob 5610 is indicative of the user's response. Once the user has selected her response, she records her response by clicking inward on linear sliding knob 5610, leaving linear sliding knob 5610 in a specific position for a predetermined amount of time, or by any other appropriate means. When the user selects her response, a corresponding electrical signal is generated by linear sliding knob 5610. It should be understood that linear sliding knob 5610 may be spring biased so that there is a default start or trim position.

Figure 7G:
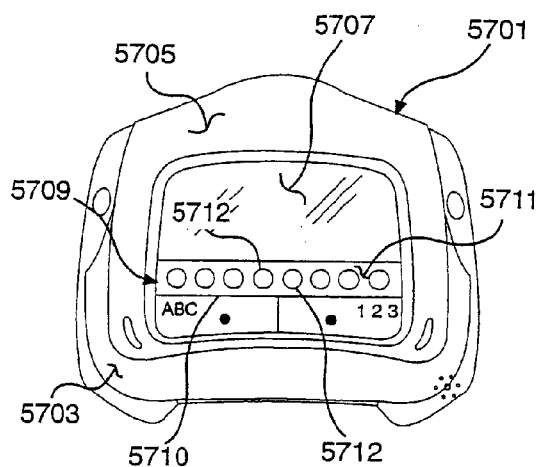

11.A.3.h. Touch Screen with Graphical Radio Buttons. Referring now to FIG. 7G in the drawings, the alternate embodiment of the electronic data input apparatus in which the input element is a touch screen with graphical radio buttons is illustrated. An appliance 5701 has a body portion 5703 and a display portion 5705. A screen display 5707 is carried by display portion 5705. An electronic data input apparatus 5709 includes an input element in the form of a touch screen with graphical radio buttons 5710. Touch screen with graphical radio buttons 5710 is a digitized touch screen 5711 which may integrated into screen display 5707 if screen display 5707 is a digitized touch screen, or may be separate from screen display 5707 if screen display 5707 is not a digitized touch screen. Touch screen with graphical radio buttons 5710 includes a plurality of graphical radio buttons 5712. Upon the presentation of digital content, graphical radio buttons 5712 are displayed on digitized touch screen 5711. The user activates touch screen with graphical radio buttons 5710 by touching individual graphical radio buttons 5712 with her finger, a light pen, or a stylus. It is preferred that only a single radio button 5712 be selected at a time, but it should be understood that certain applications may allow the user to select a plurality of radio buttons 5712. After the user makes initial contact with digitized touch screen 5711, her selections are tracked by graphical radio buttons 5712. If the user continues to touch a particular radio button 5712, that radio button 5712 toggles between selected and unselected. Once the user has selected her response, she records her response by touching a designated portion of digitized touch screen 5711, leaving touch screen with graphical radio buttons 5710 in a selected state for a predetermined amount of time, or by any other appropriate means. After the user makes her selections, the selected radio buttons 5712 are recorded and corresponding electrical signals are generated. In this manner, the user's response or rating of the digital content is obtained.

Figure 7H:
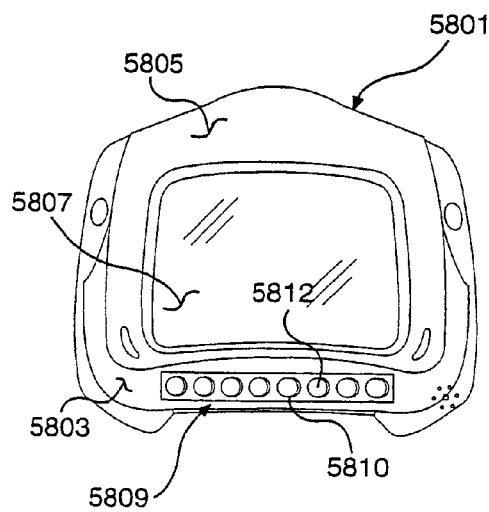

11.A.3.i. Dedicated Buttons. Referring now to FIG. 7H in the drawings, the alternate embodiment of the electronic data input apparatus in which the input element is a bank of dedicated buttons is illustrated. An appliance 5801 has a body portion 5803 and a display portion 5805. A screen display 5807 is carried by display portion 5805. An electronic data input apparatus 5809 includes an input element in the form of a bank of dedicated buttons 5810. Bank of dedicated buttons 5810 may integrated into an existing thumbboard or keyboard (see FIG. 2O), or may be a separate bank of buttons. Bank of dedicated buttons 5810 includes a plurality of electro-mechanical buttons 5812. It is preferred that dedicated buttons be spring biased into an un-depressed position. The user activates bank of dedicated buttons 5810 by depressing individual dedicated buttons 5812 a predetermined distance in response to digital content displayed on screen display 5807. If the user continues to depress a particular dedicated button 5812, that dedicated button 5812 toggles between selected and unselected. In addition, it is preferred that if the user depresses a second dedicated button, the first depressed dedicated button 5812 becomes unselected. Once the user has selected her response, she records her response by leaving bank of dedicated buttons 5810 in a selected state for a predetermined amount of time, or by any other appropriate means. After the user makes her selections, the selected dedicated button 5812 is recorded and a corresponding electrical signal is generated. In this manner, the user's response or rating of the digital content is obtained.

Figure 7I:
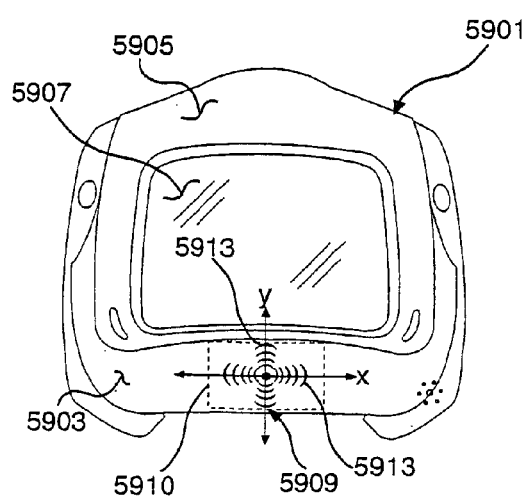

11.A.3.j. Two-Dimensional Touch Pad. Referring now to FIG. 7I in the drawings, the alternate embodiment of the electronic data input apparatus in which the input element is a two-dimensional touch pad is illustrated. An appliance 5901 has a body portion 5903 and a display portion 5905. A screen display 5907 is carried by display portion 5905. An electronic data input apparatus 5909 includes an input element in the form of a two-dimensional touch pad 5910. Two-dimensional touch pad 5910 is configured and functions similar to one-dimensional touch pad 4010. As such, two-dimensional touch pad 5910 may be integral with the surface material of body portion 5905 or may include a separate digitized element disposed within body portion 5905. In the latter situation, the surface material of body portion 5905 is flexibly configured to allow depression of body portion 5905 and activation of two-dimensional touch pad 5910. By "two-dimensional," it is meant that the touch pad is configured or digitized to capture both the longitudinal component along an X-axis and the transverse component along a Y-axis of any touch input. Thus, if the user activated two-dimensional touch pad 5910 by touching in an upper right-hand location, both the longitudinal component along the X-axis and the transverse component along the Y-axis of the input would be captured and recorded. Just as with one-dimensional touch pad 4010, two-dimensional touch pad 5910 does not require an on-screen indicator for the user to respond to or rate digital content displayed on screen display 5907.

With two-dimensional touch pad 5910, more responses or parameters may be recorded with a single response input from the user, wherein the location along the X-axis represents one response or parameter, and the location along the Y-axis represents another response or parameter. For example, if a particular digital content is a query about coffee bars, a user would have the capability of not only indicating her level of appreciation for coffee bars, but the time of day that she most likes to hang out there. In this example, the user's appreciation of coffee bars might be entered by activating two-dimensional touch pad 5910 along the X-axis, while the user's favorite time of day to spend time in coffee bars might be entered by the user's selection along the Y-axis. Two-dimensional touch pad may include raised ridges 5913 or other visual indicia to aid the user in spatially locating her response. As with one-dimensional touch pad 4010, two-dimensional touch pad 5910 may be programmed to function in either an absolute mode or a relative mode. It is preferred that when the user releases her finger from two-dimensional touch pad 5910, the user's response is captured and recorded in appliance 5901.

11.A.4. Utilizing Analog Responder in Other Personal Computing Devices.

Figure 8A:
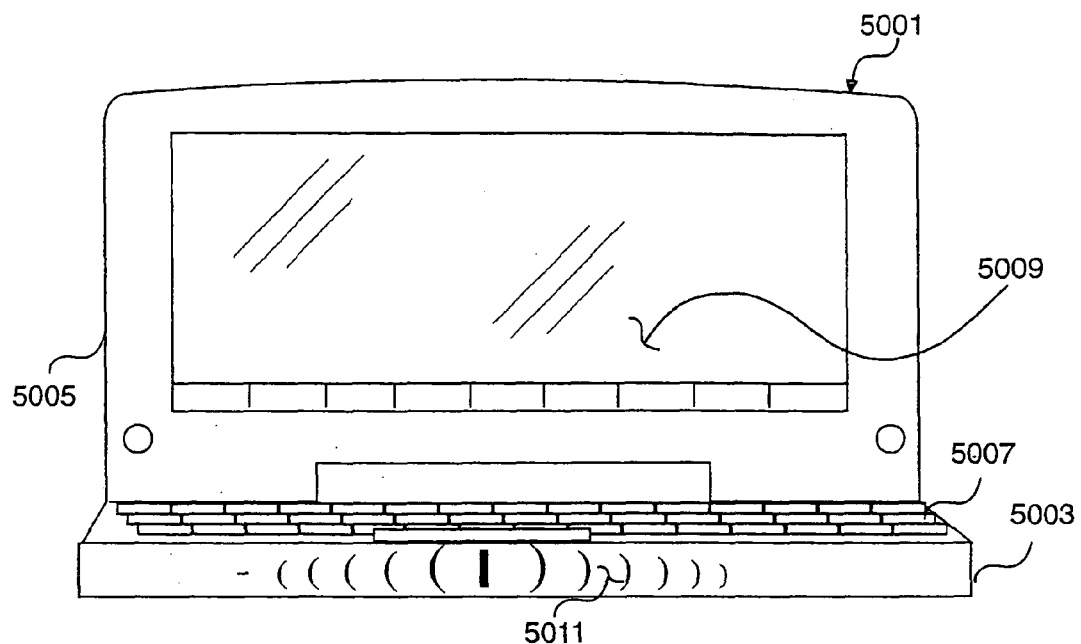
FIGS. 8A-8E are schematics illustrating the electronic data input apparatus according to the present invention being utilized on a variety of personal communication devices.

11.A.4.a. Analog Responder Integrated into Device. Referring now to FIGS. 8A-8E in the drawings, the electronic data input system and apparatus according to the present invention is illustrated shown being utilized on a variety of personal computing devices. In FIG. 8A, a palmtop computer 5001 of clamshell design has a body portion 5003 and a display portion 5005. Body portion 5003 has a keyboard 5007 and display portion 5005 has a display screen 5009. An electronic data input apparatus, or analog responder, 5011 according to the present invention is operably associated body portion 5003. This allows palmtop computer 5001 to capture analog responses, inputs, and/or ratings to digital content, such as queries.

Figure 8B:
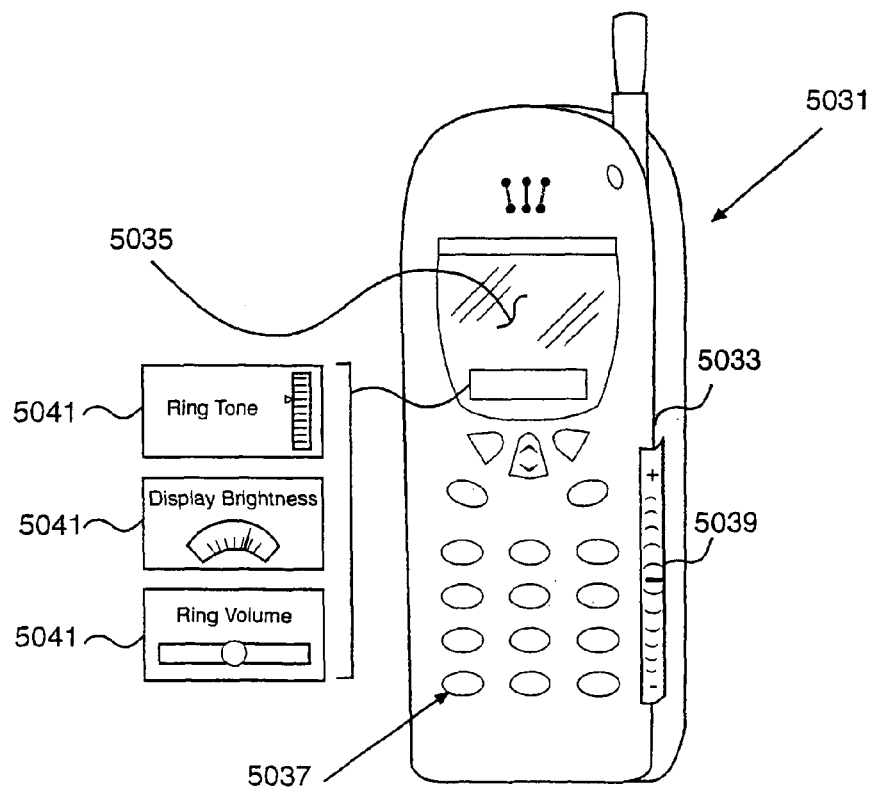

In FIG. 8B, a wireless phone 5031 has a body portion 5033 and a display screen 5035. Body portion 5033 has a key pad 5037. An analog responder 5039 according to the present invention is operably associated with body portion 5033. As is shown, a plurality of scaling graphical messages 5041 may be displayed on display screen 5035, whereby the user may input an analog response to certain queries, such as ring tone, display brightness, and ring volume. Scaling graphical messages 5041 are commonly used graphical images that inherently indicate the status of wireless phone 5031.

Figure 8C:
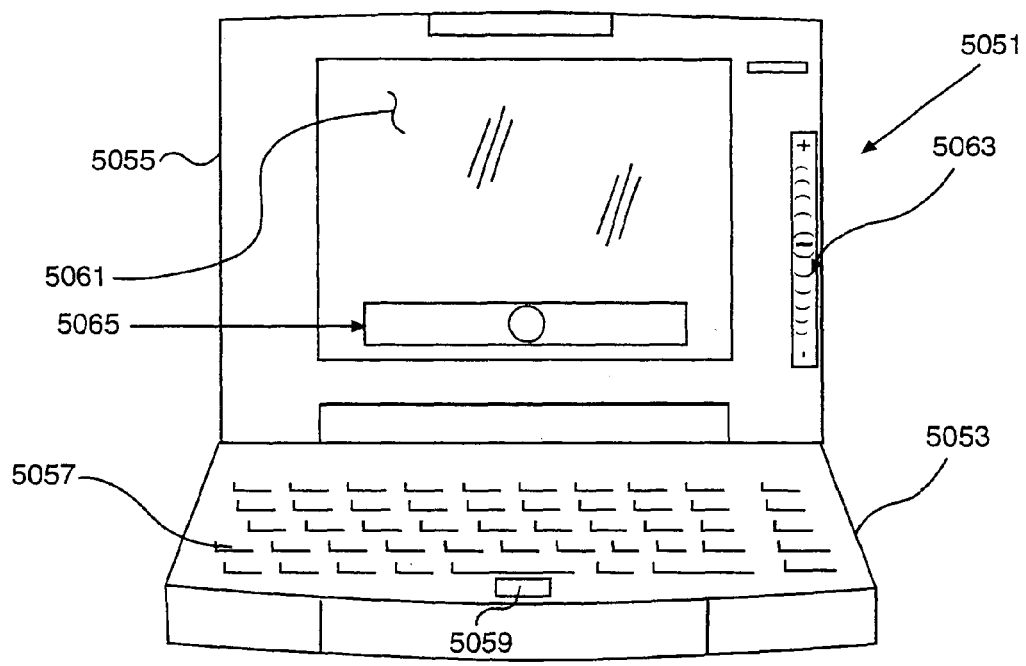

In FIG. 8C, a notebook computer 5051 of clamshell design has a body portion 5053 and a display portion 5055. Body portion 5053 has a keyboard 5057 and a conventional touch pad 5059. Display portion 5055 has a display screen 5061. An analog responder 5063 according to the present invention is disposed within display portion 5055. As is shown, a scaling graphical element 5065 is displayed on display screen 5061. This embodiment illustrates that analog responder 5063 may be disposed anywhere on a personal computing device that is convenient for the user to operate. This embodiment also illustrates that the analog responder of the present invention may be utilized on a personal computing device that has other touch pads or similar input devices. Analog responder 5063 allows notebook computer 5051 to capture analog responses or inputs to queries or other outputs.

Figure 8D:
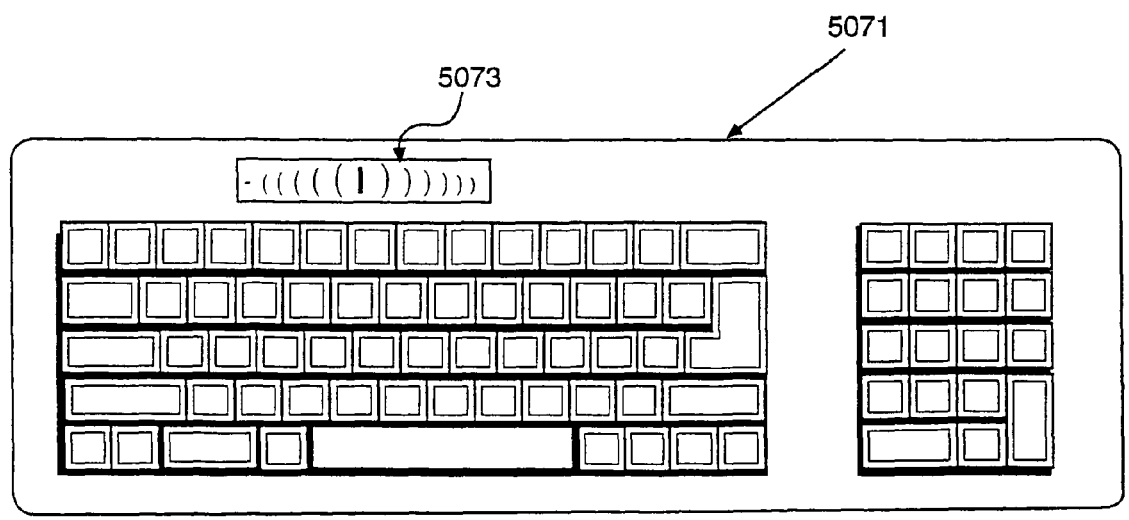

In FIG. 8D, a traditional keyboard 5071 has been modified by the addition of an analog responder according to the present invention. In this embodiment, an analog responder 5073 is operably associated with keyboard 5071. This embodiment is particularly useful when users access network 11 over their personal computers, as opposed to a location-aware wireless communication appliance.

Figure 8E:
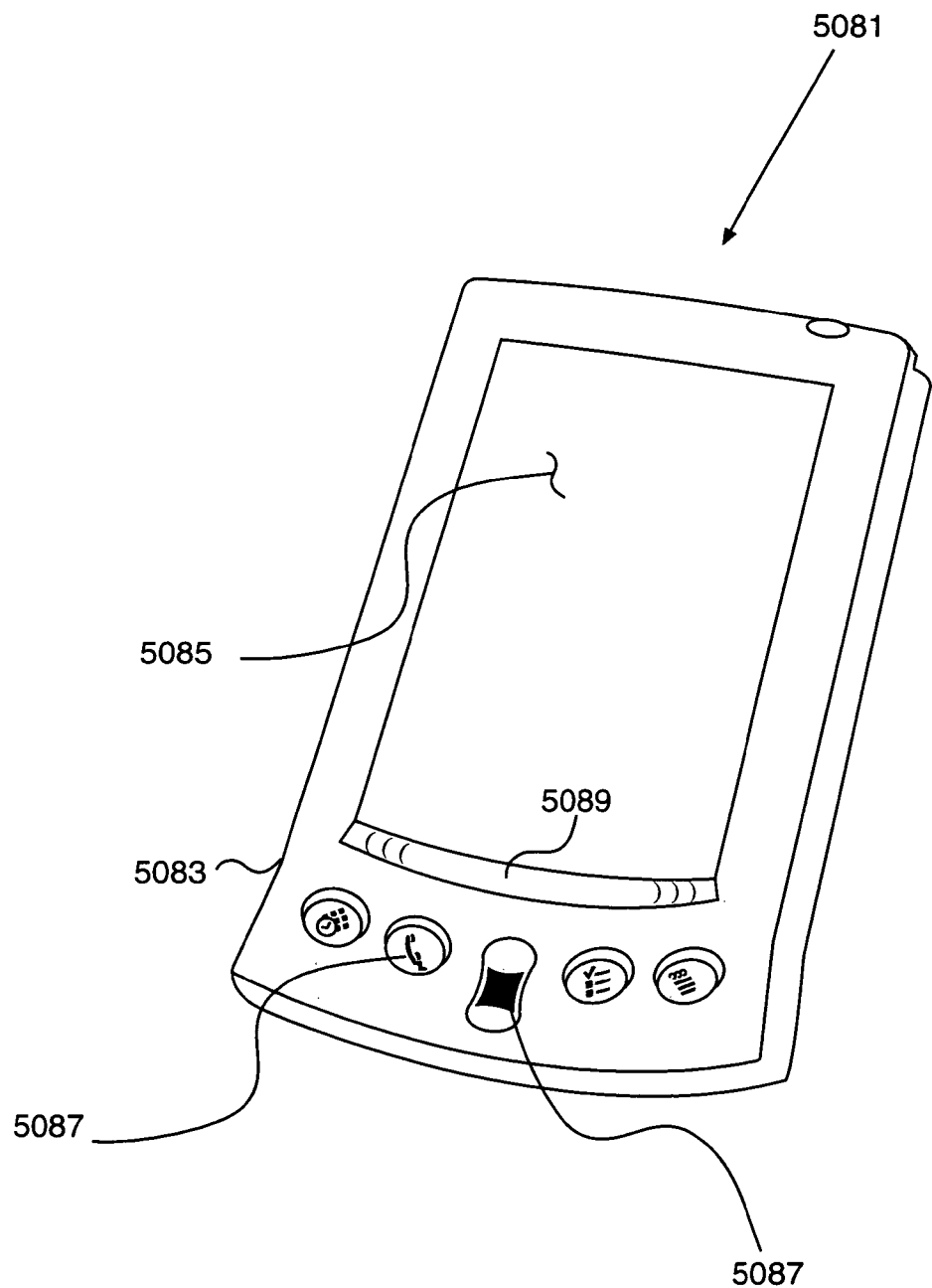

In FIG. 8E, a personal digital assistant (PDA) 5081 has a body portion 5083 and a display screen 5085. Body portion 5083 has no keyboard, but does have a plurality of input buttons 5087. Display screen 5085 is a touch screen so that the user may input data into PDA 5081 with her fingers, or by the use of a stylus or light pen. An analog responder 5089 has been operably associated with body portion 5083. Analog responder may be either an independent component, or may be integrated into touch screen 5085. In this manner, analog responder 5089 allows PDA 5081 to capture analog responses or inputs to queries or other digital content.

Figure 9:
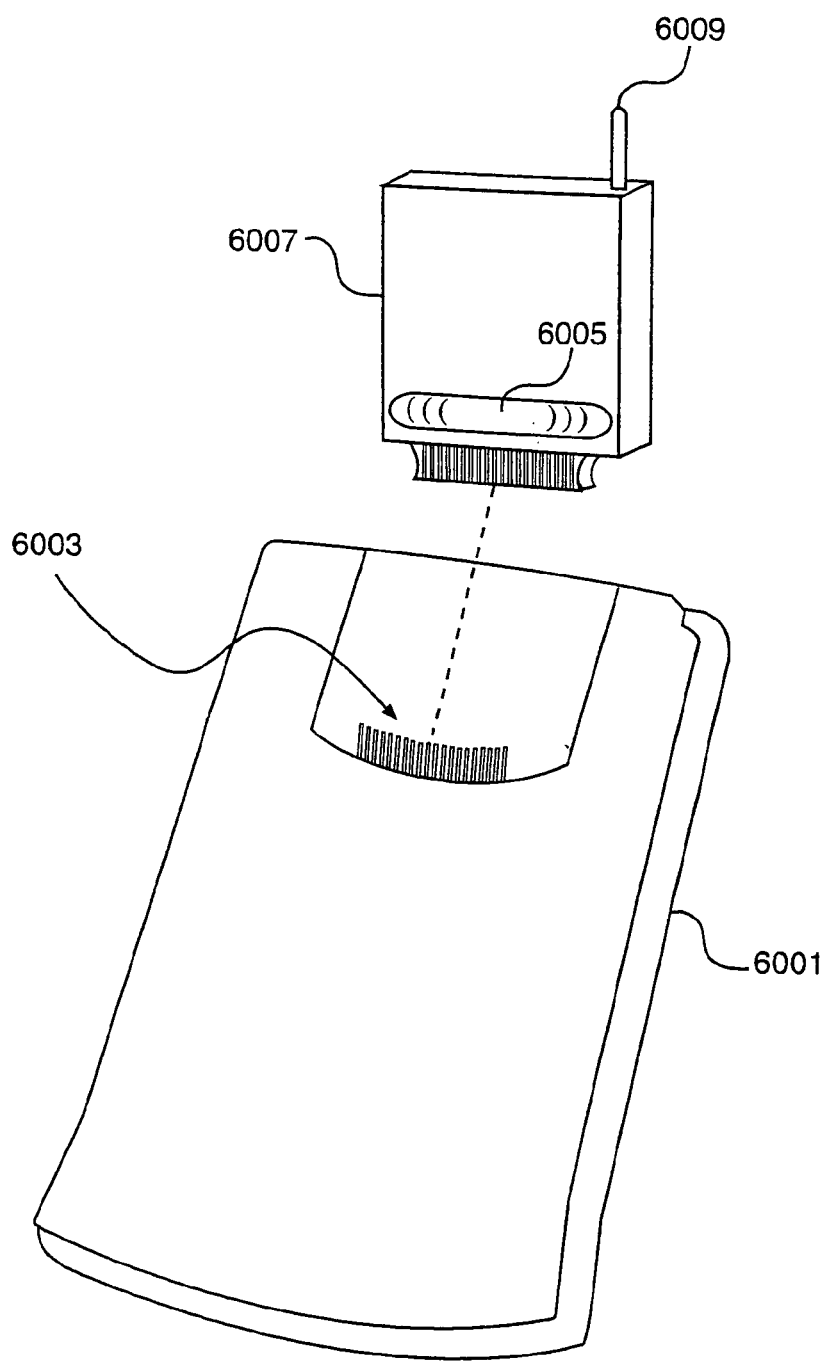
FIG. 9 is an alternate embodiment of the electronic data input system and apparatus according to the present invention being utilized as an add-on expansion module in a conventional personal communication device.
Figure 101:
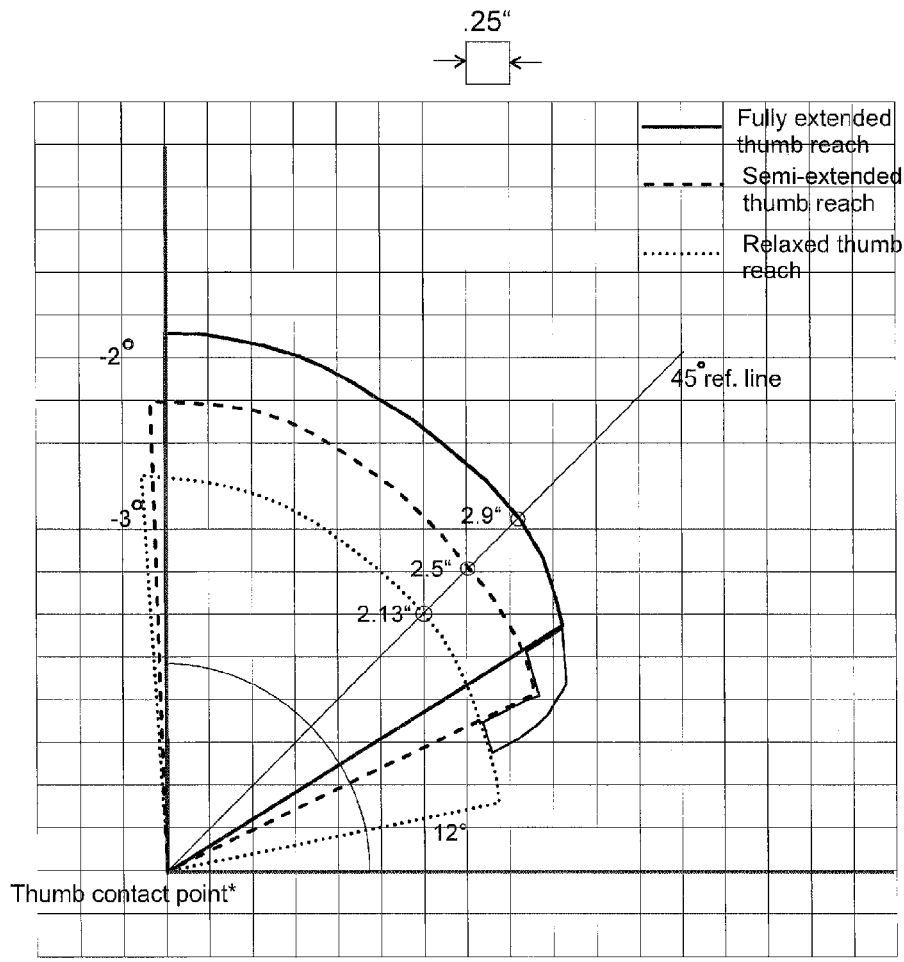
Figure 100:
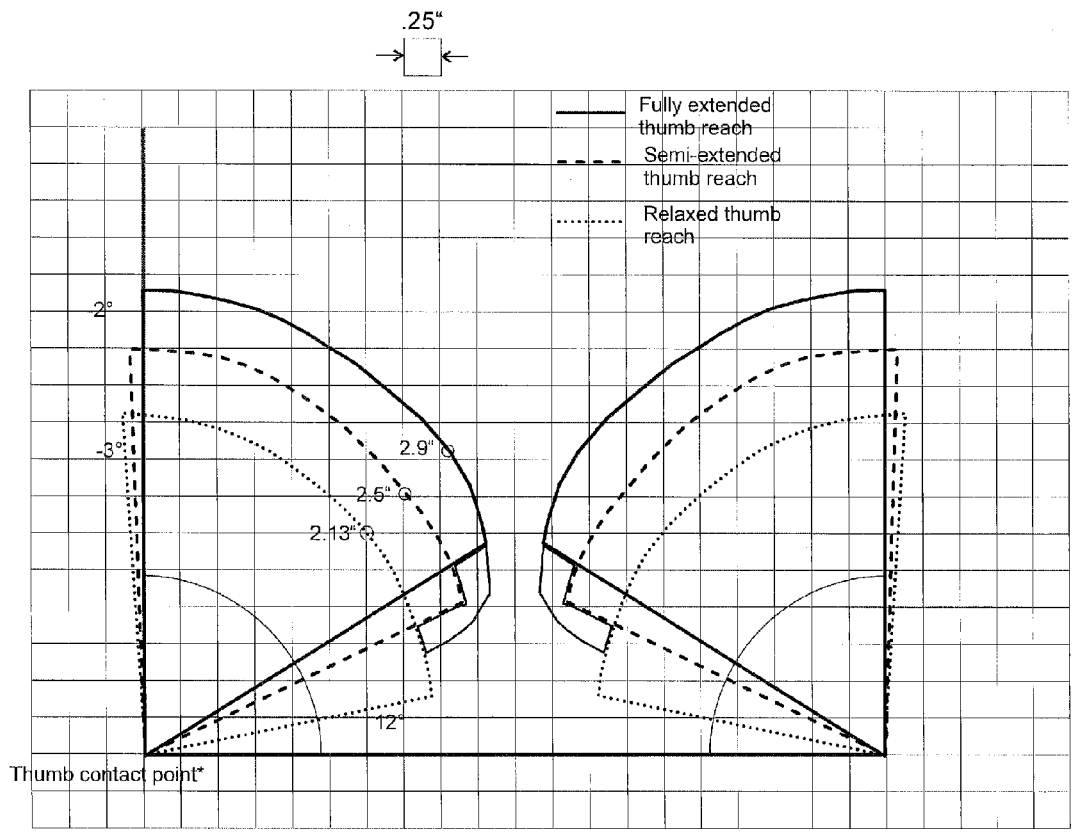

11.A.4.b. Analog Responder as an Expansion Module. Referring now to FIG. 9 in the drawings, an alternate embodiment of the analog responder according to the present invention is illustrated. A PDA 6001, or other personal computing device, is shown in a rear perspective view. PDA 6001 includes an accessory port 6003, usually of proprietary design. In this embodiment, an analog responder 6005 is operably associated with an expansion module 6007 that plugs into accessory port 6003 of PDA 6001. Expansion module 6007 may include other components that are present in a location-aware wireless communication appliance of the present invention, such as a GPS antenna 6009. In this manner, a conventional PDA can be converted into a device having the same or comparable functionality of a location-aware wireless communication appliance according to the present invention.

Although only the one-dimensional touch pad embodiment of the input element of electronic data input system and apparatus of the present invention has been illustrated in FIGS. 8A-8E and FIG. 9, it should be understood that any of the alternate embodiments of the input element which are illustrated in FIGS. 7A-7I may be used in these installations and applications. In addition, the electronic data input system and apparatus of the present invention may also be used with wearable personal computing devices.

Figure 10J:
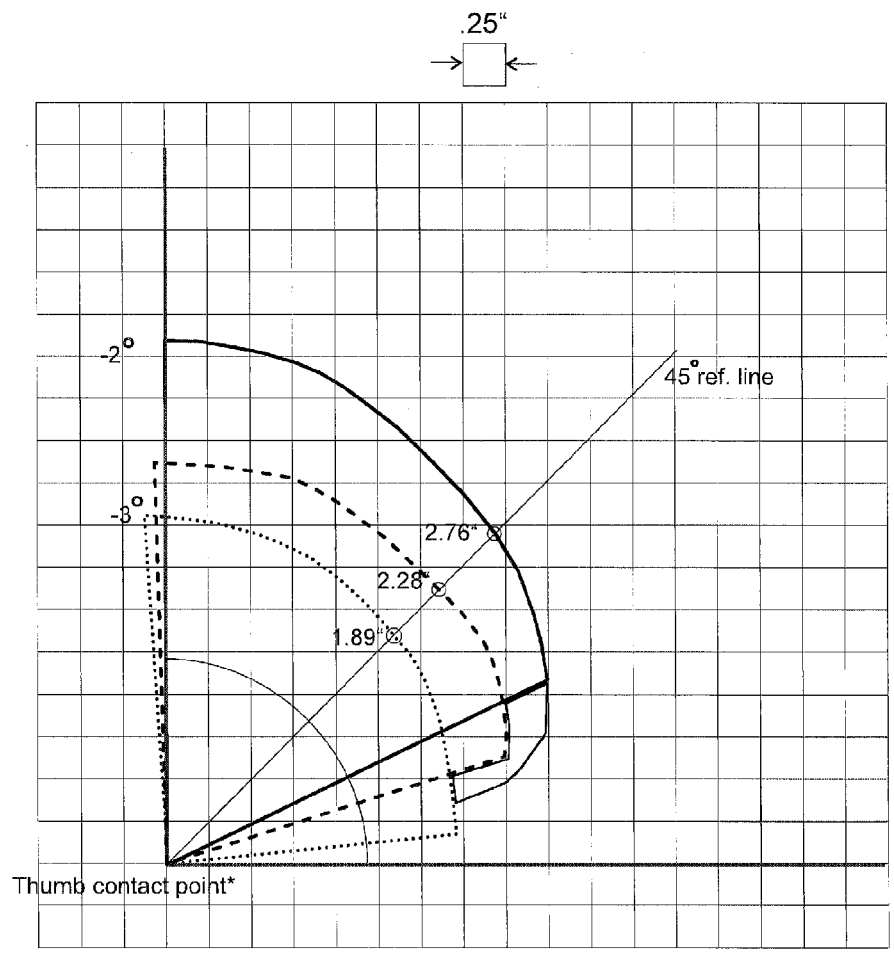
Figure 10K:
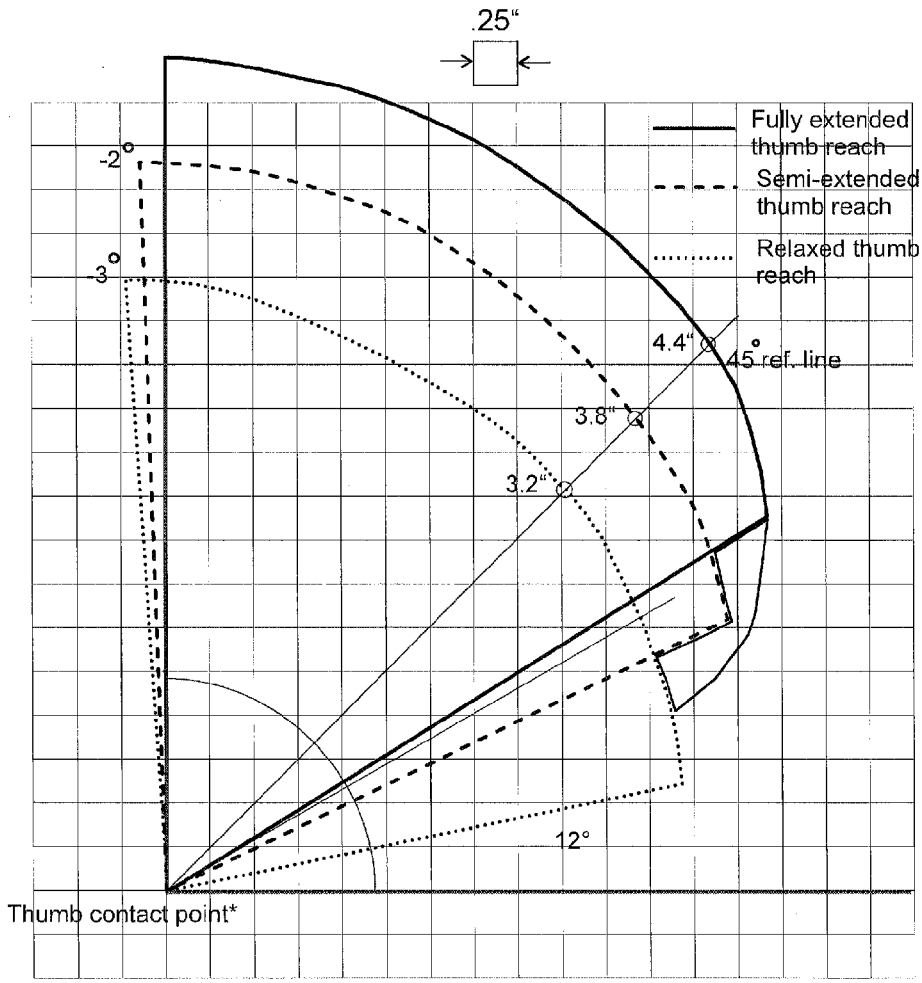
Figure 10L:
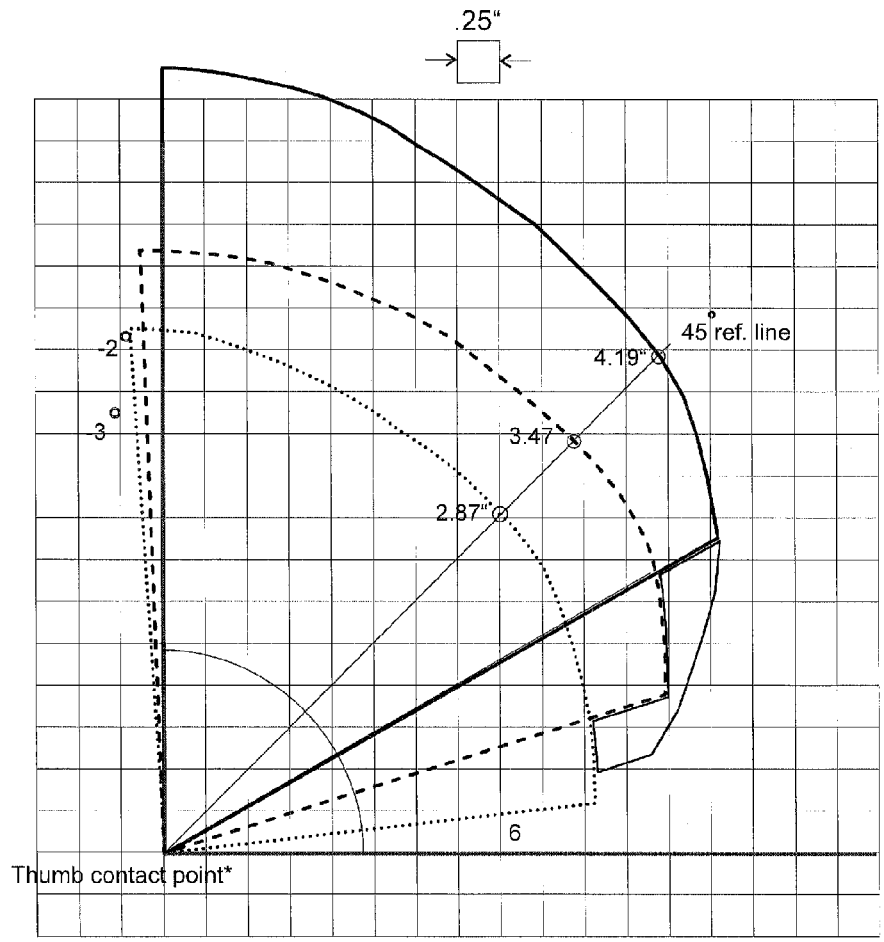
Figure 10M:
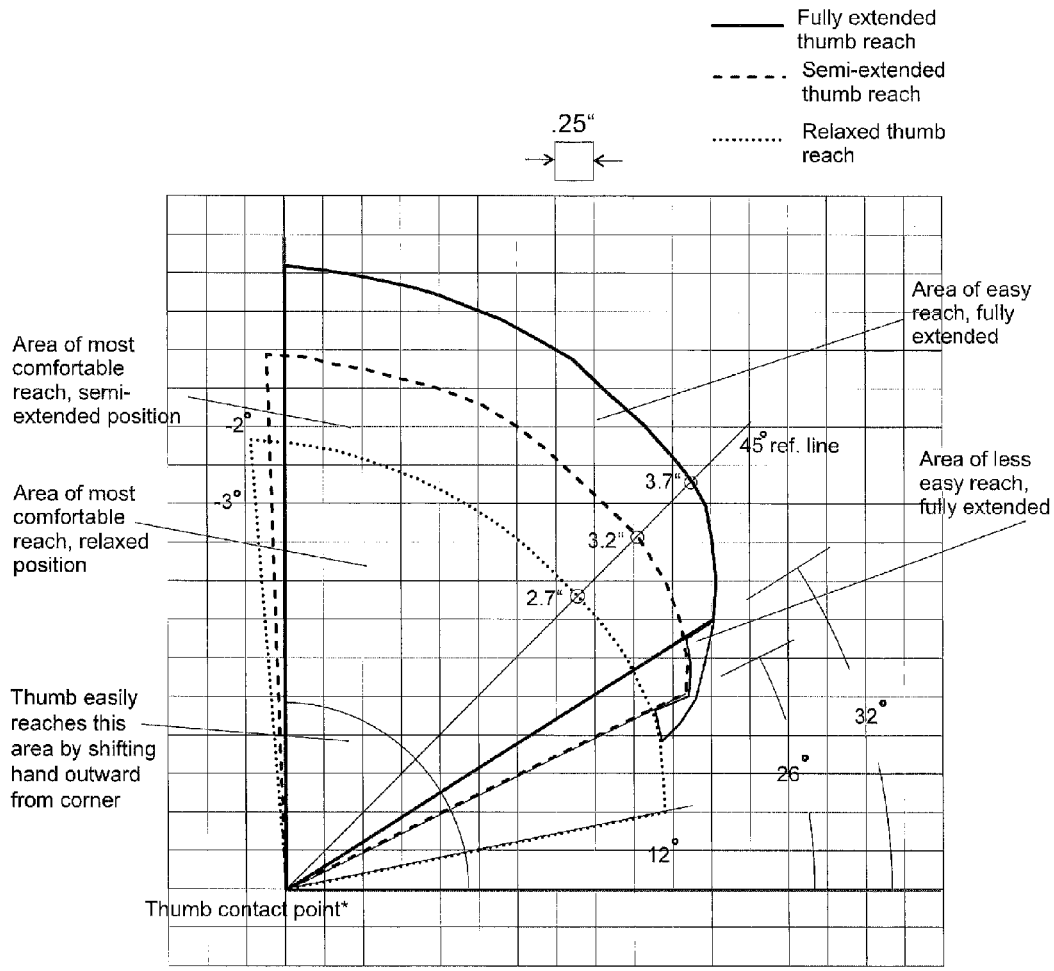
Figure 10N:
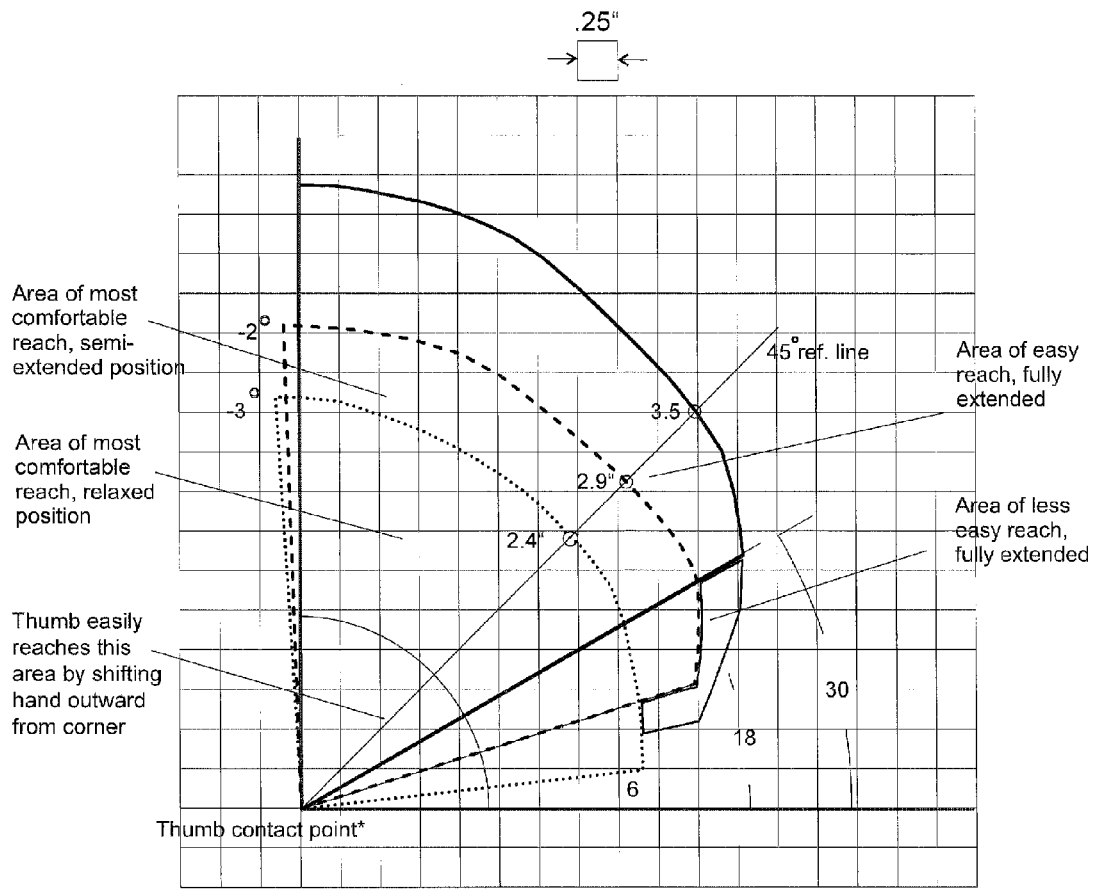
Figure 10S:
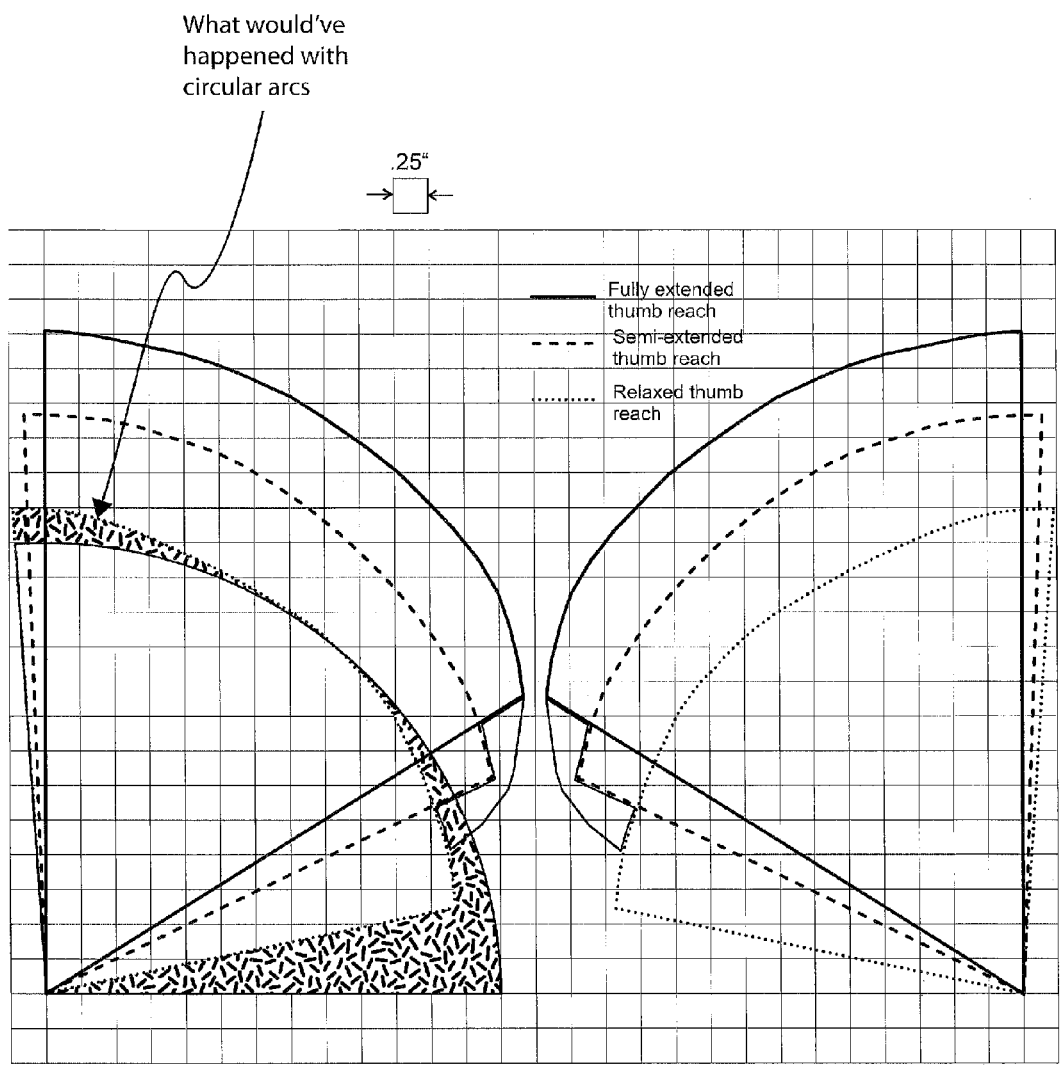
Figure 10T:
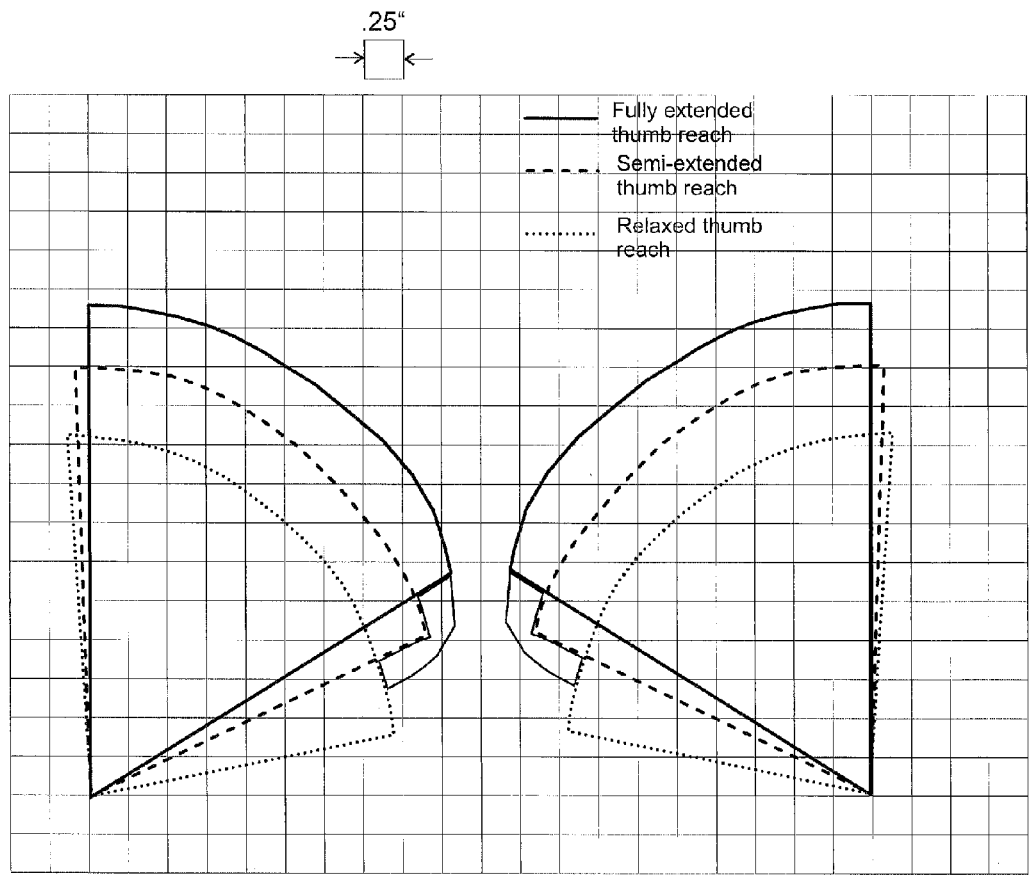
Figure 10V:
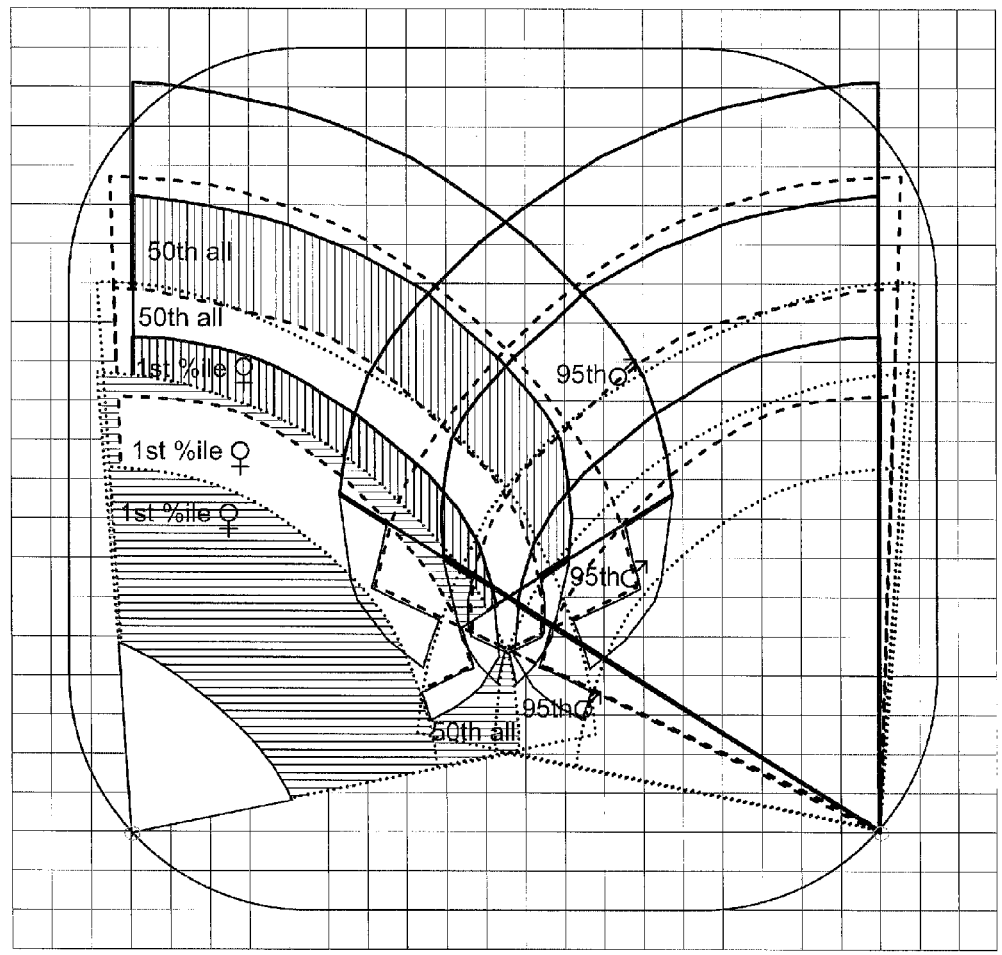
Figure 10W:
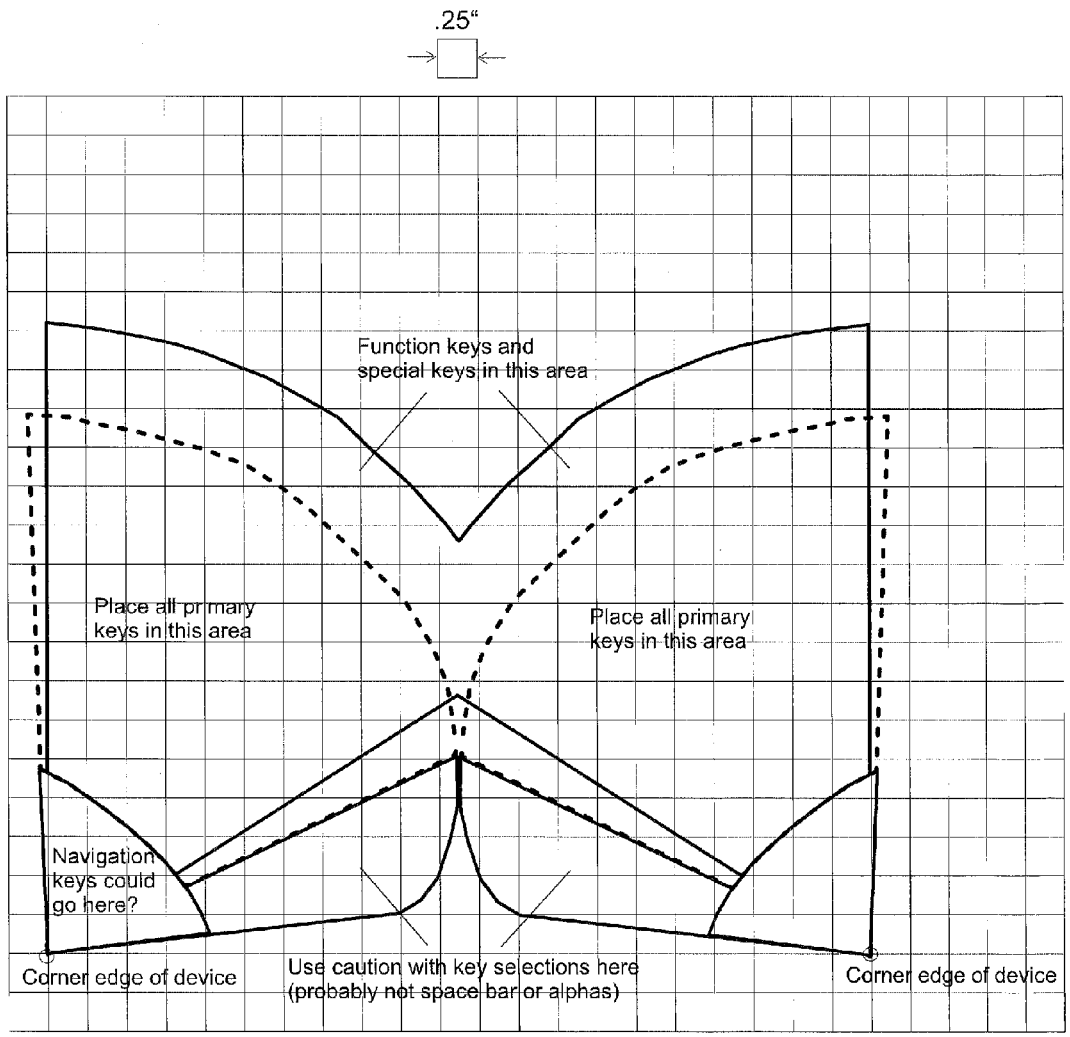
Figure 10Y:
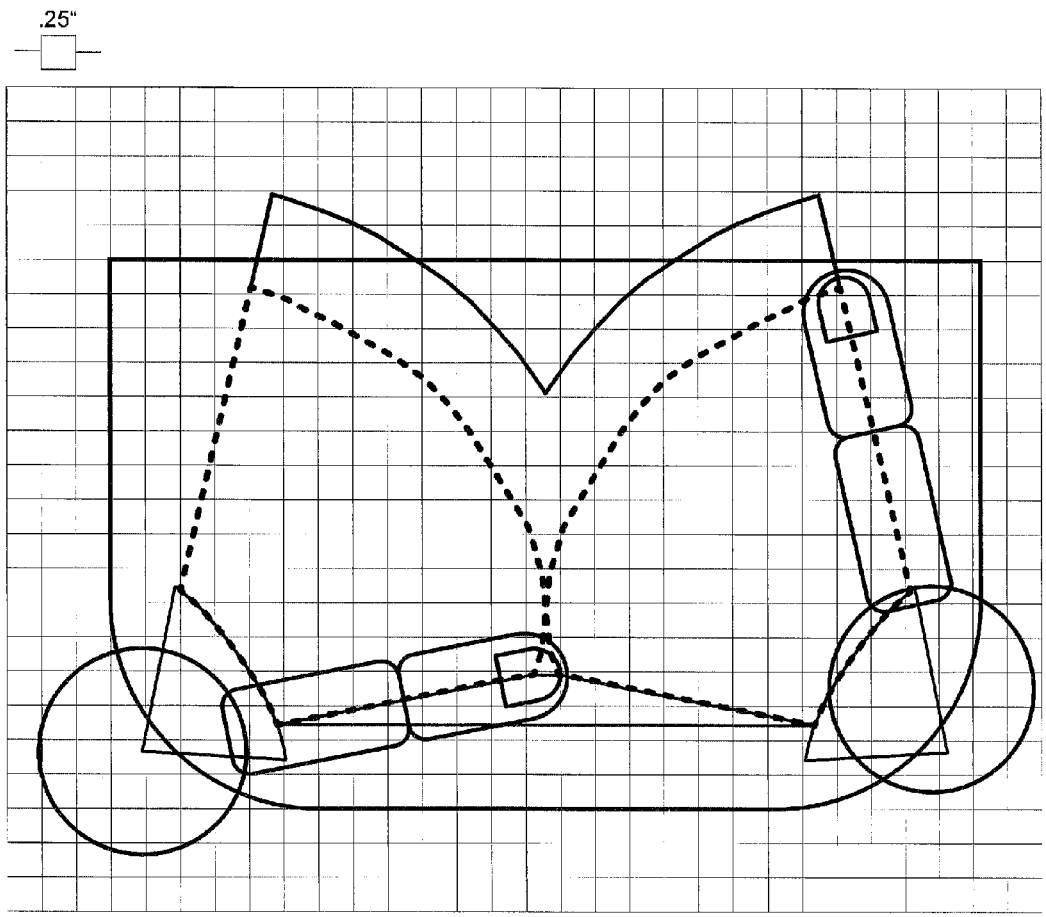

11.A.5. QWERTY Thumbboard. The QWERTY Thumbboard 605 of the present invention will now be discussed with reference to FIGS. 10A-10Y. FIGS. 10A-1010H are tabular representations of thumb lengths and hand lengths correlated by age, gender, and race. FIGS. 10I-10Y are graphical representations of thumb sweep distances for various groups of individuals.

Innovative Elements Related to Ergonomics and the Device, Keypad in Particular. The present invention includes a unique QWERTY thumbboard which is an ergonomically designed keypad optimized for dual-thumb handheld typing, and which is also designed for finger typing while not holding device, or while holding the device in one hand while fingertip typing primarily with the other hand. This allows for the following advantages:

1. Increased ease of use;
2. Increased typing speed;
3. Reduced typing errors;
4. Reduced risk of being dropped; and
5. Reduced risk of soft tissue or joint discomfort relative to other designs or with overuse The QWERTY thumbboard of the present invention minimizes fatigue and discomfort because the weight of device is kept low to control fatigue and droppage, and the center of gravity of the device is placed to minimize static gripping effort when the device is either opened or closed. The center of gravity is located to permit limited one-handed use. The gripping areas are sized to fit the user group hand sizes in different common postures, and the gripping surfaces are designed to permit easy use and holding even with small hands.

The user's thumbs are not required to go beyond comfortable extension, opposition, abduction. Key forces are optimized for low-fatigue typing with low error rate, and the space bars are shaped for hitting with thumbs, and with low force.

The keys are arranged, spaced, located, and shaped for easy reach for most teen and adult thumb lengths, because they are anthropometrically designed in accordance with scientifically sampled teen thumb length data, incorporating differences due to age, sex, racial background, and geographic region. In other words, the QWERTY thumbboard of the present invention is designed for comfortable efficient use by both small and large hands.

For small hands, non-slip gripping surfaces and semi-extended reach positions are used. For very small hands, a fully-extended position can be used with minimal risk of dropping. For large hands, the closest keys are kept from being too close to corners, full-hand device gripping contours are sized for comfort and good feel, and the layout permits shifting hands to out-and-away positions for reaching closer keys without over-flexing thumb joints.

The keys are spaced to balance easy reach, not spread across too large an area, with error avoidance, i.e., the keys are not too close together. Alpha keys are about 0.29 inches oval, with about 0.16 inches between keys. Therefore the keys are set apart about 0.456 inches center to center.

Key forces and tactile feedback. Alpha key resistance is selected to avoid excessive fatigue even with extended use. Numeric key resistance slightly higher than alpha keys to reduce errors. Spacebar resistance is selected lower to control fatigue and reduce errors. Resistance and tactile feedback are engineered to permit knowing by "feel" which key is being pressed when more than one are in contact with thumb or finger. This is good for larger, wider thumbs.

Key shapes. No corners or square shapes are used, because thumbs are likely to approach keys from more different directions than when typing with fingers. Ovals and other key shapes (shift-return) are carefully spaced and oriented to maintain greater than 0.16 inches interkey distances for alpha characters in all directions, and greater than 0.125 inches interkey distances for numeric keys.

Key orientation. Arc-based rows and sloping ovals are oriented to closely fit thumb motion envelopes. Thumb motion envelopes or "sweeps" match natural motion of thumb joints, which is not a circular arc but rather a distorted arc.

Key labeling. Easy to read, lower case letters are selected to increase speed and reduce errors.

Key recessing. Numeric keys are slightly recessed to reduce errors and permit closer spacing than alpha keys.

Input controllers. Input controllers are located for easy reach by most teen and adult users, for both reach and joint angles. When used, dual controllers accommodate left or right handedness, as well as, provide user-set modes to increase ease of use.

Key heights, surfaces, and forces are engineered to minimize the need to lift thumbs up unnecessarily, which is an especially fatiguing motion.

It is preferred that no edges surround the keypad or that the keypad area is not recessed. This prevents any sharp edges from pressing against soft tissues of the hands, thumbs, or fingers.

The device is designed to permit use with neutral comfortable hand and wrist positions.

Holding the device. Along with the relaxed, semi-extended, and fully-extended hand positions, there are other common natural hand positions that can be anticipated. In particular, and depending on gross configuration, there may be an "out and away" hand posture that may be used to access any keys located too close to the lower corners of the device to easily reach without excessive thumb joint flexion. This position leaves only fingertips or potentially half of some fingers in contact with the back of the device. Although this may have a detrimental leverage effect in biomechanical terms, it will generally be compensated for by the strength of other hand.

Depending upon device weight, center of gravity is a strong consideration and should be balanced long the front-back centerline of the device, and generally close to the lower edge of the device, even when the display is in extended or open position. It will be very advantageous to provide form and contour features to assist with gripping, located on the underside of the device.

Keying. Thumbs are relatively clumsy, slow, and short on some elements of dexterity relative to the other digits. Also, much more muscular and tendinous effort is required to lift the thumb than to press down with it, especially when the thumb is already lifted or extended from the fingers to some extent (e.g. thickness of device). The muscles and tendons used to lift the thumb are much weaker and more easily fatigued than those used for opposing and closing with the thumb. This kind of fatigue can be quite annoying and uncomfortable, and feels something like "writers cramp" in general, and would be likely in even young users using a design with problems in this area. Therefore, it is preferred that the need for lifting the thumb unnecessarily be minimized while using the device. One other problem along these lines will be users wanting to "peek" at key labels.

Key characteristics. To keep thumbs from being lifted too much, it is preferred to provide key characteristics that promote "polishing" the key surface with the thumbs moving over it in contact with surfaces of keys and surroundings. It would be good to have a well-conceived key top design that promotes tactile identification and discrimination between keys, not which is which, but which ones that are being simultaneously touched are going to register if the user depresses his touch at any given time. It is likely with key spacing areas and thumb sizes and device size that the thumb will often be in partial contact with more than one key at a time, and key top design as well as resistance characteristics and feedback can either help or hinder the user. Low-friction of key tops may be a tradeoff with being too slippery, where the devices develops the potential for provoking ease of use problems and errors.

Key layouts. The thumb-optimized arrangement of the present invention leads to keys being placed in different places than if more of the typing were to be done with the fingers. Often, this poses special challenges for a variety of reasons. QWERTY arrangements use about 57% left-side keys overall, and many common words are typed with only the left-side keys. The space bar should be extremely easy to reach and press, with the side of the thumb if possible. Dual space bars may be advantageous.

Good layouts do not require excessive switching between hand positions. Moderate switching is unavoidable, comfortable, and desirable. Therefore, some switching may be desirable in terms of keying strings anticipated for common tasks with the keyboard in use. Some of the considerations relating to the inner keyboard of the device may also be relevant to the layout of the device controls and keys that will be used and exposed when the device is in the closed mode.

For full-size keys, vertical displacements of between 2 and 4 millimeters (mm) (0.08-0.16 inches) have the best speed and error rates for continuous normal typing with fingers. However, lower displacements, down to 1.5 mm (0.06 inches), may be desirable.

The force to depress the keys of the QWERTY thumbboard of the present invention is preferred at 0.5-0.6 Newtons (N), whereas traditional bounds are 0.25-1.5 N. Thumb-squeezing to press keys has more available strength than finger-keying does, and significantly higher force values may be needed for thumb-operated keys to have optimum "feel."

Tactile feedback is very important. Research has shown that, in general, key resistance force should increase with vertical displacement to approximately 40% of total displacement, followed by a sharp and substantial reduction in force over approximately 20% of the total, followed by an increasing force over the remaining displacement. As the key is pressed, there should be a definite breakaway force to acknowledge to the operator that the stroke has been registered. After this the force should increase again to the bottom of key travel. Elimination of either the breakaway force or the secondary force increase may result in slower keying, higher error rates, and increased fatigue.

Audio feedback may also be employed, but is no substitute for tactile feed back. If audio feedback is used, it should be capable of being turned off.

11.B. Software. In accordance with the preferred implementation of the preferred invention, operating system 1575 is excessively user-centric. As such, the weight or value associated with interrupts generated through user manipulation of appliance 1500, whether through thumbboard 1527, analog responder 1528, joysticks 1530, or additional input elements 1529, is of the highest priority. Accordingly, other operations may be aborted or suspended in order to execute, on a priority basis, certain commands associated with a user interrupt.

11.B.1. Separate Thread for Monitoring User Action. Preferably, such action is accomplished by providing a separate, dedicated thread for monitoring user commands, actions, and/or input. This user-initiated processing thread is accorded a greater priority relative to most other processing threads. In this manner, the user has a substantial Ca impact on the operating system through manipulation of thumbboard 1527, analog responder 1528, joysticks 1530, and additional input elements 1529. The user never has to wait to take control of the appliance and/or the operating system.

11.B.2. User Impact on Operating Processes. All systems are de-escalated to lower priority when the user is interacting with the appliance.

12. User

12.A. Operational empathy. In the preferred implementation of the present invention, network 11 monitors its own operation in a manner which allows appliances, such as appliances 351, 353, 355, 357, 359, and 361, to communicate empathetic messages to the user when network 11 is operating in a manner which may be frustrating to the user. For example, network 11 traffic may be so heavy that there is substantial delay in communications such as the transmission of e-mails or the ability to engage in real-time chat communications. In accordance with the preferred embodiment of the present invention, appliances 351, 353, 355, 357, 359, and 361 will communicate to the user an awareness of a network problem which can be frustrating to the user. This may mitigate the user's frustration.

12.A.1. Device Awareness. In accordance with the preferred embodiment of the present invention, appliances 351, 353, 355, 357, 359, and 361 include monitoring software to aid in determining whether empathetic action should be implemented.

12.A.2. User Compensation/Incentives. Alternatively, network 11 may actually compensate the user in some manner for the frustration experienced due to network problems, such as a network being down or heavy traffic on the network. Such compensation may take many forms, such as dispensing network energy to the user as a direct compensation for frustration experienced due to operational difficulties of network 11. Alternative incentives or compensation may be provided to the user in the form of digital content, such as merchant coupons which may be consumed by the user. For example, digital content in the form of a program or game may be presented to the user as a form of compensation for some type of frustration experienced due to network problems. The following are particular examples of how the device manifests a "awareness" of network problems and manages the user's frustration through highly anthropomorphic empathy which may be communicated through dialog and other interaction with the user. Additionally, particular types of compensation or incentive for network problems will also be discussed.

12.B. Expectation Management. In general, network 11 and appliances 351, 353, 355, 357, 359, and 361 of the present invention may also be utilized to manage user expectations in general. This goes beyond management of frustration. Expectation management can be utilized in order to encourage the development of community around appliances 351, 353, 355, 357, 359, and 361 and network 11. The utilization of expectation management may be a powerful means to allow the users to become involved in the development of consumable digital content. There are examples in the history of consumer electronics in which the existence of a "community" around an electronic appliance accelerated the adoption of such devices. One noteworthy example is Apple Computer which developed a very loyal community around its personal computing products. Another example is the "Palm Pilot" device which was introduced by 3COM. A community developed around this device and hundreds or thousands of applications were written which are available through publications or over the internet free of charge. These applications greatly enhance the utility of the device. Essentially, the community of users become an informal development team for new applications. Management of expectations can be utilized to accelerate the development of community and digital content which may be consumed by the community. Incentives, including the offering of network energy may be utilized to accelerate the development of community around appliances 351, 353, 355, 357, 359, and 361 and network 11.

13. Network Energy

Figure 4A:
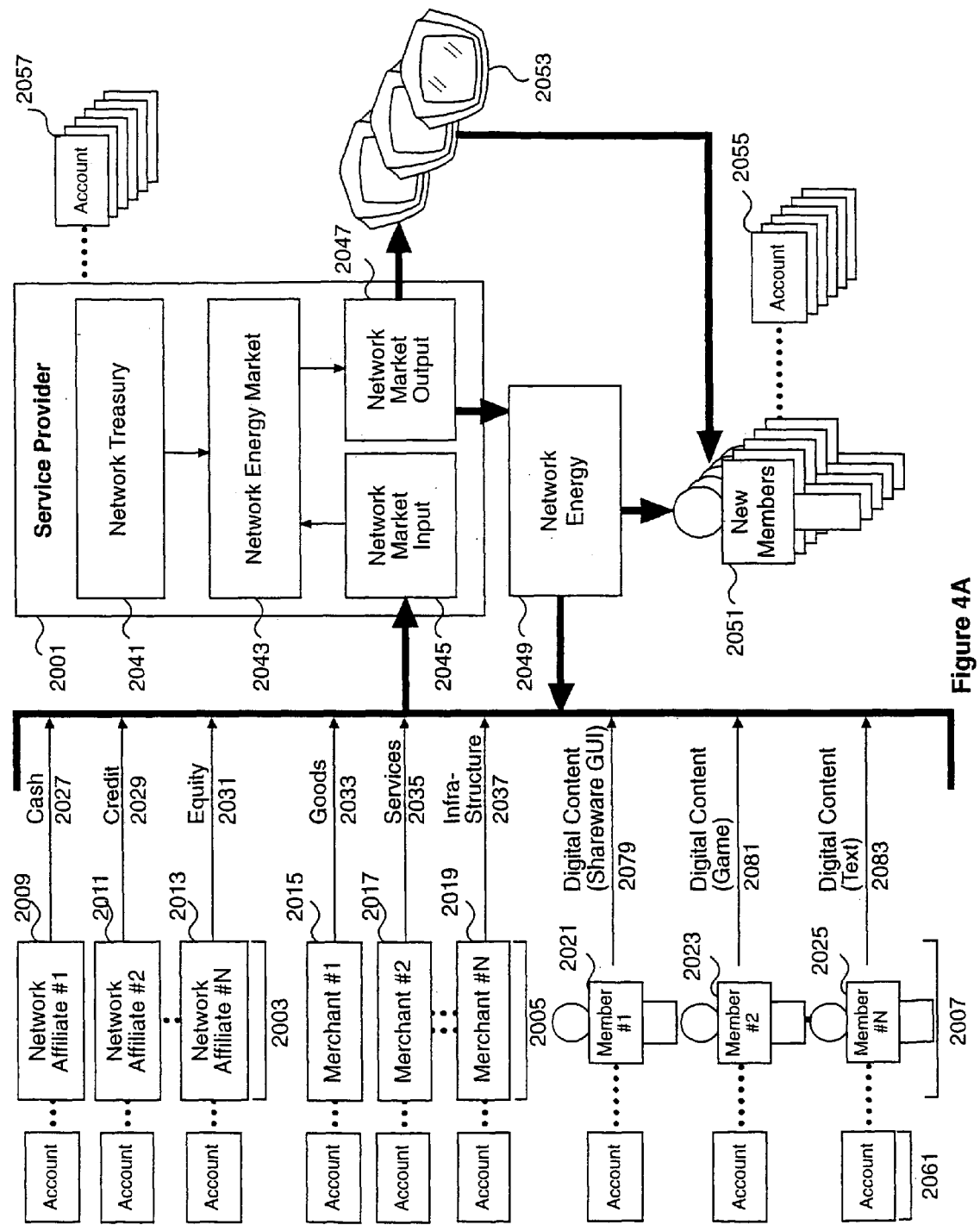
FIG. 4A is a high-level block diagram representation of the commercial operation of the appliance and network of FIG. 1A.

Referring now to FIG. 4A in the drawings, the broad concepts of the preferred embodiment of the network community and network currency of the present invention are depicted in block diagram format. In accordance with the preferred embodiment of present invention, a network currency is created and utilized to fund the operation of network 11, the distribution of location-aware wireless communication appliances to new users, or members, the creation of digital content, and the dissemination of digital content through network 11. This is a useful approach, because, in the first commercial instance of the present invention, the members are likely to be adolescents who may have little or no income other than family allowances. In accordance with the preferred embodiment of the present invention, the appliances are distributed to the members free of charge under a sponsorship arrangement with one or more network affiliates. Sponsoring network affiliates purchase the appliances to generate goodwill and customer loyalty with the adolescent network members. Additionally, one or more network affiliates may also sponsor, for particular members or groups of members, certain amounts of network air time. The air time can be used by the members to engage in communication or the consumption of digital content, such as reading stories, viewing movies, or engaging in game activities. The service provider which operates and maintains network 11 is responsible for distributing the appliances and any air time purchased by sponsors for the benefit of particular members or groups of members.

As is shown, a service provider 2001 is in charge of operating and maintaining network 11. In this capacity, service provider 2001 operates and maintains a network treasury 2041 and a network energy market 2043. Accordingly, service provider 2001 performs numerous accounting, tracking, and distribution functions. Network energy market 2043 is supplied with valuable commodities from a plurality of sources. The sources of commodities include: network affiliates 2003, network merchants 2005, and network members 2007. There may be hundreds of network affiliates 2003, such as Network Affiliate #1, Network Affiliate #2, up to Network Affiliate #N, which are identified by reference numerals 2009, 2011, and 2013, respectively. Additionally, there may be thousands of network merchants 2005, such as Merchant #1, Merchant #2, up to Merchant #N, which are identified by reference numerals 2015, 2017, and 2019, respectively. There may be millions of members 2007 spread throughout the country, such as Member #1, Member #2, up to Member #N, which are identified by reference numerals 2021, 2023, and 2025, respectively. Each of the network affiliates 2003, merchants 2005, and members 2007 has an account 2061 which is set up, operated, and maintained by service provider 2001.

The commodities may be categorized into different types, including cash 2027, credit 2029, equity 2031, goods 2033, services 2035, infrastructure elements 2037, or digital content, such as shareware GUI 2079, game 2081, and text content 2083. Service provider 2001 accumulates, organizes, and assigns values to the commodities, which have varying degrees of liquidity. This process is represented by network market input 2045. Service provider 2001 then introduces the commodities into network energy market 2043. The commodities are transformed into either network energy 2049 or location-aware communication appliances 2053. This process is represented by network market output 2047. Network energy 2049 becomes available under certain conditions for consumption, distribution, and use by network affiliates 2003, merchants 2005, and/or members 2007. Appliances 2053 are distributed under certain conditions to new members 2051. Network energy 2049 may also be distributed to new members 2051. Each new member 2051 has an account 2055 which is operated and maintained by service provider 2001. Service provider 2001 also manages books of account 2057 which relate to the operation of network energy market 2043 and the valuation, allocation, and distribution of network energy 2049 and appliances 2053. As is shown, some network energy 2049 may be directed back to the sources that provided the commodities for network market input 2045 to network energy market 2043.

Continuing with reference to FIG. 4A, accounts 2057, 2055, and 2061 generally track the transactions made in network energy market 2043. In practice, network market input 2045, which is the cumulative value of the commodities contributed by the sources and introduced into network energy market 2043 by network treasury 2041, should equal network market output 2047, which is the cumulative value of network energy 2049 and appliances 2053 released from network treasury 2041. Thus, for purposes of simplification, appliances 2053 may have a value which is not in terms of dollars or other national currencies, but rather in terms of network energy 2049. In this manner, a balance can be obtained between service provider 2001, network affiliates 2003, merchants 2005, members 2007, and new members 2051 in a closed-loop environment in which consumption and production of network energy 2049 is closely controlled, monitored, and maintained by service provider 2001 acting as a treasurer for network 11.

In certain instances, network energy 2049 may be transferred directly from a source, i.e., network affiliates 2003, merchants 2005, or members 2007, to either other members 2007 or new members 2051. Such transfers are an alternative to the direct supply of network energy 2049 by service provider 2001. Although such transactions may not involve service provider 2001 or network energy market 2043, the transactions are recorded in accounts 2061 and 2055, thereby maintaining the balance of network energy 2049 within network 11.

In accordance with the preferred implementation of the present invention there are a variety of ways in which network energy 2049 may expended or consumed. Such activity is referred to herein as "burning" network energy 2049. Alternatively, there are a variety of ways in which network energy 2049 may be acquired or accumulated. Such activity is referred to herein as "earning" network energy 2049. As mentioned above, a balance can be obtained between service provider 2001, network affiliates 2003, merchants 2005, members 2007, and new members 2051 in a closed-loop environment. An equilibrium can be established which can be moderated or modulated by service provider 2001 to encourage or discourage growth of network 11. This is comparable to the monetary policies of the Federal Reserve, which through its actions, can regulate the supply of available money to the market, resulting in a "heating" or "cooling" impact on the economy in general. It is necessary for the success of service provider 2001 that a relationship exist between network energy 2049 and national currency. Of course, as interest in network 11 fluctuates, the relationship between network energy 2049 and national currency will also fluctuate.

13.A. Energy Management. Network 11 and service provider 2001 manage the "earning" and "burning" of network energy.

13.B. Earning Network Energy. There are a variety of ways in which network energy 2049 may be "earned" in accordance with the preferred embodiment of the present invention. Several of the primary methods of earning network energy 2049 will now be discussed with reference to FIGS. 4B-4D.

13.B.1. Purchasing Energy The easiest way to obtain network energy 2049 is to directly purchase network energy 2049 with one or more national currencies. It should be understood that an exchange rate will established and maintained between network energy 2049 and selected national currencies, such as U.S. dollars, Euros, or Canadian dollars. Members may purchase network energy in the form of air time either in advance on a prepaid basis, or after charges have been incurred, if deemed creditworthy. Service provider 2001 generates periodic statements which reflect the amount of network energy earned and burned during the period for each network affiliate 2003, merchant 2005, member 2007, and new member 2051. The statements are then communicated to the network affiliates 2003, merchants 2005, members 2007, and new members 2051 for payment or advance payment.

Figure 4B:
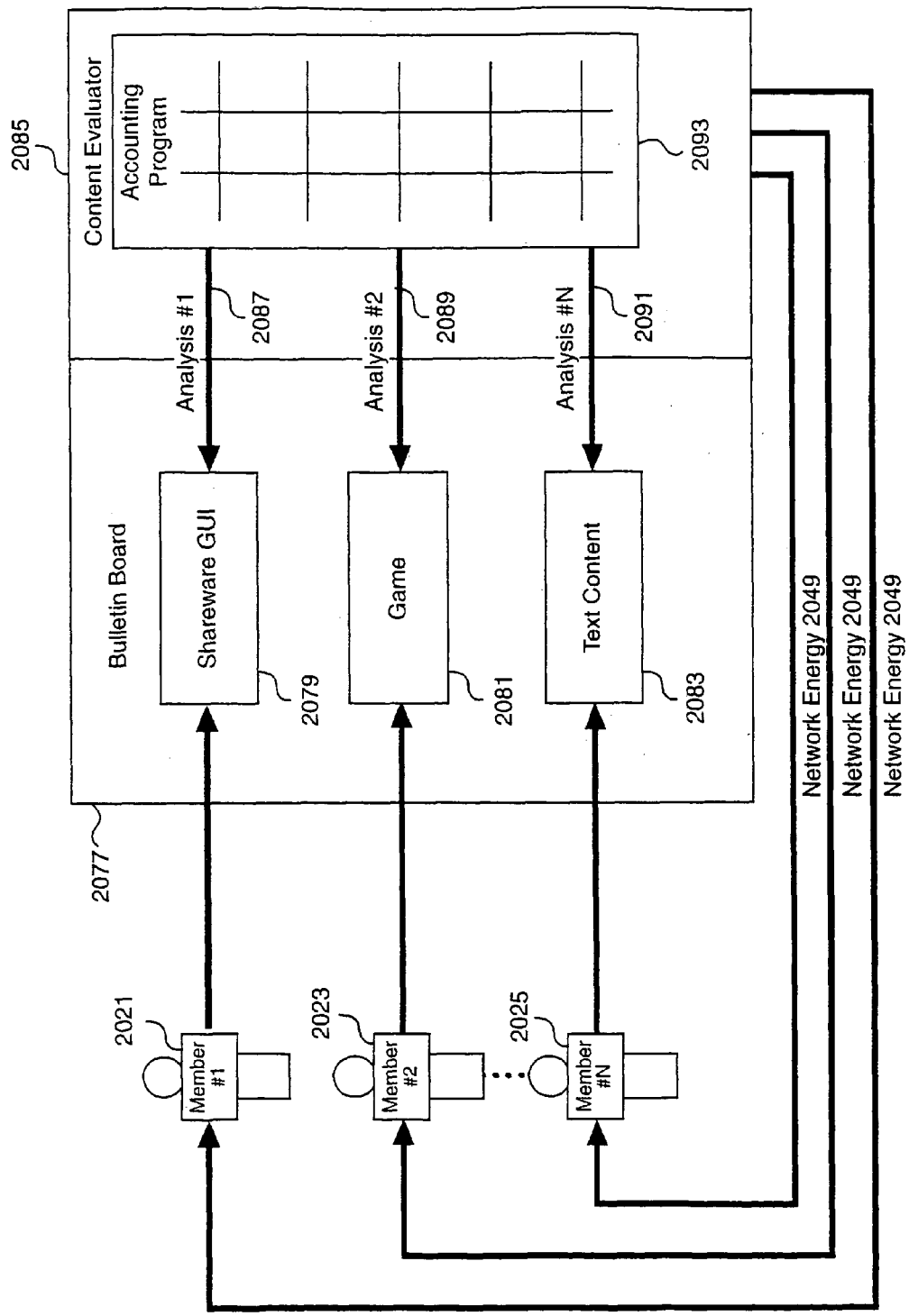
FIG. 4B is a high-level block diagram representation of a scenario in which a plurality of members distribute and contribute content to an electronic bulletin board on the network of FIG. 1A.

13.B.2. Earning Energy Through Posting of Digital Content. One interesting way to "earn" network energy 2049 in accordance with the preferred embodiment of the present invention is to generate and contribute digital content to network 11, preferably through the posting of digital content onto a publicly-available digital content site, such as a bulletin board 2077 (see FIG. 4B). Bulletin board 2077 may be accessible via the Internet, but may only be accessible via location-aware wireless communication appliances, such as appliances 2053. The bandwidth associated with GPRS communication is relatively narrow in comparison to the bandwidth of a relatively good wired/landline Internet connection. However, some digital content may be downloaded "over the air." This scenario is depicted in FIG. 4B, in which Member #1, Member #2 up to Member #N, generate and post a variety of digital content to bulletin board 2077. Member #1 has generated a shareware graphical user interface (GUI) 2079; Member #2 has generated a game 2081; and Member #N has generated text content 2083, such as an article or short story. A content evaluator 2085 performs Analysis #1, Analysis #2, and Analysis #N, represented by reference numerals 2087, 2089, and 2091, respectively, on the posted digital content and determines a relative value for the digital content in terms of network energy 2049. Content evaluator 2085 is either under the control of service provider 2001, or under the combined control of service provider 2001 and one or more member groups. An accounting program 2093 is utilized in order to record, allocate, and eventually distribute network energy 2049 as compensation to Member #1, Member #2, and Member #N for their contribution to network 11. This type of reward system encourages the development of new digital content, and makes membership in network 11 continuously interesting to existing members 2007 and new members 2051 alike.

Figure 4C:
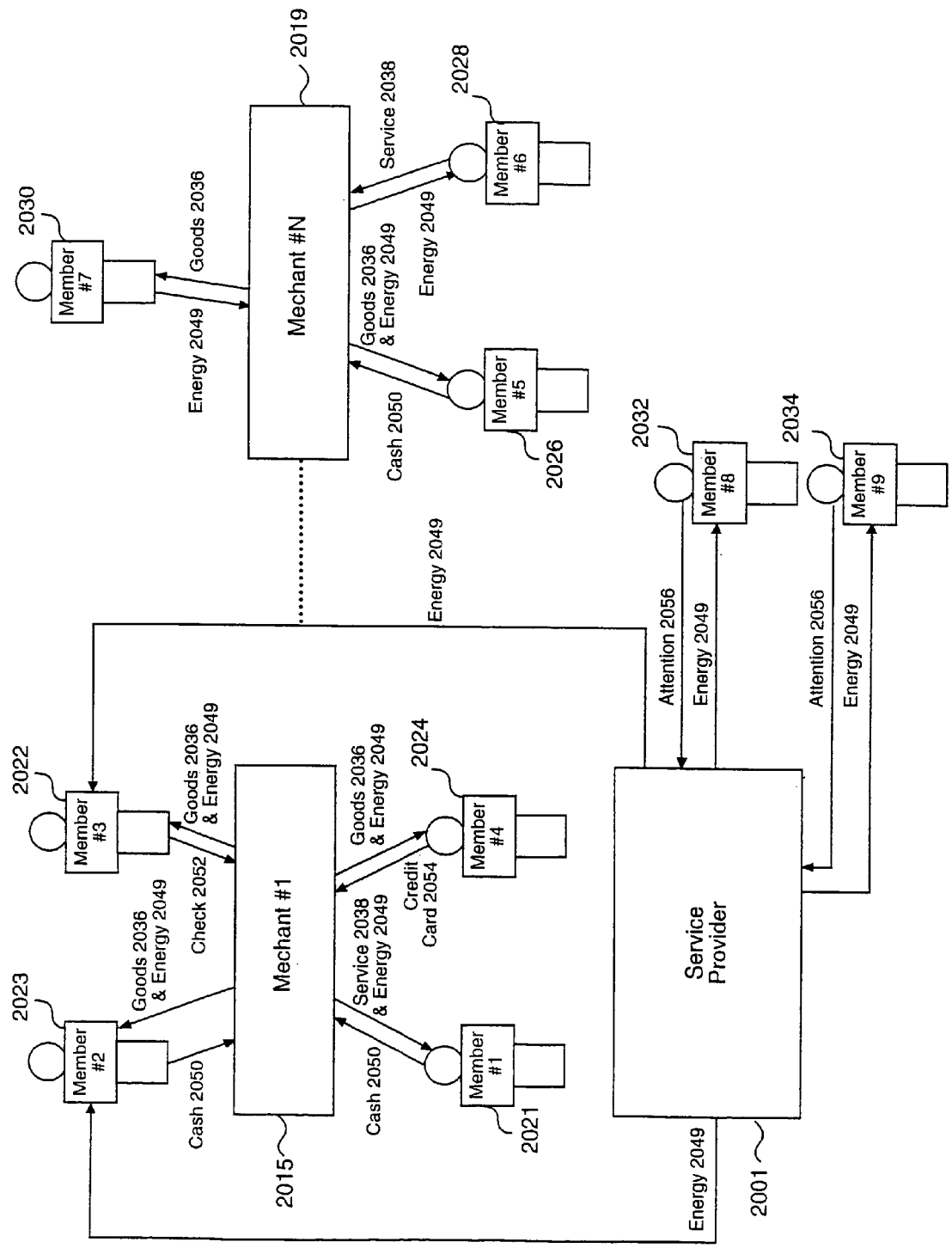
FIG. 4C is a high-level block diagram representation of a scenario in which a plurality of members interact with a plurality of merchants via the network and appliances of FIG. 1A.

13.B.3. Earning Energy Through Interaction with Merchants. Another interesting way to earn network energy 2049 in accordance with the preferred embodiment of the present invention is through interaction with network merchants 2005. This is depicted in FIG. 4C, in which Merchant #1 and Merchant #N provide either or both of goods 2036 or services 2038 to members of the public in general and members of network 11 in particular. In addition to Member #1 and Member #2, identified by reference numerals 2021 and 2023, respectively, Member #3, Member #4, Member #5, Member #6, Member #7, Member #8, and Member #9 are identified by reference numerals 2022, 2024, 2026, 2028, 2030, 2032, and 2034, respectively. Merchant #1 and Merchant #N have pre-existing commercial relationships with service provider 2001 which manages network 11. Under these relationships, Merchant #1 and Merchant #N are authorized to directly or indirectly distribute, allocate, gift, or grant particular amounts of network energy 2049 to members who patronize Merchant #1 and Merchant #N through the purchase or acquisition of goods 2036 or services 2038. These relationships may also be set up to reward members for merely considering the purchase of goods 2036 or services 2038, such as by entering the retail establishment associated with Merchant #1 or Merchant #N, or by reviewing electronic or printed materials related to Merchant #1's or Merchant #N's goods 2036 or services 2038.

As is shown in the view of FIG. 4C, Member #1, Member #2, Member #3, and Member #4 are engaged in commercial transactions with Merchant #1 through the purchase of either goods 2036 or services 2038. Member #1, Member #2, Member #3, and Member #4 purchase goods or services utilizing cash 2050, checks 2052, or credit cards 2054. Merchant #1 provides goods 2036 and/or services 2038 in return. However, Merchant #1 may also provide certain predefined amounts of network energy 2049 which may be utilized by Member #1, Member #2, Member #3, and Member #4 to engage in activities on network 11. In certain transactions, service provider 2001 may provide members with additional rewards of network energy 2049. For example, service provider 2001 provides network energy 2049 directly to Member #2 and Member #3 which supplements network energy 2049 awarded to Member #2 and Member #3 directly by Merchant #1.

FIG. 4C also depicts the interaction between Member #8 and Member #9 directly with service provider 2001. Member #8 and Member #9 are rewarded directly by service provider 2001 through the allocation of network energy 2049 due to network-mediated activities relating to Merchant #1, such as reviewing offers for goods 2036 or services 2038 in the form of attention 2056.

In a similar fashion, Merchant #N is engaged in commercial transactions with Member #5, Member #6, and Member #7. As is shown, Member #5 pays cash 2050 in exchange for goods 2036 and an amount of network energy 2049 from Merchant #N. Member #6 "burns" a selected amount of network energy 2049 in exchange for services 2038 from Merchant #N. Member #7 "burns" a selected amount of network energy 2049 in exchange for goods 2036 from Merchant #N. In each of these transactions, valuable consideration has been exchanged for goods 2036, services 2038, and/or network energy 2049.

13.B.4. Earning Energy Through Recruitment of New Network Members. In accordance with the preferred embodiment of the present invention, network energy 2049 may also be earned by members through the recruitment of new members into network 11. This is depicted in simplified and graphic form in FIG. 4D. As is shown, service provider 2001 has a pre-existing commercial relationship with Member #1. Member #1 engages in recruitment of a New Member #1, identified by reference numeral 2097. Such recruitment is reported to service provider 2001, which, in turn, supplies a selected amount of network energy 2049, or "recruitment" energy 2096, to Member #1 for the recruitment. New Member #1 receives network energy 2049, or "start-up" energy 2098, and a location-aware wireless communication appliance 2099 from service provider 2001 for joining. Typically, a sponsor, such as a network affiliate 2003 or a network merchant 2005, would sponsor or subsidize the new membership. Thus, there would be no out-of pocket expense associated with New Member #1's initial membership. Because each member who recruits new members is rewarded with "recruitment" energy 2096, there is an incentive to repeat or pass on the recruitment process.

Figure 4D:
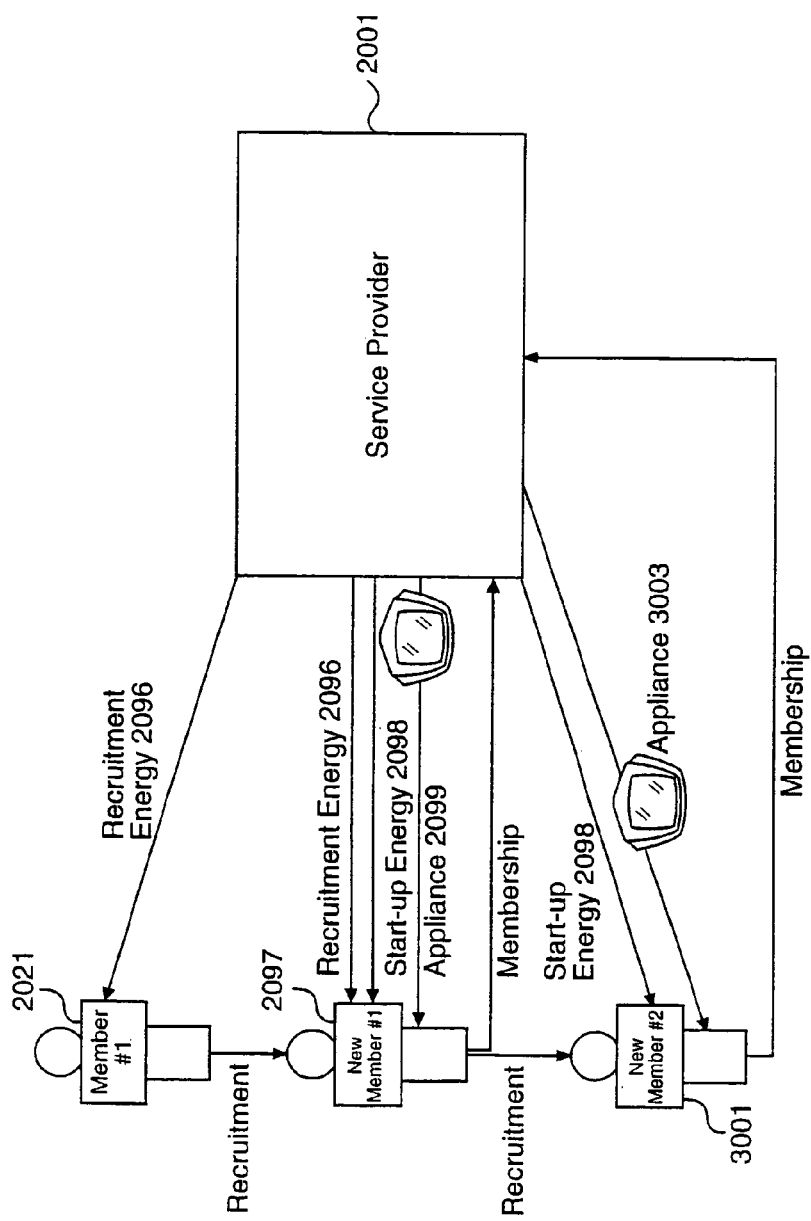
FIG. 4D is a high-level block diagram representation of a scenario in which members recruit new members to the network of FIG. 1A.

The continuation of the recruitment process is also depicted in FIG. 4D. As is shown, New Member #1 recruits New Member #2, identified by reference numeral 3001. New Member #2 receives start-up energy 2098 and an appliance 3003 from service provider 2001 as part of her membership. Again, this membership may be sponsored or subsidized by service provider 2001, one or more network affiliates 2003, or one or more merchants 2005, such that there is no initial membership charge to New Member #2. For the recruitment activities New member #1 receives recruitment energy from service provider 2001. In this manner, the number of members grows and network 11 expands geometrically. It should be understood that the sponsoring or subsidizing of new members may be done in whole or in part, or may be shared among sponsors. In an alternate embodiment of the present invention, new members may be required to purchase their appliances and start-up energy.

13.B.5. Earning Energy Through Good Samaritan Action. An alternative way to earn energy in the network is performing acts which are considered "Good Samaritan" acts in accordance with some schema established by service provider 2001. Good Samaritan acts may include assisting other members with difficulties in utilizing network 11 or appliances. In addition, good Samaritan acts may include the generation of "shareware" digital content or other means for enriching the user experience. Some good Samaritan acts may relate to particular problems experienced by network affiliates 2003, merchants 2005, or members 2007. For example, members 2007 asking for directions or other types of useful information may be rewarded through a good Samaritan system in which good deeds are reported to service provider 2001 and rewarded with predetermined amounts of network energy 2049.

13.B.6. Gifts of Network Energy to Encourage Participation. Another way to obtain network energy 2049 is in receipt for engaging in certain types of activity on network 11. Service provider 2001 may reward members and member organizations for forming and maintaining chat groups or community relationships on network 11. For example, the leader of an antique car owner's group may be rewarded with network energy 2049 by service provider 2001 for establishing and maintaining a virtual community of member who own antique cars. Such rewards may be subsidized by a merchant who deals in antique car goods and services. This can have a substantial motivating effect on members, and can be utilized to grow and form network 11.

13.C. Burning Network Energy. A variety of ways are also provided for consuming or "burning" network energy 2049. A few of these means for consuming energy are discussed below under separate headings.

13.C.1. Burning Energy Through Hardware Acquisition. One way to consume network energy 2049 is through the acquisition of network hardware or accessories. Under this scenario, a member may have access to a wide array of hardware and hardware accessories for utilization in activity on network 11. For example, a New Member #1 may want to burn network energy 2049 to obtain an additional docking station for his appliance 2099, or New Member #2 may wish to burn network energy 2049 to acquire an interchangeable housing for her appliance 3003. The prices for these activities may be set in terms of network energy 2049, instead of national currencies. Such pricing and exchange rates would be set by service provider 2001.

13.C.2. Burning Energy Through Content Consumption. Another means for burning network energy 2049 is through the consumption of digital content over network 11. As set forth above, digital content may come in many different forms and in many different ways. Digital content can be textual materials, graphical materials, or animated "movies" which are displayed on the member's appliance.

13.C.3. Burning Energy Through Airtime Use. Another way to burn network energy 2049 is by utilizing airtime to transmit digital content or to conduct communications with other members within network 11. In accordance with the preferred embodiment of the present invention, airtime may have a predetermined or even variable price in terms of network energy 2049. Mechanisms are established for determining the total amount of airtime usage for particular members. On a periodic basis, the network energy 2049 in each member's account is reduced by an amount of network energy 2049 that is equivalent to the amount of airtime used by that each member during that period of time.

13.C.4. Burning Energy Through Instant Messaging. One particular communication mode which burns network energy 2049 is instant messaging (IM). In network 11, IM is comparable to currently commercially available IM with the exception that in network 11 of the present invention, location-aware wireless communication appliances are utilized.

13.C.5. Burning Energy Through Chatting. Network energy 2049 may also be burned through communication activities in the form of real-time chatting between one or more members of network 11. The airtime used during a chat session may be apportioned among the various members engaged in the chat and charged to their own individual accounts, thus decrementing the amount of network energy 2049 available to each participant in the chat session.

13.C.6. Burning Energy Through E-Mail. E-mail may also be sent over network 11 in the preferred embodiment of the present invention. The use of network 11 to send and receive e-mail may also burn network energy 2049 in a predetermined amount. This may be established in terms of the length of the transmission, the number of characters transmitted, or by some other method.

13.C.7. Burning Energy Through Finding Buddies. Another way to burn energy on network 11 is to locate buddies within network 11 to determine their location and establish communication with them. The act of finding a buddy may have a predetermined price in network energy 2049 associated with it.

13.C.8. Burning Energy Through Internet or World Wide Web Access. To the extent that the location-aware wireless communication appliances are equipped with web browsers, utilization of such devices to access the Internet or the World Wide Web and download materials may also burn a certain predetermined amount of network energy 2049.

13.C.9. Burning Energy Through Gifts or Transfers. An alternative way to burn network energy 2049 is to give or transfer network energy 2049 to other members in the form of a gift or grant. Members may link network energy 2049 to other desirable currencies or goods or services. For example, relationships can be established between network energy 2049 and POKEMON cards or baseball cards. In another example, electronic gift certificates can be utilized to transfer network energy 2049 between members to celebrate special occasions, such as birthdays.

13.C.10. Burning Energy Through "Collect" Transactions. An alternative and interesting means of burning network energy 2049 is to place communications on network 11 on a "collect" basis similar to the placement of collect telephone calls. When a collect communication is placed, the recipient of the communication, or the party that responds to the communication, is charged a predetermined amount of network energy 2049 for the transfer from source to service provider 2001 and from service provider 2001 to recipient, should the recipient accept the communication. With regard to IM, in the preferred embodiment of the present invention, the recipient is charged for all costs associated with the IM communication.

13.D. Merchants and Affiliates. Network 11 relies heavily on the participation and cooperation of network affiliates 2003 and merchants 2005.

13.E. The Relationship Between Network Energy and Currency. In the preferred embodiment of the present invention, service provider 2001 is responsible for establishing and maintaining an exchange rate between network energy and national currencies, so that digital content, goods, and services may be freely exchanged over network 11 between and among service provider 2001, network affiliates 2003, merchants 2005, and members 2007.

13.F. E-Coupons. E-coupons function in a manner very similar to conventional coupons. Merchants 2005 may distribute e-coupons to members 2007 who may redeem the e-coupons for goods and services, or reductions in the amount of network energy 2049 required to be burned for such goods and services.

14. Community Systems

14.A. Trust Management. As has been previously discussed, network 11 of the present invention places a high value on the trust that a member places upon her appliance and network 11 in making her private communications. Accordingly, trust management is a priority for network 11. This is especially true because network 11 manages a great deal of personal information, especially information relating to the value or weight accorded by the member to her peers, friends, and acquaintances.

14.B. Network Management Relationships. Network 11 relies upon truthful member input in establishing the weight or priority that is attached to particular communicants. Each member will be afforded an opportunity to honestly evaluate the relative importance of his or her peers, friends, and acquaintances. Although such information must be utilized by network 11 on a frequent basis, the information must be guarded at all times against inadvertent disclosure. Examples have been previously provided which illustrate how a member may attach a "block" to communications originating from particular entities, such as merchants 2005 or members 2007. Additional examples have been given illustrating the assignment of "high," "medium," or "low" values to communications originating from particular entities. By managing this trusted information, network 11 manages "relationships."

14.C. Referential Trust. On novel aspect of the present invention is the ability of network 11 to infer likely levels of trust between individuals that have not yet interacted with one another through utilization of known trust data which the relevant individuals may have for commonly-known and ranked or rated members, groups of members, or merchants. In this manner, network 11 may infer trust data between members and groups of members. The use of referential trust can be extended to the analysis of likely preferences for particular goods or services based upon known preferences of particular members, or groups of members. For example, users having high regard for one another in one area of taste or likes are likely to agree upon other areas of a similar nature.

The concept of referential trust may also be used to assign preference ratings to digital content the first time the digital content is offered for presentation to a member. Because the member has not yet had an opportunity to rate the new digital content, a referential trust analysis can be performed to assign a preliminary preference rating to the digital content. In this analysis, the unrated new digital content is compared to existing rated digital content of a similar nature. On a member-by-member basis, the ratings from the existing digital content are used to calculate and assign a rating to the new digital content. The similarity between the new digital content and existing digital content is determined by comparing the wrapper for the new digital content with the wrapper for existing digital content. As set forth above, wrappers contain a wide variety of information, or content parameters, which describe the digital content.

14.D. Message Bubble-Up Filtering. The preferred communication system of the present invention may utilize trust data in order to sort, prioritize, or filter digital content so that messages form a highly trusted source are quickly brought to the member's attention while messages form less trusted sources are blocked, delayed, or otherwise minimized.

14.E. Filtering Merchant Offers. The presentation of merchant offers may also be filtered or prioritized based upon the level of commercial trust that the user has for particular merchants or providers of digital content. It should be understood the above-described referential trust analysis can be applied in the instance of assigning preference information to commercial digital content.

14.F. Virtual Introductions. The level of trust and confidence that a user has assigned to particular known individuals may be utilized by network 11 to arrange for virtual introductions initiated by network 11 of members that are likely to form a relationship. In this manner, friendships can be created by network 11, thereby building community within network 11 around common preferences or evaluations of third-party members.

14.G. Seeking a Good Samaritan. The trust and personal preferences information can be utilized automatically by network 11 to locate one or more individuals which could or may be of assistance in a time of need or crisis. A member in need of a ride to school or for a referral to a doctor may call upon network 11 to identify likely good Samaritans for possible assistance.

14.H. Requesting Information. Trust and personal preferences can also be utilized by network 11 to fulfill member requests for assistance.

14.I. Direct Assessment of Trust.

14.J. Interpolated or Calculated Trust.

14.K. Trust in "ePinions" and "eValuations."

14.L. Messages and Trust.

14.M. Digital Peripheral Vision. Community can also be developed in network 11 through the sharing of virtual common space by particular members or groups of members. Because the virtual space of a display to some extent reflects portions of the actual physical space occupied by the members, a form of common peripheral space may be used in the actual display to identify and locate actual locations or places of commerce in a space known as the digital peripheral space. Items that are accorded a low priority by a member or groups of members may be relegated to the digital peripheral space. Focusing on this space can represent an exercise of digital peripheral vision. Items in this space are not in the foreground of the member's attention; however, such items are also not quite relegated to a background or off-screen position. Digital peripheral vision is further explained below with reference to the graphical user interface (GUI) of the present invention.

14.N. Sticky-Notes Community Communication. The present invention also enables a new form of public forum. Sticky notes, which provide user commentary, may be attached to any particular virtual space in network 11 in the form of "digital sticky notes." Sticky note messages may take the form of either positive or negative commentary. This commentary may prove useful to other users and aid in building community.

14.O. Digital Graffiti. The present invention also enables a form of "tagging" in virtual space which may take the form of "digital graffiti," which may serve no useful purpose, except possibly to note that another member has passed in the same space before.

14.P. Shouting Communication Mode. The present invention also provides for a digital "shout." A digital shout is an IM communication sent by a single member which may be received, and perhaps acted upon or responded to, by many other members, such as trusted members or members which are determined by network 11 to likely prove to be helpful and/or trustworthy. Each member may set up and maintain a list of members who are to receive each member's digital shouts. In addition to this express designation of digital shout recipients, network 11 may utilize trust and preference data to determine which members receive each member's digital shouts. In such situations, the aggregated trust data can serve as a type of communication "creditworthiness" indicator.

14.P.1. Generating a Digital Shout. In this embodiment, network 11 utilizes trust and preference information maintained in the relationship network to transmit the digital shout from a single member to many other trusted members or members who are determined by network 11 to likely prove to be helpful and/or trustworthy. Essentially, the aggregated trust and preference information can serve as a communication "creditworthiness" indicator. The relationship analysis referred to above may be used by network 11 to analyze and determine the group of members who are able to "hear" the shouting member's digital shout.

14.P.2. Sending a Digital Shout. In this embodiment, network 11 utilizes GPS information, either raw longitude and latitude coordinates, if chosen by the user, or colloquially designated information, to transmit the digital shout to listening members who are within a predetermined geographical proximity of the sending member.

14.P.3. Combination Digital Shout. In this embodiment, network 11 utilizes both trust and preference information and GPS information to transmit the digital shout to listening users who are determined by network 11 to likely prove to be helpful and/or trustworthy, and who are within a predetermined proximity of the sending member.

14.Q. Virtual Tourism. The present invention also enables a form of virtual travel known as "virtual tourism" in which a member may choose to receive digital content as if he or she were actually located in a selected geographic region also served by network 11.

14.R. Virtual Window Shopping in Remote Locale. The present invention also allows a member to actually shop in shared virtual space from a remote locale.

14.S. Sister City Through Virtual Location. In accordance with the present invention, a member or a group of members may adopt a remote virtual space as a "sister" city, and thus engage in community building.

14.T. Location "Morphing" to Create Shared Virtual Space. In accordance with the present invention, one or more members may combine remote virtual space into a single "morphed" virtual space. For example, the network space for New Orleans, La. may be combined with the network space for Dallas, Tex.

14.U. Position/Location Snap Shots. In accordance with the present invention, a member may mark or index a particular virtual location for future reference or to allow later return.

14.V. Jump-To Function to Emulate Relocation and/or Travel. The present invention also enables the rapid relocation or "jumping" between virtual locations.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

We claim:

1. A method for automatically selecting at least one element of a set of content items for presentation to a user through a device, comprising:
- determining a current context of said device, wherein said context has at least one dimension;
- automatically determining a relevancy value for each element of said set of content items with respect to said current context;
- automatically generating a probability value for each element of said set of content items from said relevancy values by mapping said relevancy value to an unadjusted probability value, wherein said mapping is a non-linear mapping defined by the equation:

Unadjusted Probability Value=$e^{**(A \times (\text{Relevancy Value})+B)}$ wherein $A$ is a scale value and $B$ is an offset value;

- probabilistically selecting at least one of said plurality of content items in accordance with each item's probability value; and
- presenting said at least one selected content item to said user through said device.

2. A method for automatically selecting at least one element of a set of content items for presentation to a user through a device, comprising:
- determining a current context of said device, wherein said context has at least one dimension;
- automatically determining a relevancy value for each element of said set plurality of content items with respect to said current context;
- automatically generating a probability value for each element of said set of content items from said relevancy values by mapping said relevancy value to an unadjusted probability value;
- adjusting said unadjusted probability value to generate an adjusted probability value by suppressing the unadjusted probability values of content items having similar, unadjusted probability values to generate the adjusted probability value, wherein said adjusted probability value is generated by the relations:

Adjusted Value($k$)=Unadjusted Value($k$)/Correction($k$)

Correction($k$)=Sum$\{j=1$ to $n\}(1/(1+(\text{Unadjusted Value}(k)-\text{Unadjusted Value}(j))^4))$ wherein Unadjusted Value(k) is the unadjusted probability for item "k", "n" is the number of said content items, and "j" is an index of iteration of unadjusted values;
- probabilistically selecting at least one of said plurality of content items in accordance with each item's probability value; and
- presenting said at least one selected content item to said user through said device.

* * * * *